(12) United States Patent
Goodman et al.

(10) Patent No.: US 7,020,697 B1
(45) Date of Patent: Mar. 28, 2006

(54) ARCHITECTURES FOR NETCENTRIC COMPUTING SYSTEMS

(75) Inventors: Marina Goodman, Chicago, IL (US); Tor Mesoy, Stabekk (NO); Stanton J. Taylor, Green Oaks, IL (US); Scott R. Reiter, Chicago, IL (US); Michael T. Bowen, Dallas, TX (US); Ralph Auriemma, Norridge, IL (US); Tamara D. Alairys, Lombard, IL (US); Christopher M. Degiorgio, Downers Grove, IL (US); Lizbeth Johnson Coleman, Lithonia, GA (US)

(73) Assignees: Accenture LLP, Chicago, IL (US); Accenture ANS, Oslo (NO)

( * ) Notice: Subject to any disclaimer, the term of this patent is extended or adjusted under 35 U.S.C. 154(b) by 841 days.

(21) Appl. No.: 09/706,012

(22) Filed: Nov. 3, 2000

Related U.S. Application Data

(63) Continuation-in-part of application No. 09/676,227, filed on Sep. 29, 2000, now abandoned.

(60) Provisional application No. 60/163,477, filed on Nov. 3, 1999, provisional application No. 60/156,962, filed on Oct. 1, 1999.

(51) Int. Cl.
   G06F 15/16 (2006.01)
   G06F 11/00 (2006.01)
(52) U.S. Cl. .................... 709/223; 709/229; 714/1
(58) Field of Classification Search ................ 709/224, 709/226, 223, 201, 225, 229; 707/513, 10, 707/2–6; 345/339; 714/1, 2
See application file for complete search history.

(56) References Cited

U.S. PATENT DOCUMENTS 4,809,170 A 2/1989 Leblang et al.

(Continued)

FOREIGN PATENT DOCUMENTS

EP 0520923 A2 12/1992

(Continued)

OTHER PUBLICATIONS

"Data Joiner: A Multidatabase Server Version 1," White Paper, IBM Data Management Solutions, IBM, USA, second edition (May 1995).

(Continued)

*Primary Examiner*—Paul H. Kang
(74) *Attorney, Agent, or Firm*—Brinks Hofer Gilson & Lione

(57) ABSTRACT

An execution architecture, a development architecture and an operations architecture for a netcentric computing system. The execution architecture contains common, run-time services required when an application executes in the netcentric computing system. The development architecture is the production environment for one or several systems development projects as well as for maintenance efforts. The purpose of the development environment is to support the tasks involved in the analysis, design, construction, and maintenance of business systems, as well as the associated management processes. It is important to note that the environment should adequately support all the development tasks, not just the code/compile/test/debug cycle. The operations architecture is a combination of tools and support services required to keep a production system up and running efficiently.

20 Claims, 37 Drawing Sheets

U.S. PATENT DOCUMENTS

| | | |
|---|---|---|
| 5,495,610 A | 2/1996 | Shing et al. |
| 5,535,388 A | 7/1996 | Takeda |
| 5,590,270 A | 12/1996 | Tsukuda et al. |
| 5,602,997 A | 2/1997 | Carpenter et al. |
| 5,619,716 A | 4/1997 | Nonaka et al. |
| 5,710,915 A | 1/1998 | McElhiney |
| 5,737,533 A | 4/1998 | de Hond |
| 5,742,829 A | 4/1998 | Davis et al. |
| 5,745,753 A | 4/1998 | Mosher, Jr. |
| 5,758,150 A | 5/1998 | Bell et al. |
| 5,761,071 A | 6/1998 | Bernstein et al. |
| 5,781,732 A | 7/1998 | Adams |
| 5,799,297 A | 8/1998 | Goodridge et al. |
| 5,805,785 A | 9/1998 | Dias et al. |
| 5,835,090 A | 11/1998 | Clark et al. |
| 5,859,969 A | 1/1999 | Oki et al. |
| 5,860,012 A | 1/1999 | Luu |
| 5,877,759 A * | 3/1999 | Bauer .................. 719/317 |
| 5,892,905 A * | 4/1999 | Brandt et al. ........... 713/201 |
| 5,905,868 A | 5/1999 | Baghai et al. |
| 5,911,071 A | 6/1999 | Jordan |
| 5,924,096 A | 7/1999 | Draper et al. |
| 5,930,512 A | 7/1999 | Boden et al. |
| 5,933,582 A | 8/1999 | Yamada |
| 5,956,400 A | 9/1999 | Chaum et al. ............ 380/4 |
| 5,956,479 A | 9/1999 | McInerney et al. |
| 6,006,171 A * | 12/1999 | Vines et al. ............ 702/184 |
| 6,012,071 A | 1/2000 | Krishna et al. |
| 6,023,698 A | 2/2000 | Lavey, Jr. et al. |
| 6,029,192 A | 2/2000 | Hill et al. |
| 6,038,560 A | 3/2000 | Wical |
| 6,061,695 A * | 5/2000 | Slivka et al. ............ 715/513 |
| 6,067,577 A | 5/2000 | Beard |
| 6,081,518 A | 6/2000 | Bowman Amuah |
| 6,112,304 A | 8/2000 | Clawson |
| 6,122,630 A | 9/2000 | Strickler et al. ............ 707/8 |
| 6,144,975 A | 11/2000 | Harris, Jr. et al. |
| 6,147,975 A | 11/2000 | Bowman Amuah |
| 6,185,573 B1 | 2/2001 | Angelucci et al. |
| 6,195,697 B1 | 2/2001 | Bowman Amuah |
| 6,256,773 B1 | 7/2001 | Bowman Amuah |
| 6,289,382 B1 * | 9/2001 | Bowman-Amuah ......... 709/226 |
| 6,321,263 B1 | 11/2001 | Luzzi et al. |
| 6,324,647 B1 | 11/2001 | Bowman Amuah |
| 6,332,163 B1 | 12/2001 | Bowman Amuah |
| 6,339,832 B1 | 1/2002 | Bowman Amuah |
| 6,345,239 B1 | 2/2002 | Bowman Amuah |
| 6,366,912 B1 | 4/2002 | Wallent et al. |
| 6,370,573 B1 | 4/2002 | Bowman Amuah |
| 6,385,655 B1 | 5/2002 | Smith et al. ............. 709/232 |
| 6,401,097 B1 | 6/2002 | McCotter et al. |
| 6,405,364 B1 * | 6/2002 | Bowman-Amuah ......... 717/101 |
| 6,418,430 B1 | 7/2002 | DeFazio et al. |
| 6,426,948 B1 | 7/2002 | Bowman Amuah |
| 6,427,132 B1 | 7/2002 | Bowman Amuah |
| 6,434,568 B1 | 8/2002 | Bowman Amuah |
| 6,434,628 B1 | 8/2002 | Bowman Amuah |
| 6,438,594 B1 | 8/2002 | Bowman Amuah |
| 6,442,547 B1 | 8/2002 | Bowman Amuah |
| 6,442,748 B1 | 8/2002 | Bowman Amuah |
| 6,449,588 B1 | 9/2002 | Bowman Amuah |
| 6,457,066 B1 | 9/2002 | Mein et al. |
| 6,477,580 B1 | 11/2002 | Bowman Amuah |
| 6,477,665 B1 | 11/2002 | Bowman Amuah |
| 6,496,850 B1 | 12/2002 | Bowman Amuah |
| 6,502,213 B1 | 12/2002 | Bowman Amuah |
| 6,523,027 B1 | 2/2003 | Underwood |
| 6,529,909 B1 | 3/2003 | Bowman Amuah |
| 6,529,948 B1 | 3/2003 | Bowman Amuah |
| 6,539,396 B1 | 3/2003 | Bowman Amuah |
| 6,542,593 B1 | 4/2003 | Bowman Amuah |
| 6,549,949 B1 | 4/2003 | Bowman Amuah |
| 6,550,057 B1 | 4/2003 | Bowman Amuah |
| 6,556,659 B1 | 4/2003 | Bowman Amuah |
| 6,571,282 B1 | 5/2003 | Bowman Amuah |
| 6,578,068 B1 | 6/2003 | Bowman Amuah |
| 6,584,466 B1 * | 6/2003 | Serbinis et al. ............. 707/10 |
| 6,598,046 B1 * | 7/2003 | Goldberg et al. ............ 707/5 |
| 6,601,192 B1 | 7/2003 | Bowman Amuah |
| 6,601,234 B1 | 7/2003 | Bowman Amuah |
| 6,606,660 B1 | 8/2003 | Bowman Amuah |
| 6,611,867 B1 | 8/2003 | Bowman Amuah |
| 6,615,199 B1 | 9/2003 | Bowman Amuah |
| 6,615,253 B1 | 9/2003 | Bowman Amuah |
| 6,615,258 B1 | 9/2003 | Barry et al. |
| 6,636,242 B1 | 10/2003 | Bowman Amuah |
| 6,640,238 B1 | 10/2003 | Bowman Amuah |
| 6,640,244 B1 | 10/2003 | Bowman Amuah |
| 6,640,249 B1 | 10/2003 | Bowman Amuah |
| 6,662,357 B1 | 12/2003 | Bowman Amuah |
| 6,697,824 B1 | 2/2004 | Bowman Amuah |
| 6,704,303 B1 | 3/2004 | Bowman Amuah |
| 6,707,812 B1 | 3/2004 | Bowman Amuah |
| 6,715,145 B1 | 3/2004 | Bowman Amuah |
| 6,721,713 B1 | 4/2004 | Guheen et al. ............. 705/1 |
| 6,742,015 B1 | 5/2004 | Bowman Amuah |
| 6,745,209 B1 | 6/2004 | Holenstein et al. ......... 707/203 |
| 2001/0052108 A1 | 12/2001 | Bowman-Amuah |
| 2002/0120553 A1 | 8/2002 | Bowman-Amuah |
| 2002/0133328 A1 | 9/2002 | Bowman-Amuah |
| 2003/0058277 A1 | 3/2003 | Bowman-Amuah |
| 2004/0030705 A1 | 2/2004 | Bowman-Amuah |
| 2004/0030749 A1 | 2/2004 | Bowman-Amuah |

FOREIGN PATENT DOCUMENTS

| | | |
|---|---|---|
| EP | 0697655 A2 | 2/1996 |
| EP | 0697691 A2 | 2/1996 |
| EP | 0769739 A2 | 4/1997 |
| EP | 0810520 A1 | 12/1997 |
| EP | 0829808 A2 | 3/1998 |
| EP | 0841616 A2 | 5/1998 |
| EP | 0915422 A1 | 5/1999 |
| GB | 2 315 891 A | 2/1998 |
| WO | WO 92/20022 | 11/1992 |
| WO | WO 95/23373 | 8/1995 |
| WO | WO 97/12311 A2 | 4/1997 |
| WO | WO 98/52121 A2 | 11/1998 |
| WO | WO 98/53396 A1 | 11/1998 |
| WO | WO 98/54660 | 12/1998 |
| WO | WO 98/57260 A1 | 12/1998 |
| WO | WO 99/38079 A1 | 7/1999 |

OTHER PUBLICATIONS

"Effective Systems management for DB2 Universal Database," White Paper, IBM Data Management Solutions, IBM, USA, first edition (Dec. 1996).

Abdel-Mottaleb, M., Hsiang-Lung, W., Dimitrova, N., "Aspects of Multimedia Retrieval," Philips Journal of Research, NL, Elsevier, Amsterdam, vol. 50, No. 1, 1996, pp. 227-251.

Bank, J.S., "Java Security," Dec. 8, 1995, pp. 1-13, X-002092325.

Billy B.L. Lim, "Teaching web development technologies in CS/IS curricula," ACM, copyright 1998, pp. 107-111.

Blakeley, J.A., "Universal Data Access with OLE DB," Proceedings of IEEE Compcon, U.S. Los Alamitos, IEEE Computer Society Press, Feb. 23, 1997, pp. 2-7.

Burke, M.G., Choi, J.D., Fink, S., Grove, D., Hind, M., Sarkar, V., Serrano, M.J., Sreedhar, V.C., Srinivasan, H., "The Jalapeno Dynamic Optimizing Compiler for Java,"

Java '99, San Francisco, CA, US, ACM Jun. 12, 1999, pp. 129-141 XP002134655.

Chamberlin, D.D., "Evolution of Object-Relational Database Technology in DB2," Compcon '97 Proceedings, IEEE, 1997, pp. 131-135.

Chamberlin, D.D., "Using the new DB2: IBM's object-relational database system," Morgan Kaufmann Publishers, USA, 1996, ISBN 1-55860-373-5, ppl. 561-567.

Clip, P., "Servlets: CGI The Java Way," BYTE, McGraw-Hill, Inc., St. Peterborough, US, vol. 23, No. 5, May 1, 1998, pp. 55-56.

Cramer, T., Friedman, R., Miller, T., Seberger, D., Wilson, R., Wolczko, M., "Compiling Java Just in Time," IEEE Micro, IEEE Inc., New York, US, vol. 17, No. 3, May 1, 1997, pp. 36-43 XP000656035, ISSN: 0272-1732.

Gwertzman, J.S., Seltzer, M., "The Case For Geographical Push-Caching," Workshop on Hot Topics in Operating Systems, May 4, 1995, pp. 51-55.

Hamilton, M.A., "Java and the shift to Net-centric computer," Sun Microsystems, Computer, paper published Aug. 1996, ISSN: 0018-9162, Aug. 1996, pp. 31-39.

IBM Technical Disclosure Bulletin, "Security, License Management and Application Metering Process for Controlling Applications in the DOS Environment," IBM Corp., New York, US, vol. 37, No. 11, pp 195-199, Nov. 1, 1994.

Joshi, S.M., Veeramani, D., "Book Review. Increasing the Interoperability of CAD Packages. CAD and Office Integration: OLE for Design and Modeling—A New Technology for CA-Software," Computer Aided Design, Elsevier Publishers BV, Barking, GB, vol. 29, No. 12, Dec. 1, 1997, pp. 907.

Koved, L., Nadalin, A.J., Neal, D., Lawson, T., "The Evolution of Java Security," IBM, The Ultimate Resource for Java Developers, 1998, pp. 1-14, XP002144222.

Lambert, N., "A New Patent Search Tool For The Internet. Q-PAT US." Database, US, Cincinnati, vol. 19, No. 4, Aug. 1, 1996.

Litoiu et al., "A performance engineering tool and method for distributed applications," ACM, pp. 1-14.

McDowell et al., "Unloading Java classes the contain static fields," ACM, v. 33(1), Oct. 15, 1997, pp. 56-60.

Nori, A.K., Kumar, S., "Bringing Objects to the Mainstream," Compcon '97 Proceedings, IEEE, 1997, pp. 136-142.

North, K., "Database Programming with OLE and ActiveX," DBMS, US, M&T Publ., Redwood City, CA, US, Nov. 1996, pp. 1-8.

Olson, M.A., "DataBlade extensions for INFORMIX-Universal Server," Compcon '97 Proceedings, IEEE, 1997, pp. 143-148.

Pleas, K., "Ole's Missing Links," BYTE, McGraw-Hill Inc., St. Peterborough, US, vol. 21, No. 4, Apr. 1, 1996, pp. 99-102 X-000586036, ISSN 0360-5280.

Schmoll, J. "Wird OLE for Process Controll (OPC) Ein Neuer Industriestandard?", Automatisierungstechnische Praxis, ATP, Oldenbourg, Verlag, Munchen, DE, vol. 39, No. 5, May 1, 1997, pp. 11-12, 14-17.

Smith, D., Tilley, S.R., Weiderman, N.H., "Transforming Legacy Application into Object-Oriented Applications Workshop, Will Net-Centric Computing Change the Reengineering Equation?" 1996, pp. 1-4.

Tanenbaum, A., "Computer Networks—Third Edition," Prentice-Hall International, London, GB, 1996, pp. 28-39, XP002161723.

Touch, J., Hughes, A.S., "LSAM proxy cache: a multicast distributed virtual cache," Computer Networks and ISDN Systems, North Holland Publishing, Amsterdam, NL (3W3 Workshop, University of Manchester, Jun. 15-17, 1998), vol. 30, No. 22-23, Nov. 25, 1998, pp. 22-23.

Williams, S., Kindel, C., "The Component Object Model. The Foundations for OLE Services," Dr. Dobb's Special Report. Winter, 1994/95, vol. 19, No. 16, Dec. 21, 1994 pp. 14-22.

Zoller et al., "A toolkit for an automatic, data dictionary based connection of databases to the WWW," ACM, copyright 1998, pp. 706-718.

Co-pending patent application, U.S. Appl. No. 09/386,917, filed Aug. 31, 1999; 340 pages; Inventor Michel K. Bowman-Amuah.

Co-pending patent application, U.S. Appl. No. 10/647,411, filed Aug. 25, 2003; 22 pages; Inventor Michel K. Bowman-Amuah.

Co-pending patent application, U.S. Appl. No. 09/387,654, filed Aug. 31, 1999; 818 pages; Inventor Michel K. Bowman-Amuah.

Engestrom, J., "Software Agents, Towards Transparent Mediation, A Technology Report for Salama Interactive," Jan. 1999, pp. 1-19.

Morris, K.C. and Flater, D., "Standards-based software testing in a Net-Centric World" pp. 1-8 (cited by Examiner, no date given).

Raje, R. and Chinnasamy, S., "Designing a distributed computing environment for global scale systems: challenges and issues," ACM SIGAPP Applied Computing Review, vol. 7, Issue 1, Spring 1999, pp. 25-30.

Copyright Registration for Netcentric Computing: Computing, Communications and knowledge, Reg. 9 Jan. 1998, p. 1.

Kramer, D., The Java™ Platform: A White Paper, JavaSoft, pp. 1-25, May 1996.

www.empowermentzone.com/javacomp.txt, Sun Microsystems, pp. 1-18, 1996.

Ryan, H.W., Sargent, S.R., Boudreau, T.M., Arvanitis, Y.S., Taylor, S.J., Mindrum, C.; "Practical Guide to Client/Server Computing," Second Edition, pp. 1-774; Copyright 1998, CRC Press LLC, Boca Raton, FL, United States.

Ryan, H.W.; Alber, M.W.; Taylor, S.J.; Chang, R.A.; Arvanitis, Y.S.; Davis, M.C.; Mullen, N.K.; Dove, S.L.; Mehra, P.N.; Mindrum, C.; "Netcentric Computing, Computing, Communications and Knowledge," pp. 1-413; Copyright 1998, CRC Press LLC, Boca Raton, FL, United States.

Orfali, R., Harkey, D., "Client/Server Programming with OS/2 2.0 (2nd Ed.)" 1992, Van Nostrand Reinhold New York, U.S., pp. 10-24, 111-137, 149-160, 588-594, XP002164217, ISBN 0-442-01219-5.

Orfali, R., Harkey, D., "Client/Server With Distributed Objects," Byte, McGraw-Hill, Inc., St. Peterborough, U.S., vol. 20, No. 4, Apr. 1, 1995, pp 151-152, 154, 156, XP000501827, ISSN 0360-5280.

Orfali, R., Harkey, D., Edwards, J., "Intergalactic Client/Server Computing," Byte, McGraw-Hill, Inc., St. Peterborough, U.S., vol. 20, No. 4, Apr. 1, 1995, pp. 108-110, 114, 11, XP000501823, ISSN: 0360-5280.

Lee, J., "Internet and Client Server Patent Information Systems: New Services from Derwent," World Patent Information, GB, Elsevier Sciences Publishing, Barking, vol. 20, No. 2, Jun. 1998, pp. 136-139, XP004165804, ISSN 0172-2190.

Borsook, P., "Seeking Security. Mainframe Techniques Define System Security. Soon, they'11 be Adapted To distributed Client/Server Systems." Byte, McGraw-Hill, Inc., St. Peterborough, vol. 18, No. 6, May 1, 1993, pp. 119-122, 124, 12, XP000359327, ISSN 0360-5280.

Aoyama, M., Hanai, Y., Suzuki, M., "An Integrated Software Maintenance Environment: Bridging Configuration Management and Quality Management," Proceedings of the Conference on Software Maintenance. From 1994 International Conference on Software Maintenance US, Washington, IEEE Computer Society Press, Oct. 24, 1988 pp. 40-44.

Voth, G.R., Kindel, C., Fujioka, J., "Distributed Application Developement For Three-Tier Architectures: MicroSoft on Windows DNA," IEEE Internet Computing, vol. 2, No. 2, Mar./Apr. 1998, IEEE, U.S., pp. 41-45.

* cited by examiner

US 7,020,697 B1

ARCHITECTURES FOR NETCENTRIC COMPUTING SYSTEMS

This application is a continuation-in-part of U.S. application Ser. No. 09/676,227 filed on Sep. 29, 2000, now abandoned, which claims the benefit of U.S. Provisional Ser. No. 60/156,962 filed Oct. 1, 1999. This application also claims the benefit under 35 U.S.C. §119(e) of U.S. Provisional Patent Application Ser. No. 60/163,477 filed on Nov. 3, 1999.

FIELD OF THE INVENTION

The present invention relates generally to business computing systems, and more particularly to a netcentric execution architecture, a development architecture and an operations architecture that are preferentially used with a netcentric computing system.

BACKGROUND OF THE INVENTION

Computer based business solutions have existed for various different types of transactions since the mid-to-late 1960s. During this time period, the technology focused on the use of batch technology. In batch processing, the business user would present a file of transaction to the application. The computer system would then run through the transactions, processing each one, essentially without user intervention. The system would provide reporting at some point in the batch processing. Typically, the reports would be batch printed, which in turn, would be used by the business user to correct the input transactions that were resubmitted along with the next batch of transactions.

In the 1970s, businesses began a transition to on-line, interactive transactions. At a conceptual level, this processing opened up the file of transactions found in batch transactions and allowed the user to submit them one at a time, receiving either immediate confirmation of the success of the transaction or else feedback on the nature of the transaction error. The conceptually simple change of having the user interact with the computer on a transaction-at-a-time basis caused huge changes in the nature of business computing. More important, users saw huge changes in what they could do on a day-to-day basis. Customers were no longer forced to wait for a batch run to process the particular application. In essence, the computer had an impact on the entire work flow of the business user.

Along with the advent of on-line interactive systems, it was equally significant that the systems provided a means for the business user to communicate with others in the business as the day-to-day business went along. This capability was provided on the backbone of a wide area network (WAN). The WAN was in itself a demanding technology during this time period and because of these demands telecommunications groups emerged within organizations, charged with the responsibility to maintain, evolve, and manage the network over a period of time.

The theme of the 1980s was database management systems (DBMSs). Organizations used and applied database technology in the 1970s, but in the 1980s they grew more confident in the application of DBMS technology. Because of the advances in network technology, the focus was now on the sharing of data across organizational and application boundaries. Curiously, database technology did not change the fundamental way in which business processing was done. DBMS made it more convenient to access the data and to ensure that it could be updated while maintaining the integrity of the data.

In the 1990s, technology began to shift toward client/server computing. Client/server computing is a style of computing involving multiple processors, one of which is typically a workstation, and across which a single business transaction is completed. Using the workstation, the transaction entered by the user could now be processed on a keystroke-by-keystroke basis.

Furthermore, there was a change in the communications. With client/server, users could communicate with others in the work group via a local area network (LAN). The LAN permitted workstation-to-workstation communications at speeds of 100 to 1,000 times what was typically available on a WAN. The LAN was a technology that could be grown and evolved in a local office with little need for direct interaction from the telecommunications group.

During the late 1990s, the Internet began to receive widespread use by consumers and businesses. In the business world, the Internet has caused the concept of business users to expand greatly because of the way in which computers are now capable of being interconnected. In addition, the cost of computers has dropped to the point that it is affordable for almost every household to own a computer if they so desire. As such, a need to expand the reach of computing both within and outside the enterprise, and that enables the sharing of data and content between individuals and applications has developed.

SUMMARY OF THE INVENTION

The present invention discloses an architecture for a netcentric computer system that is capable of expanding the reach of computing both within and outside the business enterprise. An discloses architecture for a netcentric computing system is disclosed that brings new technologies to the forefront, especially in the area of external presence and access, ease of distribution, and advanced media capabilities. Browsers, which provide a universal client, offer a new option in distributing functionality to both internal and external users. In prior art client/server environments, distributing an application internally or externally for a business enterprise require the application to be recompiled and tested for all specific workstation operating systems. In addition, it usually required loading the application on each client or workstation.

The browser-centric application style offers an alternative to these prior art solutions. Web browsers provide a "universal client" that offer users a consistent and familiar graphical user interface. Using a browser, a user can launch many types of applications and view many types of documents and media types. This can be accomplished on different operating systems/platforms and is independent of where the applications or documents reside. To that end, browsers change the way in which information is stored, transferred and updated as well as the way in which applications are executed.

Netcentric computing systems also provide an external presence and unprecedented access to supplier-to-customer relationships. By connecting a business node to the Internet, a series of opportunities is opened up to reach an audience outside a company's traditional internal users. Consequently, the Internet has become another vehicle for companies to conduct business with their customers and suppliers through the broadcasting of product and service descriptions, exchanging interactive information and conducting actual business transactions.

Another benefit of netcentric computing systems is the ability to digitize, organize, and deliver textual, graphical and other information in addition to traditional data to a broader audience. Netcentric technologies (such as HTML documents, plug-ins and Java) and standardization of media information formats enable support for these types of complex documents, applications, and even nondiscrete data types such as audio and video. Advances in network bandwidth and compression technologies continue to make richer media-enabled applications more feasible on the Internet.

Netcentric computing systems also provide advantages over client/server computing by providing application version checking and dynamic updating capabilities. Configuration management of traditional client/server applications, which tend to be stored on both client hard disks and on the server, is a major issue for many corporations. The distribution and update problems of such applications that are packaged as one large, or a combination of a few large executable files, makes minor updates difficult for even a small-scale user population because, every time an update is made, a process must be initiated to distribute new code to all client machines.

Both netcentric computing systems as well as traditional client/server systems are tiered architectures. In both cases, there is a distribution of presentation services, application code and data across clients and servers. In addition, in both cases there is a networking protocol that is used for conducting communication between clients and servers. However, there are a number of important differences between client/server systems and netcentric systems.

For netcentric computing systems, the manner in which the application logic is distributed to clients differs from traditional client/server systems. In netcentric computing systems, application logic can be packaged into components and distributed from a server to a client over a network connection between the client and server. In traditional client/server systems, the application logic is split between the client and the server on a permanent basis; there is normally no dynamic distribution of application logic.

The client in netcentric computing systems also differs from the traditional client in client/server system. In netcentric computing systems the client has standardized interfaces so that an application can execute with a client that can run on multiple operating systems and hardware platforms. In traditional client/server systems, the client must be custom-made for a specific operating system and hardware platform. Further, the way in netcentric computing systems can be extended and adapted is different. Components enable netcentric computing systems to be adaptable to a variety of distribution styles, from a "thin client" to a "fat client." In comparison, as known to those skilled in the art, once designed and built, client/server systems are less easily adapted for use with more than one computing style.

Netcentric architectures for netcentric computing systems support a style of computing where processes on different machines communicate using messages. In this style of computing, "client" processes delegate business functions or other tasks (such as data manipulation logic) to one or more server processes. Server processes respond to messages from clients. Business logic can reside on both client and/or server. Clients are typically PCs or workstations with a graphical user interface running a web browser. Servers are preferentially implemented on UNIX, NT, or mainframe machines. In netcentric computing systems, there is a tendency to move more business logic to the servers, although "fatter" clients result from new technologies such as Java and ActiveX.

A preferred embodiment of the present invention discloses an architecture for a netcentric computing system. The architecture for the netcentric computing system includes a business solutions architecture layer; an application architecture layer in communication with said business solutions layer; a technical architecture layer in communication with said application architecture layer; and a platform architecture layer in communication with said technical architecture layer.

Another preferred embodiment of the present invention discloses a netcentric computing system. The netcentric computing system includes a business solutions architecture layer that has an environment layer, a business requirements layer and a data architecture layer. An application architecture layer is in communication with the business solutions layer. A technical architecture layer that includes an infrastructure layer and a system software layer is in communication with the application architecture layer. The system software layer includes a netcentric execution architecture, a development architecture and an operations architecture. A platform architecture layer is in communication with the technical architecture layer. The platform architecture layer includes a hardware/network layer that includes the physical components that makeup the netcentric computing system.

Another preferred embodiment of the present invention discloses an execution architecture for a netcentric computing system. The preferred execution architecture includes a client that is connected with a server. The client preferentially includes a presentation service, an information service, a communication service, a communication fabric service, a transaction service, an environment service and a business logic service. In addition, the server includes a base service, the information service, the communication service, the communication fabric service, the transaction service, the environment service and the business logic service.

Another preferred embodiment of the present invention discloses a development architecture for a netcentric computing system. The development architecture includes a development organization framework layer; a development process framework layer; and a development tools framework layer. The development organization framework layer comprises an information management team, a quality team, an environment management team, a release management team, a configuration management team, a problem management team, a program and project management team and a security management team.

The development process framework layer comprises a system building service, a management process service, a security management process service, a quality management process service, a program and project management process service, an environment management process service, a release management process service, a configuration management process service and a problem management process service. The development tools framework layer comprises a system building tool, an information management tool, a security management tool, a quality management tool, a program and project management tool, an environment management tool, a release management tool, a productivity tool, a collaboration tool and a process integration tool. The above-referenced elements combine to form a robust development architecture that substantially reduces development time of applications deployed on the netcentric computing system.

Another preferred embodiment of the present invention discloses an operations architecture for a netcentric computing system. The preferred operations architecture includes a operations integration architecture component; a network/systems management component; a solution availability component; a service management component; a configuration management component; a physical site management component; an operations data architecture; an operations execution architecture and an operations development architecture. The preferred operations architecture is a combination of tools and support services required to keep a production system up and running efficiently. Unlike the execution and development architectures, its primary users are system administrators, production support, and service management personnel.

Further objects and advantages of the present invention will be apparent from the following description, reference being made to the accompanying drawings wherein preferred embodiments of the present invention are clearly shown.

DETAILED DESCRIPTION OF THE PRESENTLY PREFERRED EMBODIMENTS OF THE INVENTION

Figure 1:
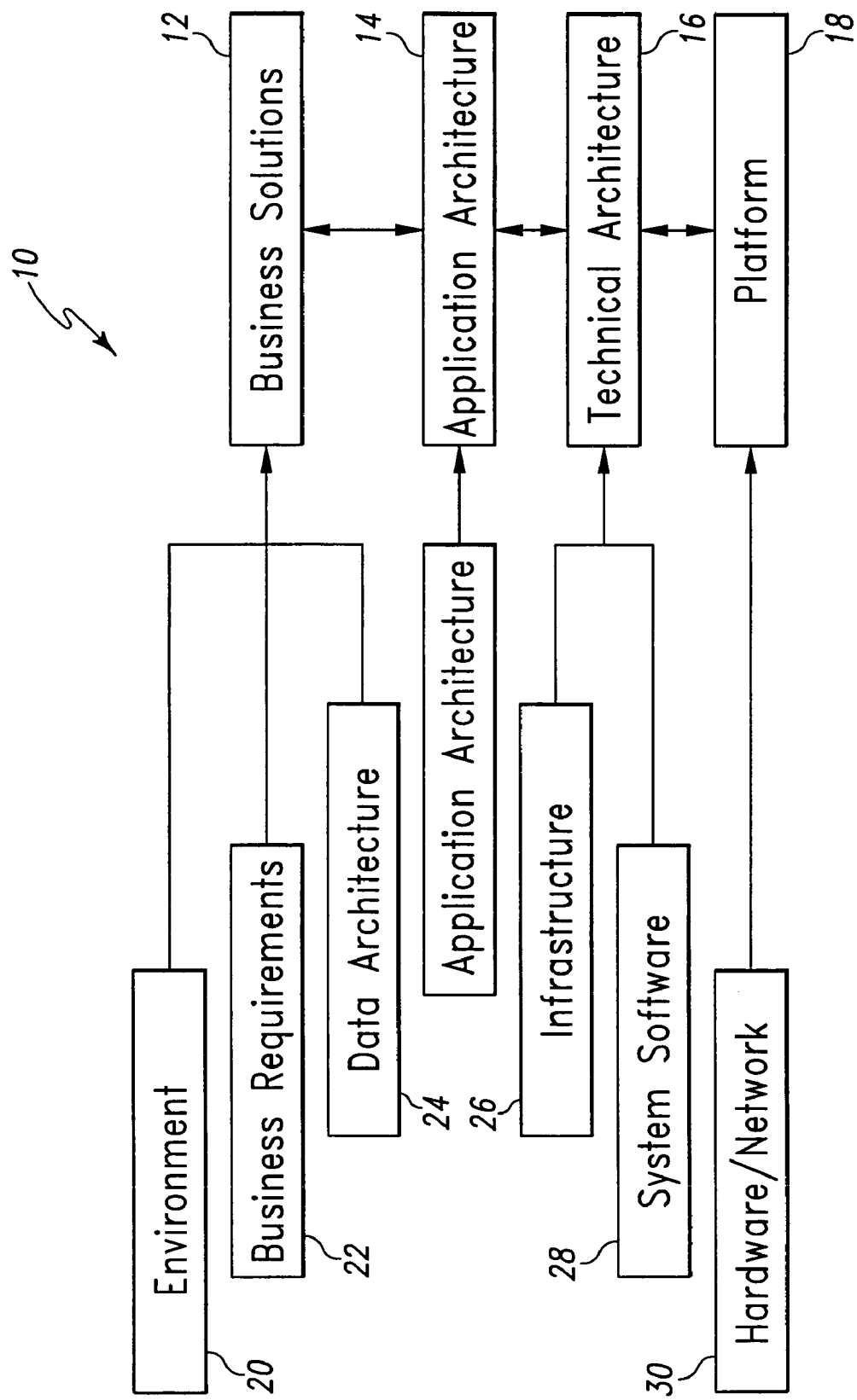
FIG. 1 illustrates a block diagram of the architecture for a netcentric computing system.

Referring to FIG. 1, a block diagram of an architecture for a netcentric computing system 10 is illustrated. The architecture for the netcentric computing system 10 includes a business solutions architecture layer 12, an applications architecture layer 14, a technical architecture layer 16 and a platform architecture layer 18. Generally speaking, the business solutions architecture layer 12 includes an environment layer 20, a business requirements layer 22 and a data architecture layer 24. The technical architecture layer 16 includes a infrastructure layer 26 and a system software layer 28. The platform architecture layer 18 includes a hardware/network layer 30.

In the preferred embodiment, the environment layer 20 uses applications designed to handle factors that influence the business requirements layer 22 and the technical architecture layer 16. These factors may be either internal (e.g.— profitability) or external (e.g.—government regulation or market competition). The business requirements layer 22 uses applications designed to handle the business needs of the organization that can be automated with the assistance of the netcentric computing system 10. These needs include providing products and services and interacting with business partners through the use of the netcentric computing system 10. Both the environment layer 20 and the business requirements layer 22 are mainly concerned with processing business-level processes, strategies and direction.

The data architecture layer 24 consists of a high-level data design with applications designed to satisfy the needs of a business enterprise's data handling requirements in terms of entities and relationships. The structure and relationships of data entities are used to define the basic relationships of business functions and applications that comprise the data architecture layer 24. The infrastructure layer 26 deals with those components of an architecture that are used by multiple applications and that are developed and maintained within the business enterprise. Usually, these technical components help support the applications architecture 14. The infrastructure layer 26 also includes the technical infrastructure of the organization that manages and operates the netcentric computing system 10.

The system software layer 28 includes the software applications and standards obtained from and maintained by outside vendors (e.g. a database management system.) In addition, the system software layer 28 may include applications that are custom written for the enterprise. The hardware/network layer 30 deals with central processing units or workstations, servers, local area networks (LAN), wide area networks (WAN), and other hardware and physical network components of the architecture for the netcentric computing system 10.

The exact structure of the business solutions architecture 12 will vary depending on the environment layer 20, the business requirements layer 22 and the data architecture layer 24. As previously set forth, the environment layer 20 and the business requirements layer 22 are mainly concerned with business-level processes, strategies and directions. The data architecture layer 24 is designed to serve the data needs of an enterprise based on the setup and structure of the environment layer 20 and the business requirements layer 22. Those skilled in the art should recognize that the decisions made for the application architecture 14 and the data architecture 24 drive the requirements of the technical architecture 16 and the platform architecture 18.

In general, the application architecture 14 is defined herein as the services that perform business functions on a computer. It represents the components or applications that provide automation support for a business function or activity in the business process. For example, a manufacture's sales and marketing netcentric computing system might include sales tracking applications and the distributed data architecture to support both networked sales offices and mobile sales persons.

Figure 2:
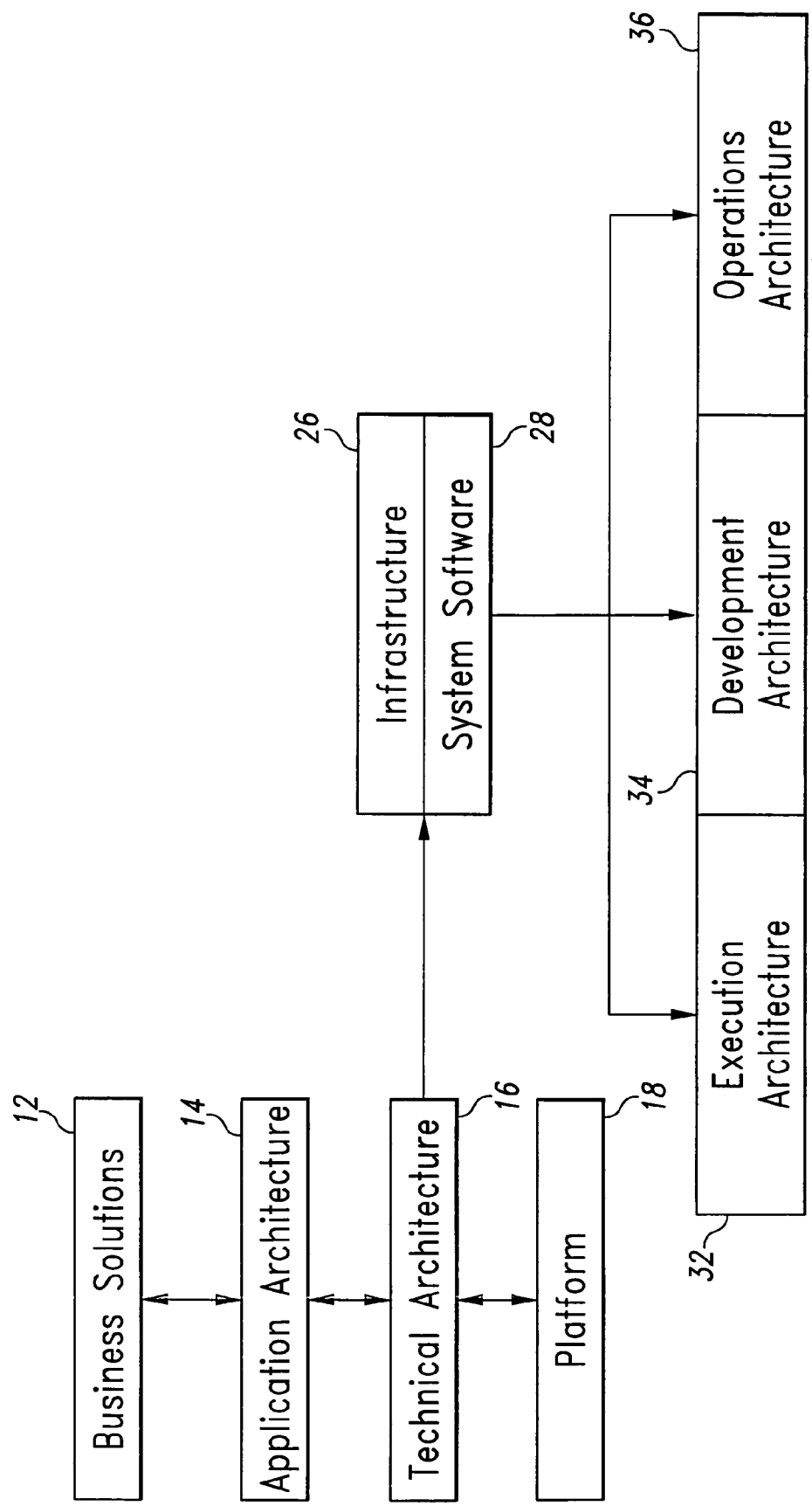
FIG. 2 illustrates a block diagram of the preferred technical architecture of the netcentric computing system.

As previously set forth, the infrastructure layer 26 and the system software layer 28 are combined to form the technical architecture 16. In general, the technical architecture 16 is where the buy decisions of the system software marketplace are combined with the build decisions for the needs of specific applications. Referring to FIG. 2, the technical architecture 16 of the netcentric computing system 10 is comprised of a netcentric execution architecture 32, a development architecture 34 and an operations architecture 36. Each of these architectures will be discussed in detail in the sections that follow.

The platform architecture 18 can be described as the things a person can see. The platform architecture 18 provides a framework for selecting the platform components required: servers, workstations, operating systems and networks. The platform architecture 18 represents the overall technology platform for the implementation and deployment of the previously mentioned netcentric execution architecture 32, development architecture 34, operations architecture 36 and the software applications that are included in these architectures 32, 34, 36.

Figure 3:
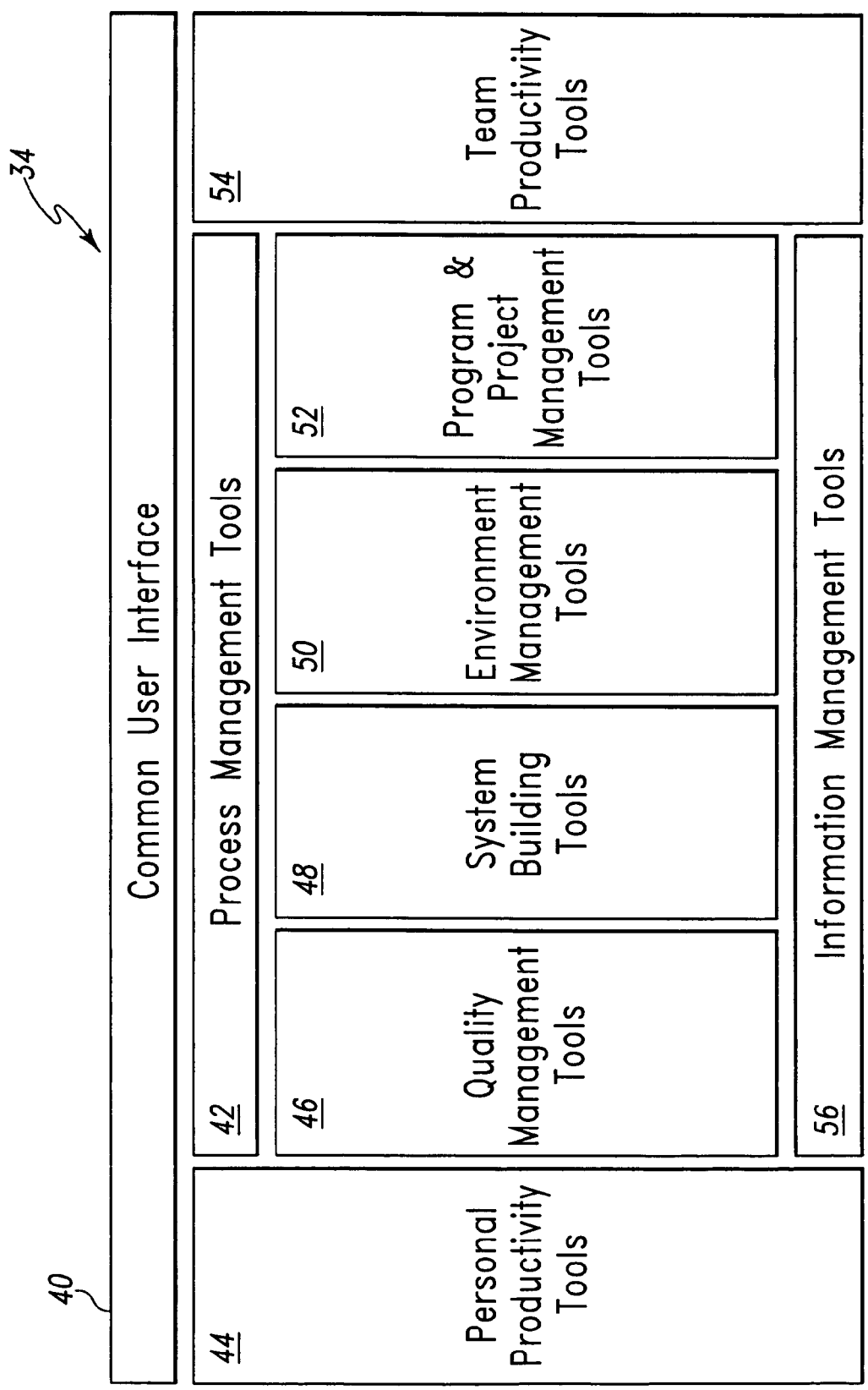
FIG. 3 illustrates a block diagram of the preferred development architecture of the netcentric computing system.

Referring to FIG. 3, the development architecture 34 includes a common user interface 40, at least one process management tool 42, at least one personal productivity tool 44, at least one quality management tool 46, at least one systems building tool 48, at least one environment management tool 50, at least one program and project management tool 52, at least one team productivity tool 54 and at least one information management tool 56. The purpose of the development architecture 34 is to support the tasks involved in the analysis design, construction and maintenance of business systems as well as the associated management processes. It is important to note that the development architecture 34 should adequately support all of the development tasks, not just the code/compile/test/debug cycle.

The common user interface 40 of the development architecture 34 provides a common launching place for all of the tools in the netcentric computing system 10 to make it more integrated and consistent. All of the tools that are used in the development architecture 34 are presented to the developer via a single view of the entire environment. Tools that support the common user interface 40 are known as window managers (e.g., Microsoft Windows, Presentation Manager and Motif). The process management tools 42 are used to integrate the development architecture 34 by providing tool-to-tool communication and workflow management. Tool-to-tool communication integrates tools by enabling information in the form of short messages to be passed from one tool to another. Those skilled in the art would recognize that tools may take the form of specialized software applications or applets designed to perform predetermined tasks in the netcentric computing system 10.

Workflow management integration builds a development methodology and process into the tool environment. Workflow management enforces the correct sequencing of tasks and tools. Process integration is often implemented through the use of integration frameworks or through custom coding of interfaces. The personal productivity tools 44 are a collection of software applications that enhance the development environment for the individual developer. These applications are typically integrated suites of PC software that allow the developer to work on the workstation independent of the development server or mainframe to complete tasks, such as analysis and documentation. The personal productivity tools 44 are basic office automation applications and typically include spreadsheet applications, word processing applications, graphic applications (e.g., drawing, diagramming, and presentation), and personal calendar applications. Those skilled in the art would recognize that various personal productivity tools 44 may be incorporated in the present invention.

The quality management tools 46 support the planning and measurement of quality in the enterprise. In the preferred embodiment, quality management is a management discipline that promotes a customer satisfaction focus and continuous improvement. The preferred quality management tools 46 may be selected from the group consisting of quality function deployment tools, measurement and metrics tools, statistical process control tools, and continuous improvement tools. In the preferred embodiment of the present invention, these quality management tools 46 would be represented by software applications that are directed toward the specific needs of the business enterprise.

The system building tools 48 comprise the core of the development architecture and are used to design, build and test the overall functionality of the netcentric computing system 10. In the preferred embodiment of the present invention, all of the system building tools 48 must be integrated and share development objects appropriately. The preferred system building tools 48 may be selected from the group consisting of analysis and design tools, reverse engineering tools, construction tools, testing tools and configuration management tools.

The environment management tools 50 monitor performance, provide help desk support, manage and distribute changes to the development architecture 34, administer the environment, and track and plan capacity. The development architecture 34 supports many different functional and technical requirements (illustrated by the execution architecture 32), many different development teams, and tools from many different product vendors, and often must support projects in different states of the development life cycle. Some examples of environment management tools 50 may be selected from the group of service management tools, systems management tools, update management tools and service planning tools.

The program and project management tools 52 provide many key features that assist project planners in planning, scheduling, tracking and reporting on project segments, tasks and milestones. In the preferred embodiment of the present invention, the program project management tools 52 are differentiated by the ability to support multiple projects, complex functions and adequate performance when supporting multiple concurrent projects. The program and project management tools 52 may be selected from the group consisting of planning tools, scheduling tools, tracking tools and reporting tools. Those skilled in the art would recognize that depending on the enterprise's operations, the programming and project management tools may vary from enterprise to enterprise.

The team productivity tools 54 are used to make the work, sell and project team as a whole more productive within the enterprise. Instead of the software residing on an individual's PC or work station, the team productivity tools 54 are typically LAN based and shared by the project members. In the preferred embodiment of the present invention, the team productivity tools 54 are focused on enhancing communication and information sharing within the business enterprise and may be selected from the group consisting of e-mail tools, teamware tools, publishing tools, group calendar tools, and methodology browsing tools. Those skilled in the art would recognize that several other team productivity tools may be incorporated into the architecture for the netcentric computing system 10.

The information management tools 56 are provided through a development repository. In a preferred embodiment of the present invention, the information is stored on such devices as hard drives, CD-ROMS, and magnetic tapes. However, those skilled in the art would recognize that various other storage devices may be used as well. The information management tools 56 share a common repository of development objects, design documents, source code, and test plans and data. Ideally, the repository would be a single database with an all-encompassing information model. The development repository is built by integrating the repositories of the different development tools through various interfaces. Specific tool vendors may also build part of the integrated repository by integrating specific products. In the preferred embodiment of the present invention, the information management tools 56 include folder management tools and repository management tools.

For a more detailed discussion of the preferred development architecture 34 refer to U.S. patent application Ser. No. 09/677,065, entitled DEVELOPMENT ARCHITECTURES FOR NETCENTRIC COMPUTING SYSTEMS, which is incorporated herein by reference in its entirety.

Figure 15:
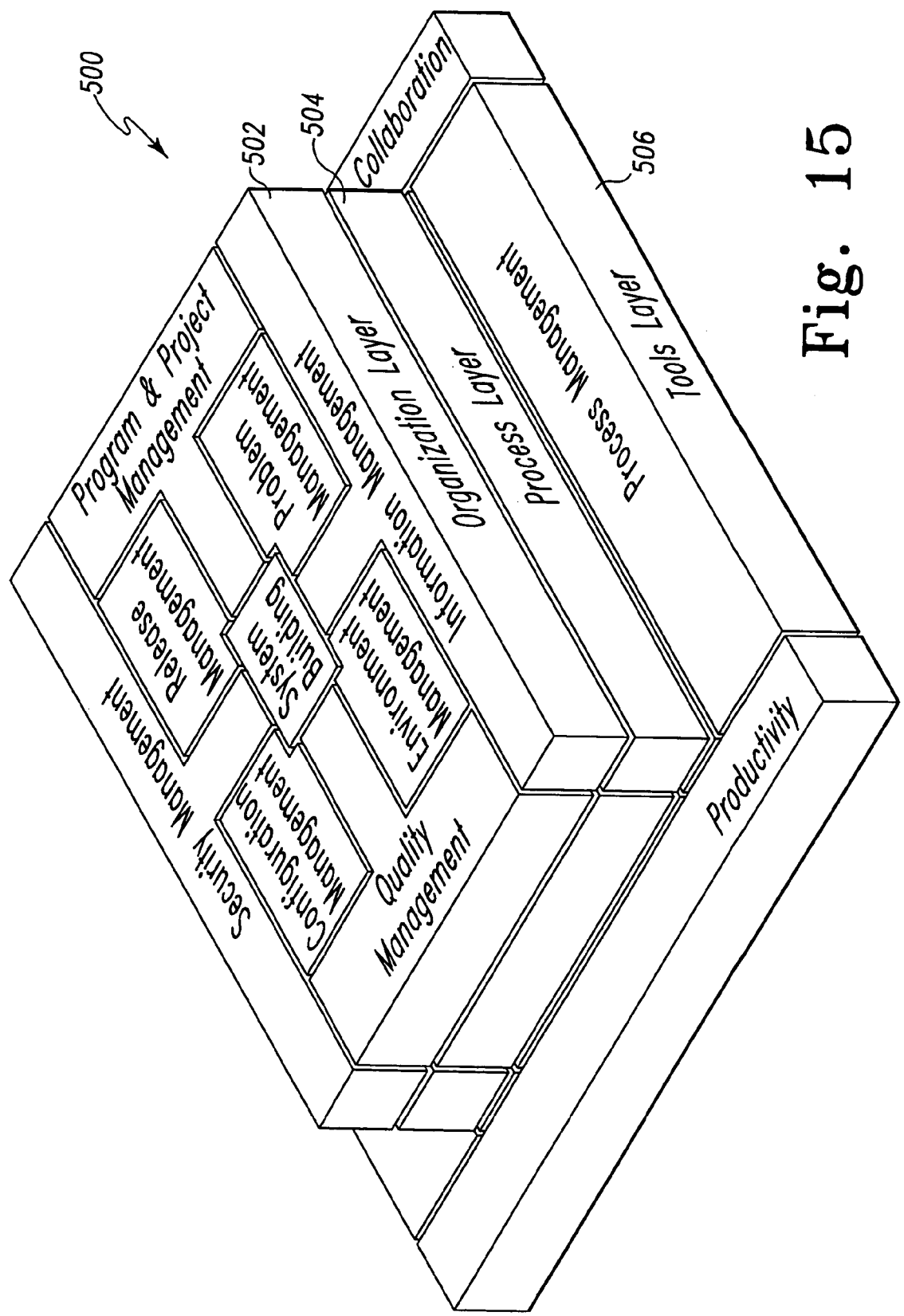
FIG. 15 illustrates another preferred development architecture.

Referring to FIG. 15, another preferred development architecture 500 is illustrated. As previously set forth, the development architecture 500 is the production environment for one or several systems development projects, as well as for maintenance efforts. The purpose of the development architecture 500 is to support the tasks involved in the analysis, design, construction, and maintenance of business systems, as well as the associated management processes. It is important to note that the development architecture 500 adequately supports all the development tasks, not just the code/compile/test/debug cycle.

Another reason for the comprehensive framework that is disclosed by the development architecture 500 is that it is important to get the development architecture 500 right the first time. Changing the development architecture 500 when construction is fully staffed may entail serious disruptions and expensive loss of productivity. Experience has shown that within the same medium- to large-size project, with the same people, moving from a poor to good development architecture 500, productivity can be improved by a factor of ten for many tasks. The improvements come in two categories: the elimination of redundant and non value-added tasks, and the streamlining of useful tasks.

While it seems intuitive that most tasks can be streamlined, the following list gives a few examples of redundant tasks that can be eliminated, if the preferred development architecture 500 is used in the netcentric computing system 10. Analysis to determine how to merge the uncoordinated changes applied by two programmers to the same module. Re-entry of the source code and retesting of a module, which was accidentally deleted. Recurring discussions about "what a design packet should contain" or "what constitutes good programming style in a particular context." Repeated design, coding, testing, and maintenance of very similar logic (for example, error handling, date conversion and manipulation, main structure of a module). Searching for the manuals of a particular productivity tool to find information. Remigration to system test of a cycle, because the impact analysis for a change request was incomplete. Requesting support from another team (for example, environment support, information management) and waiting unnecessarily for a response.

The preferred development architecture 500 of the present invention provides an integrated development environment. The integrated development environment provides a development environment framework and associated guidelines that reduce the effort and costs involved with designing, implementing and maintaining an integrated development environment. The preferred development architecture 500 takes a holistic approach to the development environment in netcentric computing systems 10 by addressing all three business integration components: organization, processes and tools.

Returning to FIG. 15, the preferred development architecture 500 includes a development organization framework layer 502, a development process framework layer 504, and a development tools framework layer 506. The development organization framework layer 502 deals broadly with organizing individuals into teams that are responsible for various aspects of designing, maintaining and updating applications of the netcentric computing system 10. When designing a business application, it is crucial to keep in mind the organization that will use the system. The same is true of the development architecture 500. The development organization's size, structure, experience, and maturity should strongly influence the choice of tools and the way the tools are integrated into the netcentric computing system 500. If this link is not understood, the benefit of tool support will be minimal in many areas, and may significantly reduce productivity.

In the same way, when a new business capability is introduced, it is crucial to keep in mind the needs for training and organizational change that may accompany the technical change. This is also true of the development architecture 500. When a new development architecture 500 is put in place, the developers need to learn not only how each individual tool works (for example, how to use the compiler), but also how the tools work together to support the organization as it performs well-defined processes.

The preferred development organization framework layer 502 uses business integration methodology to provide valuable information on an entity's organizational issues. Relying on the business integration methodology and project organization guidelines, the following should be prepared: 1) a list of responsibilities covering both responsibilities for end products and those for on-going processes; and 2) a Responsibility, Accountability, and Authority profiles deliverable (RAA) for each role in the development team, making sure that all the responsibilities listed earlier are covered.

The RAA profiles deliverable consist of statements about the responsibilities, accountability, and authority of each of the positions in the development organization. These statements define the role of each position in terms of: responsibility, as to what objectives the position is expected to accomplish; accountability, as to how and by whom the performance will be measured; and authority, as to the position's decision-making capabilities and limits.

Figure 16:
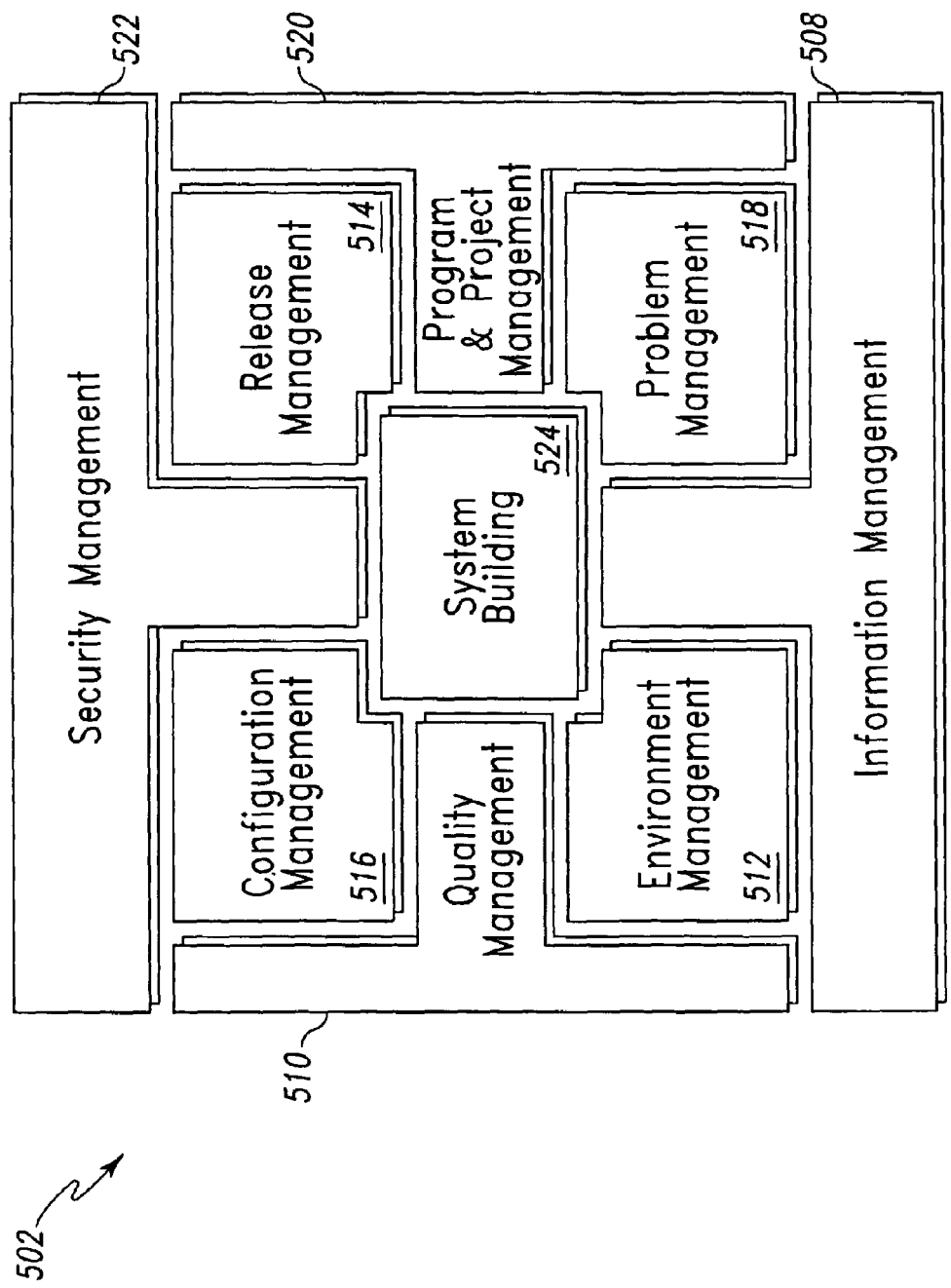
FIG. 16 illustrates the development organization framework layer of the preferred development architecture illustrated in FIG. 15.

Referring to FIG. 16, the development organization framework layer 502 includes a plurality of management teams with responsibilities for key management functions of the development architecture 500. The preferred management teams include an information management team 508; a quality team 510; an environment management team 512; a release management team 514; a configuration management team 516; a problem management team 518, a program and project management team 520; and a security management team 522. Together, these teams 508–522 support the efforts of a system building team 524, which is charged with the analysis, design, build, and test of the system to be developed. These teams 508–522 represent real roles, and, on a given program, the same people may play different roles.

As set forth above, the preferred development organization framework layer 502 includes a security management team 522. The evolution of new technologies and expanded access to a virtual world has increased the security risk of conducting business. It is therefore essential to recognize the need for a new unit in the organization, specifically dedicated to ensuring that security is handled appropriately. At the application level, the security management team 522: ensures all security issues are effectively addressed throughout the program (all business and IT processes); acts as facilitator and approving body for all new and existing initiatives that contain security components; owns responsibility for the organization and facilitation of working groups that would address security issues; and is responsible for development and maintenance of a security plan.

The size of the security management team 522, and the way in which it is integrated into the development organization framework layer 502 depends on the degree to which security is a factor for the specific environment. For example, the security risks associated with an Internet-based online banking system are far greater than those of a fully isolated client/server system, and therefore warrant a larger team with broader responsibilities and greater influence.

Figure 17:
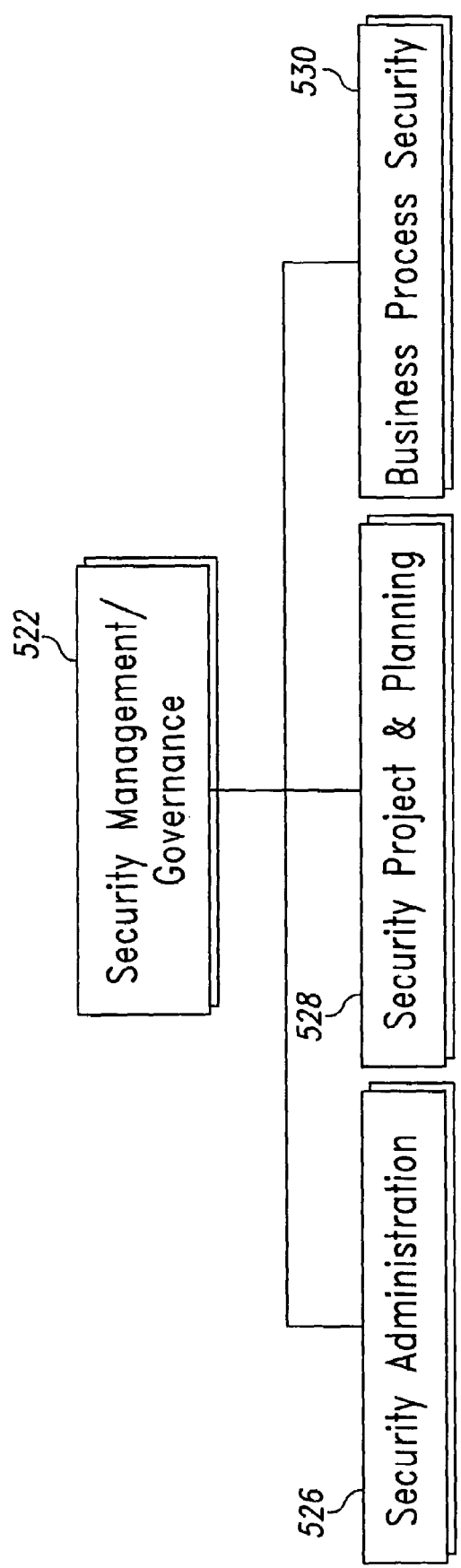
FIG. 17 depicts an illustrative security organization functional structure.

An example of security organization functional structure is illustrated in FIG. 17. In this example, the security management team 522 is broken down into three categories: a security management team 526, security project and planning team 528, and business process security team 530. As discussed below, each of these categories is responsible for particular security issues surrounding the netcentric computing system 10.

The security administration team 526 is preferentially responsible for maintaining user access to systems and applications, implementing and maintaining security administration tools, analyzing security logs and investigating security violations, and, configuring security systems on all technology platforms. The security project and planning team 528 is responsible for threat/risk assessment; designing and implementing security into new technology/systems; developing and maintaining security policies and procedures; developing and maintaining a disaster recovery plan; and, developing and maintaining a user awareness plan and providing security training for users. The business process security team 530 is responsible for defining functional requirements, defining and monitoring key security performance indicators for business processes, and working with audit and engineering to develop and improve business process controls.

The information management team 508 is responsible for ensuring that the project's knowledge capital and information resources are managed effectively. This includes: ensuring integrity; ensuring accessibility; and, ensuring quality and consistency. Information management encompasses repository management, but generally has a broader scope than merely the repository contents, because most repositories are not capable of holding all the information resources of a project. It is, for example, common to have key project information reside in a combination of repositories, teamware databases, flat files, and paper documents. It is the information management team's 508 responsibility to ensure consistency across all these formats.

The responsibilities of the information management team 508 therefore cover: repository management; folder management; object management; media content management; and information and data reuse coordination. In addition to managing the information for the system building team 524, the information management team 508 also manages the information resources of the other management processes-quality management, environment management, and project management.

In order to delineate the responsibilities of the information management team 508, it is useful to state those areas that are out of scope. The following are not included: performance of daily backups, which is handled by the environment management team 512; database administration; and, performance tuning of the information repositories, which is also handled by the environment management team 512.

The information management team 508 is ultimately responsible for the contents of the repository. They need to have an intimate understanding of the repository structure and the rules that govern how different objects should be stored in the repository. Although most of the inputs to the repository are entered by designers, the repository management team 508 must manage this population process. Rather than taking a policing role on the project, they should work as facilitators, helping the designers do things correctly the first time, thereby maintaining the integrity of the repository. Without strong repository management, the benefits of using a repository quickly diminish.

In many situations the information management team 508 must make decisions that affect functional areas. To empower the information management team 508, the application developers should include the information management team 508 in relevant design discussions. This facilitates the validation of design outputs.

The information management team 508 is also responsible for folder management. Folders (or directories) can be very useful in gaining control over the overwhelming amount of information produced on a large project. Their utility greatly increases if they are managed appropriately. This management is based on easy-to-follow, easy-to-enforce standards.

The responsibilities involved with object management are very similar to those involved with repository management. However, in order to facilitate and promote reuse, it is recommended to have a librarian whose responsibilities include: reviewing designs; packaging classes and components for reuse; and, managing maintenance and upgrades of common components (a strong relationship with the configuration management team 516 is required).

The information management team 508 is also responsible for media content management. The methods of handling media content are somewhat different from those surrounding more traditional development content such as code or documentation, for this reason, a role should be defined that is responsible for the management of all media content.

The quality management team 510 is responsible for defining and implementing the quality management approach, which means defining what quality means for the program leadership, and then implementing the procedures, standards, and tools required to ensure the delivery of a quality application. The quality management approach addresses concepts such as expectation management, quality verification, process management, metrics, and continuous improvement. Since quality is the result of the interaction of many teams working on multiple processes, the quality management team 510 is responsible for ensuring effective cooperation between teams and good integration of the development processes. The quality management team 510 must therefore forge strong links with all the other project teams. It is important to note that the quality management team 510 is not only responsible for ensuring the quality of the system building process. The quality management team 510 is also directly involved in ensuring the quality of the other integrated development environment management processes.

The program and project management team 520 is responsible for delivering business capability. In this respect, it is responsible for the system building team 524 and other management teams. In addition, other management responsibilities that do not have a specific team or role defined within the integrated development environment also belongs to the program and project management team 520. These include: contingency management; financial management; issue management (decisions to be made regarding the development of the business capability, not to be confused with problem management); program performance reporting; resource management; risk management; and, vendor management.

The program and project management team 520 is also responsible for producing a deliverable or set of deliverables. As such, it is responsible for: planning and control of delivery; milestones and schedule; resource consumption; and, risk and quality (at deliverable levels).

The configuration management team 516 is responsible for defining the approach the program takes to deal with scope, change control, version control, migration control, and for establishing the policies, processes, and procedures required to implement this approach. In other words, the configuration management team 516 is responsible for maintaining the integrity of software and critical documents as they evolve through the delivery life cycle from analysis through deployment.

The development organization framework layer 502 also includes a release management team 514. Delivering a system on a release-based approach means delivering the system in a series of consecutive releases, increasing or refining functionality progressively. Some of the main drivers to such an approach include: to release business benefits early; to mitigate impact on the organization; to keep the change program up to date; to optimize processes; to test proof of concept; and, to reduce risk.

The release management team 514 is responsible for: planning the capability release design and development effort, based on the capability development approach and timeline; measuring and monitoring progress using established processes to ensure that a capability release is delivered on time, within budget, and that it meets or exceeds expectations; managing project interdependencies to ensure delivery of the capability release; and, ensuring that resources are used effectively across projects for the release.

As with many other management responsibilities, release management is more a role than a function. It is good practice to have as many areas as possible represented in the release management team 514; for example, design, construction, configuration, and environment management team 512 members would make up a typical release management team 514, each providing input based on their own perspective.

The development organization framework layer 502 also includes an environment management team 512. Just as a business application requires support and system users require service, the development environment requires system operations daily, and developers require ongoing support in order to use the environment effectively (In fact, the complexity and frequency of these operations is often greater than that of the execution environment).

The environment management team 512 is responsible for performing, assisting and overseeing that various tasks are performed. Some of the responsibilities include performing back-ups, performing preventative maintenance, database reorganization, resource management, daily operation, repository, equipment installation, network operations, and systems software operations. Service developers of the environment management team 512 are responsible for supporting the execution architecture 32, the development architecture 500, the operations architecture 36, networks, tools, technical standards, developers help desk, performance monitoring, design review, general technical support, and act as an information systems liaison.

The service developers serve as a single point of contact for developers. They provide answers to questions from developers. To avoid adding overhead to the issue resolution process, the support group must be staffed adequately to ensure that all questions are answered. For example, the support group should recruit people from the technology infrastructure team at the completion of technology infrastructure development, which is discussed later.

The development organization framework layer 502 also includes a problem management team 518. Problem management is concerned with the discrepancies that result from the testing process and the management of design problems detected during verification or validation steps throughout the development process. The problem management team 518 is responsible for defining the problem tracking and solution process, and for providing tools and procedures to support the solution process. The focus of the problem management team 518 will vary from organization to organization.

The development organization framework layer 502 also includes a system building team 524. The Business Integration Methodology (BIM) describes system building under the following activities: design application; build and test application; design technology infrastructure; and, build and test technology infrastructure. For this reason, the system building team 524 is organized into an application team 532, and a technology infrastructure team 534 (not illustrated).

Figure 18:
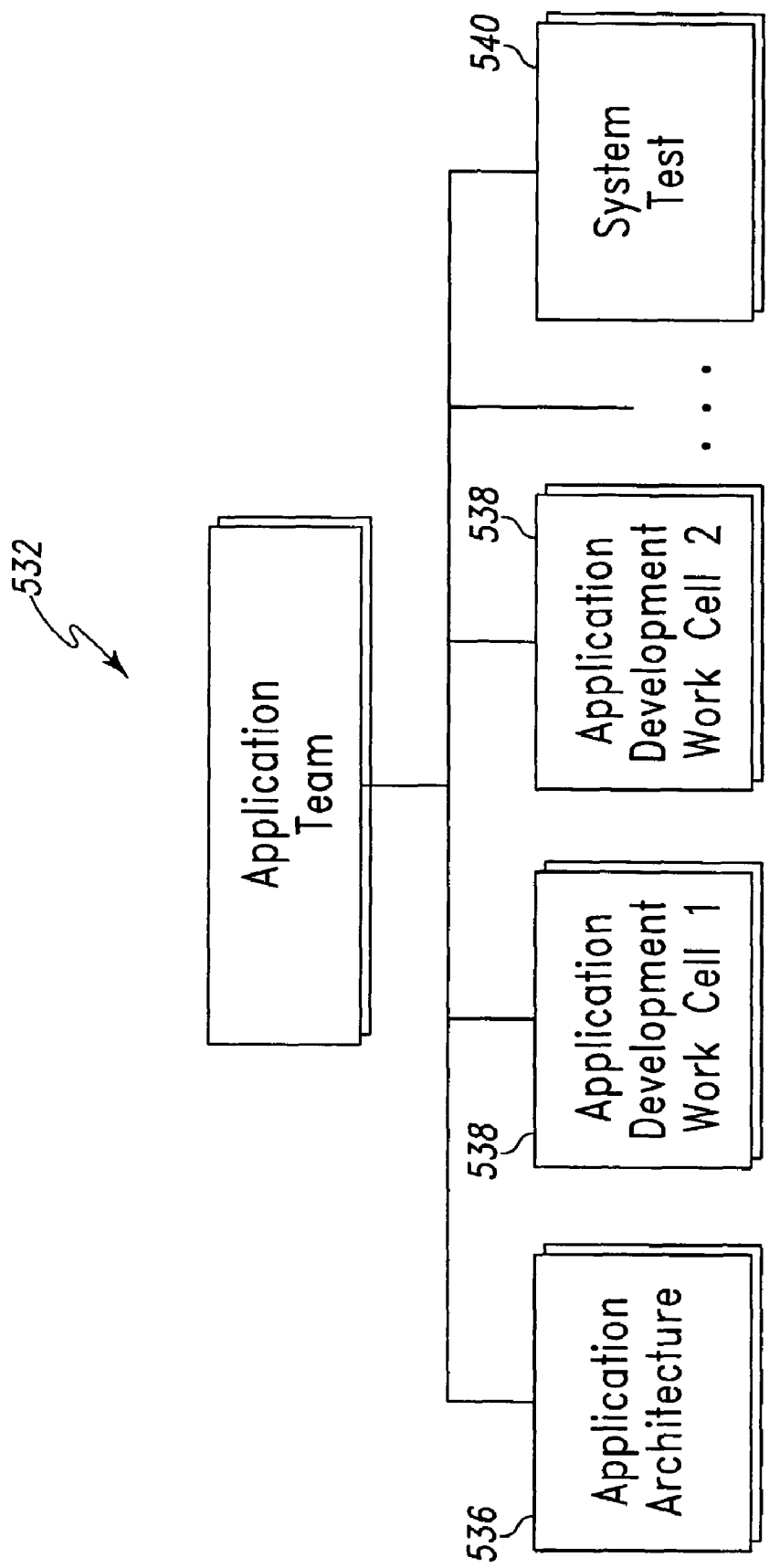
FIG. 18 illustrates the preferred application team.

Referring to FIG. 18, the application team 532 consists of three separate subteams: an application architecture team 536; at least one application development team 538; and, a system test team 540. The application architecture team 536 is responsible for ensuring common code/component design and construction, technical standards design/documentation, cod/component reuse coordination, and security.

The structure of the application team 532 evolves as the development process continues. As the development of the application architecture components is completed, the application architecture team's 536 roles may change. While the team 536 continues maintaining the application architecture components, some team members may be deployed to the application development team 538. Here their roles can include helping application developers to correctly use the architecture components, providing development support, and performing code reviews, and so forth.

As systems become more user-facing, important new roles have emerged that are integrated into the application development teams 538, which include media content design and usability. For any system with a user-facing component, it is extremely important that media and design specialists are involved as team members at an early stage in the design of the system. In systems with simple user interfaces, this helps to ensure usability and consistency. As user interfaces become more complex, the early involvement of design experts not only leads to more creative and attractive user interfaces, but also reduces the risk of further alteration to work at a later stage. Often coupled with media content design, it is vital that a role for usability is defined within the application development teams 538. This will ensure the usability of the system from the perspective of target user groups. The application development team 538 is responsible for the coding of applications, detailed design of applications, security, component testing, assembly testing, user procedures, and user training development.

The technology infrastructure evolves throughout the project, and responsibility for managing and evolving the infrastructure must be clearly defined. Therefore, rather than having a single amorphous 'technical team' (responsible for operations, support, architecture evolution, and more), it is important to define a dedicated technology infrastructure team 534. By allowing the technology infrastructure team 534 to focus on the technology infrastructure, rather than the day-to-day running of the environment, the project increases the chances that the technology infrastructure will provide good support for the business applications. In practice, the technology infrastructure team 534 is the team that will implement the integrated development environment framework.

The technology infrastructure team 534 is responsible for: data design and management; database administration; database tuning; execution architecture 32 design and construction; development architecture design and construction; operations architecture design and construction; network design; technical standards design and documentation; system software selection; performance tuning of the final system; and, security infrastructure development. The responsibilities of the technology infrastructure team 534 may overlap with those of the application architecture team 536, and, on some projects, the two teams may be combined.

Referring to FIG. 15, as previously set forth, the preferred development architecture 500 includes a development process framework layer 504. A thorough understanding of the development processes is a prerequisite for ensuring that the tools effectively support the organization and the processes they are intended to support. The development process framework layer 504 facilitates the analysis of the many concurrent processes of systems development. This analysis helps understand process interaction, which, in turn, affects organizational interaction and defines a need for tools integration.

Figure 19:
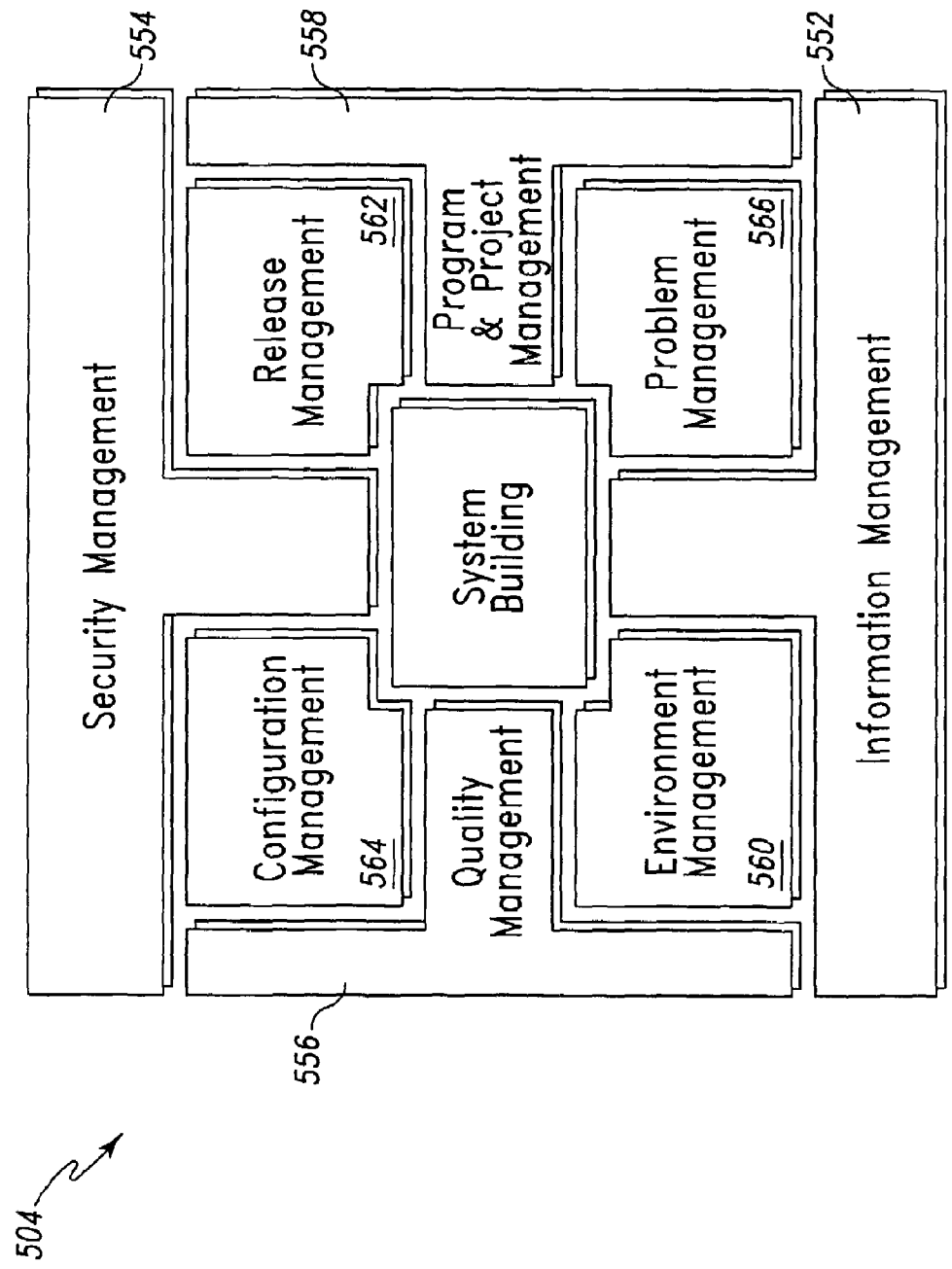
FIG. 19 illustrates the preferred development process framework layer.

As illustrated in FIG. 19, at the core of the development process framework layer 504 is a system building service 550, which is surrounded by eight key process services. The preferential process services include information management process services 552, security management process services 554, quality management process services 556, program and project management process services 558, environment management process services 560, release management process services 562, configuration management process services 564, and problem management process services 566. The core activity, systems building services 550, depends strongly on support from the surrounding management processes, which all affect each other.

The information management process services 552 manage the information that supports the entire project, i.e., information that is used both in systems building and in other management processes. The security management process services 554 cover all areas of development security, from coding standards, to security verification. The quality management process services 556 pertain to all areas of the development environment. The program and project management process services 558 must manage all the management processes, in addition to managing the systems building process.

The environment management process services 560 supports the environment where management processes are performed, and where systems are being built. The release management process services 562 manage the simultaneous development of multiple releases. The configuration management process services 564, often closely linked with release management, cover the version control, migration control, and change control of system components, such as code and its associated documentation. The problem management process services pertain to the problem tracking and solution process.

For a given project, each of the processes must be defined at a greater level of detail than that which any methodology can achieve. This additional specification consists of a set of procedures and standards that specify how to perform the work and what to produce at each step.

Standards specify what the results should look like. They may include industry standards and more formal (de jure) standards, such as POSIX compliance, but most standards are project specific and determine, for example, how to structure and name system components, and where to place system components. Standards make it possible for a large team to exchange information effectively and to work productively together.

Standards should focus on what must be common, and should not become a goal in themselves. Erring on the side of over-standardization stifles productivity. It is, however, often the case that unforeseen events (such as platform demise, tool evolution) will be easier to tackle the more unified the development approach has been. Unfortunately, there is no substitute for experience when making the detailed decisions on exactly what should be standardized. Factors to take into account should at least include: life expectancy of the system under development—the higher the life expectancy, the more standards are warranted; life expectancy of the development organization—the higher the life expectancy, the more standards are justified; attrition—a stable organization can tackle more detailed standards than a volatile one; and, expected change in the environment—a high rate of change provides greater opportunity to reap the benefits of a standardized approach.

Procedures specify how to perform a task. They are generally guided by the methodology but provide information at a lower level of detail. They are highly environment-specific, and take into account the organization, the standards, and the tools in the environment. Procedures often specify the techniques to be used. They may specify which tools to use and how to use the tools that support these techniques. Many processes require individual judgment, and the way to perform these processes cannot be specified in detail. In such cases, it may be valuable to provide guidelines that do not have the mandatory flavor of procedures but rather that of valuable advice.

While it is easy to generate zeal to set up standards and procedures at the beginning of a project, it can sometimes be more difficult to ensure that these are enforced throughout the project. Two considerations are useful. Firstly, standards must be easy to follow. It should be easier to follow the standard than doing things any other way. This is generally achieved by supplying the training, tools, and support needed to facilitate a given work style. For example, developing and distributing application program shells, which respect the architecture and standards, facilitates programming and contributes to ensuring broad standards compliance. Secondly, the responsibility for enforcing standards must be clearly identified and assigned. Standards enforcement must take place as a natural part of the process and at well-defined check points before work flows to the next task, or (even more importantly) to the next group or team.

A very useful way of complementing the specification of procedures is to provide samples. Samples can sometimes convey a message much faster than pages of explanatory prose. Sample programs are generally very useful. Other samples may include logs, which demonstrate interaction with tools, a sample change request, or a sample request for technical support. Samples can sometimes be created efficiently by taking screen dumps. This can be much faster than specifying what the screen should look like in theory.

Samples and standards must be high quality, any quality breach win be multiplied when developers start using them. It is therefore imperative that samples and standards not be created in a vacuum, but be based on concrete experience with the project's development environment. Some pilot development work often proves extremely useful when fine tuning the standards.

When documenting the process, it is useful to develop an approach and process description for each project segment and for each high-level process. This document summarizes the support available for that segment or process. It refers to all the standards, procedures, guidelines, and examples relevant to a collection of tasks. Such a summary document makes it easier for developers to navigate the standards and hence, to follow them.

To ensure that the project team works effectively together, numerous processes must be integrated. A simple example is provided by the required integration between design and construction. A subtler one is the integration of product quality inspection and the continuous improvement process.

As process integration frequently involves several teams, it is crucial to understand the interfaces between processes and teams to ensure good hand-offs. This understanding must have a direct impact on tools integration, so that integrated processes are supported by integrated tools. Tools that support multiple processes performed by the same individual must, at a minimum, be integrated at the user interface level and should ideally be integrated at the process level. Tools that support processes performed by different individuals may only have to be integrated at the data level.

The security management process services 554 ensure security is properly designed and built into the netcentric computing system 10 that is being developed, including: definition of security requirements based on business risk; development of security standards, guidelines and procedures; implementation of security controls; and, security validation. Security requirements are defined by a security risk assessment. This is the process of identifying business risks, identifying system vulnerabilities or weaknesses that can impact those risks, and recommending mechanisms to control the vulnerabilities. Specific confidentiality, integrity and availability requirements for the new system and the development environment are defined through this process.

Security standards, guidelines and procedures provide security direction to the implementation. They will help define how the security requirements developed through the risk assessment must be addressed in all areas of the development environment. They will include security standards for the development environment infrastructure, procedures for the development processes, standards for the design of the security architecture and security guidelines for programming. It is especially important to ensure the security of the development environment because if these systems are broken into and back doors are introduced, it may lead to later compromise of the production system. It will be the responsibility of all developers that these security controls are implemented and adhered to throughout the development process.

In order to ensure the security of the netcentric computing system 10, periodical security audits should be arranged, in order to verify that the processes and architecture and application components that are being developed conform to security proven practices. This may be done by an external body specializing in security (such as Global TIS-Security) in the form of interviews, architecture and code reviews, and automated tool assessment.

The degree to which security should be implemented in a development environment should be determined by the amount of risk in the environment, and the functionality and access levels required by the developers. Security controls should not be so restrictive as to inhibit legitimate access needs to data and systems. In general, higher security will result in lower flexibility of the development environment.

Figure 20:
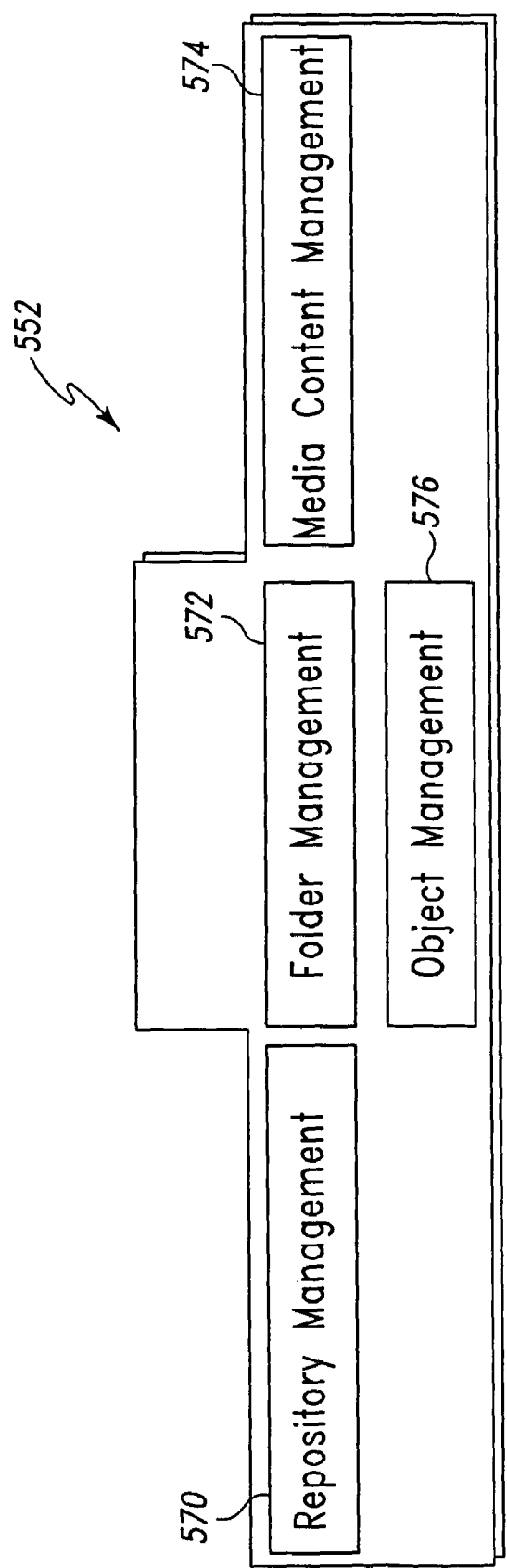
FIG. 20 illustrates the preferred information management process services.

The preferred development process framework layer 504 includes information process management services 552. A vast amount of information is generated within the development environment, which needs to be carefully managed (for example, design documentation, application code, media content, test plans and test data). Referring to FIG. 20, the preferred information process management services 552 include repository management services 570, folder management services 572, and, where applicable, media content management services 574 and object management services 576.

Since a number of teams rely on the service provided by the information management team, it is important that the level of service to be provided be chosen carefully, documented, and communicated. The arrangement should take the form of a Service Level Agreement (SLA). An SLA typically defines how quickly a new data element is created and how repository changes are communicated. More generally, it defines the division of responsibilities between the information management team and the other project teams at a detailed level.

The repository management services 570 include activities and applications that monitor these activities, such as: monitoring and controlling update activities in the repository; receiving and validating data element change requests; creating and modifying data elements; enforcing project standards regarding repository objects; validating the contents of the repository to avoid redundancy and inconsistencies; ensuring accuracy of the repository contents so that the repository reflects the applications being developed; importing and exporting from one repository to another; and, maintenance of the information model (or metamodel), which describes how data is represented within the repository.

As many repositories do not provide sufficient versioning functionality, it is common to have more than one repository on large projects. Typically, there may be one repository for development, one for system test, and one for production. This allows better control, but also requires significant resources to move repository objects from the development environment to the system test environment. By merging the development and system test repositories, the medium-sized project has a potential for productivity gains. If these gains are to be realized, great care must be taken when making corrections during system test. As a common repository is shared, any error analysis involving repository objects must take into account the possibility that these objects could have changed since the previous migration to system test. This situation can be managed by meticulously maintaining a comprehensive change log, which the repository management services 570 may provide in certain embodiments.

The repository management services 570 may maintain a delta repository. Another reason for maintaining several copies of the repository is the existence of concurrent projects focusing on different releases. If this is the case, it may be beneficial to maintain delta repositories, which document those components that have been modified. This requires strict repository management but the reward can be significant. It allows the merging of several releases, which have implemented complementary functionality, but which have modified a few shared components.

A single development environment may have to deal with multiple repositories. For functional reasons, one repository might be integrated with an upper-case design tool and the other with a lower-case generation tool. In a multi-site environment, repositories may be distributed over different locations. In order to keep these repositories synchronized, well-defined development processes must be implemented. The repository management services 570 provide a well-defined development process.

The repository management services 570 can be divided into the following services: security services; maintenance services; validation and mass change services; and, analysis, reporting, and querying services. The security services provide restricted access to various kinds of repositories. Restricted access to repository object types is necessary to ensure high quality repository content, because developers sometimes take shortcuts and make unauthorized changes to meet their deadlines. When standards have been set, a good way to enforce them is to restrict personnel through the use of locking mechanisms. Access to repository object types typically changes throughout the project.

The data elements are preferentially controlled by a repository management team, because they are the basic building blocks of the netcentric computing system 10 and have broad reuse. Poorly defined data elements can cause inconsistency, redundancy, and generation errors. Data elements are therefore preferentially locked at least by the time construction starts, and possibly earlier, depending on the discipline of the team. Project members must be allowed to browse the data elements, but only the repository management team should be allowed to modify or unlock data elements. In some repositories, it is difficult to restrict the creation of repository objects. If this is the case, it may be acceptable to let designers create data elements if these are reviewed and locked at the end of each day. Increased control can be obtained by having designers submit requests for new data elements to the repository administrator. This allows the repository manager to evaluate whether the new data element is justified, or whether an existing one should be used.

The repository maintenance services are responsible for creating and maintaining data elements and other repository objects. Requests for data element changes are preferentially forwarded using a database, but may be done using a paper-based system, as well. The database is updated using an application that monitors and tracks requests for data element changes. Based on functional and technical knowledge, the repository administrator evaluates the requests and may involve other teams to make appropriate decisions regarding requested changes.

The database used to request data element changes during design and programming should be separate from the project's change request database. This will simplify and speed up the change process. When data elements have to be changed during system test, however, the impact can be much greater, and the regular change request database should be used.

Whenever a data element is changed, impact analysis should be performed to understand the side-effects. The repository manager should be able to obtain the list of direct references and the list of all components affected indirectly (transitive closure). In the latter case, a message based on a record containing a group, which makes reference to a changed data element is considered to be indirectly affected by the change. When adding a data element, no functional equivalent must exist, because redundancy creates difficulties for impact analysis and future maintenance.

The objects related to dialog definitions, reports, messages, and so forth, are usually maintained by designers and programmers. When the dialogs and report applications are tested, approved, and ready to be promoted to the system test environment, the related objects must be locked. The repository maintenance services lock these objects.

The repository validation and mass changes services are responsible for keeping data elements consistent and in compliance with project standards. This daily effort is crucial to avoid a massive clean-up, which would be necessary if the repository manager ever lost control of the repository. Detailed, project-specific standards should exist for defining repository objects. These standards form the basis for a repository validation application, which can run through the entire repository and report on detected deviations from standards. In some cases, this program can also enforce the standard.

Mass changes to the repository can be performed when the validation reports show the occurrence of many standards violations that follow a common pattern. This may occur in cases where: project standards have been incomplete; project standards have changed; repository management has been poor; and, new objects have been imported from another repository.

The analysis, reports, and queries services is responsible for generating certain reports that should be run daily, such as the list of new data elements or modified data elements. These reports can serve as an audit trail of changes and can be used to communicate changes to the entire team. Procedures should specify which reports are run daily and what their distribution should be. The repository management team performs certain analyses repeatedly. Standard analyses such as impact analyses should be specified in detail to facilitate staffing flexibility. When supporting specific kinds of repository analysis, the repository management team can provide custom reports or ad hoc queries that satisfy particular needs.

As illustrated in FIG. 20, the preferred information management process services 552 includes folder management services 572. The folder management services 572 set up and communicate a detailed folder structure with specified access rights. Contents of folders are checked regularly by applications or users to ensure that folders contain what they are supposed to. In the preferred embodiment, folders can be organized by type of component so that one folder contains all the include files, one folder contains the source modules, one folder contains executables, and so on. Folders can also be organized functionally so that all the common components reside in one folder and each application area stores its components in its own folder.

Choosing the strategy used depends on how components are named, on the number of components, and on the tools used. If naming standards make it easy to identify the component type (for example, by using suffixes), organizing them by functional area is generally useful and straightforward to administer. Some tools assume that closely linked files (for example, source and object modules) reside in the same folder.

Figure 21:
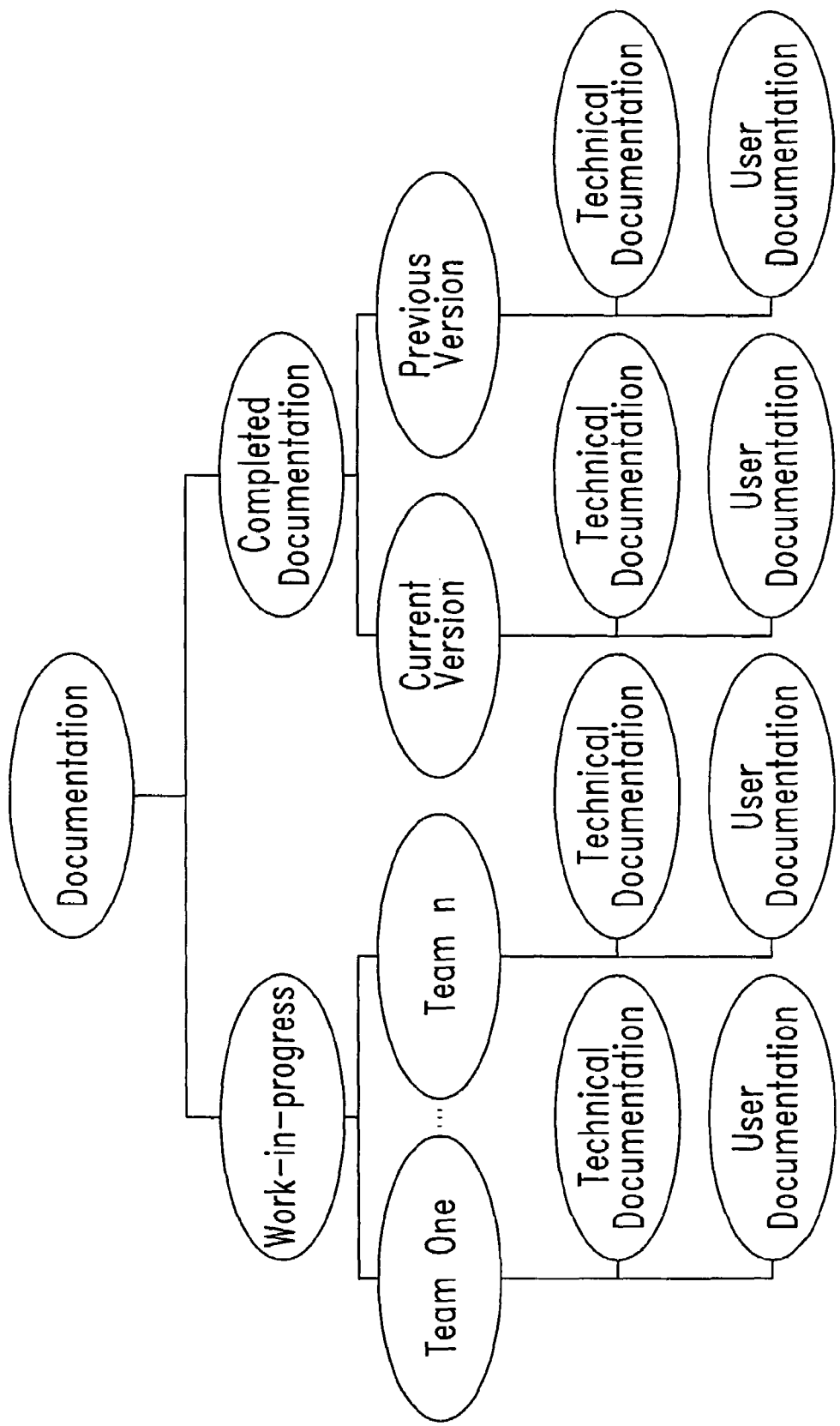
FIG. 21 illustrates the preferred folder management services folder structure.

Another important distinction maintained by the folder management services 572 is the one between work in progress and completed documents that have been approved. This distinction is supported by a folder structure with carefully chosen access rights. An example of how the folder management services 572 maintain documentation for an application is illustrated in FIG. 21. As illustrated, documentation is divided into two general categories, work-in-progress and completed documentation. Work-in-progress can further be divided into teams, wherein each team maintains its own technical documentation and user documentation. Completed documentation is broken down by versions; including a current version folder and a previous version folder that contain technical documentation and user documentation.

While scratch folders may be useful in certain contexts, the proliferation of miscellaneous folders with cryptic names can make it very difficult to navigate the information. Some useful guidelines include: keep the folder structure under central control; within personal folders, allow users to create any folder structure; clearly assign ownership for the contents of each folder; document each folder, either in a central location, or in the form of a readme type file within the folder itself; the high-level documentation should include the purpose of the folder and the kinds of contents it should hold; and, perform regular clean-up, by backing up redundant or misplaced files and then removing them.

The preferred information process management services 552 also include media content management services 574. The unique nature of media content means that it cannot be treated in the same way as 'standard' formats, such as source code or design documentation. The major differentiating factors are its sheer volume (media files can range from a Kilobyte to multiple Gigabytes), and the complexity of its associated formats (i.e. it is not easy to 'look into' a media file and understand its contents). For this reason, some of the processes that support multimedia content management must be handled differently.

The three major processes that are required to support media content management are: storage management services; metadata management services; and version control services. Storage management services deal with the methods of storing and retrieving media content. The cost of data storage may be decreasing, but it is still the case that for large volumes of media it is often uneconomical to store everything on-line. For this reason, processes are implemented with the storage management services that manage where data is stored, and how it is transitioned from one location to another within the netcentric computing system 10. There are three ways data is stored in the present invention: on-line (Instant access, for example, hard disk); near-line (delayed access, for example, CD-ROM jukebox); and, off-line (manual access, for example, CDs or tapes on shelves).

When deciding on where media content should be stored, there is always a trade-off between accessibility and cost (on-line storage being the most accessible and most expensive, and off-line the cheapest but least accessible). The decision of which method to use for which data may depend on a combination of its type, volume, version (i.e. latest or historic) and accessibility requirements.

The metadata management services store data about the media that is stored. Data about the media that is being stored is an important commodity that must be managed. As the volume of media content grows, it is vital to understand characteristics of the media, in order to be able to manage it correctly. Examples of metadata that may be monitored include: media type (for example, MPEG video, JPEG image); media settings (for example, sample rate, resolution, compression attributes); usage details (which module uses the content); media source (for example, Source, author, creation date); and, legal information (for example, whether the media is copyrighted).

As with standard development code, when media content is created and edited, the version control services maintain a revision history of changes. This way, if it is necessary to revert to an original piece of media content, it is not necessary to go all the way back to the original source (which in the case of finding an image in a CD-ROM library containing 10,000 images, for example, could be a difficult task). In practice, this may mean storing the original and final copies of media (especially where volume is an issue). For this reason, a process for managing multiple versions of media content is put into place in the preferred development architecture 500.

The object management services 576 are very similar to those involved with repository management. However, they should promote reuse through specific processes. The object management services 576 promote reuse through: design review; class and component packaging for reuse; and common component maintenance and upgrade Referring to FIG. 19, the problem management process services 566 keep track of problems and errors that occur in the netcentric computing system 10. Problem management is generally associated with the discrepancies that result from the testing process, though it may also be applied to the management of design problems detected during verification or validation steps. Problem Management is a crucial process in the system development life cycle. It ensures that quality software is designed, developed, and tested so that initial benefits defined in the business case are in fact realized. A development environment must have a formally defined problem management process to ensure that this objective is met.

Formal problem tracking helps to control the analysis and design process by maintaining documentation of all problems and their solutions. Problem tracking improves communication between developers and business representatives, which is particularly helpful in minimizing misunderstandings at later stages of the development cycle. Such formal problem tracking also helps to facilitate the solution process by formalizing a procedure for reviewing, acting on, and solving problems in a timely manner. By circulating problem documentation to all affected parties, management can minimize the risk of misunderstandings at a later date. In addition, the documentation serves as an audit trail to justify design and implementation decisions. These documents may be transmitted electronically via e-mail as well.

It is, however, important to note that not only the software that is developed for business case benefits realization must have a formal problem tracking mechanism, but the development architecture 500 must also have a formal problem tracking mechanism. The development environment tools and processes support the design, development, testing, and delivery of quality software. Therefore, the foundations of design, build, and test must be stable and problem free. All problems identified in the development architecture 500 are tracked formally and solved as the development architecture 500 also provides a production environment for developers.

The program and project management services 558 focus on the continuous oversight needed to support the delivery of business capability through multiple projects and releases. Appropriate disciplines, techniques, and applications are provided that plan and organize the work, and manage the incremental delivery of new business capabilities. Program management consists of three major activities, each split into a number of task packages. The task packages include a plan program package, a mobilize program package, and a manage and improve package.

The program and project management services 558 also focus on providing specific deliverables through balanced management of scope, quality, effort, risk, and schedule. Project management processes follow a cycle of planning the project's execution, organizing its resources, and controlling its work. The program and project management team 520 oversees all other teams within the development architecture 500. Project management comprises a single activity containing a number of task packages, dealing with project execution, organizing project resources, controlling project work and completing the project.

Referring to FIG. 19, the preferred quality management services 556 cover the following tasks: defining a quality management approach, and implementing the quality management approach. The objective of these tasks is to ensure that, early in the life of an application, program leadership explicitly defines what quality means for the program. This results in the production of the quality plan. Then the infrastructure and processes are put in place to ensure delivery of a quality program.

The quality management approach defines the following processes: expectation management; quality verification; process management; metrics; continuous improvement; rewards and recognition; and, training and orientation. Focus here is preferentially on those processes that have a direct impact on the integrated development environment and its components.

Expectations can be thought of as quality objectives expressed in measurable terms such as: functionality; reliability; usability; efficiency; maintainability; portability; and, security. The targets for quality verification should be defined. Processes and deliverables are key candidates. In development terms, the V-model is the preferred method by which the quality verification process is managed. The V-model ensures that deliverables are verified, validated, and tested. It is based on the concept of stage containment (enforcing for a given deliverable the identification of the problems before it goes to the next stage) and entry and exit criteria (describes conditions in which a deliverable passes from one stage to another). The quality verification process owner may not be responsible for executing the V-model, but is responsible for making sure that the V-model is in place and complied with.

To fine-tune the development process, important quality attributes must be measured. Sample metrics include: development environment availability; time needed for a new user to learn to use a function of the development environment; user error rate per function; user satisfaction per function; code complexity; code structure; productivity. average number of defects per design packet at the moment construction starts; and, average number of defects per program at the time of its first migration to system test. Once the key metrics are agreed upon, procedures and applications must be put in place to: perform the measurements (these should flow from the development processes in a natural way); compare results with the goals documented in the quality plan; analyze deviations, with key focus on the process that caused the deviation; and, adjust the processes so that similar deviations do not occur in the future.

The first stage of the Continuous Improvement Process (CIP) is to capture continuous improvement opportunities. These may include: gaps identified by metrics; analysis of program performance-internal quality verification results; process reviews; capability maturity model (cmm) assessments; and, suggestions made by program team members (for example, through a suggestion box).

The CIP then plans and manages improvement related activities such as: define explicit criteria for assigning priority; consider raising the priority of low-priority opportunities that can be completed quickly; maintain a mix of high-priority and sure successes to ensure the continued momentum of the continuous improvement program; define the opportunity selection process; identify the resource allocation process; define the scheduling process; identify how the effort will be monitored; identify the procedure for communicating results to the organization; establish a continuous improvement organization to support the process; prioritize and classify opportunities; select projects; allocate resources and scheduling; monitor effort; and, support a standard process improvement process across the project. While maintaining quality at a program level, the quality management team 510 must liaise with each of the organizational units within the development architecture 500 in order to monitor the quality management processes within these units.

The Capability Maturity Model (CMM) for software describes the software engineering and management practices that characterize organizations as they mature their processes for developing and maintaining software. The CMM provides a software organization with guidance on how to gain control over their processes for developing and maintaining software and how to evolve toward a culture of software engineering and management excellence. The model defines five levels of software process maturity as well as how to move from one level to the level above.

Figure 22:
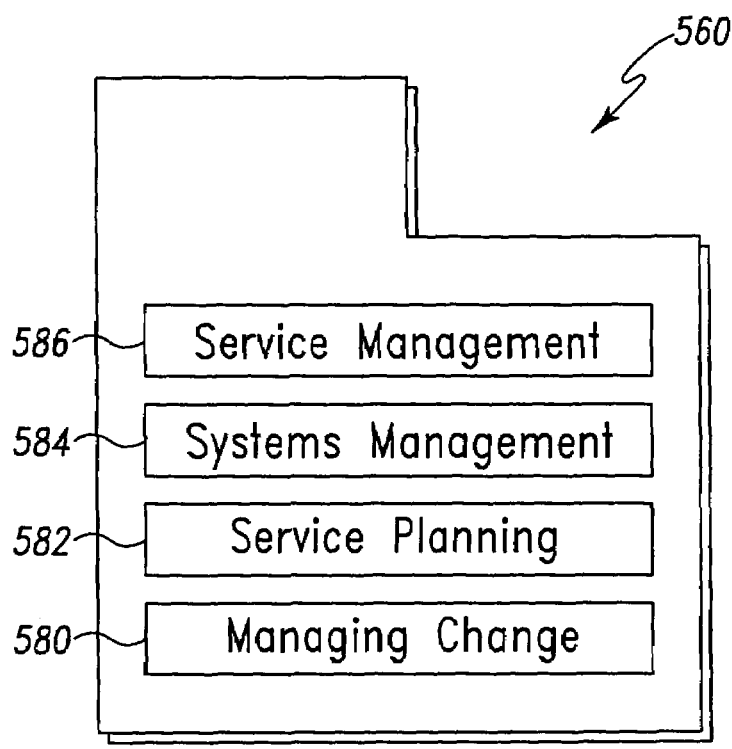
FIG. 22 illustrates the preferred environment process management services.

As illustrated in FIG. 15, the preferred development process framework layer 504 also includes environment process management services 560. Since the development architecture 500 is a production environment, it follows that environment management must be planned, organized and executed to ensure a predictable and productive environment. A comprehensive framework for the Management Of Distributed Environments (MODE) is used in the present invention. Referring to FIG. 22, the preferred environment process management services 560 include managing change services 580; service management services 582; service planning services 584; and systems management services 586.

MODE provides an excellent framework for specifying the management responsibilities that apply to the development architecture 500. These responsibilities are often assigned to the technical group, but, as discussed above, there are benefits associated with establishing a dedicated environment management team 512. The preferred environment process management services 560 component uses MODE as a framework, adopts MODE terminology, and focuses on those management tasks, which are particularly important in the development environment.

Adopting a structured approach to environment management, which applies the same principles to development as it does to production, has several advantages: high-quality support for developers; significant experience with the operations management tools in an environment, which is generally smaller and which carries lower risk than the full production environment; and the ability to tune the environment management approach before production roll-out In some respects, the development environment is simpler than the production environment. It is, for example, generally smaller in terms of the number of hardware components and the number of locations. In other respects, however, the development environment is more complex. For example, the amount of change in this environment is generally higher than in the production environment. In fact, the environment can be so fluid that extreme care must be taken to maintain control. On a large engagement, one dedicated technical support person per ten designers and programmers is recommended. The greatest need for technical support is generally during detailed design and programming. It is, however, necessary to start building the technical support function before detailed design. All processes that are performed by the environment management=team 512 must be documented in a centralized database that allows quick and easy reference.

The service management services 586 provide the interface between the environment management team 512, the development teams and external vendors or service providers. It manages the level of service that is provided to the developers. In order to maintain this service, three areas are managed: management of Service Level Agreements (SLAs); management of Operations Level Agreements (OLAs); and help desk services.

In order to plan and organize the development work appropriately, a Service Level Agreement (SLA) must be in place between a Service Management group (typically part of the environment management team 512) and the developers. As with all other components of the development architecture 500, this agreement should be kept simple. It should specify the following: the responsibility of the environment management team 512; how developers should request technical support; how quickly a request for support will be serviced; and how the environment management team will notify developers of environment changes such as changes to databases and common technical modules.

Specifications of service levels should be precise and the service must be measurable. The SLA should also specify how to measure this service (for example, system response times, request service times, backup frequencies). In addition, the SLA must be managed. It may have to be modified as the environment changes, and it must be reviewed with developers on a regular basis to see if the service level is adequate.

The environment management team 512 is responsible for providing the specified level of service, but frequently relies on external vendors and suppliers to perform certain tasks. For example, hardware service is typically provided by the hardware vendor. To provide the agreed level of service to the developers, the environment management team 512 must ensure that external vendors provide their services as required. This generally means establishing a contract with the vendor and following up that the contract is respected. As the relationship between the environment management team 512 and external vendors becomes less formalized (for example, Internet Service Providers, mass market software vendors), it becomes more difficult to provide guarantees on the level of service that will be delivered.

The help desk services are an important part of the interface between the service management group and the developers. The help desk services make sure that questions is answered and requests serviced in a timely manner by the right people. In a complex, leading-edge environment, the help desk services are crucial to maintaining productivity. The help desk services need particular focus when: the system software is immature; the development environment is weakly integrated; the environment is heterogeneous; the amount of newly released custom infrastructure is large; and the developers are less experienced.

While supervisors and coordinators who work with the developers may alleviate the impact of these factors, the more difficult questions must be resolved by the environment management team 512. As some of these will be repeat questions, the ability to log the question, the analysis and the result in a structured way provides the basis for performing smart searches and answering the question quickly. Repeat questions may also trigger: additional training; modifications of existing training; additional entries in a "technical hints" database; and changes in tools, procedures, and responsibilities. Efficient searches in the help desk services database can, in some cases, be greatly facilitated by extending the basic functionality of the help desk tool. This can be achieved, for example, by adding a smart word search capability on top of the help desk services history database.

Comprehensive training must be given to help desk personnel in order to ensure the best possible level of service to the developers. In addition to serving internal project needs, the help desk services must be prepared to coordinate the activities of external suppliers to solve problems. This occurs when several new versions of hardware and system software are introduced, and compatibility issues arise. Part of the coordination is the tracking of request IDs, which refer to the same question but which are assigned differently by each supplier.

To manage communication with external vendors, a contacts database in the help desk services that contains the following information is useful: company name; products supplied; details on support arrangements; address, phone and fax numbers; main contact; secondary contacts; regional office address/fax/phone/contacts; and world headquarters address/fax/phone/contacts. Based on this information, it is useful to log the exchanges with the external company, indicating: date; individuals involved; and key information exchanged.

Defining the SLA, with its specific, measurable criteria, is the basis for continuous improvement. The continuous improvement effort may focus on providing the same level of service with fewer resources, or on providing better service. An important part of quality management is ensuring that the environment management team 512 understands the key performance indicators for service delivery, that these indicators are monitored, and that all personnel are adequately equipped with the tools and training to fill their responsibilities. While the entire team is responsible for delivering quality, the responsibility for quality management is preferably assigned to a specific individual on the environment management team 512.

As illustrated in FIG. 22, the preferred environment management services 560 also includes systems management services 584. The preferred systems management services 584 are divided into: production control services; monitoring services; failure control services; security management services; and outsourcing services.

The production control services perform a number of activities that are required to be completed on a schedule basis. In the typical development environment, a number of activities must be performed according to schedule, including: reorganization of databases, including the repository; rerunning of database statistics; performing backups; transportation of backups off site; performing periodical file transfers between environments/sites; and preventive maintenance of equipment. Many of these activities can be scheduled and performed automatically by applications, but some must have some level of manual control to ensure that they are executed correctly. Control tasks may include checking and archiving activity logs. Standards and procedures that describe the control function should be established by organization.

The monitoring services monitor predetermined items or processes that make up or are a part of the development environment. The environment management team 512 must systematically monitor the development environment to ensure that it is stable, provides adequate response times, and satisfies the needs of the developers. This monitoring involves looking at trends and extrapolating them to anticipate problems with disk capacity, system performance, network traffic, and so forth.

The system management services 584 also include failure control services. Failures must often be corrected quickly to restore service. The time needed to restore service is affected by the time it takes to isolate and repair the fault. In many cases, allowing remote administration of system components can shorten elapsed time. The preferred failure control services monitor the netcentric computing system 10 for operational failures and report them as they occur within the system. The system management services 584 also include security management services. Security management involves: defining security requirements; preventing security breaches; limiting the effect of security breaches; detecting security breaches; and correcting the effect of security breaches.

Although direct sabotage is rare, inexperienced developers, perhaps new to the project, can wreak havoc to the system under development by inadvertently deleting or modifying system components. The security management services focuses on defining access rights so that developers have the right level of access (read/write) to all the information that is useful and relevant to their work. With the opportunity to connect development environments to the Internet comes new risks. There is a potential for security breaches or the transfer of viruses and other malicious programs. In extreme situations, where security is of great importance, it may be prudent to isolate the development environment, and allow Internet access only via a dial-up connection on stand-alone machines. The overlap of responsibility for security management between the environment management team 512 and the security management team 522 will need to be defined at the program level.

The preferred system management services 584 also include outsourcing services. In the development environment, it may be possible to outsource certain systems management tasks. For example, the LAN supplier may be willing to take responsibility for LAN support, upgrades, and so on. Similarly, an existing data processing center may be willing to take responsibility for host operations. Such agreements are very beneficial and make it possible to use project team members more effectively. However, outsourcing the development environment carries a risk, which can be mitigated by defining a Service Level Agreement with the provider. This will generally be very similar to the SLA established between the environment management team 512 and the developers. One important difference is that punitive measures (to be applied if the SLA is not respected) must be specified to ensure that outside suppliers are strongly motivated to abide by the agreement.

The preferred environment process management services 560 also include service planning services. The service planning services can be divided into service management planning; systems management planning; managing change planning; and strategic planning. All these planning stages apply in the development environment and are analogous to the kind of planning that must occur in the business application's production environment. One of the most important success factors when providing technical support is being proactive and anticipating the need for intervention. The service planning services includes service management planning. Once the SLA is defined, the resources required for delivering the service can be specified. Questions to address include the staffing of these resources and training to ensure that they are equipped to deliver service as agreed. The service planning services also includes systems management planning. Daily tasks must be specified, assigned, and followed up. Systems management planning determines who is responsible and how follow-up is performed.

Managing change planning is of great importance in the development environment. During a large project, several very significant changes to the development environment must be accommodated; they include: new hardware; rewiring of the network; new development software; new releases of existing development software; and new releases of infrastructure components (custom-built technology architecture). The release of these components into the environment requires very careful planning to ensure minimal disruption for developers. Techniques that may be used include: ballback options if a new component does not function as planned; partial rollout to a subteam to limit the consequences if a component does not work as planned; ample information to developers about timeframes for rollout and expected effects of new components; well-planned testing; and sufficient training for new tools or changes to existing tools.

Planning for change includes choosing options based on a thorough understanding of the positive and negative impacts of change to the environment. Changes to the development architecture 500 should be analyzed and planned for as orderly releases, rather than a stream of small modifications. Changes are preferentially packaged into releases, and each new release of the development environment should be tested by developing a small, but representative part of the system using the new environment. Ideally, this test should be performed by real developers rather than by the environment management team 512. This may be very helpful in order to obtain better buy-in.

The preferred service planning services also includes strategic planning. Strategic planning is traditionally regarded as being less important in a development environment than in the production environment, mainly because the development environment is often viewed as a temporary entity that does not warrant serious strategic considerations. This may be changing, however, with the concept of the enterprise-wide development environment—a single, generic development architecture 500 that is tailored to each specific project. In this case, strategic planning for the development architecture 500 is vitally important if the environment is to evolve, and allow the organization to remain competitive. Strategic planning of the environment management function may, for example, include such questions as support for multisite development and coordination of multisourced systems management.

As illustrated in FIG. 22, the environment process management services 560 includes managing change services 580. The development environment is subject to constant change (for example, the addition of new tools, or changes to code libraries), which needs to be managed carefully. The managing change services 580 comprise three sub-components: controlling change, testing change, and implementing change.

After planning for and scheduling change, it must be controlled. Thorough testing is required to reduce the risk of productivity loss due to environment changes. Techniques commonly used include: careful scheduling of events to minimize disruptions (typically weekends and evenings are used to enable a strictly controlled test of new components released to the design and construction environment); rigorous testing of environment management tools themselves. This test must be as rigorous as the testing of the execution environment. A hardware and systems software acceptance test environment where components from external suppliers are validated before the component is accepted into the environment; and one or more separate architecture build and test environments where new or modified custom-built components can be thoroughly verified before they are made available.

After planning and testing the change to be introduced, it must be implemented. The most common kinds of change in the development environment are the introduction of additional hardware, new releases of databases, subroutines and infrastructure, and upgrades to tools. Each change implementation should be viewed as continuous improvement so that any difficulties or inefficiencies are analyzed and resulting improvements are planned and implemented. To be effective over time, this requires that procedures be documented and regularly reviewed and enhanced.

When the database is changed, new versions of test-data must be developed and distributed. When infrastructure components are modified, they may have to be distributed across platforms, and the ripple effects (for example, the need for recompilation or code changes in affected components) must be understood and coordinated. Some projects have experimented with incentives to ensure that the infrastructure components do not change too frequently. One such strong incentive is to make the architecture team responsible for all ripple effects and have them implement all the application level changes that result from an architecture modification.

As illustrated in FIG. 19, the development process framework layer 504 also includes release process management services 562. The release process management services 562 coordinate activities that contribute to an application release (for example, cross-project management) and coordinate products that contribute to a release (such as architecture, integration, and packaging). The release process management services 562 are concerned with managing a single application release, rather than cross-release management.

The release process management services 562 are responsible for documenting critical decisions regarding the management, tracking, and integrity of all components and configurations within a given application release. The preferred release process management services 562 are closely coordinated with the definition of the configuration management services 564 and the problem process management services 566. Release management involves two main components: the coordination of activities that contribute to a release, and the coordination of products that contribute to a release.

The coordination of products that contribute to a release is the maintenance of a bill of materials for a release. It is an inventory of all software and hardware components that are related to a given release. The development environment is directly affected by the release management strategy. The way an application is released affects the complexity of the development environment. It should be noted that delivering a system in a series of releases significantly increases the effort.

If the release plan dictates that there will be parallel development of two releases of software, the development environment and configuration management must be able to support the release plan. In the most general development case, an application can have a single release capability mechanism but must simultaneously perform maintenance activities for components that are in production. There must be an ability for the application to design, build, and test the applications for production.

The ability to perform all development stages for a given release is defined as a development pipeline. The development pipeline consists of all development and testing stages necessary to release the application to production. The pipeline strategy of an application depends directly on the release strategy. An application is potentially developed on three different timelines: short term—production bug fixes; middle term-production service packs; and long term—new releases of software.

To support this release plan, the development architecture 500 is separated into pipelines that are replicas of a single migration path to production. As previously set forth, a pipeline consists of all the necessary development and testing stages required to deliver a piece of software to production. Therefore, because of simultaneous development and testing of three code bases, there are three development and testing pipelines that deliver software to production in the preferred embodiment. The development pipeline is capable of allowing developers to design, build, and test applications as well as architecture components. As the number of development pipelines increases, the complexity of working in the development architecture 500 also increases.

All development environment tools must support the pipelining strategy and so must the configuration management and problem management processes. The preferred pipeline strategy for an application incorporates code base synchronization. Code base synchronization occurs among the three pipelines to ensure that the three code bases eventually result in one version in production. Referring to FIG. 19, the preferred development process framework layer also includes security process management services 554. The purpose of the security process management services 554 is to ensure security is properly designed and built into the netcentric computing system 10 that is being developed, including: definition of security requirements based on business risk; development of security standards, guidelines and procedures; implementation of security controls; and security validation.

Security requirements are generally based on the outcome of a security risk assessment. This is the process of identifying business risks, identifying system vulnerabilities or weaknesses that can impact those risks, and recommending mechanisms to control the vulnerabilities. Specific confidentiality, integrity and availability requirements for the new system and the development environment are defined through this process.

Security standards, guidelines and procedures provide security direction to the implementation. They will help define how the security requirements developed through the risk assessment must be addressed in all areas of the development environment. They will include security standards for the development environment infrastructure, procedures for the development processes, standards for the design of the security architecture and security guidelines for programming. It is especially important to ensure the security of the development architecture 500 because if these systems are broken into and back doors are introduced, it may lead to later compromise of the production system. It will be the responsibility of all developers that these security controls are implemented and adhered to throughout the development process.

In order to ensure the security of the netcentric computing system 10, periodic security audits are performed, in order to verify that the processes and architecture and application components that are being developed conform to security proven practices. This may be done by an external body specializing in security (such as Global TIS-Security) in the form of interviews, architecture and code reviews, and automated tool assessment or through special applications.

The degree to which security should be implemented in a development architecture 500 should be determined by the amount of risk in the environment and the functionality and access levels required by the developers. Security controls should not be so restrictive as to inhibit legitimate access needs to data and systems. In general, higher security will result in lower flexibility of the development architecture 500.

As illustrated in FIG. 19, the preferred development process framework layer 504 includes configuration management process services 564. Configuration management is not only the management of the components in a given environment to ensure that it collectively satisfies given requirements, but it is the management of the environment itself. The environment consists not only of system components, but also of the maintenance of these components and the hardware, software, processes, procedures, standards and policies that govern the environment. Configuration management in systems-building consists of four major interdependencies: packaging, version control; migration control; and change control.

Packaging is the combination of systems software and application component configurations (source code, executable modules, DDL and scripts, HTML) together with their respective documentation. It may also include the test data, test scripts and other components that must be aligned with a given version of the configuration. Packaging allows the grouping of components into deliverable packets of application software that can be developed, tested and eventually delivered to the production environment. Packaging defines the underlying architecture that drives version, change and migration control. Each of these control processes defines how changes to configuration packages are versioned and migrated to the various development and test phases in the systems development life cycle.

A sample packing strategy would take into consideration several factors to determine a unique method to handle a given configuration packet in terms of version, change and migration control, which are briefly discussed below. Base package type identifies the various types of application components that are developed during systems building such as executables, JCL, HTML scripts and Java applets.

Package release type identifies the types of commonality that components can have. There are usually four basic types of components that are developed during systems building. "Technology architecture packages" are developed by the technology architecture team and are used by all other projects in a program. "Program-wide packages" are developed by the application development teams, but are used by other projects in the program. They are common components that are not owned by the technology architecture team. "Application common packages" are developed by the application development team and are used internally on the project by application developers. "Application packages" are the most rudimentary of all packages developed. They consist of basic application components developed by application developers.

"Package platform type" identifies the eventual delivery platform of the package. Identifying this early on in development and encapsulating this information within the package definition allows developers to envisage the production environment at an early stage during the systems development life cycle.

Given these three basic package definitions, a configuration management cube can be defined, which uniquely identifies version, change and migration control characteristics of a given package. The cube can be used to implement a table-driven configuration management control system for all software developed on the application. The configuration control system consists of version and migration control. Therefore, the cube defines all processes associated with version control and migration of a package.

Version control and compatibility are key considerations when managing these packages. Note that version control not only applies to software components, but also to all components of a given package, including test scripts, test data and design documentation. It is also of great importance to keep track of which version is in which environment. If incompatibilities are discovered, it must always be possible to "roll back" to a previous consistent state; that is, to revert to an earlier version of one or more components. It must be possible to define releases of a configuration—a list of version numbers, one for each component of the package, which, together, form a consistent configuration. The smallest unit that can be version-controlled should be the package as defined in the packaging plan. This ensures that the lowest common denominator in all version-control activities is managed at the package level.

A systems-building environment can have many development and test stages. On a large project, these may include: development and unit test; assembly test; system test; integration test; and user acceptance test. Migration of packages or consistent configurations from one stage to another is a central part of configuration management. The key to successful migration is the knowledge of what constitutes each stage. Examples of migration include: migration from development and unit test to system test; migration from user acceptance test to production; migration of development tools from the technology architecture team to the developers on the project; and migration of architecture components from the technology architecture team to the developers on the project. Stages and their constituents exist as a result of certain user and technical requirements. The technical requirements are derived from the user requirements. It is crucial to develop a migration plan that maps out the progression on configuration packages throughout the systems development life cycle.

The version control plan must align with the migration control plan. The version control plan defines the points where version-control activities will take place. Version control will take place at the development stages, architecture development and unit test, an application development and unit test. Migration control defines how these version-control configuration packages will be migrated successfully from one stage to the next until the package is eventually released to the production environment.

Change requests as a consequence of changing requirements and changes requested due to nonconformities (or defects), either in the application software or in the system software, must be analyzed, authorized, schedule, staffed and tracked in a defined way. What, why, when and who made a change must be tracked from the point of analysis to the reintroduction of the defective or changed component at the appropriate stage. Change control, therefore, governs what software is changed, version-controlled, and when it is re-migrated to a given development stage. It is important to link the general change request with the requests produced during formal testing phases; this makes the processes clearer.

Referring to FIG. 19, the preferred development process framework layer 504 includes system building services 550. Understanding the systems building process is important since well-defined development tasks and workflows form the basis for achieving high productivity and consistent process quality. The development environment varies by segment of a systems development project. The development process is iterative and can be entered at different stages depending on the complexity of the changes. Small corrections may not require explicit design, and small enhancements may not require any high-level design, while new functionality may require high-level design.

The iterative nature of the development process is important since it implies that components of the development environment, which are put in place for design (for example), must be maintained, since they will continue to be used until the end of system test and beyond. Multiple releases of the business application may also be under concurrent development at different stages. This may lead to very active use of design, construction, and testing tools at the same time.

Figure 23:
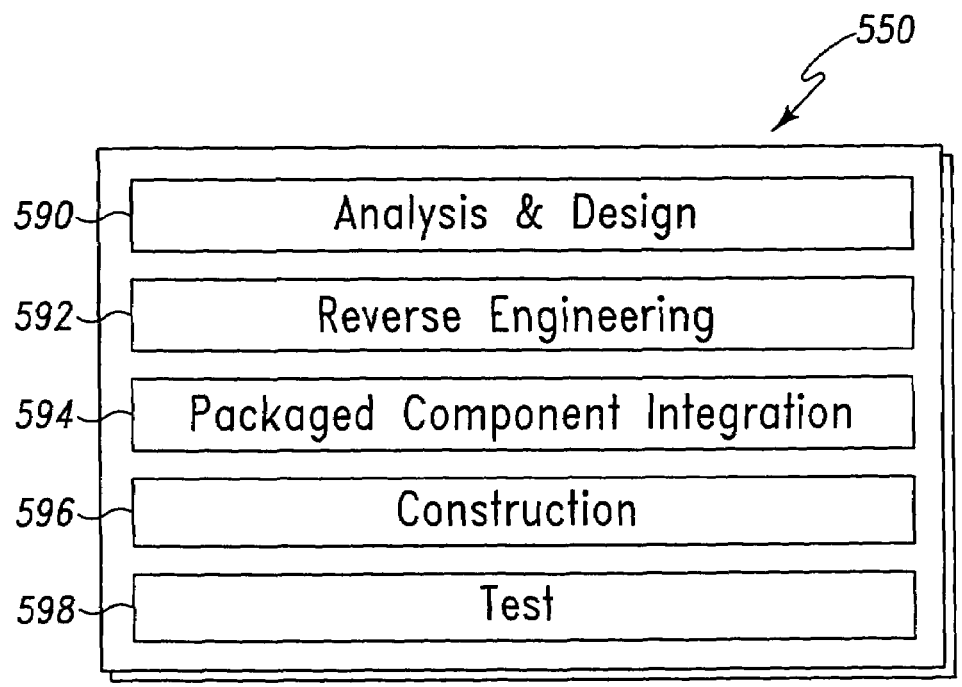
FIG. 23 illustrates the preferred systems building services.

Referring to FIG. 23, the preferred systems building services 550 include analysis and design 590, reverse engineering 592, packaged component integration 594, construction 596 and test 598. Analysis and design 590 in this context, refers to the two business integration methodology activities: design application and design technology infrastructure. The most critical and perhaps the most difficult work in implementing a netcentric solution occurs up front. The success of the entire design effort depends on the quality of the work performed to gather, document, communicate, and analyze requirements in the early stages. Standards for how to document these requirements are very important. They facilitate communication, which, in turn, ensures a common view of the problem to be solved. Communication must be ensured within the analysis team but also with the (possibly future) designers and programmers.

The analysis and design 590 process includes numerous activities, which range from high-level general considerations to low-level detailed issues. The overall objective of design is to transform functional and technical specifications into a blueprint of the netcentric computing system 10, one that will effectively guide construction and testing. While requirements-analysis and specification deals with what the system must do, design addresses how the system will be constructed. Validating that the design actually meets the requirements for functionality, performance, reliability, and usability is essential.

The quality of the analysis and design process 590 directly affects the magnitude of the efforts required to construct and test the netcentric computing system 10, as well as the maintenance effort. Investments in defining high-quality design standards and procedures and integrating tools is, therefore, particularly important. It may, for example, have a direct impact on the degree of reuse achieved. In addition, adequate training must be provided to ensure that the designers make optimal use of the environment provided.

New tools and processes link detailed design and construction more closely than before. To realize the expected benefits from repositories and code generation, the output from detailed design must be exact and correct, leaving little room for interpretation. This requires careful quality control and very specific exit criteria associated with the completion of detailed design.

It is important that the development architecture 500 accommodates concurrent effort in different areas. For example, parts of design may occur after system test starts, as in the case of an urgent change request, or when a significant inconsistency is detected in system test. Some reverse engineering work may also occur before design or during construction.

When standards, procedures, and tools are developed for a task, it is important to consider where the task belongs in the sequence of tasks that contribute to the development. For example, the use of a repository early in the development process reduces the need for re-entering information while enhancing consistency and facilitating standards compliance.

Usability is an important (and often overlooked) consideration in system design. Usability is more than a well-designed user interface—the way in which business processes are modeled, how they are implemented within the netcentric computing system 10, and how they are presented to the user all contribute to the overall usability of the netcentric computing system 10. Usability is an iterative process of refinement that results in systems that are easy to learn, efficient, and enjoyable. In the very broadest sense, usability is the thoughtful, deliberate design approach that considers users throughout the solutions-building process, from start to finish. For this reason, usability guidelines should be defined and followed at every stage of system design. This, along with regular usability reviews and tests both internally, and by target user groups (by using prototypes), helps to reduce the risk of a poorly received system.

The user interface has become increasingly important as systems become more and more user-facing. As multimedia technologies evolve allowing the development of richer user interfaces, so the design processes must adapt to reflect these new technologies. The processes that surround the design of media content are similar to that of regular system design, and many of the same issues that apply to designing traditional user interfaces also apply to the design of media content. The major change is the involvement of media content designers—a group of people not traditionally associated with system design and development. As their presence is relatively new to the scene of systems development, it is often the case that media content designers are not fully integrated into the development team—a potentially costly mistake. It is important to ensure that media content designers are involved in the design process at a very early stage, and that they are fully integrated into the application design and construction teams.

The approach to interface design is evolving as media technologies become more advanced. Modern media creation tools allow the development of not only media-rich interfaces, but also the functionality that lies behind them. This means that the role of the media content designer may now range from that of designing the look and feel of a user interface, to developing the entire presentation layer of an application. In this situation, the role division between media designer and application developer becomes a difficult one to define, reinforcing the argument for fully integrating media designers into the application development team.

Well-documented, comprehensive standards are used in the preferred embodiment to make designers more independent and enable them to produce more consistent, high-quality designs. Common standards include: detailed specifications of deliverables from each design step; window and report design standards; naming standards for design objects and documents; navigation standards; standards that specify the design techniques to use; documentation standards that specify format; and technology infrastructure design standards that specify how to ensure security, handle errors, and manipulate context data.

While the standards focus on what to do during design, procedures focus on how to do it. Procedures are used in the preferred embodiment to specify: how to resolve functional and technical issues; which tools to use and how to use them; how to perform design validation; when and how to initiate and perform functional and technical design reviews; and how to cope with design teams distributed across locations.

Guidelines give assistance in areas where judgment is important and where standards are not easy to define. Valuable guidelines that are used in the present invention may include: usability guidelines; style guidelines; guidelines on how to use a tool effectively; and sample design packet for each kind of system component to be designed.

Reverse-engineering 592 is a set of techniques used to assist in reusing existing system components. Most of the time, this work is performed manually: one person studies thick listings to understand data layouts and processing rules. The person gradually builds a higher-level understanding of how the components work and interact, effectively reverse-engineering the system into a conceptual model. It may be necessary to study certain pieces of code to understand how they work, but reverse-engineering is not limited to code. For example, these techniques might help understand the data-model of a legacy application in order to better design the new applications with which it will coexist.

The process can be very time-consuming and is notoriously difficult to estimate. Tools to support the effort do exist, and have been used successfully to streamline the process. The main problem with such tools, however, is the hasty (and erroneous) conclusion that tools automate everything; they do not, just as design tools do not automate the design process. Human intelligence is still required to drive the effort.

The supporting tools can, however, reduce the amount of manual effort needed and significantly lessen the amount of non value-added activities, such as "find all the places in a program that affect the value of a given variable." The goal of a specific reverse-engineering effort generally falls into one of the following categories: to determine which parts of existing systems must be replaced and which can be reused; to determine how a particular component works in order to design other components with which it will interface; to extract components for reuse; and to prepare for cleaning up those parts of a system that will be retained.

In component-based development, a concept known as "round-trip reengineering" provides the developer with a way of modifying a component model and generating the code, then at a later date, modifying the code at predefined locations in the source code and regenerating, thus enabling the model to maintain a two-way-synchronization.

Packaged component integration 594 applies to the use of any third-party (or previously developed) technical components that may be integrated into the target system. This can range from simple components offering limited functionality (worksheet or charting GUI components), to components handling a significant portion of the application architecture (data access components and firewalls). The process involves a number of stages: package or component selection; component customization; and component interfacing.

A proven practice in the component-based development world, when dealing with purchased components, is to "wrap" them, i.e. encapsulate them so that the visible piece of any component remains fully controlled. This way, when a component is replaced (either for an update or because it has proved to be defective), no other system components that refer to that component will need to be altered.

Construction 596 covers both generation of source code and other components as well as programming and unit test. It may also involve help text creation and string test. As construction is a large part of system building, the benefits of streamlining this process are significant. Since several aspects of construction are rather mechanical, it is often fairly easy to simplify this process and to automate parts of it, particularly if the design holds high quality. The arrival of Integrated Development Environments (IDEs), has further simplified the automation of construction processes to the degree that a single tool can manage the majority of the process. As with analysis and design 590, usability must not be ignored in the construction of a system. Especially in the case of an iterative development approach, it is vital that those responsible for usability and target user groups are involved in regular reviews as the system is being developed.

System test 598 is performed to validate that the gathering and transformation of information is complete and correct with automated testing tools. As automation progresses and an increasing number of business processes are supported by computer systems, system test is changing in nature. First, the testing of interfaces to other systems is becoming an ever-larger part of systems test. Secondly, system test increasingly applies to a new release of an existing system. In addition, it is worth noting that as design and construction is increasingly automated, system test is becoming a larger part of the total development effort.

Both of these factors increases the value of automated testing tools, given that the work associated with checking that system changes do not have unintended side effects, is becoming an ever-larger part of system test. Another trend affecting system test is the demand for traceability. Increasingly, users and management wish to know the purpose of a given test condition. This is answered by referring back to the design and to user requirements.

System test 598 is a very large part of any systems development effort and can, especially when requirements are changing, exceed one-third of the entire effort. A streamlined environment, which enables high productivity, is, therefore, of utmost importance. When planning system test, it is vital that the testing of all target platforms is included in the test plan. For each platform that is supported by the system, there must be a separate set of tests.

The necessity of impact of volume and stress-testing early in the development process is becoming more common, due to the proliferation of new technologies and tools, which have little or no performance track record. It is important that the performance and reliability of such tools and technologies are established as early as possible in the project to avoid possible problems further down the line.

System test relies heavily on configuration management, repository management, and quality management. Configuration management provides the basis for promoting a configuration from the construction environment to the system-test environment. As test cycles are run and fixes implemented, migration can become complex, requiring flexible mechanisms for locking and unlocking system components and analyzing the impacts of change. Information management and, in particular, repository management guarantees a correct view of the interrelationships between system components. This is required to ensure that impact analyses are complete and correct, which, in turn, makes for effective regression testing. Quality management, together with well-defined standards and procedures, ensures that the outputs from each test activity are documented at the right level of detail and fed back to the design and construction teams, in accordance with the quality plan.

Each of the following system-test activities needs well-documented standards and procedures and is supported by applications in the present invention: promote configuration (migrate configurations from the construction environment to the system test environment); run test cycle; compare expected results and actual results; log System Investigation requests (SIRs); analyze deviations and identify components requiring change (either expected results, test data, or system components); define Change Requests (CRs) and perform impact analysis; package those change requests that affect the same areas and that naturally belong together, into change packages; schedule and staff the changes; unlock components for change; perform changes and refine impact analysis based on added understanding; verify changes before re-submitting to system test; and migrate to system test based on updated impact analysis and re-lock components.

Several types of test may be performed as part of the system test 598. A component test is the testing of an individual piece of the solution. All components, including application programs, conversion programs, and input/output modules, are subject to component test. The objective is to ensure that the component implements the program specifications. At the end of component test, all lines of code should have been exercised, keeping in mind the specified functional and quality requirements.

An assembly test tests the interaction of related components to ensure that the components, when integrated, function properly. Assembly test ensures that data is passed correctly between screens in a conversation or batch process and that messages are passed correctly between a client and a server. The specification tested is the technical design. The application flow diagram within the technical design depicts the assemblies, either on-line conversations or batch assemblies, which will be assembly tested. Testing is, therefore, organized by assembly rather than by business function.

By the completion of assembly testing, the system should be technically sound, and data flow throughout the system should be correct. Component and assembly testing ensures that all transactions, database updates, and conversation flows function accurately. Testing in later stages will concentrate on user requirements and business processes, including work flow.

A benefits-realization test tests that the business case for a system will be met. The emphasis here is on measuring the benefits of the new system, for example: increased productivity, decreased lead times, or lower error rates. If the business case is not testable, the benefits-realization test becomes more of a buyer signoff.

Ideally, benefits-realization test occurs prior to complete deployment of a system and utilizes the same environment that was used for the service-level test piece of operational readiness test. Tools are put in place to collect data to prove the business case (e.g., count customer calls). A team of people to monitor the reports from the tools and prove that the business case is achieved is still needed. The size of the team depends upon the number of users and the degree to which tools can collect and report the data. The benefits-realization test tests that the business case for the system will be met. The emphasis here is on measuring the benefits of the new system; for example: increased productivity, decreased lead times, or lower error rates. If the business case is not testable, the benefits-realization test becomes more of a buyer signoff.

A product test tests an entire application to ensure that all functional and quality requirements have been met. Product testing may occur at multiple levels. The first level tests assemblies within an application. The next level tests applications within a system, and a final level tests systems within a solution. Within the multiple levels, the purpose is the same.

The product test tests the actual functionality of the solution as it supports the user requirements: the various cycles of transactions, the resolution of suspense items, the work flow within organizational units and among these units. The specification against which the product test is run includes all functional and quality requirements. The testing is organized by business function.

An operational readiness test ensures that an application can be correctly deployed. The operational readiness test is also commonly known as the readiness test, roll-out test, release test or the conversion test, and has four parts: roll-out test—ensures that the roll-out procedures and programs can install the application in the production environment; operations test—ensures that all operational procedures are in place and acceptable, and that the production system can be operated by the personnel responsible for supporting production; service level test—ensures that once the application is rolled out, it provides the level of service to the users as specified in the Service Level Agreement (SLA); and roll-out verification—ensures that the application has been correctly rolled out at each site. This test, developed by the work cell or team performing operational-readiness test, should be executed during each site installation by the work cell or team in charge of the actual roll out of the application.

The operational-readiness test assumes a completely stable application and architecture in order for it to be successful, and, therefore, is heavily reliant on the previous testing stages. The operational-readiness test is the point in the development process where all the application development, architecture development, and preparation tasks come together. The operational-readiness test ensures that the application and architecture can be installed and operated in order to meet the SLA.

Referring to FIG. 15, the preferred development architecture 500 includes the development tools framework layer 506. The development environment is built upon an integrated set of tools and components, each supporting a specific task or set of tasks in the development process. As with the processes and organization layer, the central component, system building 600, is supported by the eight management components. An efficient development environment requires good tools.

Figure 24:
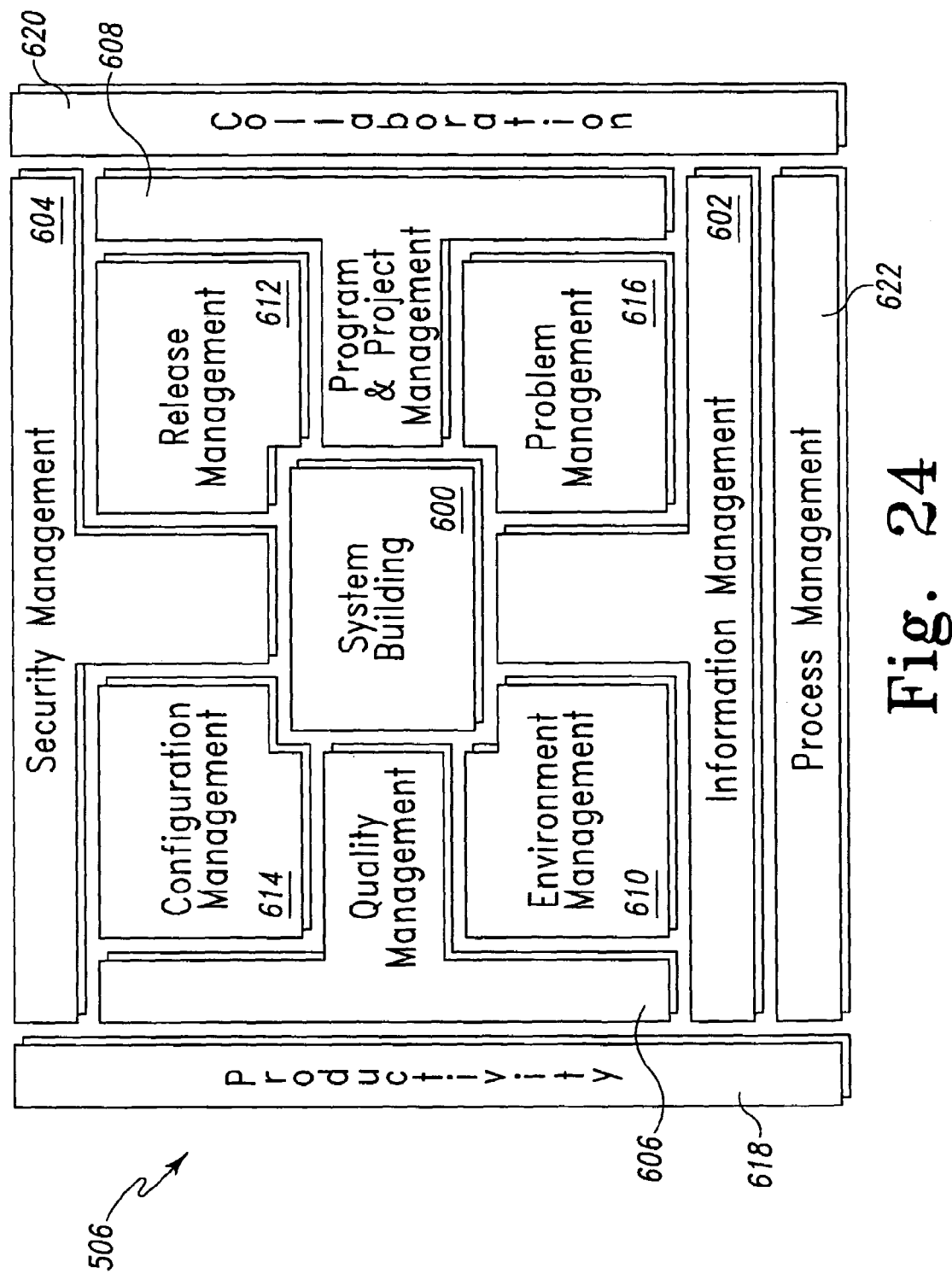
FIG. 24 illustrates the preferred development tools framework layer.

As illustrated in FIG. 24, the preferred development tools framework layer 506 includes information management tools 602, security management tools 604, quality management tools 606, program and project management tools 608, environment management tools 610, release management tools 612, productivity tools 618, collaboration tools 620 and process integration tools 622. Information management tools 602 manage the information that supports the entire project—information that is used both in systems building and in other management processes. Security management tools 604 enable the development of security components. Quality management tools 606 support all quality management processes.

Program and project management tools 608 assist the management teams in their daily work. Environment management tools 610 provide the facilities to maintain the development environment. Release management tools 612 manage the simultaneous development of multiple releases. Configuration management tools 614 cover the version control, migration control and change control of system components such as code and its associated documentation. Problem management tools 616 pertain to the problem tracking and solution process.

Productivity tools 618 provide the basic functionality required to create documents, spreadsheets, and simple graphics or diagrams. Collaboration tools 620 enable groups of people to communicate and to share information, helping them work together effectively, regardless of location. Process integration tools 622 enforce the correct sequencing of tasks and tools in conformance with a pre-defined methodology.

As illustrated in FIG. 24, the preferred development tools framework layer 506 includes productivity tools 618. While many tools are developed in order to support a specific task (for example, source code editor), there is a family of tools that are generally required across the board, often known as productivity tools or office automation tools. These tools, typically packaged as integrated suites of software, provide the basic functionality required to create documents, spreadsheets, and simple graphics or diagrams. More recently, the ability to access the Internet and browse electronic documentation has been added to the suite of productivity tools.

Specifically, the preferred productivity tools include: spreadsheet applications; word processor applications; graphics editor applications; personal organizer (may be linked to Group Scheduling) applications; methodology browser applications; and Internet access applications. These tools are generally versatile enough to take the place of specialized tools (such as planning tools) in certain circumstances.

Referring to FIG. 24, the preferred development tools framework layer 506 also includes collaboration tools 620. It is well understood that both good communication and knowledge sharing are vital for the success of any team. As development projects get bigger and teams more distributed, it becomes increasingly difficult to maintain communication between project team members. Collaboration tools 620 enable groups of people to communicate and to share information, helping them work together effectively, regardless of location.

Figure 25:
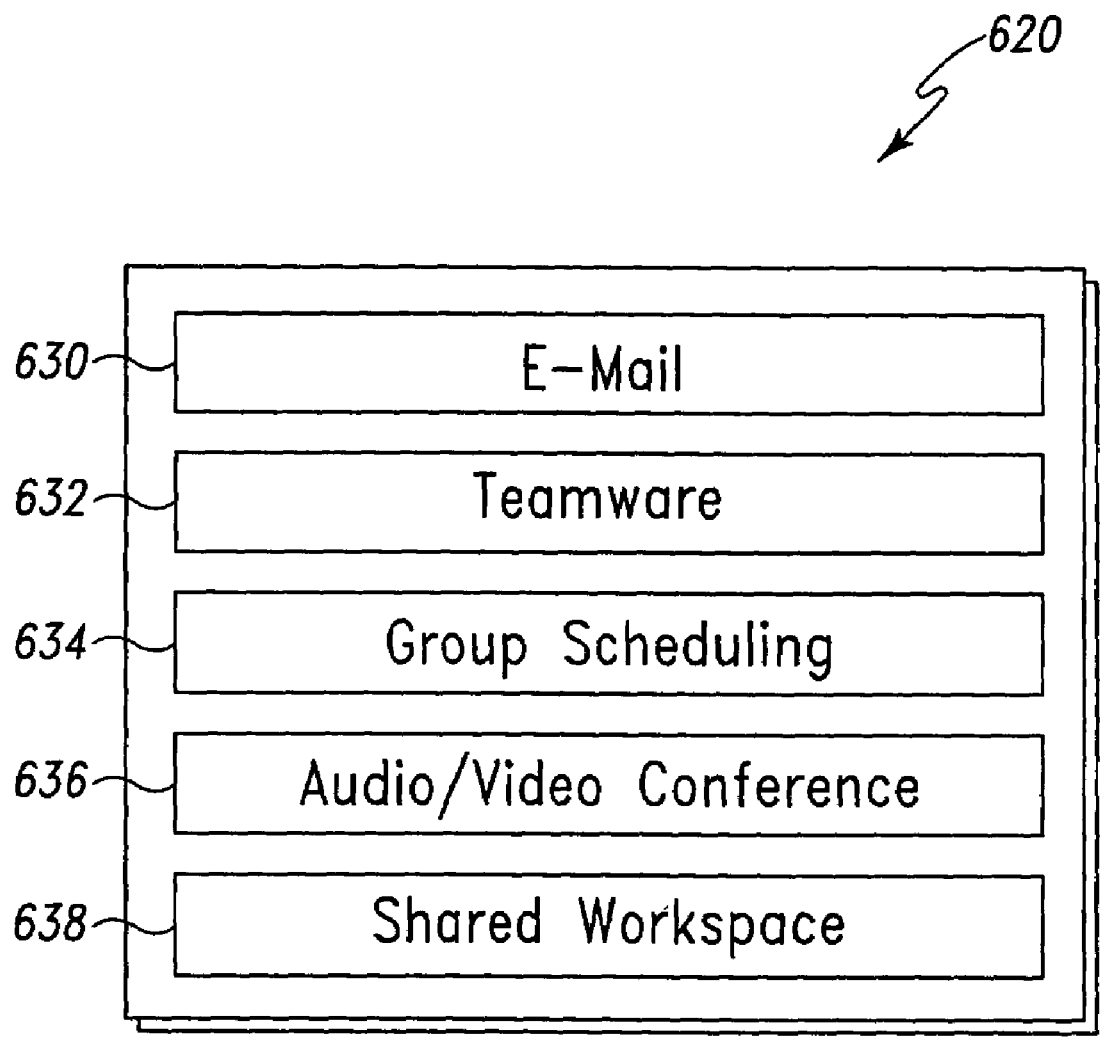
FIG. 25 illustrates the preferred collaboration tools.

Referring to FIG. 25, the preferred collaboration tools 620 include an e-mail tool 630, a teamware tool 632, a group scheduling tool 634, an audio/visual conference tool 636 and a shared workplace system 638. E-mail tools 630 provide the capability of sending and receiving messages electronically. In addition to the ability to send simple ASCII text, e-mail systems usually provide the capability to attach binary files to messages. E-mail is a convenient tool for distributing information to a group of people, as it has the advantage of delivering content directly to the 'mailbox' of each individual, rather than relying on individuals to access a central data repository in order to retrieve the information.

As illustrated in FIG. 25, the preferred collaboration tools 620 also include teamware tools 632. In a creative environment, it is vitally important that people are able to easily share ideas and information. Teamware provides the ability to capture and share information across a project through the use of common-access, structured databases. Teamware may be used to share many different types of information; for example: technical support requests; technical hints, which facilitate trouble-shooting; change requests; resource reservation (for example, meeting rooms); standards and procedures; status reports/meeting minutes; project member availability; project events and milestones; functional and technical issues; suggestions; and project methodology. In order to guarantee the value of a teamware environment, it is vital that consistency is maintained, relevant updates are made (including deletions), storage is not abused and security is enforced.

To ensure that information is consistent across different formats, it is useful to view the management of all these information sources as part of a more general information management process. Effective information management beyond repository management is required to ensure that the anticipated benefits of electronic mail and teamware materialize. For example, certain teamware databases may require continuous maintenance in order to remain relevant. The management of the database contents may require significantly more work than either the initial installation of the tools or the technical support for the tools.

In addition to setting guidelines for general usage, preferentially mail administrators and knowledge managers are designated, who are responsible for: maintaining user accounts; maintaining security profiles; managing database contents; removing obsolete information; and managing resource usage (for example, disk space).

As illustrated in FIG. 25, the preferred collaboration tools 620 also include group scheduling tools 634. Group scheduling tools 634 help to centrally manage the personal schedules of a group of people. This offers the advantage of being able to coordinate events that require the participation of a number of people automatically by checking 'group availability' rather than checking with each person individually. These tools may also be used to schedule other resources such as meeting rooms and equipment. For the use of group scheduling tools to be successful, the personal schedules of each member of the group must always be current.

As further illustrated in FIG. 25, the collaboration tools 620 also include audio/visual conference tools 636. In an ideal world, all meetings would be conducted face to face. In reality, however, it is often the case that not all the individuals who are required to take part in a meeting are on the same site. To overcome this problem, audio and video conferencing tools 636 allow many individuals in different locations to communicate simultaneously. Audio conferencing is a valuable tool for conducting meetings where the issues being discussed do not require the support of visual aids. Video conferencing takes this one step further, allowing people to interact both aurally and visually, making for a much richer method of communication.

The preferred collaboration tools 620 also include shared workspace systems 638. Shared workspace systems may include electronic whiteboarding and application sharing tools. An electronic whiteboard tool provides a large, clear screen that can be viewed close up and at a wide angle, upon which participants may 'write' with an infrared pen or a mouse. Images may also be pasted onto the whiteboard. Regular workstations on a network may also be used for electronic whiteboarding, providing the appropriate software is installed. Electronic whiteboarding often works in conjunction with video conferencing applications.

Application sharing tools allow participants to see and control the same application running on multiple PCs. In this way, they can simultaneously create and edit a single, common file. Application sharing may be combined with audio conference.

As illustrated in FIG. 24, the preferred development tools framework layer 506 includes process management tools 622. Process management may be categorized into two areas, which include simple process integration and workflow management. Simple process integration concerns the simple integration of a sequence of tasks, according to a prescribed development methodology. Workflow management concerns more sophisticated situations where several complex processes require the participation of multiple groups. In either situation, the aim of the process management tools 622 is to enforce the correct sequencing of tasks and tools. Task integration must be provided in accordance with the methodology and should provide direct support for the methodology. Effective task integration therefore reduces the need to consult the methodology.

Simple process integration concerns the integration of a limited sequence of tasks, for an individual, according to a prescribed development methodology. For example, the construction process can be supported within an integrated development environment tool by a menu with the following choices: generate module template; generate windows and dialogs; edit code; compile; link; edit test plan; generate test data; execute test with debug; execute test without debug; edit script; and compare results. The sequencing of the menu items helps to remind the programmer of the steps needed to complete the construction of the program.

Going beyond mere sequential use of tools, real-time integration of tools enables real-time data interchange. The most common example is, perhaps, the edit/compile/debug cycle. Here, it can be very helpful to work in an integrated environment that uses the editor and places the cursor at the position corresponding to a syntax error or to a given break-point defined to the debugger. This integration is generally offered as a standard feature of an integrated development environment.

Task integration for the individual can be achieved using scripting tools or a desktop manager. Real-time tools integration is most commonly provided by vendors who deliver integrated environments.

When processes become complex and require the participation of multiple groups, simple integration techniques are not adequate for managing the process flow. Workflow management tools address this problem by providing the ability to define, manage, and execute automated business processes through an electronic representation of the process, both in terms of what has to be done, and by whom. For any process where multiple groups are involved, well-defined procedures must be in place to ensure that work flows from one task to another. Each participant must have access to the information required to perform the task, including the information from previous steps in the flow. This can be handled manually or supported by tools. If handled manually, it requires dedication, attention to detail and significant training.

Workflow management can be applied to many processes within the development environment, such as quality assurance, migration, design/construction, system test and standards development. Efficient tools support for workflow management requires standards and procedures that specify: which tasks exist; expected and maximal duration of each task; what the decision points are; how the tasks fit together to form a workflow; how work is routed depending on the nature of the case/issue; which roles exist; which roles can perform which tasks; which individuals can fill which roles; and priority of cases (for example, depending on the originator).

Workflow management tools preferably provide support for workflow definition; case routing with flexible assignment, escalation, exception handling; and reporting. Tools to assist workflow management preferentially support the following: specification of individuals, their roles and tasks, and their relationships; specification of the workflow; automatic routing of cases; exception handling if a task is not performed within a prescribed elapsed time; routing of a case based on its contents (for example, different decision processes depending on the importance of the decisions); assignment of cases to roles and to individuals, with manual override; assignment based on priority; re-assignment of cases; and reporting.

As illustrated in FIG. 24, the preferred development tool framework layer 506 also includes security management tools 604. Security management tools 604 provide the components that make up the security layer of the final system, and provide required security controls to the development architecture 500. While some of these tools may be considered as nothing more than security-specific packaged components, many are an integral part of the development environment toolset.

The preferred security management tools 604 perform several functions during operation, which are set forth as follows. Intrusion detection discovers and alerts administrators of intrusion attempts. Network assessment performs scheduled and selective probes of the network's communication services, operating systems, and routers in search of those vulnerabilities most often used by unscrupulous individuals to probe, investigate, and attack your network. Platform security minimizes the opportunities for intruders to compromise corporate systems by providing additional operating system security features. Web-based access control enables organizations to control and manage user access to web-based applications with restricted access.

Fraud services are methods of verifying the identity of credit card users to reduce the amount of fraudulent credit card transactions. Mobile code security protects corporate resources, computer files, confidential information, and corporate assets from possible mobile code attack. E-mail content filtering allows organizations to define and enforce e-mail policies to ensure the appropriate email content. Application development security toolkits allow programmers to integrate privacy, authentication, and additional security features into applications by using a cryptography engine and toolkit. Encryption provides confidential communications to prevent the disclosure of sensitive information as it travels over the network. This capability is essential for conducting business over an unsecured channel such as the Internet.

Public key infrastructure provides public-key encryption and digital signature services. The purpose of a public-key infrastructure is to manage keys and certificates. A PKI enables the use of encryption, digital signatures, and authentication services across a wide variety of applications. Authentication system provides a business with the ability to accurately know with whom they are conducting business. Firewalls protect against theft, loss, or misuse of important data on the corporate network, as well as protection against attempted denial of service attacks. Firewalls may be used at various points in the network to enforce different security policies.

As illustrated in FIG. 24, the development tools framework layer 506 also includes information management tools 602. Information management of the development architecture 500 is provided through an integrated development repository. At this level of integration, tools share a common repository of development objects, design documents, source code, test plans and data. Ideally, the repository would be a single database with an all-encompassing information model. Realistically, the repository must be built by integrating the repositories of the different development tools through interfaces.

Figure 26:
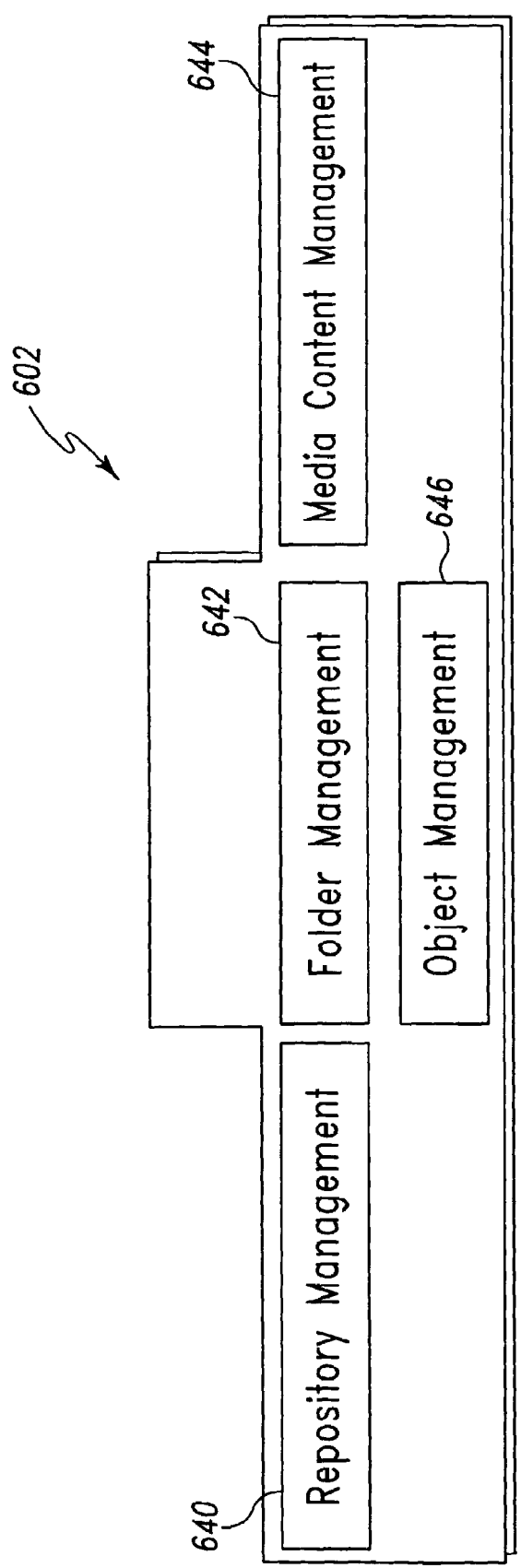
FIG. 26 illustrates the preferred information management tools.

Referring to FIG. 26, the preferred information management tools 602 are responsible for repository management 640, folder management 642, media content management 644 and object management 646. Repository management is the key information management tool 602. The preferred repository open, extensible, integrated and scalable. By being open, the repository has a published interface and an underlying data model. In some development environments, multiple repositories may be used. One repository may be integrated to an upper-case design tool, and another one to a lower-case design tool, each of them offering the best capabilities in its respective domain. It is then key that repositories offer import/export capabilities, so proper bridging/synchronizing capabilities can be developed.

The preferred repository has the flexibility to extend the type of information that can be captured. The repository is integrated with the tools that are used to populate the repository and to draw information from the repository. Be being scalable, the repository-enabled environment is able to support tens to hundreds of users simultaneously, and tens to hundreds of thousands of repository relationships. It should also scale downwards, so that it can also be easily used by small projects. This is a major criteria for usability.

A development repository results in three important benefits for a development organization and for the business units they support. Information is kept in one place, in a known and organized structure. This means that effort is not wasted initially in recreating work that already exists and effort is not wasted later on when reconciling relevant information. This is often referred to as "full life-cycle support." Design information, created for one step of the development process, can be fed to the next step, reducing effort and knowledge "gaps" or misunderstandings. The repository captures information relevant to each stage in application development: design, construction, testing, migration, execution, and operation.

Repository access can be controlled using an access control function within the preferred information management tool 602. A common technique is to group users and assign different access rights to the different groups. Each of these groups is also assigned specific read/write/delete/modify authority. For example, the following groups may be defined as having increasing rights: programmer; designer; technical support; and repository administrator. A less-flexible alternative is to lock objects. A locked object cannot be changed until it is unlocked by the repository administrator. This is a less-flexible approach, but may be used when flexible access control functionality is not part of the repository.

A tricky, and somewhat risky, approach to compensate for lacking access control functionality is to use information about the repository's internal storage mechanism to design an access control scheme. For example, if data elements are stored in a particular directory, tools from the network operating system can be used to limit access to that directory. If data elements are stored in a particular table, tools from the DBMS can be used to limit rights to that table. How well this works depends on how gracefully the repository handles error messages from the network operating system or the DBMS. This approach should be tested before it is implemented.

As soon as data element maintenance becomes structured and is based on formal requests, it is practical to make the requests available to the developers in electronic format. Ideally, the requests should be entered into a database, which also contains information on status, comments on the request, and other pertinent information. This database can be a useful communication vehicle. The preferred information management tool 602 provides this functionality in the preferred embodiment of the invention.

An alternative approach to maintaining history in cases where the repository does not offer good versioning capabilities is to maintain a shadow repository where previous versions of repository objects are stored. This only works for those repository objects whose maintenance is strictly controlled.

All key characteristics of data elements in the repository, and their inter-relationships, can be validated by the information management tools 602, including: naming standards for the element name; naming standards for the variable name associated with each programming language; type (for example, numeric and alphanumeric); length and precision; and window display and internal precision. Similar validation can be performed on other repository objects depending on project standards. At a minimum, naming standards must be validated. This helps designers navigate the repository and thereby encourages reuse.

Import and export utilities, which provide exchanges between the repository and flat files, can be useful in several ways and are included in the preferred information management tools 692. These utilities make it easy to take a snapshot of the repository for archiving, and they allow for reuse of the contents of other repositories.

Reports for impact analysis are extremely useful in the change control process. As the repository maintains relationships between repository objects, where-used and contains reports are usually provided with the repository. Storing the names of affected repository objects in an area-affected table can be useful when grouping change requests during assignment, or when defining a release. The area-affected table is also a valuable tool that can be used to facilitate migration from development to system test.

The ability to easily create various repository reports is important to leverage the information in the repository. A scripting language, a simple report builder, or a query tool provides this capability. Having a query tool with an intuitive user interface and good report formatting features is a necessity on a large project. The query tool can be used to provide standard reports for designers and programmers, printed design information for external reviews, and ad hoc requests for the repository administrator.

As illustrated in FIG. 26, the preferred information management tools 602 is capable of providing folder management 642. It is not always practical to store all information in the same repository. One reason for this is the repository's physical implementation. For example, if the repository is implemented on top of a relational DBMS, this supporting structure does not provide good support for storing flat files. It may therefore often be most practical to populate the repository with place-holders for entities, which reside outside the repository. With this scheme, the place-holder serves as a logical pointer.

This scheme obviously requires some work to ensure integrity, but in practice, it can work quite well. It works better if the objects outside can be organized in a structured way. This is where folders come in; they can be used to impose a structure on flat files; a structure, which can correspond to the structure of the repository. Folders preferentially provide: flexible access rights based on user profiles, which differentiate (at least) between read and write access; efficient search for a component across several folders; migration between folders; nested folders; and links to avoid duplication of components while still showing that a component belongs to several folders The preferred information management tools 692 are also capable of providing media content management 644. Methods for storing and managing media content range from simple folder management techniques to multimedia digital asset management systems, capable of indexing and manipulating numerous multimedia data types. Media content management includes the ability to: manage multiple file formats; efficiently store high-volume files; manage metadata on files within the system; manage multiple versions of media files; manage revision history of changes to media files; and control media storage across locations (online, near line, offline). Whether the functionality described above is handled as an integral part of the information management tools 602, or by manual processes implemented by the information management team 508, depends on the richness of functionality provided by the tools chosen.

Additional functionality provided by advanced media content management tools in the information management tools 602 may include intelligent indexing of media types (allowing specialized search facilities); capabilities for browsing media content (low-res images, previews); and high-performance proprietary file systems (both in terms of speed and volume).

As illustrated in FIG. 26, the information management tools 602 is also responsible for object management 646. Object management tools provide capabilities for viewing objects, their methods and attributes, and the dependencies between these objects. Object management tools also provide specific analysis tools, in order to understand interdependencies between the core classes and the components. When classes and components are modified, impact analysis tools are required to see where the modified entity is being used, allowing them to understand what is the overall impact of the change. This is more complex than with traditional systems as a veritable spider's web of dependencies between classes, components, and applications may ensue. In addition, OO features such as inheritance and polymorphism make tracking down dependencies with simple text search tools much more difficult.

Referring to FIG. 24, the preferred development tools framework layer 506 includes quality management tools 606. Quality management is a management discipline that promotes a customer satisfaction focus and continuous improvement. Quality management tools 606 support the definition and implementation of quality. A number of integrated quality management tools 606 are available that may combine the functionality of all the required quality subcomponents into a single product. Many quality processes, however (such as expectation management), do not require specialized tools, and are, therefore, supported by standard productivity tools 618.

Figure 27:
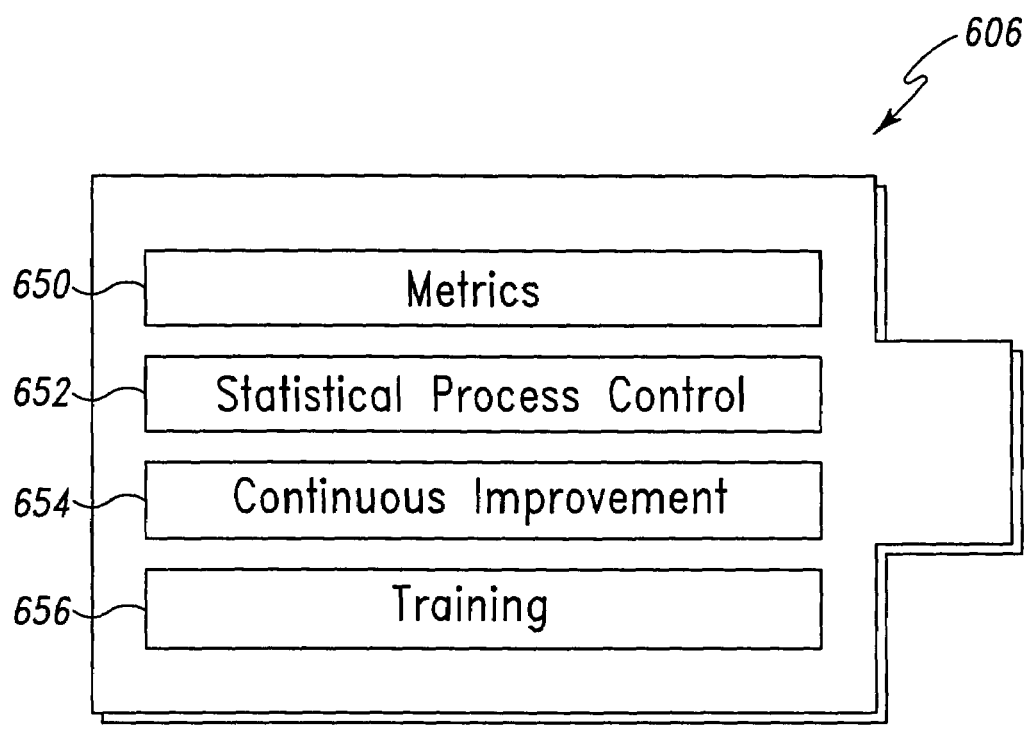
FIG. 27 illustrates the preferred quality management tools.

Referring to FIG. 27, the preferred quality management tools 606 include metric tools 650, statistical process control tools 652, continuous improvement tools 654 and training tools 656. Metrics are an important part of quality management in that they provide a method of measuring (for example, sampling, testing, and determining) whether a process or application meets a given criterion. With metrics, different stakeholders can agree that a product objectively meets an expectation, or that a process has been improved by a measurable amount. Without metrics, stakeholders can only have subjective opinions that may or may not agree.

The metric tools 650 include measurement tools that are used to measure process quality and product quality. Process quality may include metrics such as the time it takes to process a change request. Product quality should be measured for all the product expectations the project has set. This measurement process is the inspection part of quality management.

The preferred quality management tools 606 also include statistical process control tools 652. Statistical process control tools 652 are used to analyze the results obtained with the measurement tools of the metrics tools 650. These display trends that can be used as the basis for process improvement or, in other cases, product rework.

As previously set forth, the preferred quality management tools 606 also include continuous improvement tools 654. Continuous improvement tools 654 are used to analyze and improve the development processes. Continuous improvement is a process management technique by which action is taken to modify a process when the measurement or outcomes of that process are unsatisfactory. Process improvement is required whenever the number of defects exceeds the desired level, productivity falls below a desired threshold, or client expectations fail to be met. Once the process has been modified, it is remeasured to see whether the expected gain was actually achieved.

The preferred quality management tools 606 also include training tools 656. Training tools provide methods to apply a standardized training approach to a large group of people. Training tools can complement or take the place of traditional instructor-led training, depending on the type of information that must be communicated. Computer-Based Training (CBT) tools offer the advantage of being able to train personnel directly on the target environment.

At the more basic level, training tools can also include online or paper-based training materials—not offering all the advantages of CBTs, but still providing the flexibility and convenience because they can be conducted as and when the trainee requires, and in any location. This removes the need to organize classes. The decision of whether to use CBT, online, paper-based or instructor-led training is affected by the number of people that have to be trained, the complexity of the subject, and the availability and distribution of the people to be trained.

Referring to FIG. 24, the preferred development tools framework layer 506 includes program and project management tools 608. Program and project management tools 608 assist the management teams in their daily work. These tools provide the basic functionality required for planning, scheduling, tracking and reporting at both the program and project level. The preferred program and project management tools 608 include planning tools, scheduling tools, tracking tools and reporting tools.

Planning tools are used to assist in program and project planning including the development of the Program Resource Plan, the Work Breakdown Structure (WBS), the Organization Breakdown Structure, Cost Accounting, milestones and deliverables. Scheduling tools are used to allocate resources against the WBS, to determine the timeline for a specific project, and to schedule the allocation of resources at the program level. Project tracking tools enable the project manager to track the actual project status against the original plan and schedule. Integration with the time reporting system and techniques such as Estimates to Complete (ETCs) are valuable in tracking project status. Reporting tools are used to summarize status and metrics to program and project management.

Referring to FIG. 24, the preferred development tools framework layer 506 includes configuration management tools 614. Configuration management tools 614 ensure that consistency between components and a given environment is maintained over time as components are changed. Engagement teams frequently require configuration management tools 614 to support the testing process. Large development efforts may have multiple releases of an application in the development pipeline (development, unit test, integration test, user acceptance test and production). Additionally, some environments have multiple applications that share common components. Multiple versions of common components may be required depending upon the application being tested.

Configuration management tools 614 assist in migrating code between these environments. These tools can also be used to manage different versions of test scripts for various releases of an application. Configuration management tools 615 are essential when development teams are not centralized at one location. These tools provide services, such as version control, when geographically distributed teams need to access common modules or data, such as code tables. Configuration management tools 614 may still be necessary even if the development team is centralized, depending upon other criteria such as development team size.

Large applications, as well as large development teams, require configuration management tools 614 to help control versioning of code, changes to code and migration of code (and accompanying design and test documentation) through the development and testing environments. As the size of the team increases, the communication between team members becomes more cumbersome. The configuration management tools 614 provide a structure for communication between team members regarding version control, change control and migration control. As the size of the application increases, so does the number of objects, files or components. The management of these items becomes increasingly difficult to manage and track during the development process. The configuration management tools 614 provide structure for managing the objects, files and components and reduce the risk of lost information caused by version problems, or by items not being migrated properly.

Over time, a large number of configurations will evolve and configuration management tools 614 can be used to control the evolution and to document these configurations. It may be necessary to keep track of and control configurations consisting of objects such as training materials, documentation, hardware components, system software and even building characteristics. The existence of a large number of such components makes the task of managing their configurations complex, and a dedicated configuration management tool becomes crucial to the process. Configuration management tools are particularly important when there are multiple vendors and subcontractors involved and there is a need to align what is assembled in preparation for the integration test.

A configuration management tool 614 is important if many generations or versions are to be managed. This will generally be the case if the project involves a large development team. There may be external factors that the project team has no control over such as hardware vendors who change their configurations frequently. The internal components, for example, software modules must be configured to match external components such as operating systems and hardware components.

Figure 28:
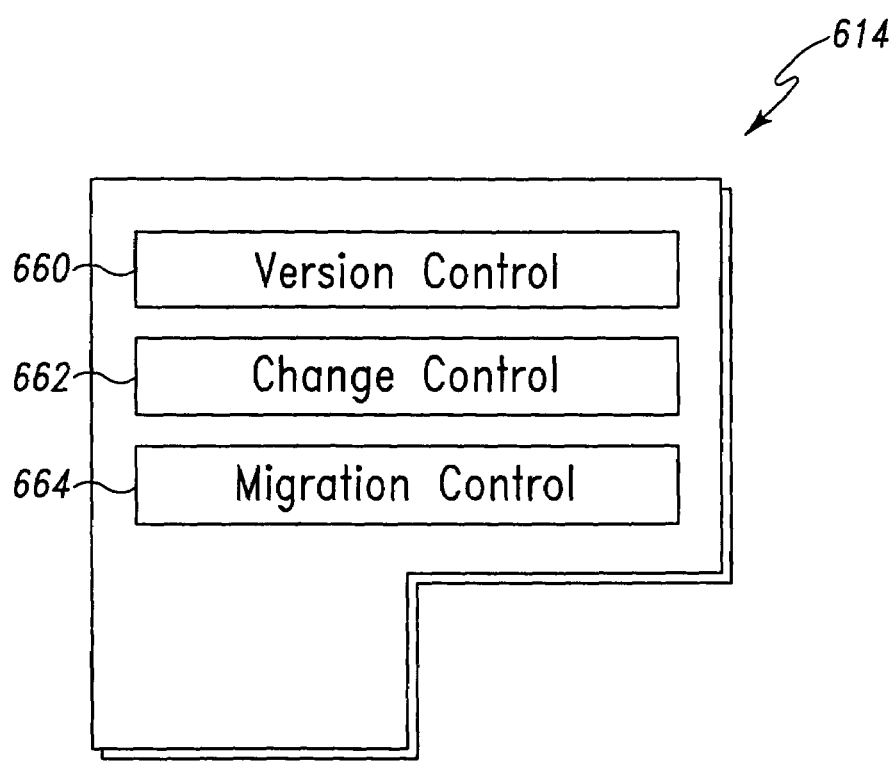
FIG. 28 illustrates the preferred configuration management tools.

Referring to FIG. 28, the preferred configuration management tools 614 includes version control tools 660, change control tools 662 and migration control tools 664. Version control tools 660 control access to source code as it is developed and tested and allow multiple versions to be created, maintained or retrieved. For example, a source code comparator can be used to identify changes between different versions of programs.

The component-based development raises a new challenge: when a single component is used by several applications, versioning becomes significantly more complex and therefore, advanced versioning software, including system support for versioning, is required and provided by the preferred version control tools 660. Version control tools 660 may allow systematic storage of information about who makes changes in what order so that the evolution of the system can be tracked. The tools can provide a facility to report on differences in versions so the version that existed when a critical change was made can be identified and recreated or retrieved. The tools can also provide a means of documenting why decisions are made during the evolution of the system. These decisions would have been made based on the version of the documentation for the system that existed at that time. Version control tools allow the state of the system at a particular time to be recorded. Hence, improved auditability for decisions can be achieved.

Version control tools 660 allow developers to work semi-independently and to choose the degree of integration they need at any given time. They can shield themselves from the tentative development performed on shared components and test a portion of the system with a stable environment around them. This prevents the development team from having to develop one full sequence at a time and increases the ability of a large number of people to work productively together, thus compressing the time required to develop a system.

The version control tools 660 provide a means of taking snapshots of the system in time. If there are changes in the environment that force the system to be rolled back to a previous stage in the development, the version control tools 660 allow access to previous versions and mechanisms for reverting to an earlier version.

The change control tools 662 are designed to preferentially provide the following features: free format description of changes; classification of changes in several different ways (area affected, priority, estimated cost, authorization); and flexible, customizable sorting and reporting to ensure that a change is handled in a timely manner. Ideally, the change control tools 662 are also integrated with workflow support, the repository and the source code control system. This ensures rapid processing of the change, accurate analysis of the area affected, and correct locking and unlocking of repository objects and source modules.

Change control tools 662 provide a vehicle for ensuring that only authorized changes are made and signed off. This ensures conceptual, proper ownership of the total look and feel of the application. Change requests may also be rejected or deferred by an authorized person. Facilities to track interdependencies between change requests (for example, change request A must be completed before change request B can start) are provided by the change control tools 662. This can be used to encourage efficient scheduling and to ensure that work is not duplicated.

Change control tools 662 also can provide a vehicle for capturing good ideas. If the project does not have the capacity to implement those ideas at present, the change control tools 662 can be used to capture those ideas. These ideas can be reinvestigated when a future release is planned.

Change control tools 662 can be used to identify changes that conflict, for example, one user wants a green background and another wants a blue background. The changes must be resolved through some kind of dialog or discussion and change control tools can be used to initiate this process.

Change control tools 662 provide a means of identifying at what point in time a critical change was implemented and that information can be used to find out what version existed at that time. Change control tools 662 also can support some kind of impact analysis and may be integrated with an impact analysis tool set. Impact analysis is important in order to group changes so that they can be implemented effectively. Multiple changes may affect the same component and it would be wasteful to open that component many times over and implement the changes one at a time. Impact analysis can be used to ensure that all relevant changes to that component are implemented together. Hence, impact analysis is important for scheduling purposes and for estimating cost.

The preferred migration control tools 664 control multiple versions of source code, data and other items as they are changed, tested, and moved from one development environment into another, for example, from development to test and from test to production. Data migration control tools manage multiple versions of the database and its data to ensure that accurate data and structure are maintained in the environment, and to ensure that versions of application code and database are deployed consistently. Types of data that would be migrated include base codes data and converted data. Other migration control tools 664 manage other types of objects to ensure that complete versions of all components reside in the production environment (for example, test definitions and scripts).

Multiple environments are typically required when the project is faced with serious time constraints. Typically, the project team performs integration or systems testing on one portion of the system, while developing the next portion. The team corrects errors based on one test while, at the same time, the next test cycle or testing of the next part of the system is performed. This means that multiple environments exist that are configured differently and use a different version of the system components.

The migration of these different versions and configurations between environments must be carefully controlled using migration control tools 664. For successful migration, there must be consistent migration of all components and their dependents. If multiple releases are being developed in parallel, it is vital to provide a consistent means of migrating configurations and versions from one environment to the next, which is provided by the migration control tools 664. Migration control tools 664 keep a log of what is migrated. It may be required to review what has happened over time in order to gain an understanding of the current status of the system. Migration control tools 664 can also be used to ensure that only authorized personnel can trigger the migration of components from one environment to the next. This ensures that there is no confusion of components in each release as the move is made from, for example, a unit test environment to a system test environment.

Referring to FIG. 24, the preferred development tools framework layer 506 includes environment management tools 610. The modern development environment is both complex and sophisticated. It supports many different functional and technical requirements (illustrated by the execution architecture 32), many different development teams, tools from many different product vendors, and often must support projects at different stages of the development life cycle. As such, it is a mission-critical production environment and must be managed based upon an operations architecture. The extent to which the areas of the operations architecture are implemented must also be a factor of project size and duration.

The preferred environment management tools 610 are based upon the MODE (Management of Distributed Environments) conceptual framework. This section uses MODE as a framework, adopts MODE terminology, and focuses on those management tasks from MODE, which are particularly important in the development architecture 500.

Figure 29:
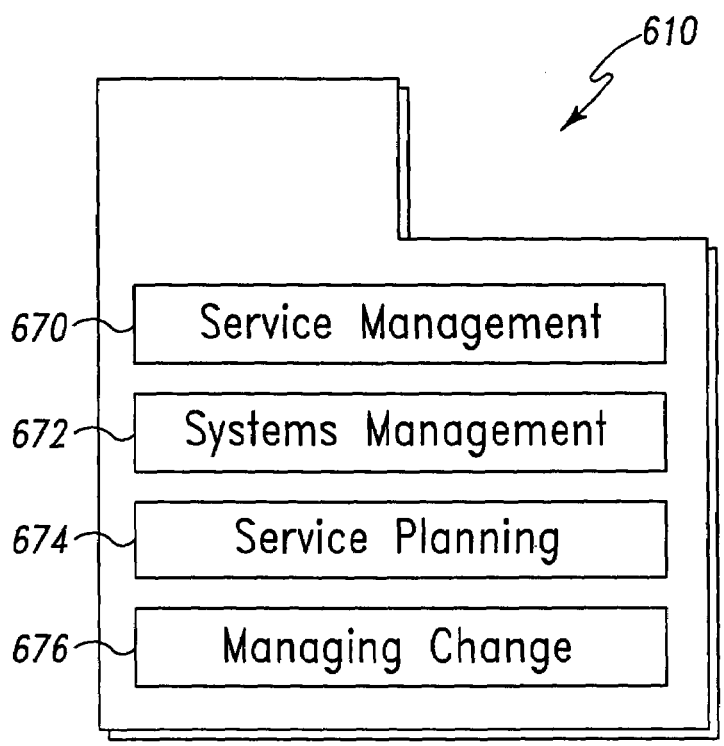
FIG. 29 illustrates the preferred environment management tools.

Referring to FIG. 29, the preferred environment management tools 610 include service management tools 670, systems management tools 672, managing change tools 674 and service planning tools 676. Service management tools 670 support the various aspects of supporting and managing the interface with developers. As defined in MODE, these include the following: tools to support and manage a help desk; tools to support the creation, management and reporting of Service Level Agreements (SLAs) and Operations Level Agreements (OLAs); and tools to manage and support the quality of the development environment.

Figure 30:
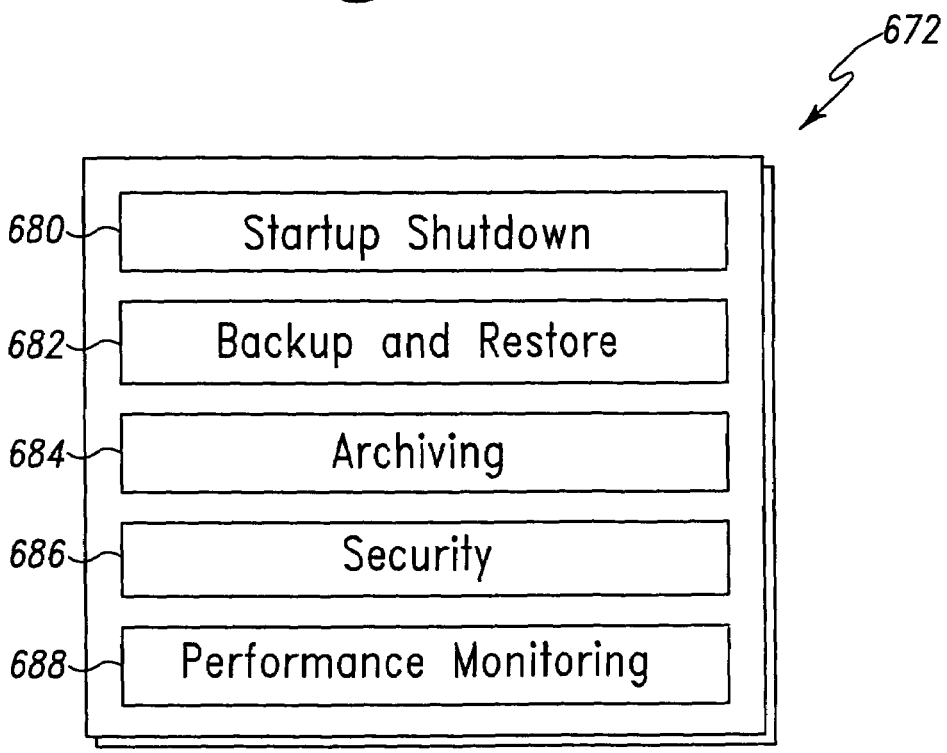
FIG. 30 illustrates the preferred systems management tools of the environment management tools.

Systems management tools 672 support and manage the operation of the distributed system. Referring to FIG. 30, the preferred systems management tools include startup and shutdown tools 680, back-up and restore tools 682, archiving tools 684, security tools 686 and performance and monitoring tools 688. A comprehensive development environment rapidly becomes sufficiently complex that the startup and shutdown of the environment must be managed carefully and preferably automated. The startup and shutdown tools 680 ensure the integrity of the environment. Startup may involve the carefully sequenced initialization of networking software, databases, web servers and more. Similarly, shutdown involves saving configuration changes as needed and gracefully taking down running software in the correct sequence.

The preferred systems management tools 672 also include backup and restore tools 682. The incremental value of the daily work performed on the development project is high. This investment must be protected from problems arising from hardware and software failure, and from erroneous user actions and catastrophes such as fires or floods. The repositories and other development information must, therefore, be backed up regularly. Backup and restore procedures and tools must be tested to ensure that system components can be recovered as anticipated. The large volumes of complex data generally require automation of backups and restores, which are all performed by the preferred backup and restore tools 682.

The preferred systems management tools 672 also include archiving tools 684. Archiving can be particularly useful to safeguard information from previous versions or releases. More generally, it is used to create a copy of information that is less time-critical than the current environment at a given time. Archiving may be performed to a medium, which is different from the backup medium, and may involve other tools, which, for example, provide a higher compression ratio. Those skilled in the art would recognize several different methods of archiving exist and may be used in the present invention.

The preferred systems management tools 672 also include security tools 686. Security tools 686 are required in the development environment to ensure against unauthorized access by individuals and system processes, to limit damages caused by such unauthorized access, and to audit access the environment services. At the security management level, it may be valuable to have tools that help manage security profiles, security groups and access rights.

Role-based access control establishes access rights and profiles based on job functions within the environment. If different access rights are required for security administrators versus code developers versus code reviewers versus testers, then the correct access can be established based on these functions. The security administrator can granularly configure what the tool is auditing. The audit logs should be able to optionally record User ID, time-of-day, location of access, successful and unsuccessful access or change attempts, etc. Some security services, such as content scanning or auditing, may add noticeable processing time and requirements to the system. Tools should be architected in such a way that performance impacts are or can be configured to be minimal.

Referring to FIG. 30, the performance monitoring tools 688 help ensure that the available resources are sufficient to meet the developers' performance requirements. These tools can be used to assess end-to-end performance of both batch processes, such as backups, and interactive processes such as repository-based file retrieval.

Referring back to FIG. 29, the environment management tools 610 include service planning tools 674. Service planning is the planning required to anticipate and implement changes to the following areas: service management; systems management; managing change; and strategic planning. All these areas relate to the development environment and are analogous to the kind of planning that must occur in the business application's production environment. Key types of tools for development environments that may be used in the service planning tools 674 include performance modeling tools and capacity planning tools.

Performance modeling tools in this category support the analysis of the development environment's performance, as opposed to that of the client/server application being developed. A simple spreadsheet may be suitable in some well-known and understood environments, but dedicated performance modeling tools are used on any project with high transaction volumes or complex environments involving multiple platforms. Capacity planning tools support the maintenance of adequate processing capacity for the development environment (for example, workstations, servers, storage devices and network capacity). These tools range from spreadsheets to dedicated capacity modeling and simulation tools.

Referring to FIG. 29, the preferred environment management tools 610 also includes managing change tools 676. Managing change tools support the various aspects of identifying and managing change in the development environment. Data and software distribution is a key tool in this category for development environments that have several developers. These tools enable automated distribution of data and software to the workstations and servers in the development environment and are provided by the preferred managing change tools 676.

Referring to FIG. 24, the preferred development tools framework layer 506 also includes problem management tools 616. Problem management tools 616 help track each system investigation request—from detection and documentation to resolution (for example, Problem Tracking, Impact Analysis, Statistical Analysis). Problem management tools 616 log information about problems detected, classify them, and generate reports. This is essential for capturing metrics information.

The major functions of the problem management tools 616 are: problem source and metrics information; problem solution information; planning support for problem fixing and migration preparation; and impact analysis capability: link to the application design repository to get a precise impact analysis on a problem; link to the test plan management system to keep track of the cycle and test the condition where the problem occurred, to determine the test stage work unit affected by the problem.

It is important to select an automated problem management tools 616 that are integrated with the program's testing and configuration management tools 614. Therefore, the problem management tools 616 must be able to support the testing model selected, and have tight integration with the migration control tools 664 and version control tools 660 associated with the configuration management tools 614.

An automated test script tool can be integrated to allow users to reference scripts that were being used when the error or defect was found. A data repository can be integrated into the problem management tools 616 that will allow the users to build relationships between problems and design and test documentation and application components. An ability to associate problems with affected work packages and a mechanism for version control changes for the work package is necessary so the package can be migrated back into the testing environment.

Referring to FIG. 24, the preferred development tools framework layer 506 includes problem management tools 616. Problem management tools 616 help track each system investigation request—from detection and documentation to resolution (for example, problem tracking, impact analysis, statistical analysis). Problem management tools 616 log information about problems detected, classify them, and generate reports. This is essential for capturing metrics information.

The major functions of problem management are: problem source and metrics information; problem solution information; planning support for problem fixing and migration preparation; and impact analysis capability: link to the application design repository to get a precise impact analysis on a problem; and link to the test plan management system to keep track of the cycle and test the condition where the problem occurred, to determine the test stage work unit affected by the problem.

It is important to select an automated problem management system that is integrated with the program's testing and configuration management tools 614. Therefore, the problem management system must be able to support the testing model selected, and have tight integration with the migration and version control tools associated with configuration management.

An automated test script tool can be integrated to allow users to reference scripts that were being used when the error or defect was found. A data repository can be integrated into the problem management application that will allow the users to build relationships between problems and design and test documentation and application components. An ability to associate problems with affected work packages and a mechanism for version control changes for the work package is necessary so the package can be migrated back into the testing environment. When considering an automated tool, also consider what type of security is required for the problem management application. This is closely tied with the configuration management tools 614. Only one person should have the rights to review and approve problem analysis tasks as well as problem migration activities.

Referring to FIG. 24, the preferred development tools framework layer 506 includes release management tools 612. Release management tools 612 provide: planning functionalities, to help planning design and development effort; monitoring functionalities, in order to measure progress towards delivery goals; project independencies management; and interface with the change control system. Ideally, the release management tools 612 should also be integrated with workflow support, the repository and the project/program management system.

Security management tools provide the components that make up the security layer of the final system, and may provide required security controls to the development environment. While some of these tools may be considered as nothing more than security-specific packaged components, many are an integral part of the development environment toolset. Security management tools include: intrusion detection discovers and alerts administrators of intrusion attempts. Network assessment performs scheduled and selective probes of the network's communication services, operating systems, and routers in search of those vulnerabilities most often used by unscrupulous individuals to probe, investigate and attack your network.

Platform security minimizes the opportunities for intruders to compromise corporate systems by providing additional operating system security features. Web-based access control enables organizations to control and manage user access to web-based applications with restricted access. Fraud services are methods of verifying the identity of credit card users to reduce the amount of fraudulent credit card transactions. Mobile code security protects corporate resources, computer files, confidential information and corporate assets from possible mobile code attack. E-mail content filtering allows organizations to define and enforce e-mail policies to ensure the appropriate e-mail content. Application development security toolkits allow programmers to integrate privacy, authentication, and additional security features into applications by using a cryptography engine and toolkit. Encryption provides confidential communications to prevent the disclosure of sensitive information as it travels over the network. This capability is essential for conducting business over an unsecured channel such as the Internet. Public key infrastructure provides public-key encryption and digital signature services. The purpose of a public-key infrastructure is to manage keys and certificates.

A PKI enables the use of encryption, digital signatures, and authentication services across a wide variety of applications. Authentication system provides a business with the ability to accurately know with whom they are conducting business. Firewalls protect against theft, loss or misuse of important data on the corporate network, as well as protection against attempted denial of service attacks. Firewalls may be used at various points in the network to enforce different security policies. These tools will be discussed in detail in the Security Product Evaluation Framework to be published by Global TIS Security as part of the Security in eCommerce project.

Figures 31, 32:
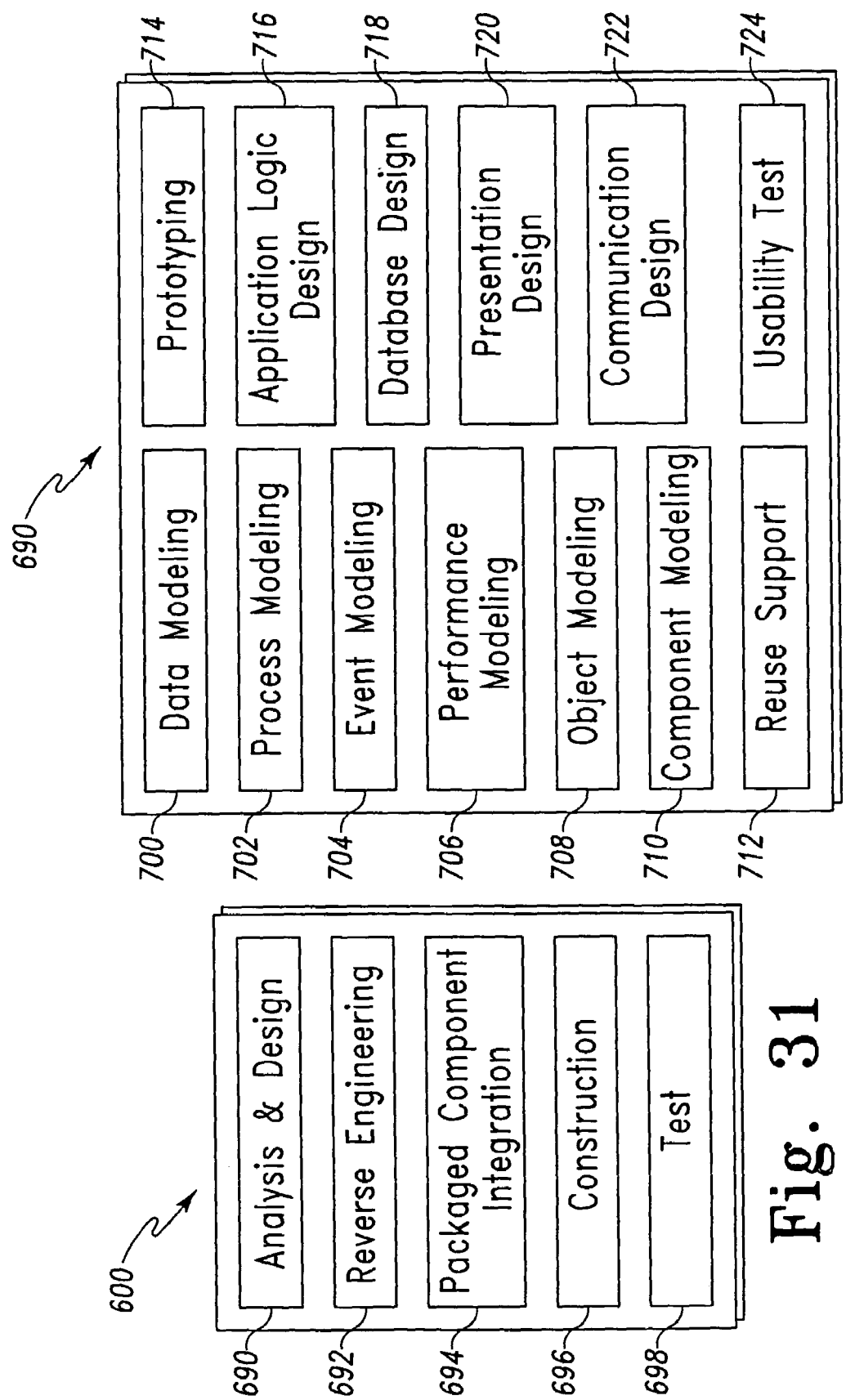
FIG. 31 illustrates the preferred system building tools.
FIG. 32 illustrates the preferred analysis and design tools of the system building tools.

Referring to FIG. 24, the preferred development tools framework layer 506 includes system building tools 600. System building tools 600 comprise the core of the development architecture 500 and are used to design, build and test netcentric computing system applications. All the system building tools 600 must be integrated and share development objects appropriately. As illustrated in FIG. 31, the preferred system building tools 600 include analysis and design tools 690, reverse engineering tools 692, package component integration tools 694, construction tools 696 and test tools 698.

Analysis and design tools 690 are used to specify the requirements for the system being developed. They are typically modeling and diagramming tools, which provide the ability to diagram system requirements and specify "what" a system must do. The analysis and design tools 690 are used to specify "how" a system will implement these system requirements. They include diagramming tools, which graphically depict how the system will be built in terms of its key components. This differs between classical client/server systems and component-based systems. The standard client/server model comprises application logic, presentation and communication components, which together support the business processes. For a client/server system, each of these components must be individually defined. The component-based systems, however, have the data model and process models encapsulated within the object model. In addition, the design of the component model is directly affected by the business processes, which govern the way these objects interact. Therefore, with component-based systems, the object and component models encapsulate the data and process models.

Referred to FIG. 32, the preferred analysis and design tools 690 include data modeling tools 700, process modeling tools 702, event modeling tools 704, performance modeling tools 706, object modeling tools 708, component modeling tools 710, reuse support tools 712, prototyping tools 714, application logic design tools 716, database design tools 718, presentation design tools 720, communication design tools 722 and usability test tools 724.

Data modeling tools 700 provide a graphical depiction of the logical data requirements for the system. These tools preferably support diagramming entities, relationships and attributes of the business being modeled on an Entity-Relationship Diagram (ERD). Several techniques have evolved to support different methodologies (e.g., Chen, Gane & Sarson, and IDEF).

As systems are often built on top of legacy databases, some data modeling tools 700 allow generation of an object model from the legacy database data model (DDL). By understanding the E-R diagram represented by the database, it is easier to create an efficient persistent framework, which isolates business components from a direct access to relational databases. Caution is required, however, as the resulting model is, at best, only partial, as an object model has dynamic aspects to it as well as static relationships, and may not correctly reflect the analysis performed in the problem domain.

When a component- or object-based approach is used, data modeling is not performed. Rather, the object model contains both the data and the behavior associated with an object. In most systems, relational databases are used and the object model must be mapped to the data model. Tools such as Persistence (Persistence Corp.) and DBTools (Rogue Wave) can generate the code necessary to map objects to a database.

Data modeling tools 700 allow DDL to be generated from the data model. The tools should support DDL generation for the chosen RDBMs (Sybase, Oracle DB2). In addition, the DDL generator should take advantage of the specific advanced features supported by each of the RDBMs. Data modeling tools 700 help to graphically develop the logical and physical data requirements for an application. These tools depict logical constructs such as entities, attributes and relationships between entities, along with physical constructs such as database definitions and table indices.

It is useful for developers to have read-only access to either a hard or soft copy of the data model during development. This document rapidly becomes a key discussion document in design discussions. It is useful to show tables, columns, primary keys and foreign keys (if all of this will fit on a diagram at the same time) in the document. Graphical depiction is not only useful, but essential to data architects, DBAs and also to application developers (the latter group is often omitted). As in most cases, a picture speaks a thousand words.

Data modeling tools 700 promote consistency in application development by defining standard names and attribute characteristics for the application data. Application developers then use the standard entity and attribute definitions across various application development initiatives. This results in a consistent definition and usage of data. For example, all applications that require customer number will use the standard name and attribute length defined in the data model. Database administrators will also use the data model to generate physical database definitions that are consistent with the application under development. Thus, the data model acts as a single source for data definition.

All applications should have data consistency that is linked back to a set of business data standards. Failure to achieve an agreed set of definitions will jeopardize the ability of the separate applications to perform as a business unit; for example, applications will not be able to share data if they are in different formats or use different code lookups. Data consistency must be agreed functionally during analysis and design. Data modeling tools 700 help to document data definitions, but they will not automatically enforce data consistency.

Data modeling tools 700 allow documentation of the data insofar as it appears in the data model (and ultimately in the database). However, there are usually a significant number of other data definitions that will never appear in the database, and whose definition is different to the data model attributes. For example, most systems have interfaces to external systems, and inherit a legacy of interface files whose data definitions may differ to those on the data model, but which do logically correspond to fields on the model. These data definitions must also be documented and stored, but are effectively outside the data model. The data-modeling component should be used to implement procedures to address all the data definitions that affect the system.

The features required in the data-modeling tool 700 will depend on the intended use of the tool. If the tool is to be used to develop logical data models, it should support logical constructs such as entity definition, attribute definition, subtyping and supertyping. If the tool is to be used for physical data design, it should support the physical constructs required for the targeted RDBMs, such as transforming a logical model into a physical model, database definition, index definition and DDL generation.

Process modeling tools 600 provide a graphical depiction of the business functions and processes being supported by a system. The tool(s) selected must support the modeling techniques being used in the development methodology; these include process decomposition, data flow and process dependency. Process modeling is a method for clarifying and communicating the business design of the system. The process model can provide an effective means of bringing people together, creating a shared vision of how the business is to function. A process model provides a means of standardizing a set of similar processes, which exist, for example, at different branches of the business.

The re-engineered processes in the process model may form a basis for the systems design, which is to come afterwards. Requirements and constraints for the system design can be well represented and communicated in a process model. Advanced process modeling tools 702 provide process simulation capabilities. Process simulation ensures that the process design is adequate as a basis of the functionality of the software that is to be developed.

Event modeling tools 704 provide graphical depiction of the events and associated responses for the applications on the netcentric computing system. A variety of tools and techniques can be used for event modeling, for example, word processors to develop simple textual lists of events and data flow diagramming to show events and responses. For component-based development, event modeling or interaction sequence modeling may be performed through interaction diagrams, both at the object and component level. The event model is often used as input for test scripting.

Event modeling does not fix the sequence of processes. A process starts when a specified event occurs, and may generate other events when it has finished. Event modeling notation allows focus on what steps the process must do as opposed to "how" it sequences the steps. This form of representation is especially useful for processes that will be re-engineered, since it allows steps to be re-arranged easily.

An event model represents external actions, which the system must recognize and responses, which the system must produce. Events express the system's perception of external activities. Therefore, event modeling allows the external environment to influence the requirements definition, rather than basing the environment on the applications structure. This approach supports the applications consistency with the workflow and other business activities and thus clearly defines the scope of the system.

An event model represents the user requirements in concise business terms. When used in conjunction with the process model, this provides an effective means of communicating the system requirements from the business design team to the systems design team or to the users. By using event modeling and a central event router architecture, interfaces to several systems can be easily and flexibly provided. Each system registers itself with the event router and indicates in which business events it is interested. Whenever an event is triggered, the router is notified. It then triggers all the applications that registered themselves as being interested in that event. Applications can generate events as required to ensure that appropriate next steps in the process are performed after they have completed their part.

Performance modeling tools 706 support the analysis of performance over the network. The performance of a system must be analyzed as early as possible in the development process. A simple spreadsheet may be suitable in some well-known and understood environments, but dedicated performance modeling tools 706 should be considered on any project with high transaction volumes or complex distributed architectures involving several platforms.

In the case of Internet-based applications, as the Internet is not a controlled environment, performance modeling is limited to those components within the domain of the controlled environment (i.e. up to the Internet Service Provider). However, in the case of intranet-based systems, where the environment is controlled from end-to-end, performance modeling may be performed across the entire system.

Performance modeling for components involves the analysis of the projected level of interaction between components and the level of network traffic generated by this interaction. It is important for performance reasons that communication between components is minimized, especially if these components are distributed.

The preferred analysis and design tools 690 also include object-modeling tools 608. An object model preferably contains the following deliverables: class diagram (one per functional area or one per component); class definition (one per class); class interaction or sequence diagram (one or more per scenario/workflow); and class state transition diagram (one per class with complex state).

Tools such as MS Word, MS PowerPoint or ABC Flowchart (Micrografix) may be used to produce these deliverables. Specific modeling tools do exist, however, and provide advantages such as cross-referencing (for example, are all the methods used in the interaction diagrams described in the class definitions?), automatic propagation of changes to other diagrams, generation of reports and generation of skeleton code.

As well as providing the usual editing and graphical functionalities, the preferred object modeling tools 708 will interface with a repository (to support versioning); support multiple users, and generate code from the design. The use of UML notation to represent the object model is becoming more and more common. In this case, other diagrams such as Use Cases (from Ivar Jacobson) and collaborations diagrams complement the model.

The preferred analysis and design tools 690 also include component-modeling tools 710. The component modeling tools 710 are used to monitor and mode various components connect with the netcentric computing system 10. Component modeling can mean either designing components from scratch, or customizing and integrating packaged software. No specific component modeling tools exist and current object modeling tools only offer limited support for components (e.g., for packaging-related classes together). Class packages can be used to separate the object models for different components, with a separate class package(s) for the component model. This approach, however, is not enforced by current modeling tools, and requires project naming and structuring standards.

When component modeling is being performed using existing packaged software, some form of reverse engineering or importing is required from the modeling tool to capture the existing design. During component design, the partitioned component model is designed, which defines physical interfaces and locations for components. It is important for performance reasons that communication between components is minimized, especially if they are distributed.

The preferred analysis and design tools 690 also include reuse support tools 712. It is during analysis and design that really large savings can be obtained by reusing existing solutions. At this stage, reuse is often at the subsystem level but can extend down to the service and module level. Asset navigation tools, which permit the retrieval of reusable components can, therefore, be of great value.

For a component-based or object-based solution, reuse is usually with a specific aim. It occurs at different levels and requires different types of support. At the analysis and design stage, common classes and components are used across applications. Repository management is required that allows easy browsing and sharing of pieces of design.

During the construction phase, there may be strong interdependencies between the core classes and the components. This must be taken into account when planning the work. When classes and components are being fixed or modified, impact analysis tools are needed to see where the modified entity is being used. This is more complex than traditional systems as a veritable spider's web of dependencies between classes, components and applications may ensue. In addition, OO features such as inheritance and polymorphism make tracking down dependencies with simple text search tools much more difficult.

In terms of tools, a class or library browser is required, which allows easy navigation and identification of candidate components and classes. In many cases, there can be a mismatch between design and build, especially if no detailed design phase exists. This may result in the existence of two repositories. The object or component model produced in the design phase is at a higher level and gives a good introduction or overview. The actual code, however, is where developers tend to go to find out how an application really works. When this is the case, the source code can be used as the detailed design. There are tools that extract documentation (from comments in a given format) and generate HTML pages. Examples of such tools include: Java-javadoc, part of the JDK and C++—available from http://www-users.cs.umn.edu/~kotula/cocoon/cocoon.htm.

The preferred situation is a single repository for analysis, design and code, allowing developers to move from design to code and vice versa. However, most tools have proprietary repositories and their import/export facilities are not sophisticated enough to merge the two. For the moment, source code and design documentation remain two separate repositories.

The preferred analysis and design tools 690 also include prototyping tools 714. It is frequently difficult to obtain specific, reliable and complete requirements that truly express what users need. This may stem from users being unavailable or inexperienced with computer systems, or it may arise from the nature of the system under design. For example, if the system incorporates very new technology, it may be difficult for users to visualize the possibilities.

Prototyping tools 714 can address this problem by simulating key user interface components, thus enabling the development team to measure the usability of the proposed system at a very early stage. The most important quality of a prototyping tool 714 is its development speed. If prototyping can be performed in hours or days rather than weeks or months, it becomes possible to perform more iterations, which explore different options. This may lead to a much better system, given that the user's perception matures with each iteration. This, in turn, improves the quality of user input.

Very rapid, low-fidelity prototypes (for example, paper-based) play an important role in early prototyping. High-fidelity prototypes, used later on in the design process, should be as close to the target system as possible, and highly detailed—even down to the characteristics of a button click (e.g., click-down image, click sound, length of click, etc.). This way, everyone (including the design teams) can determine exactly what the final system should look like.

User involvement at the prototype stage is of the utmost importance—regular user reviews as the prototype evolves will ensure buy-in from the users, and avoid unpleasant surprises at later stages of development. Caution must be taken not to raise the expectations of the users in terms of the length of time it will take for the final product to be delivered. Prototyping will deliver something that looks like it "works" very quickly. It should be clear that what is delivered is a model, and not an application. Clients 78, 79, 120 may expect real application functionality to be developed and delivered quickly due the fast turnaround of the prototyping process, which will invariably not be the case.

Prototypes may also be used to prove architecture concepts (for example, to verify the flow of messages from the client to the host), to ensure that the system is not based on an architecture that is fundamentally flawed. It is important to determine whether to carry forward and extend the prototype, or throw it away after requirements have been determined and perform technical design from scratch. Some prototyping tools offer the possibility of reusing code from the prototype. Although this is a valuable option, it is often available at the cost of slower prototype development. An interesting compromise may be to keep portions of the prototype (for example, user interface components) and rebuild other components from scratch.

In component-based development, prototyping may be a valuable way of checking that component boundaries are well defined. However, this implies that the architecture must be defined at the time of prototyping. Specific multi-platform prototyping facilities may be required when developing and deploying applications across multiple platforms.

Prototyping tools 714 can be used to identify potential performance problems in an application. A development team can use a prototyping tool 714 to implement a portion of an application to identify performance problems. The team can then use this information to improve designs and provide guidelines and standards for designs. Thus, prototyping leads to a better designed and more consistent end product.

Prototyping tools 714 allow engagement teams to demonstrate the look and feel of an application to the end user. The tools 714 should be capable of providing a realistic understanding of the final application without requiring an extensive construction effort. Prototypes can be used to interactively gather business requirements and design the application with the end user. If the tool supports interactive prototyping, changes can be quickly incorporated into the prototype and demonstrated back to the user. This is important when users are inexperienced with GUI. Prototyping the look and feel of the application and interactively gathering business requirements assist in gaining user acceptance of the system.

A prototype provides a means of communicating what the system is intended to do and can clarify system requirements. The prototype may become a throwaway if it becomes clear that the development style of the prototype is not conducive to a quality product. It is often more cost-effective to start afresh, incorporating the added understanding which was developed during the prototyping stage. It is frequently difficult to obtain specific, reliable and complete requirements that truly express what users need. Prototyping can solve this problem by simulating key user interfacing components. User interface issues that are detected later are generally costly to change. If the system is to be used by dedicated people where the measure of productivity is solely the number of transactions, they can get through per second, then user interface prototyping tools are important. Prototyping tools provide a means of getting to the easiest and most efficient interface. Prototyping tools facilitate selection between alternative styles of interaction and provide a means of addressing performance issues.

User interface prototyping tools are important since they allow developers to obtain user input early on the GUI design process. This induces user ownership and acceptance of the system. By using prototyping tools to get user input, ownership and acceptance of the system is facilitated. Adoption of the system by users and ensuring that their expectations are reasonable can make the system less expensive to deploy.

Application logic design tools 716 are used to graphically depict the logic of an application. These tools 716 include application structure, module descriptions, and distribution of functions across client/server nodes. A variety of tools and techniques can be used for application logic design. Examples are structure charts, procedure diagrams (module action diagrams), and graphics packages to illustrate distribution of functions across client 78, 79, 120 and server 92, 96, 98.

With component-based development, application logic design is performed through object and component modeling. The functionality is captured in use cases, scenarios, workflows and/or operations diagrams along with interaction diagrams/sequence diagrams. These are usually produced using MS Word, MS PowerPoint, ABC Flowcharter (Micrografix), or an object-modeling tool.

The application logic design tools 714 provide a means of confirming the complexity estimates and, hence, facilitate a revision of estimates before going into construction. By confirming the validity of the complexity estimates, the business case is also confirmed. It is at this stage that the decision is made whether or not to continue with construction. Application logic design tools 714 can provide a basis for performance modeling, based on the processing ability of the CPU, parallelism and pipelining. The tools 714 can be used to graphically depict system complexity from which a performance model can be derived.

Application logic design tools 714 provide a vehicle for communication from designer to programmer. This is particularly important when programmers are relatively inexperienced and need detailed guidance, which comes from the detailed design that is documented using these tools. Application logic design tools 714, and the designs that they contain, provide documentation of the system, which will support maintenance in the long run.

Database design tools 718 provide a graphical depiction of the database design for the system. They enable the developer to illustrate the tables, file structures, etc., that will be physically implemented from the logical data requirements. The tools 718 also represent data elements, indexing and foreign keys. Many data design tools integrate data modeling, database design and database construction. An integrated tool 718 will typically generate the first-cut database design from the data model, and will generate the database definition from the database design.

With an object-based or component-based solution, the data-modeling task changes. In most cases, relational databases are still used, even where there are no dependencies on legacy systems. As there is an 'impedance mis-match' between an object model and a data model, a mapping activity must be undertaken. There are tools on the market which allow the mapping of classes to relational tables, and which generate any necessary code to perform the database operations (e.g. Persistence, DBTools).

There is a tendency (especially when dealing with legacy systems) to treat data models and object models the same. It is important to recognize that, at best, the data model represents only the static part of the object model and does not contain any of the transient or dynamic aspects. The physical data model may also change significantly (for DB optimization), further confusing the issue. There can be performance problems with objects mapped to a relational database. In a worst-case scenario, an object can be spread across many tables, with a single select/insert for each table and, as each object is loaded one by one, the performance becomes very poor. Some tools 718 provide lazy initialization (only loading the parts as they are needed) and caching (minimizing DB hits). The current trend seems to be for object-relational databases, with vendors such as Oracle adding object features to their core products. Although the support provided at the moment is limited, it is likely that in future versions Java or C++ classes will be able to interface directly.

Database design tools 718 are important where design ideas must be communicated to the development team. Where the development team exceeds ten people, this design must be formalized. Database design tools provide a graphic depiction of the database design for a system while, at the same time, enabling the developer to illustrate tables or other structures that will be implemented physically. Database design tools 718 become especially important if performance is critical, since database design contributes substantially to the overall performance of the system. Database design tools provide quantifiable performance data, which is a crucial component of the overall performance model. Database design tools 718 also provide a means to model I/O on devices such as hard disks, optical drives and tapes, etc. This information can be used in a performance model.

The database design component is important in the case where multiple teams are working on different functional domains, since they often model different parts of the database separately, and then incorporate these models at the end into one large database model. Database design tools 718 can be used to enforce consistency of the different database designs. Navigation through a large number of tables is complicated and can be simplified significantly if dedicated database design tools 718 are used.

Presentation design tools 720 provide a graphical depiction of the presentation layer of the application, such as windows, dialogs, pages, navigation and reports. Tools in this category include window editors, report editors and dialog flow (navigation) editors. Window editors enable the developer to design the windows for the application using standard GUI components. Report editors enable the developer to design the report layout interactively, placing literals and application data on the layout without specifying implementation details such as page breaks. Dialog flow (navigation) editors enable the developer to graphically depict the flow of the windows or screens. The majority of these tools generate the associated application code required to display these components in the target system.

The majority of netcentric computing systems 10 use web browsers to provide a common cross-platform user interface. Presentation design for this type of environment therefore entails the generation of HTML pages, often with additional components (JavaScript, 3rd party ActiveX controls, Plug-ins) providing enhanced functionality or media content. Many tools are currently available for designing and creating web content, although HTML remains the common denominator, at the very least as a placeholder for the content.

The preferred presentation design tools 720 provide the ability to use a single tool for both prototyping and GUI design. This decreases the learning curve during design and permits components of the prototype to be reused. These tools make application development easier and faster through point-and-click capabilities and built-in functions. Reduction in the overall presentation layer design/development effort allows for more design iterations, and thus more chances for user feedback. If the tool to be used for construction is not known at design time, then specific tools for presentation design are needed.

The preferred analysis and design tools 690 also include communication design tools 722. An increasingly important aspect of system design is communication design. After the fundamental communication paradigms have been chosen, each exchange must be designed to allow for the detailed design of each module (clients, services, functions), and to lay the basis for more refined performance modeling. To ensure against interface problems, these tools 722 are preferentially tightly integrated with the design repository. One simple way to document communication interfaces is to define include files that hold the interface definitions.

Thorough performance simulation or modeling requires a communication model. A performance model is particularly important if the system is large, heterogeneous, and complex. A valid performance model can only be created once a detailed communication design has been developed for the system. The performance model is derived from the detailed communication design. Communication design tools 722 provide a means of documenting the physical design of the system, such as protocol stacks, message sizes, routers, bridges, gateways, LANs, WANs, MANs, etc., as well as the logical design, both of which are used to develop the performance model and to simulate performance.

Communication design tools are essential in developing systems where critical business operations have to have maximum availability and minimum down time. One of the primary contributing factors to high performance in client/server environments is a good network design. A good network design can only be achieved through a good communication design.

The preferred analysis and design tools 690 also include usability test tools 724. From a development perspective, systems that are designed and tested with usability in mind offer clear advantages. Usability testing is executed from the user perspective, and from the very beginning of the development process. Usability testing tools 724 can help developers: reduce risk by confirming that they are building the right solution; identify new system requirements; decrease development time and money by reducing rework; and achieve a smoother conversion, with less disruption to business.

Each system is designed to meet the unique requirements of its users, and, therefore, benefits from a different mix of testing techniques. In many cases, designers find that the best starting point is to build and test low-fidelity prototypes. These are paper-and-pencil versions of user interfaces that allow developers to demonstrate the behavior of systems very early in development. Before any code has been written, developers build prototypes on paper and test them with real users, simulating the human-computer interaction. Designs are adjusted and retested several times until a usable solution emerges. When it is time to begin coding, developers already have an excellent idea of how the system should work and what the users want.

Once the user interface has been coded, the high-fidelity prototype is ready for online usability testing. The test results are compared with previous tests and routed back to the developers. If lo-fi prototypes were used earlier, the major design issues have already been resolved. Refinements at the "hi-fi" stage should focus on perfecting the details.

In the later stages of development, usability laboratories can be extremely helpful for evaluating system design. Usability labs, which can be stationary or portable, rely on videotape and screen capture methods to record how users interact with prototype systems. Within a few hours of testing, lab administrators can create a highlights videotape of problems that users encountered. These tapes can be used immediately by developers and project managers to modify the hi-fi prototype as required. The average usability test results in 70 to 100 specific recommendations for improvement. Remote testing, or teletesting, is an online variation of the usability lab. This still-emerging method relies on computer networks to conduct system evaluations. Remote testing enables developers to test a large number of users efficiently and without incurring travel expenses.

Figure 33:
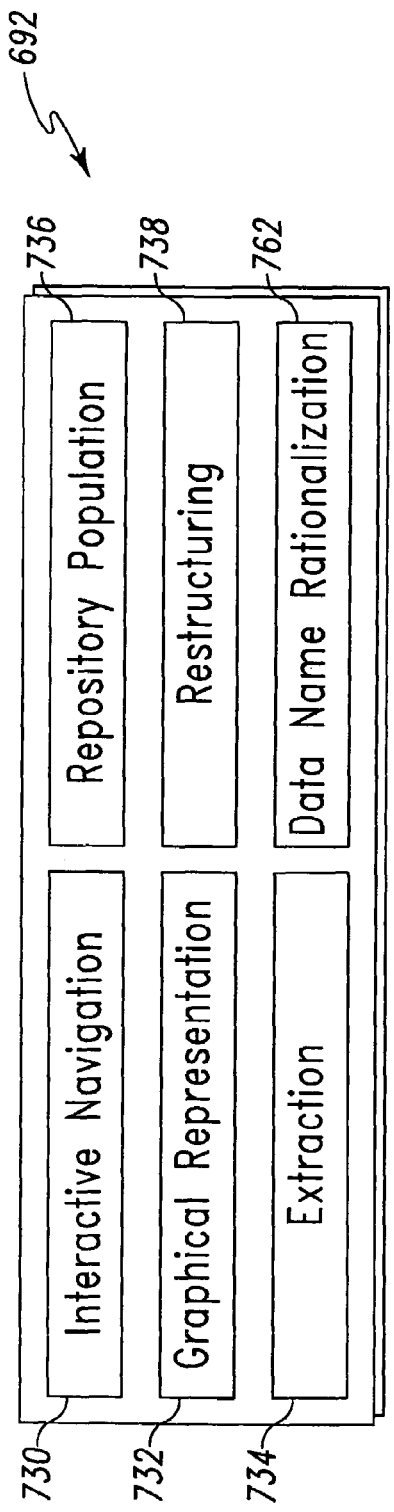
FIG. 33 illustrates the preferred reverse engineering tools of the system building tools.

Referring to FIG. 31, the preferred system building tools 600 include reverse engineering tools 692. Reverse engineering tools 692 are used to capture specific, relevant functional and design information from a legacy system for use in a new, client/server system or to restructure the existing system for improved performance and maintenance. Referring to FIG. 33, the preferred reverse engineering tools 692 include interactive navigation tools 730, graphical representation tools 732, extraction tools 734, repository population tools 736, restructuring tools 738 and data name rationalization tools 740.

Developers use interactive navigation tools to identify requirements for a new system from the functionality and design of a legacy system. These tools enable the developer to interactively and graphically navigate the legacy system, determining the system's characteristics such as system structure, module flow, flow control, calling patterns, complexity, and data and variable usage. An alternate form of presentation is through reports. These provide cross-reference listings or graphical representations of control or data flows.

The preferred reverse engineering tools 692 also include graphical representation tools 732. Graphical representation tools are used to display important system information in a form, which is easier to assimilate. These tools may, for example, produce structure charts, database schema diagrams and data layouts. They can also print matrices that indicate relationships between modules and files or between jobs and programs.

The preferred reverse engineering tools 692 also include extraction tools 734. An extraction tool 734, in conjunction with a repository population tool 736, enables the developer to reuse selected portions of a legacy system. The extraction tool 734 can read and extract information from source code, screens, reports and the database. The most common information extracted from a legacy system, however, is the data: record/table structure, indexes and data element definitions.

In component-based architectures, as systems are often built on top of legacy databases, some extraction tools 734 provide generation of an object model from the legacy database data model (DDL). By understanding the E-R diagram represented by the database, it is easier to create an efficient persistence framework, which isolates business components from a direct access to relational databases. Caution is required, however, as the resulting model is at best only partial, as an object model has dynamic aspects to it as well as static relationships, and may not correctly reflect the analysis performed in the problem domain.

The repository population tool 736 is used to load the information from the extraction tool into the development repository. These tools 736 convert the information from the legacy system into the syntax of the development tools repository. The extent of the information loaded into the repository is a function of the information model of the development tool repository. Information that is not represented in the development tool repository cannot be loaded into the repository.

Restructuring tools 738 are not analysis tools like the previous categories of reverse engineering tools 692, but are design and construction tools. They enable the developer to rebuild a legacy system, rather than replace it. Examples of this type of process include restructuring spaghetti code with structured code, replacing GOTO's, streamlining the module calling structure, and identifying and eliminating dead code. Data name rationalization tools 740 extract information on variable usage and naming, and show relationships between variables. Based on these relationships and user input, these tools 740 can then apply uniform naming standards throughout the system.

Referring to FIG. 31, the preferred system building tools 600 also includes packaged component integration tools 694. Packaged components are generally third-party components that provide ready-made business logic that is customizable and reusable. These can range from simple components offering limited functionality (for example, worksheet or charting GUI components) to components that handle a significant portion of the application architecture (for example, data access components and firewalls). The advantage of using such components is that they have already been coded, tested, optimized and documented.

The fact that these components come from third-party software houses does not always guarantee their quality. In order to minimize the dependency of the final system on these components (thus reducing the impact of possible changes within the libraries), it is recommended that wrappers are written to enclose any third-party components. This way, if any changes are made to the internals of the components, only the wrappers would be affected, allowing the application and architecture code to remain unchanged.

Packaged components usually do not provide the exact functionality that is required of the target system because they are created by third parties. They may have to be configured in order to behave in the desired fashion. The majority of packaged components allows one of two methods of customization—either by using standard construction tools (such as an editor and a C compiler), or by using proprietary toolkits provided by the vendor.

Figure 34:
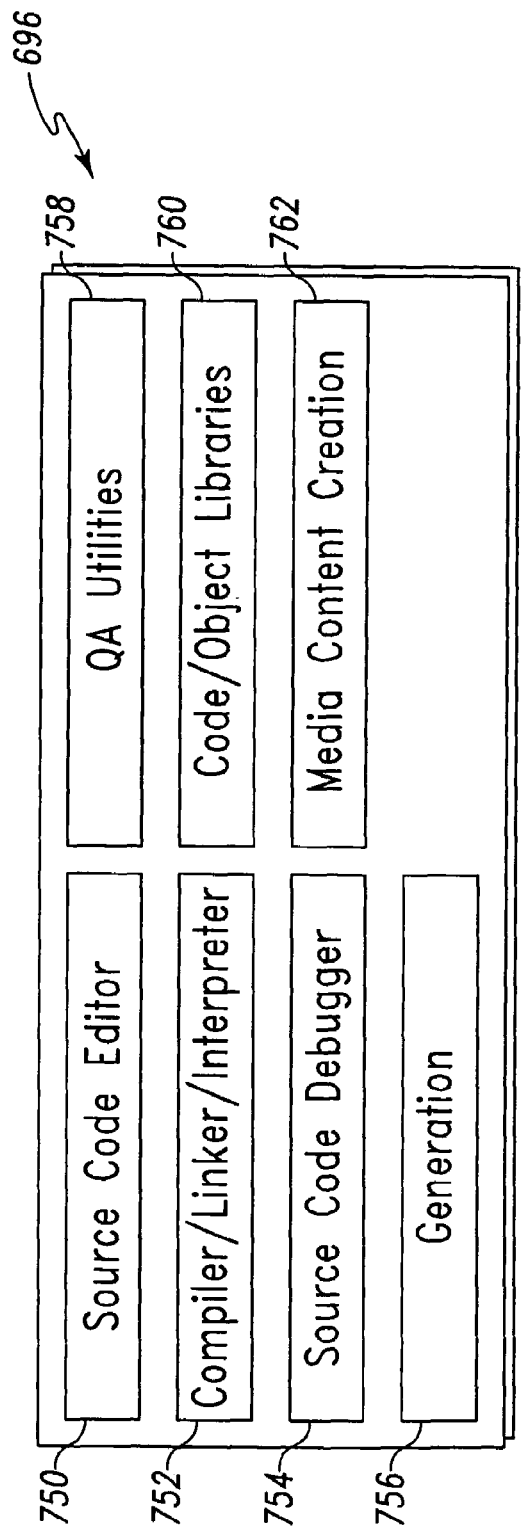
FIG. 34 illustrates the preferred construction tools of the system building tools.

Referring to FIG. 31, the preferred system building tools 600 include construction tools 696. Construction tools 696 are used to program or build the application: client and server source code, windows, reports and database. Along with the onset of visual programming, the more traditional form of construction tools have been superceded by Integrated Development Environments (IDEs) which take all the basic components required for construction, and integrate them into a single system. Referring to FIG. 34, the preferred construction tools 696 include a source code editor 750, a compiler/linker/interpreter 752, a generation tool 754, a debugging tool 756, a QA utility 758, a code/object library tool 760 and a media content creation tool 762.

It is important to ensure that developers use tools that are standard to the development environment. Now that Internet access is a standard facility for developers, there may be the tendency for people to download their own preferred tools or upgrades to standard tools. This not only affects the management of the development environment, but could easily result in the generation of code that is incompatible with the rest of the code in the development system (for example, consider the effect of developers on the same team using tools which employ different version of the JDK).

A source code editor 750 is used to enter and edit source code for the application. Complexity varies from simple ASCII text editors to fully integrated editors such as those provided by Integrated Development Environments. Typically, however, they are linked with a debugger so that coding errors, which are identified during compilation, can be more easily corrected since the error and the source code generating the error can be viewed simultaneously.

Other features of source code editors 750 include: dynamic syntax checking, improving productivity by detecting errors as they are made, rather than at compile time; color coding, which automatically applies different colors to text depending on its type or context (e.g. comments, variables, reserved words etc.), thus making the code more readable; and automatic layout, which indents code depending on its logical level (e.g. loops, conditionals etc.). Overall, these features will help ensure that code developed by the team is following project standards as opposed to individual programming styles.

The compiler/linker/interpreter 752 is responsible for taking raw code (usually in ASCII format) and creating the necessary object, library, byte-code or executable files that become components of the final system. The actual tools required depend on the development language, but always consist of one or a combination of the following components: compiler; linker (preferably incremental—the linker can substitute a new version of a single module rather than having to re-link the entire program); and interpreter, which can speed up the test/correct cycle by eliminating the compile and link steps.

In the majority of development environments, the compiler, linker and/or interpreter 752 are included as an integral part of the system. In addition, the management of compilation and linking is automated using MAKE utilities, which understand the dependencies between modules in the system. This allows the system to trigger all necessary re-compilation and re-linking when a module in the system is changed, thus avoiding the time-consuming task of re-compiling and re-linking the entire system.

A source code debugger 754 is a tool used to unit test a program. This tool 754 provides information about the activity of programs and systems, enabling automatic analysis and diagramming, assisted code tracing, editing capabilities and automatic documentation. The source code debugger 754 allows the developer to enter program break points and step through a program, tracking the progress of execution and identifying errors interactively. It is typically used in conjunction with the source code editor so that coding errors identified can be more easily corrected, since the error and the source code generating the error can be viewed simultaneously. Symbolic source code enables easier identification of where errors occur. Preferably, the debugger should be flexible enough to work with any combination of compiled modules and source modules. In addition, the debugger should be able to handle calls to the database and to other modules.

The preferred construction tools 696 also include generation tools 756. Generation tools 756 include: shell generation; make file generation; window/page generation; Data Definition Language (DDL) generation; Data Manipulation Language (DML) generation; code generation; include file generation; help text/module description generation; and trace code generation. Shell generation is the process of generating a starting point for programming. Shell generation is typically repository-based but can also be based on interaction with the programmer, where the generation utility requests key information about the program, and generates a starting point as a result of this. Key information (whether obtained from the repository or through a dialog with the programmer) may include: data base tables accessed; methods and attributes defined (for objects); and interface information.

Based on this information, the generator selects the appropriate include files and creates skeleton code, which may be used as a template for the programmer. This template may also include audit history for the module and standard code such as error handling. Make file generation is integrated into the majority of IDEs. Window/page generation (which is an integral component of visual programming tools) allows the developer to rapidly design windows and pages using a point-and-click graphical interface. The relevant source code is subsequently generated from these designs. The generation of DDL and DML is often hidden from the developer by using data access functions or objects, provided by a large proportion of IDEs (e.g., MFC, JDK). Help text and module description generation (not usually provided by IDES) analyzes developer's raw code (including comments) and creates descriptions that may be used by developers to understand the contents of modules or objects. This is particularly useful for component-based development, where methods and attributes of objects may be automatically documented. Trace code generation allows the insertion of traces into raw code in order to aid debugging.

QA utilities 758 verify the quality of completed code, and that it conforms to project and international standards. These types of tools include code analysis, code error checking, code beautification, UNIX portability checking and pure Java checking. Code analysis provides the objective information and metrics needed to monitor and improve code quality and maintenance (e.g. static analyzer, documenter, auditor). Code error checking checks code for common errors (e.g., syntax errors, uninitialized and badly assigned variables, unused variables). Code beautification reformats code in order to make it easier to read and maintain. UNIX portability checking checks compliance with basic portability standards—particularly with programming standards that ensure portability across UNIX platforms (e.g., POSIX compliance and OS/2-to-Windows portability). Pure Java checking checks that Java code conforms to the 100 percent Pure Java standard.

Code and object libraries 760 provide the developer with ready-made components (such as GUI components or simple utilities), which may be integrated into architecture or application code. The advantage of using such components is that they have already been coded, tested, optimized and documented. Code and object libraries 760 may be differentiated from packaged components in two ways: they contain little or no business logic; and source code is usually provided (as opposed to the 'black box' component approach).

That these libraries come from third-party software houses does not always guarantee their quality. In order minimize the dependency of the final system on these components (thus reducing the impact of possible changes within the libraries), it is recommended that wrappers are written to enclose any third-party code. This way, if any changes are made to the libraries, only the wrappers would be impacted, allowing the application and architecture code to remain unchanged.

Referring to FIG. 34, the preferred construction tools 696 include media content creation tools 762. As systems become increasingly user-facing, we are obliged to design user interfaces that are not only functional, but also engaging and informative. This is especially true of Internet- and kiosk-based systems, where users have a notoriously short concentration span. This requirement for more attractive user interfaces has triggered the evolution of media-rich applications, the development of which requires new tools and processes, and brings with it a whole new set of issues. Media content can be broken down into three major media types, each with its own set of tools: 2D/3D images/ animation; video; and audio.

Tools to handle 2D/3D images/animation range from simple paint packages to highly complex, multi-layered animation graphics packages. The images created by these tools may be pixel-based (bitmaps) or vector-based, each with their own advantages. Pixel-based tools (traditional graphics and image processing tools) offer more image flexibility, especially in terms of color gradation and shading, but produce relatively large files. This format is, therefore, useful where the use of high-quality textured images or highly colored images is important, but where file storage and transmission is not an issue (where the media content is local to the client application, such as in a kiosk). Vector-based tools (where the image is defined by formulae rather than pixel position) offer much smaller file sizes, and dynamic image re-sizing, while producing excellent print quality, but cannot easily handle shading and color gradation. This format is more appropriate where file size is an issue (web pages).

The preferred media content creation tools are also capable of creating video and audio. The high cost and complexity of video production equipment, along with the skills required to manage the process of video production mean that it is usually outsourced to a third party. It is important, however, that the personnel charged with creating video content are an integral part of the application team. The tools required for creating audio content depend on the quality required, and whether or not the content is original. For 'sound bites' or pre-recorded audio, simple desktop audio editing applications are adequate. For high-quality original content, a professional recording studio is recommended. Again, if third parties are involved, it is important that they are fully integrated into the team. For both image and audio, it is possible to purchase re-usable content from agencies, usually delivered in the form of CD-ROMs.

Referring to FIG. 31, the preferred system building tools 600 also include testing tools 698. Testing applications (client/server or netcentric) remains a complex task because of the large number of integrated components involved (for example, multi-platform clients, multi-platform servers, multi-tiered applications, communications, distributed processing, and data), which, in turn, results in a large number and variety of testing tools 696.

For any large-scale testing effort, it is vital to have a repository that is capable of managing the data required by each of the test subcomponents. The repository should manage the following entities: test conditions; test cycles; system investigation requests (SIRs), triggered by a deviation of actual results from those expected; test data; and requirements. Within the repository, the following relationships between entities must also be managed: test cycle and the system component to which it refers; test condition and the test cycle to which it belongs; and requirement and the test condition that tests that requirement. These relationships make it possible to analyze efficiently the impacts of change and to document the state of system test. For example, the number of outstanding SIRs per cycle can easily be provided based on these relationships.

In some cases, the mentioned entities and relationships cannot be managed within the repository, and may have to be modeled outside the repository (for example, in a teamware database). In this case, the link between the repository and the external tools must be provided by a judiciously chosen set of procedures and custom integration tools. Component-based development may have an impact on the way in which testing should be performed.

Figure 35:
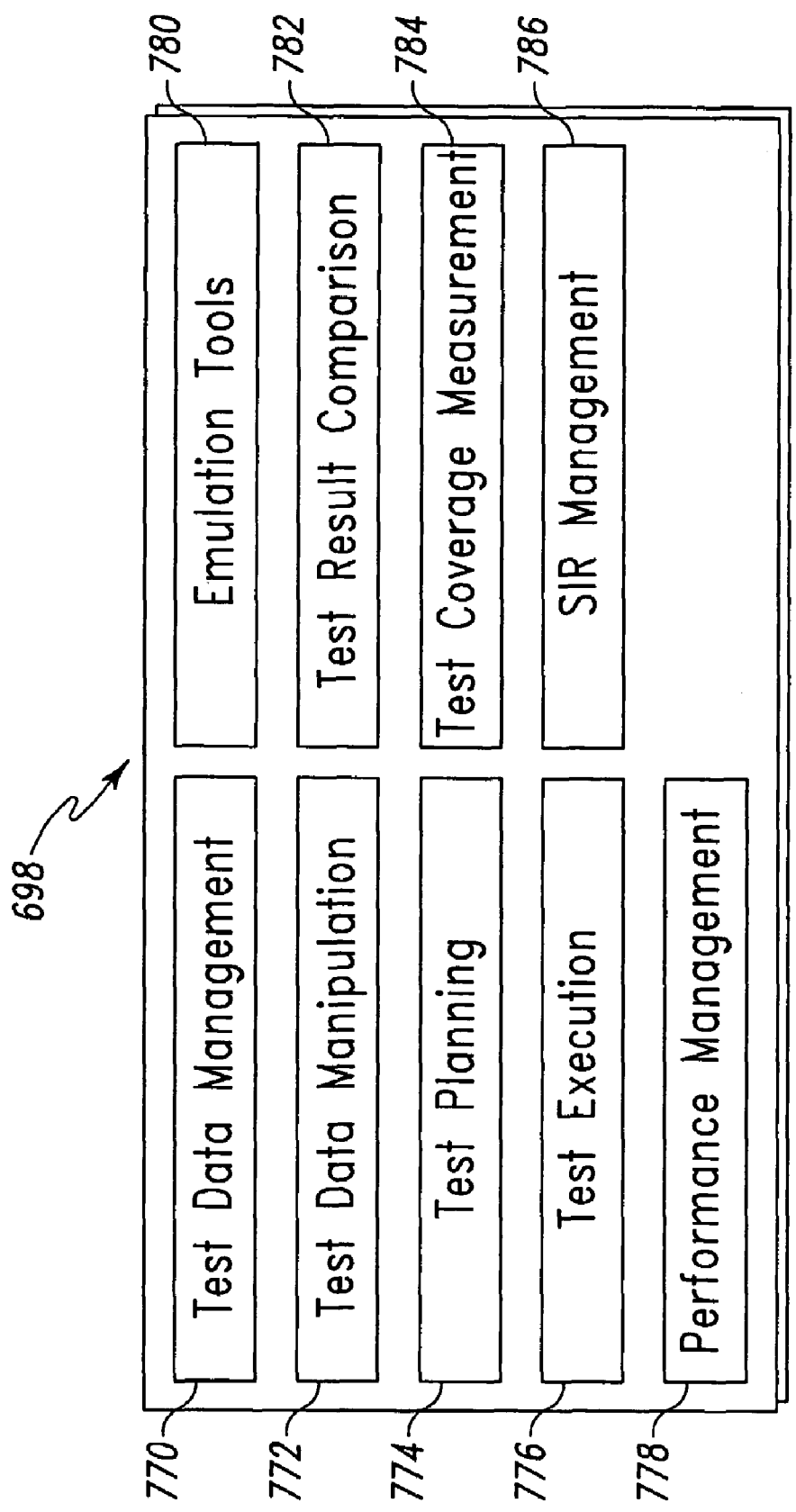
FIG. 35 illustrates the preferred testing tools of the system building tools.

Referring to FIG. 35, the preferred testing tools 698 include test data management tools 770, test data manipulation tools 772, test planning tools 774, test execution tools 776, performance management tools 778, emulation tools 780, test result comparison tools 782, test coverage management tools 784 and SIR management tools 786. Each of these tools is discussed in detail below.

Test data management tools 770 allow developers to create and maintain input data and expected results associated with a test plan. They include test data and archiving tools that assist in switching between cycles and repeating a cycle based on the original data created for that cycle. Test data management functionality may be provided by the following tools: test data generation tools usually generate test data by permutation of values of fields, either randomly or systematically; test design repository tools facilitate structured design and maintenance of test cases, which helps the developer find existing test cases, cycles and scripts that may be appropriate for reuse; and data management tools provide backup and restore facilities for data, and also provide configuration management for multiple versions of data, maintaining consistency among versions of test data.

Test data manipulation tools 772 are used to create original test data and, sometimes, to modify existing test data. Such modifications may be needed to process a change in the database schema and to correct intermediate results in order to complete a test cycle. Some test data manipulation tools generate test data very effectively.

The preferred testing tools 698 include test planning tools 794. A test plan consists of several components: test schedule; test execution tracking; test cycles; test scripts; test conditions; test condition generation; input data; and expected results. Test planning tools 774 define and maintain the relationship between components of a test plan.

Test execution tools 776 support and automate the conduct of system tests. Test execution support includes the tools required to: extract input data and expected results from the repository; load this data into the appropriate test execution tools 776; and automate the test. Such tools include dynamic analyzers and execution logs. The test execution platform may differ from the development platform if development is conducted in one environment (for example, Windows NT workstations) and deployed on a different environment (UNIX workstations).

A preferred test execution tool supports test scripting and playback. These tools program or record the running of a test plan in an online environment by capturing key stroke sequences, mouse clicks and other actions. They then record them in a script. Once the script is programmed or recorded, it can run repeatedly on the same application, effectively emulating the user. While defining the script takes some time, it saves tremendous effort when cycles must be re-run, particularly after relatively small changes (for example, the format of an output field is modified). When the application is modified, the script can be updated directly without re-entering long sequences of user input. This makes it easier to prepare for regression testing. Scripts may also be used for stress testing, where a single machine can run scripts simultaneously, emulating large numbers of users.

Performance management tools 778 support application performance testing. Owing to the large number of components in modern systems, performance modeling can be a complex task and requires tools to effectively manage the process. These tools monitor the real-time execution and performance of software. They help to maximize transactions and response time to the end user. They are also useful in identifying potential bottlenecks or processing anomalies.

In the case of Internet-based applications, as the Internet is not a controlled environment, performance management tools can only measure performance within the domain of the controlled environment (up to the Internet Service Provider). However, in the case of intranet-based systems, where the environment is controlled from end-to-end, performance management may be performed across the entire system.

Emulation tools 780 emulate components that are part of the target environment, but are not in the development environment. These emulation tools 780 include: target platform architecture components, including both custom infrastructure and system software products such as an X-window emulator on a PC to access a Unix platform; and stubs, which emulate subroutines in a minimal fashion. Harnesses and drivers, which call up a module and emulate the context in which the module will be called in the production environment.

Test result comparison tools 782 are utilities used to compare expected and actual results. These tools 782 outline the differences between actual and expected results by comparing files and databases. Most of these tools 782 offer functionality such as byte-by-byte comparison of files and the ability to mask certain fields such as date and time. Test coverage measurement tools 784 are used to analyze which parts of each module are used during the test and include coverage analyzing tools and test management and quality management tools. Coverage analyzing tools are active during program operation and provide comprehensive information about how many times each logic path within the program is run. The test management and quality management tool ensures that all components of an application are tested, and its use is a vital and often overlooked component of the test process. SIR management tools 786 help track each system investigation request from problem detection through documentation resolution.

Figure 4:
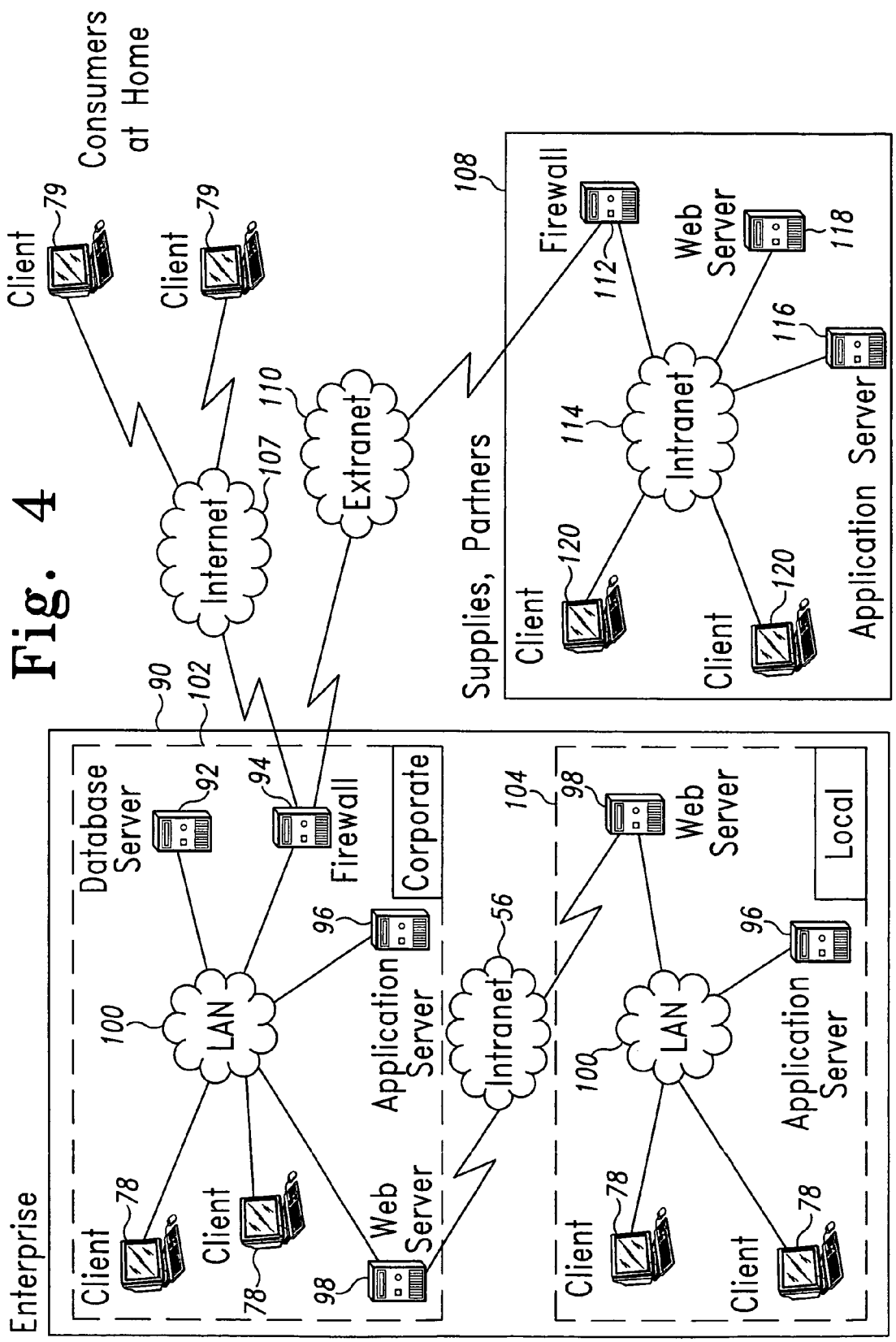
FIG. 4 depicts an illustrative preferred physical picture of a netcentric computing system.

Referring to FIG. 4, the physical picture of an illustrative example of a netcentric computing system 10 is illustrated. The physical layer of the netcentric computing system 10 architecture 34 preferentially includes a business enterprise 90 that may include at least one client 78, at least one database server 92, at least one firewall 94, at least one application server 96, at least one web server 98 and a LAN connection 100. As illustrated in FIG. 4, the LAN connection 100 is used to interconnect various components or computing devices that are located at a first business enterprise location 102 within the business enterprise 90. Those skilled in the art would recognize that various types of LAN connections 100 exist and may be used in the present invention.

For the purpose of the present invention, the firewall 94 is used to isolate internal systems from unwanted intruders. The firewall 94 isolates the web servers 98 from all Internet traffic that is not relevant to the system. In the preferred embodiment, the only requests allowed through the firewall 94 are for services on the web servers 98. All requests for other applications (e.g., FTP, Telnet) and other IP addresses are blocked by the firewall 94.

The web servers 98 are the primary interface to the clients 78, 79, 120 for all interactions with the applications of the netcentric computing system. The main task of the web servers 98 is to authenticate the clients 78, 79, 120, establish a secure from the clients 78, 79, 120 to the web servers 98 using encrypted messages, and allow the applications the clients 78, 79, 120 are using to transparently access the resources of the netcentric computing system 10. The web servers 98 are responsible for accepting incoming HTTP messages and fulfilling the requests. For dynamic HTML page generation, requests are forwarded to the application servers 96. Static pages, such as help pages, are preferably generated by the web servers 98.

In the preferred embodiment, the primary function of the application servers 96 is to provide a link through which the web servers 98 can interact with the host, trigger business transactions, and send back resulting data to the clients 78, 79, 120. A fundamental role of the application servers 96 is to manage the logical flow of the transactions and keep track of the state of the sessions. The application servers 96 are also responsible for managing all sessions.

Further, in the preferred embodiment of the present invention, the main purpose of the database servers 92 is to handle an application log. All requests sent to the web servers 98 and application servers 96 as well as responses are logged in the application log. The application log is used for traceability. In the preferred embodiment, requests are logged in the application log directly by the application server 96. Those skilled in the art would recognize that any number of data items can be monitored by the application log.

As further illustrated in FIG. 4, a second business enterprise location 104 may be connected with the first enterprise location 102 using a intranet connection 106. Those skilled in the art would recognize that various intranet connections 106 exist and may be used in the present invention. As those skilled in the art would recognize, the intranet connection 106 allow the computing resources of the second enterprise location 104 to be shared or connected with the computing resources available at the first enterprise location 102. Several other enterprise locations may be connected with the netcentric computing system 10.

In the preferred embodiment the firewall 94 of the corporate headquarters 102 is connected with a dedicated Internet connection 107 to a plurality of remote clients 78. Preferentially, the remote clients 79 that are connected to the Internet connection 106 access data at the business enterprise 90 through the Internet connection 107 using a browser application. The Internet connection 106 gives the remote clients 79 the ability to gain access to information and data content contained on the database server 92, the application server 96 and the web server 98.

The business enterprise 90 is connected with at least one supplier 108 through an extranet connection 110. As known in the art, the extranet connection 110 can be one of several different types of communication backbones, such as the Internet, DSL connections or virtual private networks. The supplier 108 may have a supplier firewall 112 that is used to secure the information and data stored at the supplier 108. A supplier intranet connection 114 may be connected with the supplier firewall 112 to allow users of the extranet connection 110 to gain access to information contained on the supplier application server 116 and/or the supplier web server 118.

A supplier client 120 may be connected with the intranet connection 114 at the supplier 108 to allow the supplier client 120 to gain access, modify, update or view information and/or data that is contained on the supplier application server 116 and/or the supplier web server 118. The supplier client 120 may also gain access to information and data content at the business enterprise 90 through the extranet connection 110. Preferentially the supplier clients 120 gain access to the business enterprise through the use of a browser application. Those skilled in the art would recognize that the supplier 108 may have various network connections that are not illustrated in FIG. 4. Although these internal connections are not illustrated, those skilled in the art would recognize that this should not be construed as a limitation of the present invention.

Figure 5:
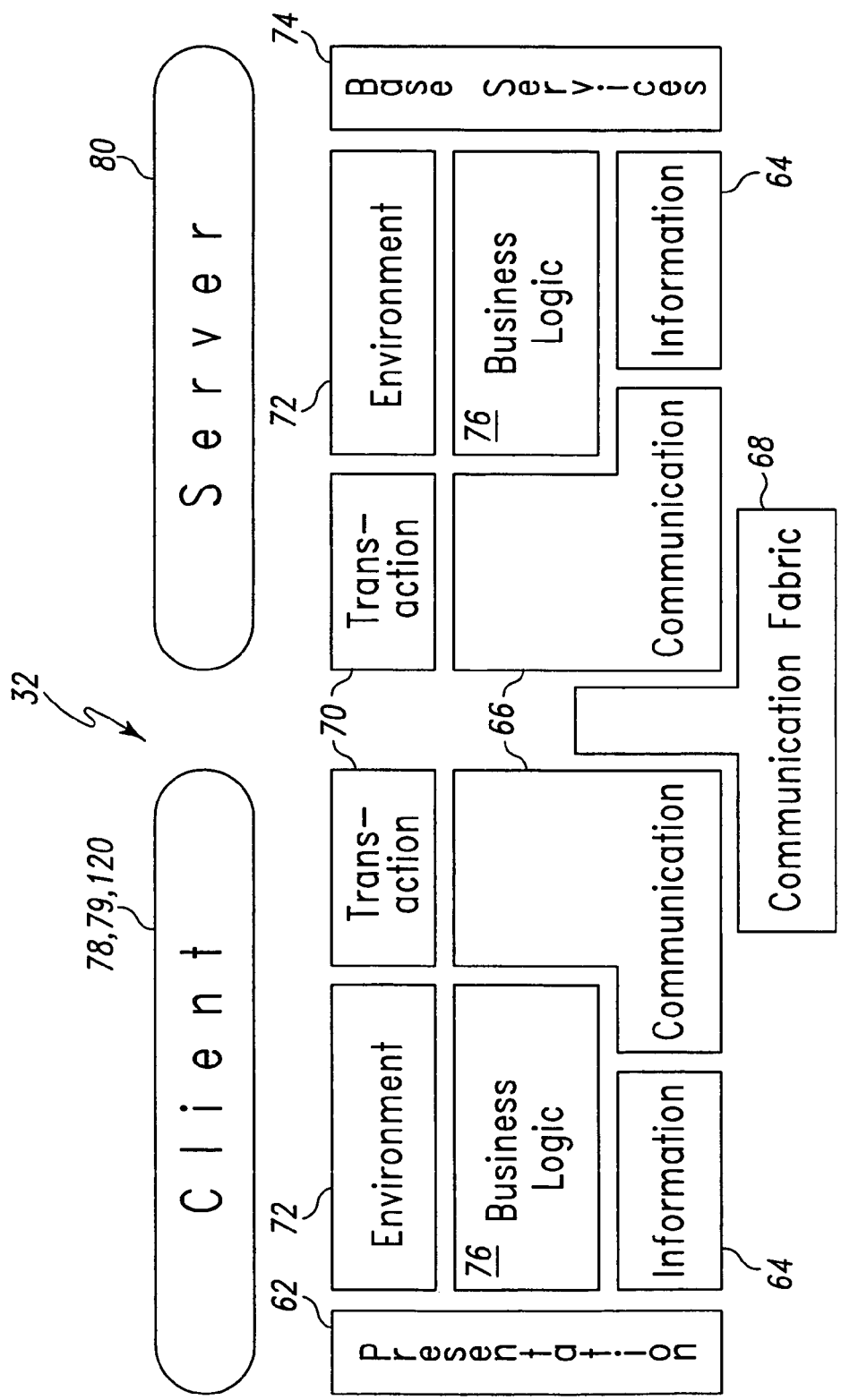
FIG. 5 illustrates a block diagram of the preferred netcentric execution architecture of the netcentric computing system.

Referring to FIG. 5, the netcentric execution architecture 32 for the netcentric computing system 10 is illustrated. The netcentric execution architecture 32 identifies and handles common run-time services required when an application executes in the netcentric computing system 10. The run-time services can be broken down into logical areas: presentation services 62, information services 64, communication services 66, communication fabric services 68, transaction services 70, environment services 72, base services 74, and business logic services 76.

As shown in FIG. 5, the netcentric execution architecture 32 is best represented as an extension to a client/server execution architecture. The figure shows the logical representation of a requestor and a provider designated by a client 78 and a server 80. Although FIG. 5 only shows one client 78 and one server 80, a physical implementation of the netcentric execution architecture 32 typically has many clients and many servers, as set forth above in the discussion of the physical make-up of the netcentric computing system 10. Thus, the services described below can be located on one physical machine, but most likely will span many physical machines, as illustrated in FIG. 4. As such, those skilled in the art would recognize that the server 80 may represent the database server 92, the application server 96 or the web server 98.

Figure 6:
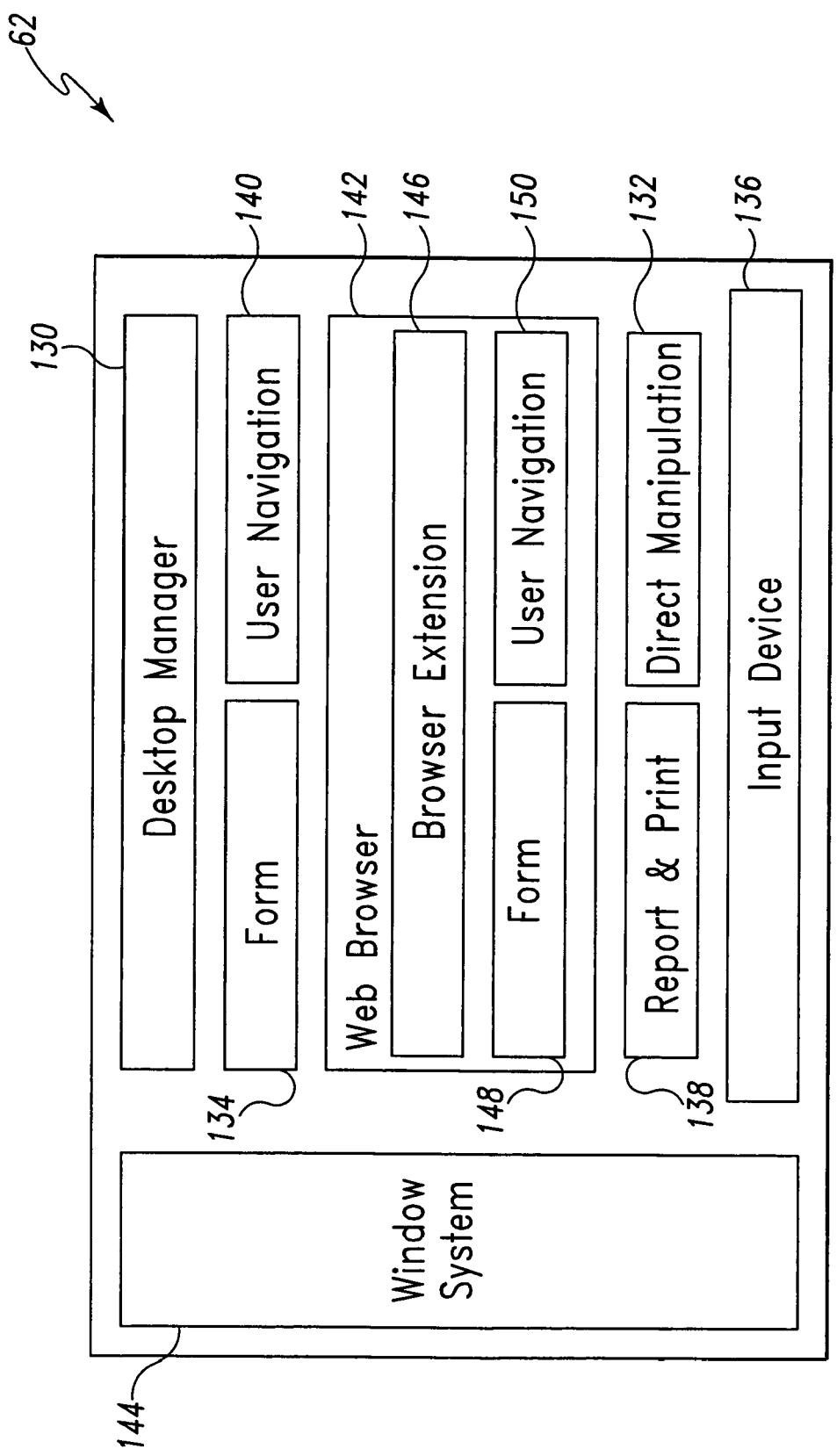
FIG. 6 illustrates the preferred presentation services of the netcentric execution architecture.

Referring to FIG. 6, the preferred presentation services 62 of the netcentric execution architecture 34 is illustrated. The presentation services 62 use presentation service applications to manage the human-computer interface in the netcentric computing system 10, including capturing user actions and generating resulting events, presenting data to the user, and assisting in the management of the dialog flow of processing. Typically, the presentation services 62 are required only by the client workstations 78, 79, 120. As set forth in more detail below, the preferred presentation services 62 may be selected from the group consisting of applications for desktop manager services 130, direct manipulation services 132, forms services 134, input device services 136, report and print services 138, user navigation services 140, web browser services 142 and window system services 144. Those skilled in the art would recognize that other services may be incorporated into the netcentric computing system 10.

The desktop manager services 130 provide for implementing the "desktop metaphor," which is commonly used to refer to a style of user interface that tries to emulate the idea of a physical desktop. It allows the user to place documents on the desktop, launch applications by clicking on a graphical icon, or discard files by dragging them onto a picture of a wastebasket. The desktop manager services 130 include facilities and devices for launching applications and desktop utilities and managing their integration.

The direct manipulation services 132 contain applications that provide a direct manipulation interface (often called "drag and drop"). A direct manipulation interface allows users to management multiple application objects by manipulating visual representations of those objects. For example, a user may sell stock by dragging stock icons out of a portfolio icon and onto a trading floor icon. Direct manipulation services 132 can be further divided into display validation and input validation. The display validation services enable applications to represent application objects as icons and control the display characteristics (color, location, etc.) of these icons. The input validation services enable applications to invoke validation or processing logic when an end user "acts on" an application object. "Acting on" an object may include single clicking, double clicking, dragging or sizing.

The forms services 134 includes applications that use fields to display and collect data. A field may be a traditional 3270-style field used to display or input textual data, or it may be a graphical field such as a check box, a list box, or an image. The forms service 134 provides support for display, input-validation, mapping support and field interaction management.

The form services 134 support the display of various data types (e.g., text, numeric, date, etc.) in various formats (e.g., American/European date, double-byte characters, icons, etc.). Input/validation enables applications to collect information from the user, edit it according to the display options, and perform basic validation such as range or format checks. Mapping support eliminates the need for applications to communicate directly with the windowing system; rather, applications retrieve or display data by automatically copying the contents of a window's fields to a copybook structure in memory. These services may also be used to automate the merging of application data with pre-defined electronic form templates. Field interaction management coordinates activity across fields in a window by managing field interdependencies and invoking application logic based on the state of fields and user actions. For example, the field interaction manager may disable the "OK" button on the client 78, 79, 102 screen until all required input fields contain valid data. These services significantly reduce the application logic complexity inherent to an interactive windowed interface.

The input devices 136 detect user input from a variety of input technologies, such as pen based, voice recognition and voice responsive systems, keyboards, touch-screens, mouses, digital cameras, and scanners. Those skilled in the art would recognize that various input devices 136 exist and may be used with the present invention. As such, those skilled in the art would recognize that the scope of the present invention should not be limited by the illustrative input devices 136 set forth briefly above.

Voice recognition systems are becoming more popular when used in conjunction with voice response systems. Users are able to speak into the phone in addition to using a keypad. Voice recognition can be extremely powerful technology in cases where a key pad entry would be limiting (e.g., date/time or location). Sophisticated voice recognition systems can support speaker-independence, continuous speech and large vocabularies.

Voice response systems are used to provide prompts and responses to users through the use of phones. Voice response systems have scripted call flows which guide a caller through a series of questions. Based on the users key pad response, the voice response system can execute simple calculations, make database calls, call a mainframe legacy application or call out to a custom C routine.

The report and print services 138 support the creation and on-screen previewing of paper or photographic documents, which contain screen data, application data, graphics or images. The report and print services 138 take into consideration varying print scenarios common in netcentric computing systems 10, including: varying graphics/file types (Adobe .PDF, GIF, JPEG), page margins and breaks, HTML constructs including tables and frames, headers/titles, extended character set support, for example.

The preferred report and print services 138 use report writers when there is a need to transform user data into columnar reports, forms, or mailing lists that may require sophisticated sorting and formatting facilities. This generally occurs for two reasons. The first is building "production reports" (i.e., reports that are built once and then used repeatedly, generally on a daily/weekly/monthly basis). The second is ad hoc reporting and decision support. Report writers give users easy and quick access to corporate data. Since developers can deliver reports as run-time applications, users are shielded from having to learn complicated databases in order to access information. All a user has to do to retrieve the data is click on an icon to launch a report. Because these run-time applications are smaller than normal applications, they launch faster and require very little training to operate. Those skilled in the art would recognize that various report and print services 138 may be used as part of the netcentric computing system 10.

The user navigation services 140 provide a user with a way to access or navigate between functions within or across applications. A common method for allowing a user to navigate within an application is to list available functions or information by means of a menu bar with associated pull-down menus or context-sensitive pop-up menus. A text-based menuing system that provides a list of applications or activities for the user to choose from may also be used. Those skilled in the art would recognize that various user navigation services 140 may be incorporated in the present invention.

The web browser services 142 provide applications that allow users to view and interact with applications and documents made up of varying data types, such as text, graphics and audio. As such, in the preferred embodiment the web browser services 142 provide support for navigation within and across documents and files no matter where they are located through the use of links embedded into the document content or the file structure. The web browser services 142 retain the link connection, i.e., document physical location, and mask the complexities of that connection from the user. The web browser services 142 can be further subdivided into browser extension services 146, web browser form services 148 and web browser user navigation services 150. The web browser services 142 allow browser applications on the clients 78, 79, 120 to interact with the netcentric computing system 10.

The browser extension services 146 provide support for executing different types of applications from within the web browser services 142. These applications provide functionality that extend browser capabilities. The key web browser extensions are plug-ins, helper-application viewers, Java applets, Active/X controls and Java beans. Each of these web browser extensions is discussed in detail below.

A plug-in is a software program that is specifically written to be executed within a browser for the purpose of providing additional functionality that is not natively supported by the browser, such as viewing and playing unique data or media types. Typically, to use a plug-in, a user is required to download and install the plug-in on the client 78, 79, 102. Once the plug-in is installed it is integrated into the web browser. The next time a browser opens a web page that requires that plug-in to view a specific data format, the browser initiates the execution of the plug-in. Also, plug-ins written for one type of browser will generally need to be modified to work with other browsers. Plug-ins are operating system dependent. Therefore, separate versions of a plug-in are required to support Windows, Macintosh, and Unix platforms.

A helper/application/viewer is a software program that is launched from a browser for the purpose of providing additional functionality to the browser. Unlike a plug-in, a helper application is not integrated with the web browser, although it is launched from a web browser. A helper application generally runs in its own window, contrary to a plug-in which is generally integrated into a web page. Like a plug-in, the user installs the helper application. However, because the helper application is not integrated with the browser, the user tends to do more work during installation specifying additional information needed by the browser to launch the helper application. In addition, the user tends to initiate the launching of the helper application, unlike a plug-in where the browser does the initiation. The preferred helper application can be executed from a variety of browsers without any updates to the program, unlike a plug-in which generally needs to be updated from specific browsers. However, helper applications are still operating system dependent.

A java applet is a program written in Java that runs within or is launched from the client's browser. This program is loaded into the client 78, 79, 102 memory at runtime and then unloaded when the application shuts down. A java can be a simple as a cool animated object on an HTML page, or can be as complex as a complete windows application running within the browser.

ActiveX control is also a program that can be run within a browser, from an application independent of a browser, or on its own. ActiveX controls are developed using Microsoft standards that define how re-usable software components should be built. Although Microsoft is positioning ActiveX controls to be language and platform independent, today they are limited to the Intel platforms. Within the context of a browser, ActiveX controls add functionality to Web pages. These controls can be written to add new features like dynamic charges, animation or audio.

The web browser form services 148, like the forms services 134 outside of the web browser services 142, enable applications to use fields to display and collect data from within the browser. The difference between the two services is the technology used to develop the forms that are used by the web browser form services 148. The most common type of web browser form services 148 within the web browser is Hyper-Text Mark-up Language (HTML). The HTML standard includes tags for informing a compliant browser that the bracketed information is to be displayed as an editable field, a radio button, or other form-type control. Currently, HTML browsers support only the most rudimentary forms, basically providing the presentation and collection of data without validation or mapping support. When implementing Forms with HTML, additional services may be required such as client side scripting (e.g., VB Script, JavaScript). Those skilled in the art would recognize that as the web browser services 142 expand various other types of web browser forms services 148 will be readily incorporated into the present invention.

The web browser user navigation services 150, like the user navigation services 140 outside the web browser services 142, provide users with a way to access or navigate between functions within or across applications. The web browser user navigation services 150 can be subdivided into three categories: hyperlink, customized menu and virtual reality services. Those skilled in the art would recognize that various user navigation services 150 may be incorporated into the present architecture for the netcentric computing system 10.

The Internet has popularized the use of underlined key words, icons and pictures that act as links to further pages. The hyperlink mechanism is not constrained to a menu, but can be used anywhere within a page or document to provide the user with navigation options. It can take a user to another location within the same document or a different document altogether, or even a different server or company for that matter. There are three types of hyperlinks: hypertext is very similar to the concept of Context Sensitive Help in Windows, where the reader can move from one topic to another by selecting a highlighted word or phrase. Icon is similar to the hypertext menu above, but selections are represented as a series of icons. The HTML standard and popular browsers provide hyperlinking services for non-text items such as graphics. Image Map is also similar to the hypertext menu above, but selections are represented as a series of pictures. A further evolution of the image map menu is to display an image depicting some place or thing (e.g., a picture of a bank branch with tellers and loan officers).

Customized menu is a menu bar with associated pull-down menus or context-sensitive pop-up menus. However, as mentioned earlier, this method hides functions and options within menus and is difficult for infrequent users. Therefore, it is rarely used directly in HTML pages, Java applets or ActiveX controls. However, this capability might be more applicable for intranet environments where the browsers themselves need to be customized (e.g., adding custom pull-down menus within Internet Explorer) for the organization's specific business applications.

A virtual reality or a virtual environment interface takes the idea of an image map to the next level by creating a 3-dimensional (3-D) environment for the user to walk around in. Popularized by PC games like Doom, the virtual environment interface can be used for business applications. For example, applications can be designed for browsers that allow users to walk through a shopping mall and into and around virtual stores, or fly around a 3-D virtual resort complex you are considering for a holiday.

The windows system 144, which is typically part of the operating system used on the clients 78, 79, 120, provide the base functionality for creating and managing a graphical user interface on the workstations. As known in the art, a graphical user interface can detect user actions, manipulate windows on the display, and display information through windows and graphical controls. Those skilled in the art would recognize that various operating systems use windows based environments and may be used in the present invention.

For a more detailed discussion of the preferred presentation services 62 refer to U.S. patent application Ser. No. 09/677,135, entitled PRESENTATION SERVICE ARCHITECTURES FOR NETCENTRIC COMPUTING SYSTEMS, which is herein incorporated by reference in its entirety.

Figure 7:
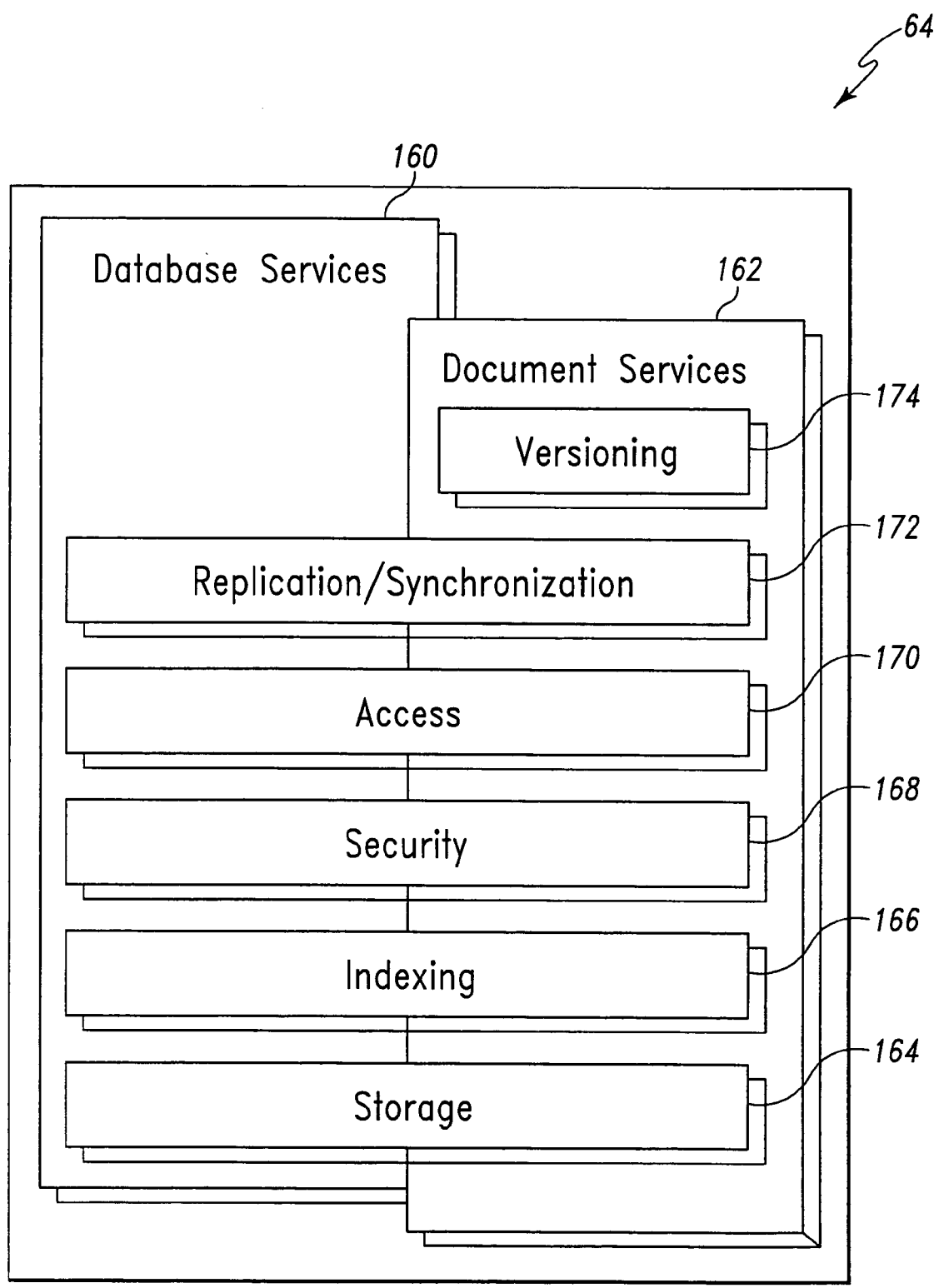
FIG. 7 illustrates the preferred information services of the netcentric execution architecture.

Referring to FIG. 7, the preferred information services 64 of the netcentric execution architecture 32 is illustrated. The information services 64 manage information and enable applications to access and manipulate data stored locally or remotely from documents, databases, or external data sources. The preferred information service 64 is one that minimizes a software applications dependency on physical storage and location within the netcentric computing system 10. Information services 64 can also be accessed and used by the end user when ad-hoc data and document access are integral to the software application work task.

In the preferred embodiment of the present invention, the preferred information services 64 includes database services 160 and document services 162. Database services 160 are responsible for providing access to a local or remote database as well as maintaining integrity of the data within the database. Data may also be stored on either a single physical platform or in some cases across multiple platforms. The database services 160 are typically provided by database management systems (DBMS) vendors and accessed via embedded or call-level SQL variants and supersets. Depending upon the underlying storage model, non-SQL access methods may be used instead.

As illustrated in FIG. 7, the preferred database services 160 include storage services 164, indexing services 166, security services 168, access services 170 and replication/synchronization services 172. Database storage services 164 manage and store the actual physical data. As known in the art, database storage services 164 provide a mechanism for saving information so that data will live beyond program execution. Data is often stored in relational format (an RDBMS) but may also be stored in an object-oriented format (OODBMS) or other structures such as IMS and VSAM.

The database indexing services 166 provide a mechanism for speeding up data retrieval from the database storage services 164. In relational databases one or more fields can be used to construct the index. Therefore, when a user searches for a specific record, rather than scanning the whole table sequentially, the index is used to find the location of that record faster. Those skilled in the art would recognize that various indexing applications may be used in the indexing services 166 of the netcentric computing system 10.

The preferred database security services 168 contain applications that enforce access control to ensure that records and data are only visible or editable by authorized people for approved purposes. As known in the art, most database management systems provide access control at the database, table, or row levels to specific users and groups as well as concurrency control. They also provide execution control for such things as stored procedures and database functions.

In a distributed environment, the need exists to provide access to the corporate data and resources in a secure and controlled manner. This access depends on the role of the user, the user group, etc. within that environment. Since security is an architecture component where functionality and robustness vary across engagements, the preferred architectures usually provide a base set of security functions. These functions target securing the systems corporate data and resources, as opposed to securing an applications detailed function.

The database services 168 prevents unauthorized users from accessing corporate data/resources by providing the users with access codes, password and identification, that allows the user to log-in to the system or execute any (or a particular) application. Database security services 168 can restrict access to functions within an application based on a user's security level. The highest level security is whether the user has access to run the application. The next level checks if the user has access to functions within the application, such as service calls or windows. At an even lower level, the security component could check security on more granular functions, such as widgets on a window. Security usually resides on both the client 78, 79, 120 and server 92, 96, 98 in a distributed environment. True security should always be placed on the server platform, to protect the system through access outside of a client application.

There are situations where it is required for the netcentric computing system 10 to maintain the relationship of the users role and the users access to specific system services/resources. For example, a database administrator will have read-write-delete access to the database, whereas a sales manager will have only read-access to it for viewing the data in various forms. The database security services 168 provide the functionality for validating the user's resource access privileges based on the role of the user.

The access services 170 enable an application to retrieve data from a database as well as manipulate (insert, update, or delete) data in a database. SQL is the primary approach for accessing records in today's database management systems. Client-server systems often require data access from multiple databases offered by different vendors. This is often due to integration of new systems with existing legacy systems. The key architectural concern is in building the application where the multi-vendor problem is transparent to the client 78, 79, 120. This provides future portability, flexibility and also makes it easier for application developers to write a single database access interface.

Achieving database access transparency requires a standards-based SQL API and a plurality of SQL gateways. The standards-based SQL API approach uses a single, standards-based set of APIs to access any database, and include the following technologies: Open Database Connectivity (ODBC), Java Database Connectivity (JDBC), and Object Linking and Embedding (OLE DB). The SQL gateways provide a mechanism for clients to transparently access data in a variety of databases (e.g., Oracle, Sybase, DB2), by translating SQL calls written using the format and protocols of the gateway server or primary server to the format and protocols of the target database. Currently there are three contending architectures for providing gateway functions.

Distributed Relational Data Access (DRDA) is a standard promoted by IBM for distributed data access between heterogeneous databases. In this case, the conversion of the format and protocols occurs only once. It supports SQL89 and a subset of SQL92 standard and is built on top on APPC/APPN and TCP/IP transport stacks. IBI's EDQ/SQL and the Sybase/MDI Open Server use SQL to access relational and non-relational database systems. They use API/SQL or T-SQL, respectively, as the standard interface language. A large number of communication protocols are supported including NetBIOS, SNA, DecNET, TCP/IP. The main engine translates the client requests into specific server calls. It handles security, authentication, statistics gathering and some system management tasks.

The preferred database replication/synchronization services 172 use applications to support an environment in which multiple copies of databases must be maintained. This is very important to enterprises that must maintain data in the event that one or more system goes down due to hardware or software failure. In addition, the database replication/synchronization services 172 use applications that perform the transactions required to make one or more information sources that are intended to mirror each other consistent. Those skilled in the art would recognize that the method in which the preferred database replication/synchronization services 172 performs its tasks will vary from enterprise to enterprise, depending on the particular needs of the enterprise.

Replication services support an environment in which multiple copies of databases must be maintained. For example, if ad hoc reporting queries or data warehousing applications can work with a replica of the transaction database, these resource intensive applications will not interfere with mission-critical transaction processing. Replication can be either complete or partial. During complete replication, all records are copies from one destination to another, while during partial replication, only a subset of data is copied, as specified by the user of the program. Replication can also be done either real-time or on-demand (i.e., initiated by a user, program or a scheduler). The following might be possible if databases are replicated on alternate server(s): better availability or recoverability of distributed applications; better performance and reduced network cost, particularly in environments where users are widely geographically dispersed; etc.

Synchronization services perform the transactions required to make one or more information sources that are intended to mirror each other consistent. This function is especially valuable when implementing applications for users of mobile devices because it allows a working copy of data or documents to be available locally without a constant network attachment. The emergence of applications that allow teams to collaborate and share knowledge (e.g., KX in Andersen) has heightened the need for synchronization services in the execution architecture.

Data can be dynamically changed to accommodate changes in how the data is used, using preferred database replication/synchronization services 172. The replicated database can consolidate data from heterogeneous data sources, thus shielding the user form the processes required to locate, access and query the data. Replication provides high availability. If the master database is down, users can still access the local copy of the database. Depending on the configuration (real time vs. nightly replication, etc.), there is a potential to reduce communications costs since the data access is local. With users, data, and queries spread across multiple computers, scalability is less of a problem. Access to replicated data is fast since data is stored locally and users do not have to remotely access the master database. This is especially true for image and document data which cannot be quickly accessed from a central site. Making automatic copies of a database reduces locking conflicts and gives multiple sets of users better performance than if they had shared the same database.

The preferred database replication/synchronization services support one or more of three ownership models: primary site ownership where data is owned by one site; dynamic site ownership where data is owned by one site, however site location can change; and shared site ownership, where data ownership is shared by multiple sites.

The preferred database replication/synchronization services 172 support four basic types of replication styles. The four preferred styles are data dissemination, where portions of centrally maintained data are replicated to the appropriate remote sites; data consolidation, where data is replicated from local sites to a central site where all local data is consolidated; replication of logical partitions, which is replication of partitioned data; and update anywhere, where multiple remote sites can possibly update the same data at the same time. In addition, the database replication/synchronization services 172 manage the latency period between replication of data. Latency periods deal with the amount of time the primary and target data can be out of synch. There are three basic styles depending on the amount of latency that is acceptable: synchronous, with real-time access for all for all sites (no latency); asynchronous near real-time, with a short period of latency for target sites; and asynchronous batch/periodic, with predetermined periods of latency for all sites.

The document services 162 provide similar structure and control for documents that database services 160 apply to record-oriented data. As known in the art, a document is defined as a collection of objects of potentially different types (e.g., structured data, unstructured text, images or multimedia) that a business user deals with. Regardless of the application used to create and maintain the component parts, all parts together constitute the document, which is managed as a single entity, usually in the form of a file. Netcentric applications that are executed from a browser are particularly well-suited for serving up document-style information. If the web application consists of more than just a few HTML documents, integration with a document management system should be considered.

The preferred document services include storage services 164, indexing services 166, security services 168, access services 170, replication/synchronization services 172 and versioning services 174. The document storage services 164 manage the physical storage of documents. Most documents are stored as objects that include two basic types of data types: attributes and contents. Document attributes are key fields used to identify the document, such as author name, date created, etc. Document content refers to the actual unstructured information stored within the document.

Generally, documents are stored in a repository using one of the following methods: proprietary database, industry standard database, or industry standard database and file system. In proprietary databases, documents (attributes and contents) are stored in a proprietary database (one that the vendor has specifically developed for use with their product). In industry standard databases, documents (attributes and contents) are stored in an industry standard database such as Oracle or Sybase. Attributes are stored within traditional database data types (e.g., integer, character, etc.); contents are stored in the database's BLOB (Binary Large Objects) data type. In industry standard database and file systems, documents' attributes are stored in an industry standard database, and documents' contents are usually stored in the file-system of the host operating system. Most document management products use this document storage method, because today this approach provides the most flexibility in terms of data distribution and also allows for greater scalability.

Document indexing services 166 are applications that allow users to locate documents stored in the database. As known in the art, locating documents and content within documents is a complex problem and involves several alternative methods. Most document management products provide index services that support searching document repositories by using attribute searching, full-text searching, context searching, or Boolean searching.

Attribute searches scan short lists (attributes) of important words that are associated with a document and returns documents that match the search criteria. For example, a user may query for documents written by a specific author or created on a particular date. Attribute search brings the capabilities of the SQL-oriented database approach to finding documents by storing in a database the values of specially identified fields within a document and a reference to the actual document itself. In order to support attribute search, an index maintains documents' attributes, which it uses to manage, find and catalog documents. This is the least complicated approach of the searching methods.

Full-text searches search repository contents for exact words or phrases and returns documents that match the search criteria. In order to facilitate full-text search, full-text indices are constructed by scanning documents once and recording in an index file which words occur in which documents. Leading document management systems have full-text services built-in, which can be integrated directly into applications. Context search searches repository contents for words or phrases. Context search also searches for related words or phrases by using synonyms and word taxonomies. For example, if the user searches for "auto," the search engine should look for "car, automobile, motor vehicle" etc. Boolean searches search repository contents for words or phrases that are joined together using Boolean operators (e.g. AND, OR, NOT). The same type of indices are used for Boolean search as for full-text search.

The preferred document security services 168 use applications that only allow documents to be accessed exclusively through the document management backbone. The document management backbone determines how documents are accessed and who may access the documents. Preferentially, if a document is checked in, checked out, routed, viewed, annotated, archived, or printed, it should be done only by authorized users. As known in the art, security services 170 can be designed to control access at the user, role, and group levels. Analogous to record locking to prevent two users from editing the same data, document management access control services include check-in/check-out services to limit concurrent editing. Those skilled in the art would recognize that the type of security services used in the present invention will vary depending upon the needs of the particular business enterprise.

The document access services 170 support document creation, maintenance and retrieval. These services allow users to capture knowledge or content through the creation of unstructured information, i.e. documents. The document access services 170 allow users to effectively retrieve documents that were created by them and documents that were created by others. Documents can be comprised of many different data types, including text, charges, graphics, or even audio and video.

The document replication/synchronization services 172 use applications to support an environment in which multiple copies of documents are maintained. A key objective is that documents should be shareable and searchable across the entire organization. Therefore, the replication/synchronization services 172 provide logically a single repository, even those the documents may be physically stored in different locations. The following is possible if documents are replicated on alternative server(s) 92, 96, 98: better availability or recoverability of a distributed application; better performance; reduced network cost; etc.

The document replication/synchronization services 172 also perform the transactions required to make one or more information sources that are intended to mirror each other consistent. They support the needs of intermittently connected users or sites. As with databases, the replication/synchronization services 172 are especially valuable for users of mobile devices that need to be able to work locally without a constant network connection and then be able to synchronize with the central server at a given point in time. As known in the art, there are many ways to provide document replication/synchronization services 172, depending upon the needs of the particular enterprise using the netcentric computing system 10.

In the preferred embodiment, the document versioning services 174 use applications to maintain a historical record of the changes to a document over time. By maintaining this record, document versioning services 174 allow for the recreation of a document as it looked at any given point in time during its evolution. Additional key features of the versioning services 174 are the ability to record who made changes, and when and why they were made. Depending on the document, versioning can be accomplished using one of several methods known and presently used in the art.

For a more detailed discussion of the preferred information services 64 refer to U.S. patent application Ser. No. 09/675,913, entitled INFORMATION SERVICE ARCHITECTURES FOR NETCENTRIC COMPUTING SYSTEMS, which is incorporated herein by reference, in its entirety.

Figure 8:
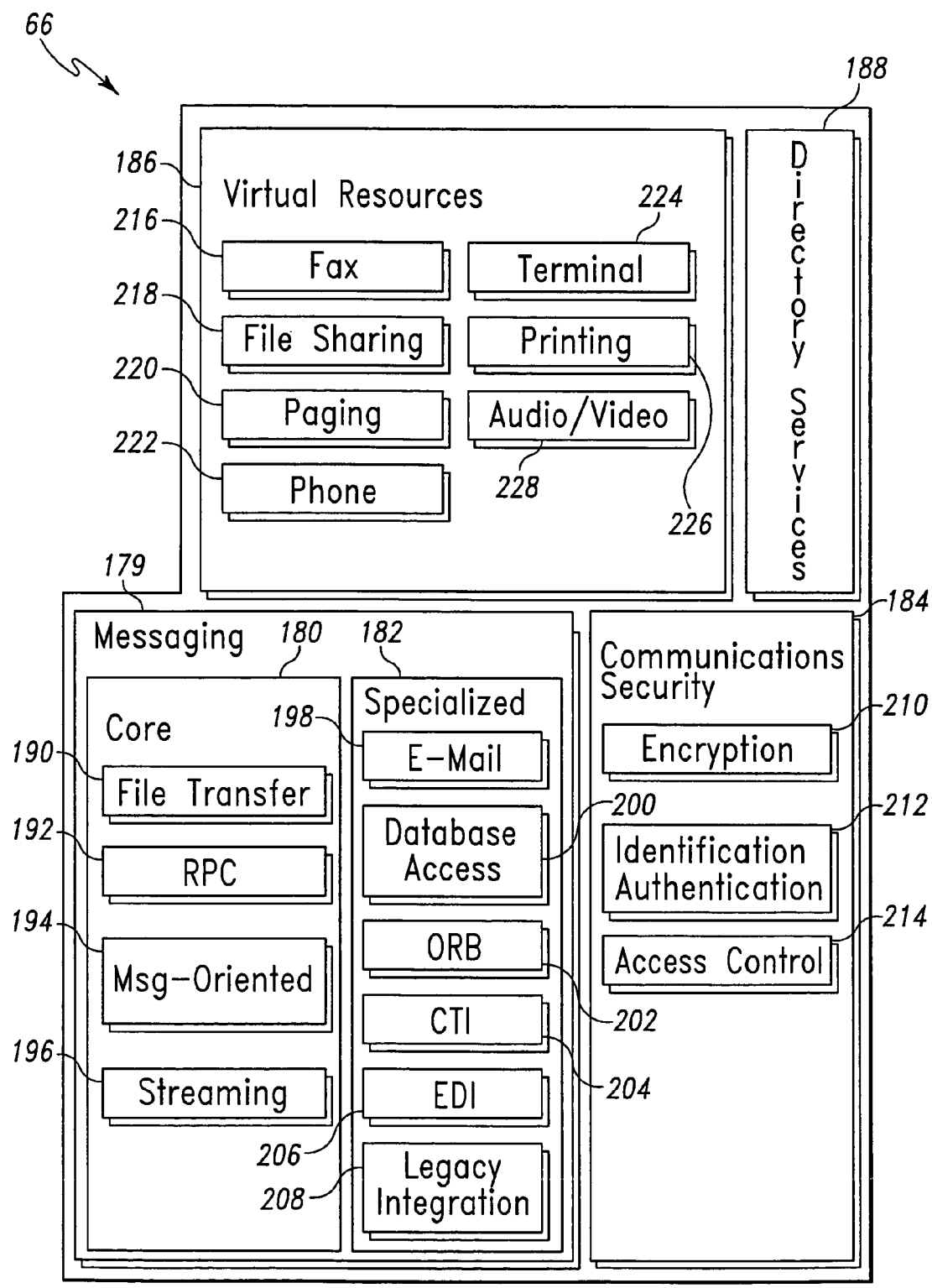
FIG. 8 illustrates the preferred communications services of the netcentric computing system.

As illustrated in FIG. 8, another service in the preferred netcentric execution architecture 32 is the communication services 66. The communication services 66 enable applications to interact transparently with other applications, regardless of whether they reside on the same workstation or on a remote workstation. The messaging services 179 transfer formatted information from one process to another. These services shield applications from the complexity of the network transport services. The communications security services 184 control access to network-attached resources. Combining the communications security services 184 with security services in other parts of the system architecture (e.g., application and database layers) results in robust security. The virtual resource services 186 proxy or mimic the capabilities of specialized, network connected resources. This allows a generic network node to emulate a specialized physical device. In this way, network users can interface with a variety of specialized resources. The directory services 188 play a key role in network architectures because of their ability to unify and manage distributed environments. Managing information about network resources involves a variety of processes ranging from simple name/address resolution to the logical integration of heterogeneous systems to create a common view of services, security, etc.

Communications middleware in the communication services 66 translate data into a format that is compatible with the receiving process. This may be required in a heterogeneous environment. An example is data translation from ASCII-to-EBCDIC. It is important to note that data translation may not be provided by all middleware products. Communications middleware can provide additional communications services 66 that may be required by the applications. Additional services might include dynamic message routing, guaranteed delivery, broadcasting, queuing, and priority delivery. These common services are usually provided in the communications middleware rather than addressing them in each application separately.

There is a functionality overlap between communications middleware and several other middleware components such as the transaction services 70 and the information access services 170. In addition, communications middleware may be provided by various CASE tools. An example of this is the distribution services component of FCP. Because of this overlap, it is important to understand the clients 78, 79, 120 overall direction toward middleware and the specific middleware functionality required by the overall solution.

Communication middleware allows the client application to access any service on any physical server 92, 96, 98 in the network without needing to know where it is physically located. This capability might be required in an environment with many physical servers 92, 96, 98 or in an environment that is very dynamic. The preferred communications middleware is designed to allow applications to access various transport protocols from various vendors. From a network interface perspective, it should be easier to port an application from one computing platform to another if the application is using communications middleware. Of course, other porting issues will need to be considered.

Referring to FIG. 8, there are four preferred communication services 66 provided in the preferred execution architecture 32, which include messaging services 179, communication security services 184, virtual resource services 186 and directory services 188. The messaging services 179 can be further broken down into core messaging services 180 and specialized messaging services 182, which are set forth in detail below.

For the purpose of the present invention, messaging is the process of sending information or commands between two or more recipients. Recipients may be workstations, people, or processes within a workstation. To send this message, a protocol (or in come cases, multiple protocols) is used that both the sender and receiver can understand. As known in the art, a protocol is a set of rules describing, in technical terms, how two end points should exchange information. Protocols exist at several levels during the exchange of information. Protocols facilitate transport of the message carrying the information. Both end points must recognize and observe the protocol. As an example, one of the most widely used protocols in today's networks is the TCP/IP protocol, which is used by the Internet.

Messaging services 179 transfer formatted information from one process to another. By drawing upon the messaging services 179, applications can shield themselves from the complexity of low-level transport services 230. The core messaging services 180 category includes styles of messaging that support basic Inter-Process Communication (IPC). There are a variety of architecture options used to support IPC. They can be divided into store and forward, synchronous and asynchronous message services.

Store and forward message services provide deferred message service processing. A store and forward message service may use an e-mail infrastructure upon which to build applications. Common uses would be for forms routing and e-mail. Synchronous messaging services allow an application to send a message to another application and wait for a reply before continuing. Synchronous messaging is typically used for update and general business transactions. It requires time-out processing to allow the application to re-acquire control in the event of failure. Asynchronous message services allow an application to send a message to another application and continue processing before a reply is received. Asynchronous messaging is typically used for larger retrieval type processing, such as retrieval of larger lists of data than can be contained in one message.

Additionally, inter-process messaging services 179 are typically one of two messaging types. Function based inter-process messaging services 179 use the subroutine model of programming. The message interface is built upon the calling program passing the appropriate parameters and receiving the returned information. The message-based approach uses a defined message format to exchange information between processes. While a portion of the message may be unstructured, a defined header component is normally included. A message-based approach is not limited to the call/return structure of the function-based model and can be used in a conversational manner.

The core messaging services 180 include file transfer services 190, Remote Procedure Call (RPC) services 192, message-oriented services 194 and streaming services 196. File transfer services 190 use applications to enable the copying and receiving of files or other large blocks of data between resources or devices of the netcentric computer system 10.

In addition to basic file transport, features for security, guaranteed delivery, sending and tracking sets of files, and error logging may be included if a more robust file transfer architecture is required. The preferred file transfer services 190 support file transfer protocol, hypertext transfer protocol, secure hypertext transfer protocol and file transfer and access management applications.

File Transfer Protocol (FTP) allows users to upload and download files across the network. FTP also provides a mechanism to obtain filename, directory name, attributes and file size information. Remote file access protocols, such as Network File System (NFS) also use a block transfer method, but are optimized for online read/write paging of a file.

Hypertext Transfer Protocol (HTTP) within a web-based environment, web servers transfers HTML pages to clients 78, 79, 120 using HTIP. HTTP can be though of as a lightweight file transfer protocol optimized for transferring small files. HTTP reduces the inefficiencies of the FTP protocol. HTTP runs on top of TCP/IP and was developed specifically for the transmission of hypertext between client 78, 79, 120 and server 92, 96, 98.

Secure Hypertext Transfer Protocol (S-HTTP) is a secure form of HTTP, mostly for financial transactions on the Web. S-HTTP has gained a small level of acceptance among merchants selling products on the Internet as a way to conduct financial transactions (using credit card numbers, passing sensitive information) without the risk of unauthorized people intercepting this information. S-HTTP incorporates various cryptographic message formats such as DSA and RSA standards into both the client 78, 79, 120 and the web server 98. File Transfer And Access Management (FTAM) is the Open Systems Interconnection (OSI) standard for file transfer, file access, and file management across platforms.

Remote procedure call (RPC) services 192 is a type of protocol by which an application sends a request to a remote system to execute a designated procedure using the supplied arguments and return the result to the application. Remote procedure calls are a type of protocol by which an application sends a request to a remote system to execute a designated procedure using the supplied arguments and return the result. Remote procedure calls emulate the function call mechanisms found in procedural languages (e.g., the C language). This means that control is passed from the main logic of a program to the called function, with control returning to the main program once the called function completes its task. Because remote procedure calls perform this mechanism across the network, they pass some element of control from one process to another, for example, from the client 78, 79, 120 to the server 92, 96, 98. Since the client 78, 79, 120 is dependent on the response from the server 92, 96, 98, it is normally blocked from performing any additional processing until a response is received. This type of synchronous data exchange is also referred to as blocking communications.

The message-oriented services 194 use message-oriented middleware to distribute data and control throughout the exchange of records known as messages. Message-oriented middleware provides the application developer with a set of simple verbs (e.g., connect, send, receive, and disconnect) that are used to exchange information with other distributed applications.

Message-oriented middleware is responsible for managing the interface to the underlying communication services 66 via the communications protocol APIs and ensuring the delivery of the information to the remote process. This interface provides the following capabilities: translating mnemonic or logical process names to operating system compatible format; opening a communications session and negotiating parameters for the session; translating data to the proper format; transferring data and control messages during the session; recovering any information if errors occur during transmission; and passing results information and status to the application. An application continues processing after executing a message-oriented middleware request, allowing the reply to arrive at a subsequent time. Thus, unlike remote procedure calls, message-oriented middleware implements a "non-blocking" or asynchronous messaging architecture. The preferred message-oriented middleware applications typically support communication among various computing platforms (e.g., DOS, Windows, OS/2, Macintosh, UNIX, and mainframes).

In the preferred message-oriented services 194, there are three types of message-oriented middleware commonly implemented, which include message passing, message queuing, and publish and subscribe. Message passing is a direct, application-to-application communication model. An application request is sent in the form of a message from one application to another. The communication method can be either synchronous like remote procedure calls, or asynchronous (through callback routines). As such, an application running on a respective client 78, 79, 120 will send a message to a respective server 92, 96, 98 during operation. In a message-passing model, a direct link between two applications that participate in the message exchange is always maintained.

Message queuing (also known as store and forward) is an indirect application-to-application communication model that allows applications to communicate via message queues, rather than by calling each other directly. Message queuing is asynchronous by nature and connectionless, meaning that the recipient need not be directly available when the message is sent. Moreover, it implies support for reliable, guaranteed and assured (non-duplicate) message delivery. Publish and subscribe (also known as push messaging) is a special type of data delivery mechanism that allows processes to register an interest in (i.e., subscribe to) certain messages or events. An application then sends (publishes) a message, which is then forwarded to all processes that subscribe to it.

The differences between the various classes are significant; hence, it is important to choose wisely. Message passing is most appropriate for enabling communications between concurrently executing systems requiring very fast response times and low latency. It is an especially good replacement for batch architectures that require real-time processing. Message passing is the only message-oriented middleware class that provides immediate confirmation that a message has been received. Message queuing is useful in a wide range of messaging contexts. It provides both high performance (although not quite as high as message passing) and reliability in the form of persistent messages and guaranteed delivery. It is also a good solution for concurrently executing applications if performance requirements allow for a slight time delay. Queuing is the only class of message-oriented middleware that allows for disconnected operation; that is, the ability for applications to communicate without requiring all processes to be active at the same time.

Publish/subscribe messaging, like message passing, is best used in concurrently executing systems. It provides very high performance message delivery. Publish/subscribe is particularly useful ion situations where there are a large number of receivers interested in the same information (a 1:n relationship between suppliers and consumers of information). The publisher is not aware if anyone is receiving the messages it sends. Publish/subscribe is the only class of message-oriented middleware that is inherently event driven. The decision on which message-oriented middleware class to use is ultimately driven by the nature of the data being transferred, the size of the data, the frequency of the data, the latency requirements of the data, and whether the communicating nodes are concurrently executing.

The streaming services 196 use applications to provide the process of transferring time-sensitive data streams (e.g., video and/or audio) in real time. In general, streaming differs from the other types of core messaging services 180 in that it delivers a continuous, one-way stream of data, rather than the relatively short messages of the other types of core messaging services 180. In the preferred embodiment, streaming services 196 are used to deliver video, audio, and/or other real-time content across the Internet or within the netcentric computing system 10.

Streaming is an emerging technology. While some multimedia applications used in the netcentric computing system 10 may use internally designed streaming mechanisms, other products incorporate standards. The following are examples of standards for streaming protocols that may be used in the present invention. Data streams are delivered using several protocols that are layered to assemble the necessary functionality.

Real-Time Streaming Protocol (RTSP) is a draft Internet protocol for establishing and controlling on-demand delivery of real-time data. For example, clients can use RTSP to request specific media from a media server, to issue commands such as play, record and pause, and to control media delivery speed. Since RTSP simply controls media delivery, it is layered on top of other protocols, such as the following.

Real-Time Transport Protocol (RTP) provides actual delivery of streaming data through real-time protocols. RTP provides end-to-end data delivery for applications transmitting real-time data over multicast or unicast network services. RTP conveys encoding, timing and sequencing information to allow receivers to properly reconstruct the media stream. RTP is independent of the underlying transport service, but it is typically used with UDP. It may also be used with Multicast UDP, TCP/IP, or IP Multicast. Real-Time Control Protocol (RTCP) allows nodes to identify stream participants and communicate about the quality of data delivery.

The specialized messaging services 182 extend the core messaging services 180 to provide additional functionality. Preferentially, the specialized messaging services 180 are designed to extend core messaging services 180 in the following general ways: providing messaging among specialized systems by drawing upon basic messaging capabilities; defining specialized message layouts; defining specialized intersystem protocols; suggesting ways in which messaging draws upon directory and security services to deliver a complete messaging environment. An example of specialized messaging services 182 is mail messaging. Mail messaging is a specialized implementation of store-and-forwarding message oriented middleware messaging, in that mail messaging defines specialized, mail-related message layouts and protocols that utilize store-and-forward messaging.

In the preferred embodiment of the present invention, the specialized messaging services 182 include the following sub-services: E-mail services 198, database access messaging services 200, object request broker messaging services 202, computer-telephone integration messaging services 204, electronic data interchange messaging services 206 and legacy integration messaging services 208.

The E-mail services 198 are used to exchange electronic messages between users. E-mail takes on a greater significance in organizations. The e-mail services 198 can function as a key channel through which work objects move within and between organizations in the form of messages and electronic forms. An E-mail server stores and forwards E-mail messages.

Although some products like Lotus Notes use proprietary protocols, the following protocols used by E-mail services are based on open standards and are preferentially supported by the netcentric execution architecture 32.

The X.400 message handling system standard defines a platform independent standard for store-and-forward message transfers among mail servers X.400 is often used as a backbone E-mail services, with gateways providing interconnection with end-user systems. Simple Main Transfer Protocol (SMTP) is a UNIX/Internet standard for transferring E-mail among servers. Multi-Purpose Internet Mail Extensions (MIME) is a protocol that enables Internet users to exchange multimedia E-mail messages. Post office protocol (POP) is used to distribute E-mail from an SMTP server to the actual recipient. Internet Message Access Protocol, Version 4, (IMAP4) allows a client to access and manipulate electronic mail messages on a server. IMAP4 permits manipulation of remote message folders, called "mailboxes", in a way that is functionally equivalent to local mailboxes. IMAP4 also provides the capability for an off-line client to re-synchronize with the server. IMAP4 includes standards for message handling features that allow users to download message header information and then decide which e-mail message contents to download.

The database access messaging services 200 use applications to provide connectivity for clients 78, 79, 120 to access databases throughout the enterprise. Database messaging applications draw upon basic inter-process messaging capabilities (e.g., remote procedure calls) in order to support database connectivity. Database access messaging services 200 typically provide single application seemless access to multiple data sources, both relational and non-relational. Additionally, database access messaging services 200 can be used to facilitate migration of data from one environment to another (i.e., MVS/DB2->Sybase). There are three types of preferred database access middleware: ODBC-like, proprietary, and gateway.

Storage of data in a database allows for more optimal future growth since databases scale better than mechanisms such as flat files. Databases are used by the netcentric execution architecture 32 to protect data integrity from multiple user access, and hardware and software failures. Databases are also used to store large amounts of information and to access an individual record(s) without having to inspect all the records of a given topic. Databases are also used when there is a need to store and impose standards on data elements. This is important when developing enterprise wide solutions, since it is desirable to have the different applications access the same structured information. Databases allow for the potential of such architectural features as a data replication strategy and/or distributed data access. Because of their normalized design, relational databases are used to reduce data redundancy. This reduces maintenance and storage requirements.

The object request broker messaging services 202 enable objects to transparently make requests of and receive responses from other objects located locally or remotely. Objects communicate through an object request broker ("ORB"). An ORB enables client objects to access server objects either locally or remotely over a network and invoke operations (i.e., functions and methods) on the objects.

ORBs typically provide interoperability between heterogeneous client and server environments: across languages and/or operating systems and/or network protocols. In that respect, some have said that ORBs will become a kind of "ultimate middleware" for truly distributed processing. A standardized interface definition language (IDL) defines the interfaces that applications must use to access the ORB services. The two major object request broker standards/implementations are: object management group's common object request broker architecture (CORBA) and Microsoft's (distributed) component object model (COM/DCOM).

The computer-telephone integration messaging services 204 use applications to integrate computer systems and telephone systems, thereby coordinating data and telephony activities. The preferred computer-telephone integration messaging services 204 support communication among clients 78, 79, 120, computer telephone integration servers (not illustrated), PBXs/ACDs, hybrid platforms, networks and external telephony devices. In the preferred embodiment, the computer-telephone integration messaging services 204 provide two primary functions: device-specific communication and message mapping.

Device-specific communication manages direct communications between telephony devices and data devices. In addition, it allows applications to control PBXs, key telephone systems, ISDN, analog PSTN, cellular, Centrex, etc. and supports features such as address translation, call set-up, call answering, call dropping, and caller identification. Device-specific communication also provides interface to carrier networks for call delivery and call-related messaging. Message mapping translates device-specific communication to generic API and/or message sets.

Computer-Telephone Integration (CTI) products can be divided into CTI Platform-Specific Products and CTI Cross-Platform Vendors. CTI platform-specific products can only be implemented on the hardware of a specific vendor. CTI telephony-based API products include proprietary PBX/ACD-based messaging sets, which permit external devices to interface with the vendor's PBX/ACD call and station control logic. CTI server/workstation-based or host-based API products operate on a particular computer vendor's hardware platform and provide call control and messaging functionality. CTI cross-platform vendors are products that have been ported to multiple hardware platforms/operating systems. CTI enabling solutions focus solely on call control and call/application synchronization functions. CTI enterprise solutions provide all CTI business functions to varying degrees.

The electronic data interchange (EDI) messaging services 206 use applications to support system-to-system messaging among business partners by defining standard message layouts. Companies typically use EDI messaging services 206 to streamline commercial transactions within their supply chains. EDI standards (e.g., EDIFACT, ANSI X12) define record layouts for transactions such as "purchase orders." EDI messaging services 206 include the generation and translation of EDI messages according to the various public message layout standards. EDI messaging services 206 can be implemented via electronic mail or customized message-oriented architectures.

The legacy integration services 208 use applications to provide gateways to mainframe legacy systems so that outdated services of the mainframe legacy systems can be integrated into the preferred embodiment of the present invention if desired. To implement these systems a systems network architecture protocol is typically used. Systems Network Architecture (SNA) is a networking connection-oriented protocol architecture that was developed in the 1970s by IBM. Currently, SNA and TCP/IP are two of the most widely used networking protocol architectures. Design techniques for integration with existing systems can be grouped into the broad categories of front end access and back end access. Front-end access is similar to the terminal services 224, which is discussed in detail below. Back-end access tends to be used when existing data stores have information that is needed in the client/server environment, but accessing the information through existing screens or functions is not feasible. Legacy integration messaging services 208 typically include remote data access through gateways. A database gateways provides an interface between the client/server environment and the legacy system. The gateway provides an ability to access and manipulate the data in the legacy system.

In the preferred embodiment of the present invention, the communication security services 184 use applications to control access to network-attached resources of the netcentric computing system 10. Combining communication security services 184 with security services in other parts of the netcentric computing system 10 (e.g., application and database layers) results in robust security. The preferred communication security services 184 include encryption services 210, identification/authentication services 212 and access control services 214.

Encryption services 210 use applications that encrypt data prior to network transfer to prevent unauthorized interception. Encryption can occur within the communications services 66, the transport services 230, or the network media services 232. Within the communications services 66, encryption occurs at the top of the protocol stack and is typically performed within an application (e.g., an e-mail application, a web browser). This is an end-to-end approach that can leave the remainder of the protocol stack (i.e., the transport services 230 and the network medias services 232) unaffected.

Encryption has two main components: the encryption algorithm, which is the series of steps that is performed to transform the original data; and the key, which is used by the algorithm in some way to encrypt the message. Typically, the algorithm is widely known, while the key is kept secret. Secret key cryptography uses one key (the secret key) both to encrypt the message on one side and to decrypt the message on the other side. Public key cryptography uses two keys, the public key and the private key. The public key and private key are mathematically related so that a message encrypted with the recipient's public key may be decrypted with the recipient's private key. Therefore, the public key can be widely published, while the private key is kept secret. Each of the components and key cryptography methods may be used in the preferred embodiment of the present invention.

There are also varying methods of employing encryption types described above to encrypt data sent across the netcentric computing system 10. In data link layers, the data is encrypted before it is placed on the wire. Data link encryptors are generally hardware products. Application layers encrypt data by the application. Netscape's Secure Sockets Layer (SSL) is one example of application-layer encryption for WWW browsers. SSL uses RSA encryption to wrap security information around TCP/IP-based protocols. In a network layer, data is encrypted inside the network layer header, therefore relying on the network layer protocol.

The advantage of SSL over S/HTTP is that SSL is not restricted to HTTP, but can also be used for securing other TCP/IP-based services such as FTP, Telnet, etc. SSL can provide session level data encryption and authentication to enable secure data communications over public networks such as the Internet. The need for encryption services 210 is particularly strong where electronic commerce solutions involve exchanging sensitive or financial data that are to be deployed over public networks such as the Internet. Cryptography can be used to achieve secure communications, even when the transmission media (for example, the Internet) is untrustworthy. Encryption services 210 can also be used to encrypt data to be stored (e.g., sensitive product information on a sales persons' laptop) to decrease the chance of information theft.

The authorization services 212 use applications that determine if a particular user has the appropriate permissions and either allows or disallows the access when a user requests access to the netcentric computing system 10. When a user requests access to network resources, the preferred authorization services 212 determines if the user has the appropriate permissions and either allows or disallows the access. (This occurs after the user has been properly authenticated.)

The following are examples of ways to implement authorization services 212 in the preferred netcentric execution architecture 32. Authorization services are bundled with all network operating systems in order to control user access to network resources. Firewall services protect sensitive resources and information attached to an Internet network from unauthorized access by enforcing an access control policy. A variety of mechanisms exist for protecting private networks. World Wide Web filters can prevent users from accessing specified content or Internet addresses. Products can limit access based on keywords, network addresses, time-of-day, user categories, etc. An application-level proxy, or application-level gateway, is a robust type of firewall. (A firewall is a system that enforces an access control policy between a trusted internal network and an untrusted external network.) The application proxy acts at the application level, rather than the network level. The proxy acts as a go-between for the end-user by completing the user-requested tasks on its own and then transferring the information to the user. The proxy manages a database of allowed user actions, when it checks prior to performing the request.

Authorization can occur locally on a server 92, 96, 98 to limit access to specific system resources or files. Applications and databases can also authorize users for specific levels of access within their control. (This functionality is within the Environment Services grouping in the execution architecture.)

The authentication services 214 use applications to verify network access requests by validating that users are who they claim to be. For secure netcentric computing systems 10, one or more authentication mechanisms can be used to validate authorized users and to verify which functions and data they have access to. Within the corporate network, authentication services 214 are often included in directory services products like Novell's NDS. NDS requires the user to have an established account and supply a password before access is granted to resources through the directory.

Authentication for accessing resources across an Internet connection 107 of intranet connection 114 is not as simple and is a rapidly evolving area. When building e-commerce Web sites, there may be a need to restrict access to areas of information and functionality to known customers or trading partners. More granular authentication is required where sensitive individual customer account information must be protected from other customers. Authentication can occur through the use of various means in the preferred embodiment, including basic authentication, ID/password encryption, hardware tokens, virtual tokes, or biometric identification. Basic authentication services require that the client

78, 79, 120 supply a user name and password before servicing a request. Basic authentication does not encrypt the password in any way, and thus the password travels in the clear over the network where it could be detected with a network sniffer program or device. Basic authentication is not secure enough for banking applications or anywhere where there may be a financial incentive for someone to steal someone's account information. Basic authentication is, however, the easiest mechanism to set-up and administer and requires no special software at the Web client 78, 79, 120.

ID/password encryption services offer a somewhat higher level of security by requiring that the user name and password be encrypted during transit. The user name and password are transmitted as a scrambled message as part of each request because there is no persistent connection open between the client 78, 79, 120 and the server 92, 96, 98. Hardware tokens are small physical devices that may generate a one-time password or that may be inserted into a card reader for authentication purposes. Virtual tokes are typically a file on a floppy or hard drive used for authentication (e.g. Lotus Notes ID file). Biometric identification services use the analysis of biological characteristics to verify individual's identity (e.g., fingerprints, voice recognition, retinal scans). Related to authentication, non-repudiation is a means of tagging a message in order to prevent an entity from denying that it sent or received the message.

Referring to FIG. 8, the virtual resource services 186 use application to proxy or mimic the capabilities of specialized, network-connected resources. This allows a generic network node to emulate a specialized physical device. In this way, network users can interface with a variety of specialized resources. The preferred virtual resource services 186 include fax services 216, file sharing services 218, paging services 220, phone services 222, terminal services 224, printing services 226 and audio/video services 228.

The fax services 216 use applications that provide for the management of both inbound and outbound fax transmissions. The fax services 216 can provide centrally managed faxing capabilities, thus eliminating the need for fax modems on every client 78, 79, 120. A fax server (not illustrated) generally provides the fax services 216 to clients 78, 79, 120, such as receiving, queuing, and distributing incoming faxes and queuing and sending outgoing faxes. Clients 78, 79, 120 can view faxes and generate faxes to be sent as well. Applications may compose and transfer faxes as part of notifying users or delivering information. For example, an application may use the fax services 216 to add customer-specific information to a delivery receipt form and fax the form to a customer.

More sophisticated fax services 216 may be used that support fax-back applications. Fax-back applications, when coupled with Computer Telephone Integration (CTI) services 204, are popular for automating customer requests for product or services information to be faxed to them. Thus, the preferred fax services 216 also include fax-back applications.

The file sharing services 218 use application that allow users to view, manage, read, and write files that may be located on a variety of platforms in a variety of locations. File sharing services 218 enable a unified view of independent file systems. The preferred file sharing services 218 provide transport access, multi-user access, file access control, multi-platform access, integrated file directory, fault tolerance and scalability.

Transparent access provides clients 78, 79, 120 with access to remote files as if they were local. Multi-user access provides distribution and synchronization of files among multiple users, including file locking to manage access requests by multiple users. File access control provides use of security services (user authentication and authorization) to manage file system security. Multi-platform access provides clients 78, 79, 120 with access to files located on various platforms (e.g., UNIX, NT, etc.). Integrated file directory provides a logical directory structure that combines all accessible file directories, regardless of the physical directory structure. Fault tolerance provides use of primary and replica file servers to ensure high availability of the file system. Scalability provides the ability to integrate networks and distributed file systems of various sizes.

The paging services 220 use applications to provide the message formatting and display functionality that allows network nodes to interface with wireless paging systems. Wireless short messaging (i.e., paging) can be implemented through wireless systems such as paging networks, GSM voice/data networks, PCS voice/data networks, and dedicated wireless data networks. Paging services 220 provide the message formatting and display functionality that allows network nodes to interface with wireless paging systems. This service emulates the capabilities of one-way and two-way pagers. The preferred paging services 220 allow pages to be generated in various ways: e-mail messages to a specified mailbox; DTMF (touch tone) signaling to a voice response system; encoded digital messages transferred into a paging provider gateway; and messages transferred to a locally attached two-way wireless pager.

The phone services 222 use applications that extend telephony capabilities to the netcentric computing system 10. For example, an application on a client 78, 79, 120 can place and receive telephone calls for the user. Phone services 222 may be used in customer care centers, help desks, or any other environment in which it is useful for a computer to replace a telephone handset.

Phone services 222 enable clients 78, 79, 120, servers 92, 96, 98, and specialized telephony nodes (PBXs, ACDs, etc.) to control the telephony environment through the following telephony controls: call control and telephone status control. Call control is used to control telephone features and recorded messages. In addition, call control is capable of manipulating real time call activities (e.g., make call, answer, transfer, hold, conference, mute transfer, release, route call, call treatments and digits collected). Telephone status control is used to control telephone status functions, log users in and out of the system, and sets ready, not ready, and make busy statuses for users.

The phone services 222 may be PC telephony, Internet telephony or desktop voice mail applications. PC telephony applications allow clients 78, 79, 120 to act as conduits for voice telephone calls. Internet telephony applications enable voice telephone calls (and faxing, voice mail retrieval, etc.) through the Internet. For example, an Internet telephony application can accept voice input into a client 78, 79, 120, translate it into an IP data stream, and route it through the Internet to a destination client 78, 79, 120, where the data is translated back into audio. Desktop voice mail applications enable users to manage voice mail messages using respective client 78, 79, 120.

The terminal services 224 use applications to allow a client 78, 79, 120 to connect to a non-local host via a network and to emulate the profile (e.g., the keyboard and screen characteristics) required by the host application. For example, when a client 78, 79, 120 application logs on to a server 92, 96, 98, the client 78, 79, 120 functions as a dumb terminal. Terminal services 224 receive user input and send data streams back to the host processor. If connecting from a client 78, 79, 120 to another client 78, 79, 120, the client 78, 79, 120 might act as a remote control terminal.

The terminal services 224 may be Telnet, 3270 Emulation, X Window System, remote control or rlogin. Telnet is a widely used terminal emulation protocol that is part of the TCP/IP communications protocol. Telnet operates establishing a TCP connection with the remotely located login server, minicomputer or mainframe. The client's 78, 79, 120 keyboard strokes are sent to the remote machine while the remote machine sends back the characters displayed on the local terminal screen. 3280 emulation is an emulation of the 3270 protocol that is used by IBM mainframe terminals. X Window System allows users to simultaneously access applications on one or more UNIX servers and display results in multiple windows on a local display. Recent enhancements to X Window System include integration with the web and optimization of network traffic (caching, compression, etc.). While terminal emulation is typically used in host-based environments, remote control is a sophisticated type of client/server. Terminal services 224 remote control allows a client 78, 79, 120 to control the processing on a remote client 78, 79, 120. The GUI on the client 78, 79, 120 looks as if it is the GUI on the remote desktop. This makes it appear as if the remote applications are running on the client 78, 79, 120. rlogin is a remote terminal services 224 implemented under BSD UNIX. The concept behind rlogin is that it supports "trusted" hosts. This is accomplished by having a set of machines that share common file access rights and logins. The user controls access by authorizing remote login based on a remote hose and remote user name.

The printing services 226 use applications to connect network workstations to shared printers so that various workstations can share printers. Print services 226 connect network clients 78, 79, 120 to shared printers (not illustrated). The administration of print services 226 is preferentially handled by a print server (not illustrated). Depending on the size of the network and the amount of resources the print server must manage, the print server may run on a dedicated machine or on a machine that performs other server functions. A primary function of print servers is to queue print jobs sent to network printers. The queued jobs are stored in a print buffer on the print server and are sent to the appropriate network printer as it becomes available. Print services can also provide the client 78, 79, 120 with information including print job status and can manage in-progress print jobs.

The audio/video services 228 use applications that allow nodes (i.e., clients 78, 79, 120) to interact with multimedia data streams. These services may be implemented as audio only, video only, or combined audio/video. Audio services allow components to interface with audio streams such as delivery of music or radio content over data networks. Video services allow components to interface with video streams such as video surveillance. Video services can add simple video monitor capabilities to a client 78, 79, 120, or they can transform the computer into a sophisticated video platform with the ability to generate and manipulate video. Video and audio content is often delivered simultaneously. This may be accomplished by transferring separate audio and video streams or by transferring a single interleaved stream. Examples include video conferencing and television (traditional or interactive).

Audio/video services 228 preferentially include several functionalities in the preferred embodiment of the present invention. The preferred audio/video services 228 provide streams content (audio, video, or both) to end users; manages buffering of data stream to ensure uninterrupted viewing/listening; performs compression and decompression of data; manages communications protocols to ensure smooth delivery of content; and manages library of stored content and or manages generation of live content. Audio/video services 228 draw upon lower-level services such as streaming (see streaming messaging services 196) and IP Multicast in order to efficiently deliver content across the network.

The directory services 188 use applications that manage information about network resources that involves a variety of processes ranging from simple name/address resolution, to the logical integration of heterogeneous systems to create a common view of services, security, and information. The directory services 188 play a key role in locating and accessing resources in a network, including Internet, intranet and extranet architectures.

Directory services 188 organize, categorize, and name networked resources in order to provide a comprehensive picture of clients 78, 79, 120, servers 92, 96, 98, users, applications and other resources. The service typically includes a database of objects, representing all nodes and resources on a network. The database manages relationships between users and networks, network devices, network applications, and information on the network. The directory services 188 can organize network nodes to reflect the topology and organization of the enterprise and its policies. The directory services 188 make resource locations and platforms independent, since it allows users to locate resources via the directory and regardless of their physical location. The directory services 188 also map between logical resource names (e.g., "Marketing_Printer") and physical resource address (e.g., 10.27.15.56).

Directory service applications utilize security services to track rights for access to network resources and information. The directory service 188 is an efficient way to manage resource security, since the directory offers a logical representation of all resources in the enterprise. In addition, the directory service can act as a single point of entry into the network, meaning users can receive access to allowed resources by authenticating themselves a single time to the directory service 188.

The directory services 188 perform several functions in the preferred embodiment of the present invention. The directory services 188 store information about network resources and users and tracks relationships; organizes resource access information in order to aid resources in locating and accessing other resources throughout the network; provides location transparency, since resources are accessed through a directory rather than based on their physical location; converts between logical resource names and physical resource addresses; interacts with security services 184 such as authentication and authorization track identifies and permissions; provides single network logon to file and print resources; can provide single network logon for network applications that are integrated with the directory services 188; distributes directory information throughout the enterprise (for reliability and location-independent access); synchronizes multiple directory databases; and enables access to heterogeneous systems (integration of various network operating systems, platforms, etc.).

There are a variety of standards for directories. Vendor-specific directory products build upon (and extend) standards to provide a robust, full-featured enterprise directory. The following are examples of standards related to directory services. X.500 an ITU-T standard for a hierarchical directory containing user and resource information; includes Directory Access Protocol (DAP), which can be used to access directory information, and Lightweight Directory Access Protocol (LDAP), a de facto standard for accessing X.500-compatible directory information in an Internet/intranet environment.

Although not illustrated, the preferred directory services 188 can be further broken down into domain services and name services. A network domain is a set of network nodes under common control (i.e., common security and logins, unified addressing, coordinated management, etc.). Domain services manage these types of activities for the network nodes in a domain. Domain services may be limited in their ability to support heterogeneous systems and in the ability to scale to support the enterprise. The name services creates a logical "pronounceable" name in place of a binary machine number. These services could be used by other communications services such as file transfer services 190, message services 179, and terminal services 224. A name service can be implemented on its own, or as part of full-featured directory services.

Referring once again to FIG. 5, another service used in the preferred netcentric execution architecture 32 is communications fabric services 68. The communications fabric services 68 use applications to extend the traditional client/server computing model by placing intelligence into the physical network, thereby allowing the netcentric computing system 10 to function as a standalone system that provides intelligent shared network services to remote users 79, 120. As communication networks become increasingly complicated and interconnected, the services provided by the network itself have by necessity increased as well.

Clients 78, 79, 120 and servers 92, 96, 98 are rarely directly connected to one another, but separated by a network of routers, servers and firewalls, providing an ever-increasing number of network services such as address resolution, message routing, security screening and many more. The communications fabric services 68 provides common network services to the platform-specific network services residing on the clients 78, 79, 120 and servers 92, 96, 98. These common network services can be used to manage resources and translate capabilities within and across enterprises.

Short of interpreting the data being transmitted, the communications fabric services 68 is aware of the different message-oriented information streams in order to help the clients 78, 79, 120 and servers 92, 96, 98 communicate regardless of the different network functions implemented on each platform. The preferred communications fabric monitors and routes data flows and provides functionality (security, directories, etc.) to clients 78, 79, 120 and servers 92, 96, 98. The communications fabric services 68 provide the following benefits: manage itself, including addressing, routing, security, recovery, etc.

It is inefficient for individual clients 78, 79, 120 and servers 92, 96, 98 to perform such tasks; specialized network components reduce the network-related processing that occurs on clients 78, 79, 120 and servers 92, 96, 98; integrates heterogeneous clients 78, 79, 80, servers 92, 96, 98, and other resources by resolving incompatible protocols and standards; the capability to actively manage the flow of information rather than simply moving data. This allows the network to effectively deliver multimedia and other network-sensitive traffic; and adds value to enterprise resources by presenting a cohesive view of available resources and increasing the level of security associated with those resources.

Figure 9:
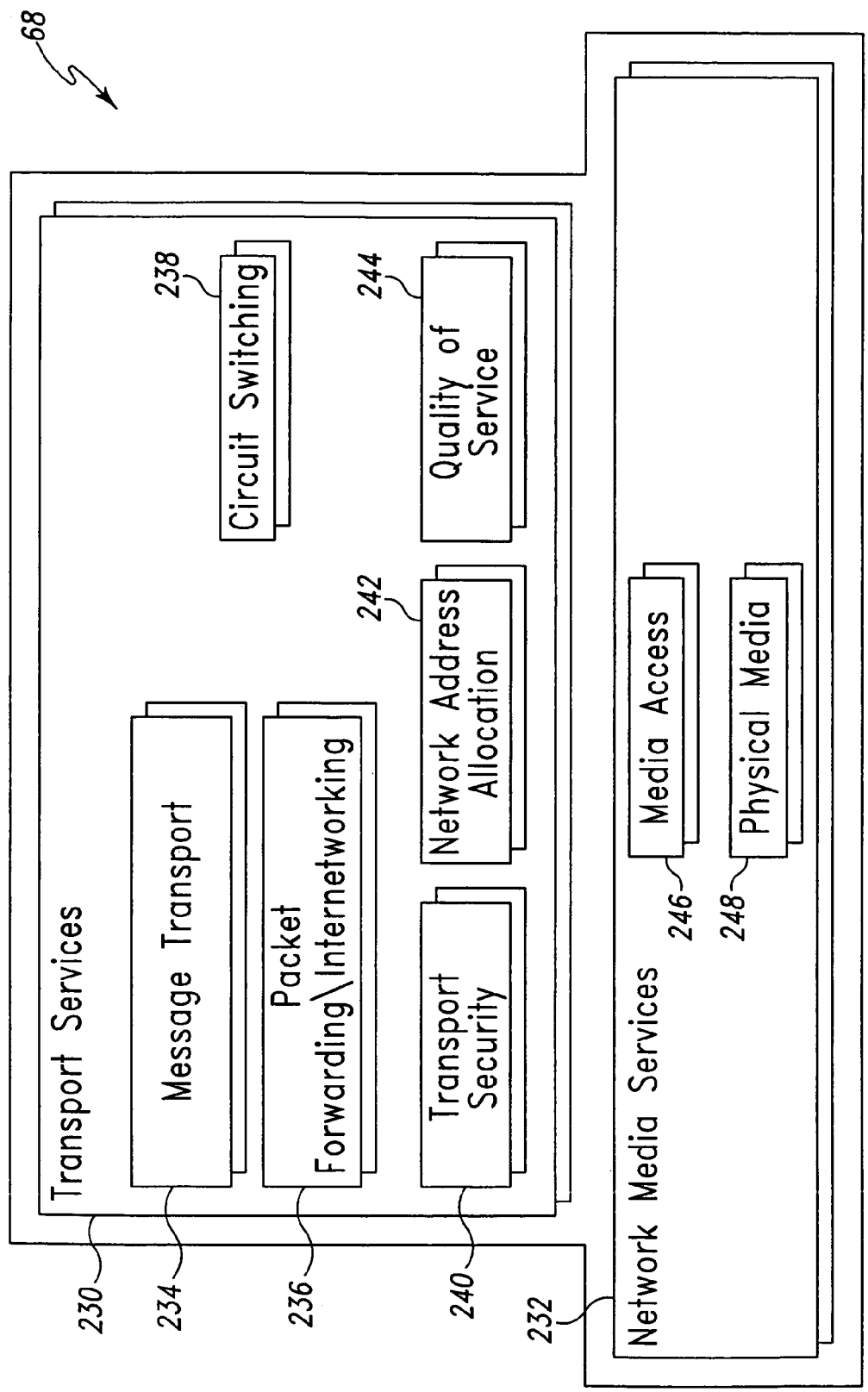
FIG. 9 illustrates the preferred communications fabric services of the netcentric computing system.

Referring to FIG. 9, the preferred communications fabric services 68 includes transport services 230 and network media services 232. The transport services 230 may be selected from the group consisting of message transport services 234, packet forwarding/Internetworking services 236, circuit switching services 238, transport security services 240, network address allocation services 242 and quality of service services 244. In the preferred embodiment, the transport services 230 are applications that are responsible for establishing, maintaining, and terminating end-to-end communications between users and processes. The transport services 230 provide the underlying protocols responsible fro transmitting and securing data communication. Connection management provides that the transport services 230 ensure the delivery of data from sender to receiver, which supports the transferring of messages from a process running on one machine to a process running on another machine. In addition, the transport services provide applications that are capable of initiating a connection, terminating a connection, and handling abrupt termination of connections. These services take place for application before and after the data are formatted for transport over the network.

The message transport services 234 are applications that responsible for the end-to-end delivery of messages. In the preferred embodiment, the message transport services 234 include functionalities such as end-to-end data transfer, connection control, reliable transfer, flow control, and multiplexing.

End-to-end data transfer allows the message transport services 234 to format messages for sending and confirm the integrity of received messages. Connection control allows the message transport services 234 to establish end-to-end (client-server) connections and track addresses and other associated information for the connection. The message transport service 234 also tears down connections and handles hard connection failures. Reliable transfer allows the message transport services 234 to ensure the reliable delivery of messages through the use of acknowledgments and retransmissions. Flow control allows the message transport services 234 to allow the receiver to govern the rate at which the sender transfers data. Multiplexing allows the message transport services 234 to define multiple addresses or ports within a single network node, allowing multiple processes on the node to have their own communications paths.

The following examples of protocols that provide message transport are: SPX (Sequenced Packet exchange); TCP (Transmission Control Protocol); UDP (User Datagram Protocol); NetBIOS/NetBEUI (Network Basic Input/Output System/NetBIOS Extended User Interface); APPC (Advanced Program-to-Program Communications); and AppleTalk.

The packet forwarding/Internetworking services 236 are applications that transfer data packets and manage the path that data takes through the netcentric computing system 10. The preferred services include functionalities such as fragmentation/reassembly, addressing, routing, switching, and multicasting.

Fragmentation reassembly allows the packet forwarding/Internetworking services 236 to divide an application message into multiple packets of a size suitable for network transmission. The individual packets include information to allow the receiving node to reassemble them into the message. The service also validates the integrity of received packets and buffers, reorders, and reassembles packets into a complete message. Addressing allows the packet forwarding/Internetworking services 236 to encapsulate packets with addressing information. Routing allows the packet forwarding/Internetworking services 236 to maintain routing information (a view of the network topology) that is used to determine the best route for each packet. Routing decisions are made based on the cost, percent utilization, delay, reliability, and similar factors for each possible route through the network.

Switching is the process of receiving a packet, selecting an appropriate outgoing path, and sending the packet. Switching is performed by routers and switches within the communications fabric. For some network protocols (e.g., IP), routers draw upon dynamic routing information to switch packets to the appropriate path. This capability is especially important when connecting independent networks or subnets. For other network protocols (e.g., Ethernet, Token Ring), switching simply directs packets according to a table of physical addresses. The switch can build the table by "listening" to network traffic and determining which network nodes is connected to which switch port.

Some protocols such as Frame Relay involve defining permanent routes (permanent virtual circuits (PVCs)) within the network. Since Frame Relay is switched based upon PVCs, routing functionality is not required. The preferred packet forwarding/Internetworking services 236 may support multicasting, which is the processing of transferring a single message to multiple recipients at the same time. Multicasting allows a sender to transfer a single copy of the message to the communications fabric, which then distributes the message to multiple recipients.

The following are examples of preferred protocols that provide packet forwarding/Internetworking: IP (Internet Protocol); IP Multicast (emerging standard that uses a special range of IP addresses to instruct; network routers to delivery each packet to all users involved in a multicast session); IPX (Internetwork Packet Exchange); ATM (Asynchronous Transfer Mode); Frame Relay; X.25; and SMDS (Switched Multimegabit Data Service). The following are preferred examples of network components that perform packet forwarding/Internetworking: routers; switches; and ATM switches, Frame Relay switches, IP switches, Ethernet switches, Token Ring switches, etc.

The following are examples of protocols that are supported by the preferred embodiment that maintain routing information tables within routers. Distance vector protocols, where each router periodically informs neighboring routers as to the contents of the routing table (destination addresses and routing metrics); routing decisions based on the total distance and other "costs" for each path. These preferentially include IP and IPX Routing Information Protocols; AppleTalk Routing Table Management Protocol (RTMP); and Ciscos Interior Gateway Routing Protocol (IGRP) and Enhanced IGRP. Link-State Protocols, where each router periodically broadcasts changes to the routers and directly attached networks that it can talk with. These preferentially include Open Shortest Path First (OSPF); ISOs Intermediate System to Intermediate System (IS—IS) and Novell's NetWare Link Services Protocol (NLSP). Policy routing protocols allow Internet backbone routers to accept routing information from neighboring backbone providers on the basis of contracts or other non-technical criteria; routing algorithms are Distance Vector. These preferentially include Border Gateway Protocol (BGR) and Interdomain Routing Protocol (IDR).

The circuit switching services 238 are applications that establish physical circuits for the transfer of such things as circuit-switched voice, fax, and video. Circuit switching services 238 use an end-to-end physical connection between the sender and the receiver that lasts for the duration of the "call" and includes voice, video, fax, etc., as well as data in a circuit-switched architecture (e.g., dial-up connections). Packetized data is preferentially transferred through brief, temporary, logical connections between nodes and includes data and packetized multimedia (video, voice, fax, etc.). The circuit switching services 238 establish an end-to-end path for circuit (may involve multiple intermediate nodes/switches) and manages the end-to-end path (quality, billing, termination, etc.). The following are examples of circuit switching services 238: analog dial-up telephone circuit and ISDN (Integrated Services Digital Network).

The transport security services 240 are applications that perform encryption and filtering of the traffic being passed over the netcentric computing system 10. Encryption within the transport services 240 is performed by encrypting the packets generated by higher level services (e.g., the message transport services 234), and encapsulating them in lower level packets (e.g. packet forwarding/Internetworking). Encryption can also occur within the communication services or the network media services. Encryption within the transport services 240 has the advantage of being independent of both the application and the transmission media, but it may make network monitoring and troubleshooting activities more difficult. The following standards support transport-layer encryption and may be used in the preferred embodiment: Point-to-Point Tunneling Protocol and Layer 2 Tunneling Protocol.

Network traffic can be controlled by the transport services 240 by filtering data packets based on source and/or destination addresses and network service. This ensures that only authorized data transfers can occur. This filtering is one of the roles of a packet filtering firewall. (A firewall is a system that enforces access control policy between a trusted internal network and an untrusted external network.) The network address allocation services 242 are applications that manage the distribution of addresses to network nodes of the netcentric computing system 10. This provides more flexibility compared to having all nodes assigned static addresses. The network address allocation services 242 assign addresses to nodes when they initially power-on and connect to the network. The following are examples of standards that implement network address allocation and allow a network node to ask a central resources for the nodes network address (e.g., IP address): DHCP (Dynamic Host Configuration Protocol) and BootP (Bootstrap Protocol).

The quality of service services 244 are application designed to deliver a predetermined level of quality throughout the network for designated traffic by allocating dedicated bandwidth, prioritizing data traffic, and managing traffic flow. Different types of network traffic (e.g., data, voice, video) have different quality of service requirements. For example, data associated with video conferencing sessions is useless if it is not delivered "on time." On the other hand, traditional best-effort data services, such as file or e-mail transfer, are not affected by variations in latency. The quality of service services 244 deliver a defined network throughput for designated traffic by allocating dedicated bandwidth, prioritizing data traffic, etc.

The following list provides a description of various quality of service parameters that the preferred quality of service services 244 monitor: connection establishment delay, the time between the connection request and a confirm being received by the requester; connection establishment failure probability, the chance that the connection will not be established within the maximum establishment delay; throughput, the bits per second (bps) of transmitted data; transit delay, the time elapsed between when sender transfers packet and recipient received packet; residual error rate, the number of lost or corrupted messages compared to total messages in the sampling period; transfer failure probability, the fraction of the time when the throughput, transit delay, or residual error were not those agreed upon at the start of the connection; connection release delay, the time between when one node initiates a release and the other node performs the release; connection release failure probability, the fraction of release attempts which do not succeed; protection, which specifies a secure connection; priority, which indicates traffic priority over the connection; and resilience, the probability that the transport layer spontaneously terminates.

The quality of service services 244 may use specialized communications protocols to provide guaranteed quality of services (QoS). Asynchronous Transfer Mode (ATM) is a connection-oriented wide area and local area networking protocol that delivers QOS on a per-connection basis. QOS is negotiated as part of the initial connection set-up and as network conditions change. Because of the small size of ATM data cells, QoS can be better managed, compared to protocols such as Ethernet that have large frames that can tie up network components. For ATM to delivery QoS to applications, ATM must be used end-to-end. Resource Reservation Protocol (RSVP) allows applications to reserve router bandwidth for delay-sensitive IP TRAFFIC. With RSVP, QoS is negotiated for each application connection. RSVP enables the network to reserve resources from end-to-end, using Frame Relay techniques on Frame Relay network, ATM techniques on ATM, and so on. IN this way, RSVP can achieve QoS across a variety of network technologies, as long as all intermediate nodes are RSVP-capable.

The quality of service services 244 may also use IP stream switching to improve network performance, however, this does not guarantee QoS. IP switching can increase network throughput for streams of data by combining IP routing software with ATM switching hardware. With IP switching, an IP switch analyzes each stream of packets directed from a single source to a specific destination, and classifies it as short- or long-lived. Long-lived flows are assigned ATM Virtual Channels (VCs) that bypass the IP router and move through the switching fabric at the full ATM line speed. Short-lived flows continue to be routed through traditional store-and-forward transfer. Like IP switching, tag switching technology also improves network throughput for IP data streams. Tag switching aggregates one or more data streams destined for the same location and assigns a single tag to all associated packets. This allows routers to more efficiently transfer the tagged data. Tag switching is also known as Multiprotocol Label Switching.

The quality of service services 244 may also use data prioritization to improve network performance. While not an example of end-to-end QoS, various network components can be configured to prioritize their handling of specified types of traffic. For example, routers can be configured to handle legacy mainframe traffic (SNA) in front of other traffic (e.g., TCP/IP). A similar technique is the use of prioritized circuits within Frame Relay, in which the Frame Relay network vendor assigns different priorities to different permanent virtual circuits.

As illustrated in FIG. 9, the preferred network media services 232 of the communications fabric services 68 include media access services 246 and physical media services 248. The network media services 232 provide final framing of data for interfacing with the netcentric computing system 10 and the ability to receive, interpret, and act on signals that are received by the communications fabric services 68. The network media services 234 are also capable of transferring data throughout the netcentric computing system 10.

In the preferred embodiment, the media access services 246 manage the low-level transfer of data between network nodes. The media access services 246 include applications that perform functions such as physical addressing, packet transfer, shared access, flow control, error recovery, and encryption. Physical addressing allows the medial access services 246 to encapsulate packets with physical address information used by data link protocols (e.g., Ethernet, Frame Relay). Packet transfer allows the media access services 246 to use data link communications protocols to frame packets and transfer them to another computer on the same network/subnetwork.

Shared access allows the media access services 246 to provide a method for multiple network nodes to share access to a physical network. Shared access schemes include: CSMA/DC, token passing, multiplexing, time division multiplexing and frequency division multiplexing. CSMA/CD (Carrier Sense Multiple Access with Collision Detection) is a method by which multiple nodes can access a shared physical media by "listening" until no other transmissions are detected and then transmitting and checking to see if simultaneous transmission occurred. Token passing is a method of managing access to a shared physical media by circulating a token (a special control message) among nodes to designate which node has the right to transmit. Multiplexing is a method of sharing physical media among nodes by consolidating multiple independent channels into a single circuit. The independent channels (assigned to nodes, applications, or voice calls) can be combined in the following ways: time or frequency division multiplexing. Time division multiplexing (TDM) is a method by which use of a circuit is divided into a series of times slots, and each independent channel is assigned its own periodic slot, and frequency division multiplexing (FDM) is a method by which each independent channel is assigned its own frequency range, allowing all channels to be carried simultaneously.

The media access services 246 manage the flow of data to account for differing data transfer rates between devices. For example, flow control would have to limit outbound traffic if a receiving machine or intermediate node operates at a slower data rate, possibly due to the use of different network technologies and topologies or due to excess network traffic at a node. The media access services 246 also perform error recovery, which is the capability to detect and possibly resolve data corruption that occurs during transmission. Error recovery involves the use of checksums, parity bits, etc.

The media access services 246 may perform encryption. Encryption can also occur within the communications services 66 or the transport services 230. Within the network media services 246, encryption occurs as part of the data link protocol (e.g., Ethernet, Frame Relay). IN this case, all data is encrypted before it is placed on the wire. Such encryption tools are generally hardware products. Encryption at this level has the advantage of being transparent to higher level services. However, because it is dependent on the data link protocol, it has the disadvantage of requiring a different solution for each data link protocol.

The following are examples of media access protocols supported by the preferred embodiment of the present invention: Ethernet; token ring; FDDI; portions of the ATM standard; HDLC/SDLC; LAPB; T-carrier, E-carrier (e.g., T1, T3, E1, E3); TDM and FDM (Time Division Multiplexing and Frequency Division Multiplexing; used on T-carriers, etc.); SONET, SDH; PPP, SLIP; V.32, V.34, V.34 bis, etc.; RS-232, EIA-232; and TDMA and FDMA (Time Division Multiple Access and Frequency Division Multiple Access; used on wireless links). Specialized services convert between addresses at the media access level (i.e., physical addresses like Ethernet) and the packet forwarding/Internetworking level (i.e., network addresses like IP). The following protocols are examples of this functionality: ARP (Address Resolution Protocol) allows a node to obtain the physical address for another node when only the IP address is known. RARP (Reverse Address Resolution Protocol) allows a node to obtain the IP address for another node when only the physical address is known.

The physical media services 248 include both the physical connectors and the physical media (wired or wireless) that are used by remote clients 79, 120 to connect with and use the netcentric computing system 10. The following are examples of wiring connectors used to connect network nodes to physical media: RJ-11, RJ-45; BNC; DB-9, DB-25; and fiber optic connectors. The physical media may be wired or wireless. Wired physical media includes wiring and cabling, while wireless physical media includes antennas, connectors, and the radio frequency spectrum. The following are examples of wired physical media: twisted pair wiring, shielded twisted pair wiring; coaxial cable; fiber optic cable; and 4-pair voice-grade wiring. The following are examples of wireless media: cellular antennas and the associated radio frequencies; wireless local area network antennas and the associated radio frequencies; and satellite antennas and the associated radio frequencies. Those skilled in the art would recognize that several physical media services 248 may be incorporated in the present invention.

For a more detailed discussion of the preferred communication services 66, refer to U.S. patent application Ser. No. 09/675,232, entitled COMMUNICATION SERVICE ARCHITECTURES FOR NETCENTRIC COMPUTING SYSTEMS, which is incorporated herein by reference, in its entirety.

Figure 10:
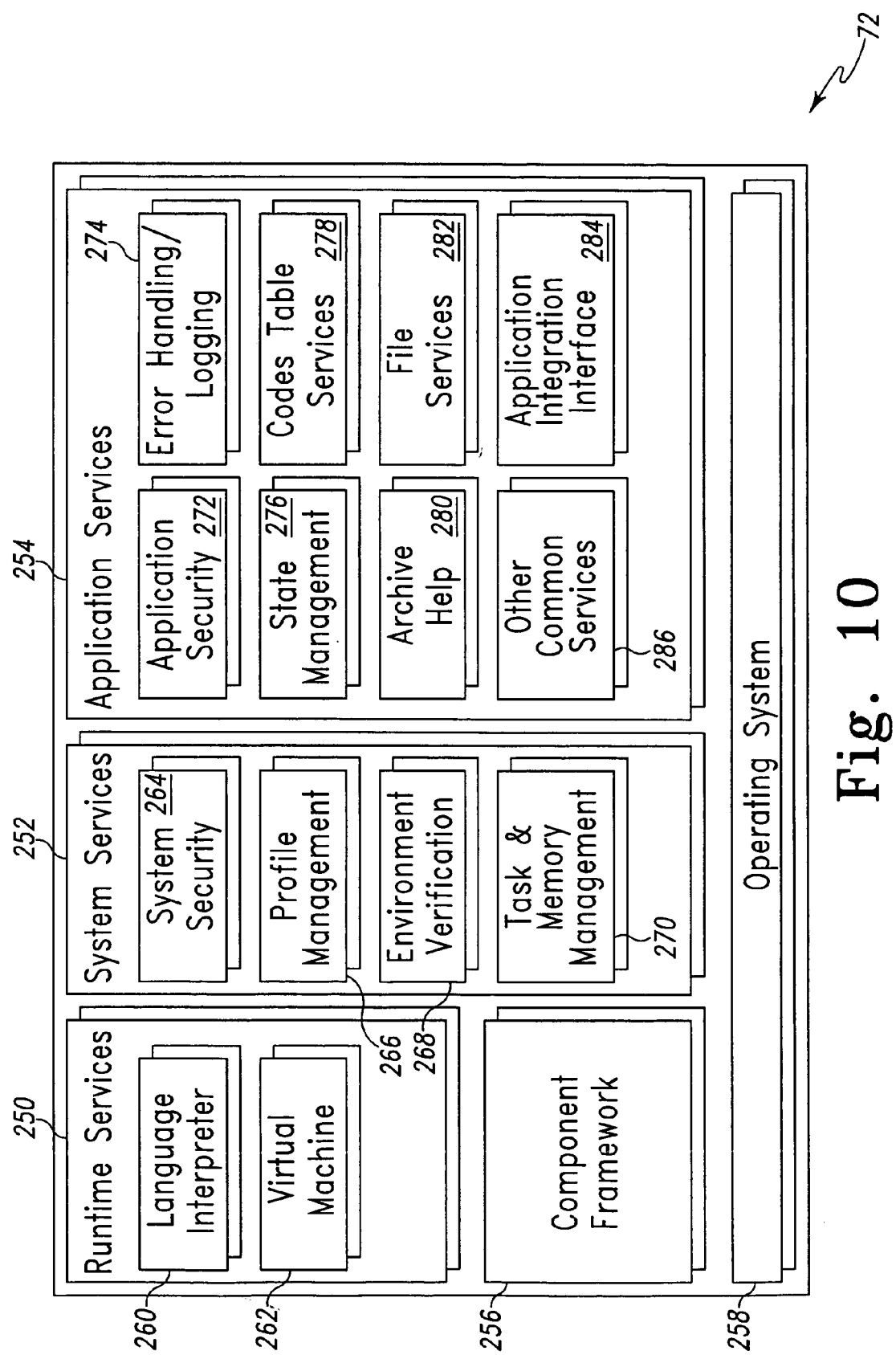
FIG. 10 illustrates the preferred environment services of the netcentric computing system.

Referring back to FIG. 5, as previously set forth the preferred netcentric execution architecture 32 also includes environment services 72. As illustrated in FIG. 10, the preferred environment services 72 may be selected from the group consisting of runtime services 250, system services 252, application services 254, component framework services 256 and operating system services 258. As set forth in detail below, the environment services 72 provide miscellaneous application and system level services that do not deal directly with managing the user interface, communicating to other programs, or accessing data.

The runtime services 250 use applications to convert non-compiled computer languages into machine code during the execution of an application. Two sub-services within the runtime services 250 comprise language interpreter services 260 and virtual machine services 262. The language interpreter services 260 decompose fourth generation and/or scripting languages into machine code (executable code) at runtime. The virtual machine services 262 are typically implemented in applications on top of an operating system and are used to run applications. The virtual machine services 260 provide a layer of abstraction between applications and the underlying operating system and are used to support operating system independence.

The system services 252 are applications that other applications use to perform system-level functions. The preferred system services 252 include system security services 264, profile management services 266, environment verification services 268 and task and memory management services 270. The system security services 264 allow applications to interact with the operating system's native security mechanism. The most common basic services include the ability to login, logoff, authenticate to the operating system, and enforce access control to system resources and executables.

The profile management services 266 are applications that are used to access and update local or remote systems, users, or application profiles. User profiles, for example, can be used to store a variety of information such as the user's language and color preferences to basic job function information that may be used by integrated performance support or workflow services.

All Microsoft windows based applications maintain their own profile file (XXX.INI) that is used during application startup, execution, and shutdown. This is a flat text file that contains information that can be used by the application during various phases of execution. For example, if an application needs to connect to a database engine/server, it needs to know, during startup, various information like database name, the server name, login ID, etc. Instead of hard coding all these information in the application executable, this information can be stored in the profile file for flexibility. In the future, if the database server name should change, this change only needs to be entered in the applications profile file. In some cases, it has been seen that this profile information has been hard coded in that applications executable itself. This will work, but, it makes the application more rigid with no room for any flexibility.

The environment verification services 268 use applications to ensure functionality by monitoring, identifying, and validating environment integrity prior and during program execution. (e.g., free disk space, monitor resolution, and correct version). These services are invoked when an application begins processing or when a component is called. Applications can use these services to verify that the correct versions of required execution architecture components and other application components are available.

The task and memory management services 270 are applications that allow other applications and/or events to control individual computer tasks or processes and manage memory. As such, the task and memory management services 270 provide services for scheduling, starting, stopping, and restarting both client and server tasks (e.g., software agents). Memory management, the allocating and freeing of system resources, is one of the more error prone development activities when using 3GL development tools. Creating architecture services for memory handling functions can reduce these hard to debug errors. Java removes, in theory, the problem of memory management, by providing a garbage collector; although its implementation is not very efficient in current implementations of Java. Future release of the Java VM promise a background-running garbage collector with significantly increased performance.

The application services 254 are miscellaneous services that applications can use for common functions. These common functions can apply to one application or can be used across multiple applications. The preferred application services 254 include application security services 272, error handling/logging services 274, state management services 276, code table services 278, active help services 280, file services 282, application integration interface services 284 and common services 286.

The applications security services 272 are applications that provide security services associated with specific applications, including user access services, data access services, and function access services. Besides system level security such as logging into the network, there are additional security services associated with specific applications. These include: user access services are sets of common functions that limit application access to specific users within a company or external customers. Data access services are sets of common functions that limit access to specific data within an application to specific users or user types (e.g., secretary, manager). In the netcentric computing systems 10, application security becomes a more critical component primarily because there are more types of users (e.g., employees, customers) and additional types of transactions (e.g., e-commerce, help-desks). In traditional client/server environments most users are employees of the company. In netcentric computing systems 10 there are typically also external users (e.g., vendors, registered users) and the general public. Usually, different types of users have different application security requirements limiting what data they can see and what functions they can execute. Also, new types of transactions such as verifying credit when doing e-commerce transactions also require additional application security services.

The error handling/logging services 274 are applications that support the handling of fatal and nonfatal hardware and software errors for applications. The error/handling logging services 274 take care of presenting the user with an understandable explanation of what has happened and coordinating with other services to ensure that transactions and data are restored to a consistent state. In addition, the error handling/logging services 274 support the logging of informational, error and warning messages. The error handling/logging services 274 preferentially record application and user activities in enough detail to satisfy any audit trail requirements or to assist the systems support team in recreating the sequence of events that led to an error.

Primarily, there are three types of errors that the preferred error handling/logging services 274 are designed to handle, which are: system, architecture and application errors. System errors occur when the application is being executed and some kind of serious system-level incompatibility is encountered, such as memory/resource depletion, database access problems, network problems or printer related problems, because of which the application cannot proceed with its normal execution. Architecture errors are those which occur during the normal execution of the application and are generated in architecture functions that are built by a project architecture team to isolate the developers from complex coding, to streamline the development effort by re-using common services, etc. These architecture functions perform services such as database calls, state management, etc. Application errors are also those which occur during the normal execution of the application and are generally related to business logic errors such as invalid date, invalid price, etc.

The state management services 276 are applications that enable information to be passed or shared among windows and/or web pages and/or across multiple applications within the netcentric computing system 10. So let's say several fields in an application need to be passed from one window to another. In pseudo-conversational mainframe 3270 style applications, passing data from one screen to another screen was done using context management services that provided the ability to store information on a host computer (in this the term context management refers to storing state information on the server, not the client). The popularity of the Internets HTTP protocol has revived the potential need for implementing some form of contact management services (storing state information on the server). The HTTP protocol is a stateless protocol. Every connection is negotiated from scratch, not just at the page level but for every element on the page. The server does not maintain a session connection with the client nor save any information between client exchanges (i.e., web page submits or requests). Each HTTP exchange is a completely independent event. Therefore, information entered into one HIML form must be saved by the associated server application somewhere where it can be accessed by subsequent programs in a conversation.

The code table services 278 are applications that enable other applications to utilize externally stored parameters and validation rules. For example, an application may be designed to retrieve the tax rate for the State of Illinois. When the user enters "Illinois" on the screen, the application first validates the user's entry by checking for its existence on the "State Tax Table," and then retrieves the tax rate for Illinois. Note that codes tables provide an additional degree if flexibility. If the tax rates change, the data simply needs to be updated; no application logic needs to be modified.

Most applications need code/decode facility. For example, an application may need to store codes like error severity codes, etc., stored in a table (may be cached table) instead of in the executable table itself. In some cases, where there is a small amount of information that needs to be stored in the codes table, the profile file (mentioned above) can be used instead of the codes table. But in cases where the codes table needs to be used quite extensively, then storing the code/decode information in the profile file win slow down the performance of the application because of the overhead of accessing flat files. In cases where the application requires extensive use of codes table, the architecture's code/decode component should provide the application developers with a set of API that can be used to use code/decode tables. This component should also provide the option of caching all or parts of the codes table in the application machines memory for easier and faster access. Code/decode information can be stored at any layer of an n-tier architecture client 78, 79, 120, application server 92, 94, 98 or database. The decision will need to be based upon codes table size and number, information update frequency, and write-access to the client machine or device.

The active help services 280 are applications that enable other applications to provide assistance to users for a specific task or set of tasks. Context-sensitive help is most commonly used in applications today, however this can imply more "active" support than just the F1 key. Typically, today's systems must be architected to include Help that is aware of both the user's environment, process and context, and in this sense can be called "active." Active Help services may include components like Wizards for walking a user through a new process, stored or real-time media support, on-demand Computer Based Training, etc.

The file services 282 are applications that enable users to interact with files on the netcentric computing system 10. File services 282 provide access to and maintain the integrity of data stored in both local and remote files (not databases). These services are usually invoked by operating system functions or functions in file access libraries. If a distributed file system is used, remote files or drives may be mapped as "local" to the application.

The application integration interface services 284 are applications that provide a method or gateway for passing context and control of information to an external application. The application integration interface 284 specifies how information will be passed and defines the interface by which other applications can expect to receive information.

External applications in this context could include anything from integration performance support systems to ERP systems like SAP or Peoplesoft to external custom applications that have been previously developed by the client. Where possible, the application integration interfaces should make use of the component model defined by the project to broker information (i.e. OLE/COM interfaces) as opposed to custom building data sharing modules.

The common services 286 should be construed herein as a catch-all category for additional reusable applications that are useful across a set of applications (e.g., Date Routines, Time Zone Conversions, and Field Validation Routines). In most large scale distributed applications, the client 78, 79, 120 and the server 92, applications 92 (or machines) are scattered over different time zones. This forces the client applications and the server hosts to deal with date and time zone conversions (like CST to PST, etc.) in order to use or display their local time accurately. Most of the architectures provide a base set of APIs that can be used by the applications to convert the date/time as needed. Many systems, for certain business reasons, need customized date and time formats for display and storage purposes. In order to do that, the common services 286 provide a set of APIs that will allow the system to convert date and time from one format to the other. As mentioned in the codes table component, sometimes it is necessary to cache the data in the memory for faster access and less database hits. This is a feature that some preferred common services 286 provide as a set of memory management APIs to create the cache area in the client 78, 79, 120 platforms memory for the data to reside.

The component framework services 256 are applications that provide an infrastructure for building components that can communicate within an application and across other applications, on the same machine or on multiple machines across a network, to work together. A few examples are COM/DCOM and CORBA, which are two leading component industry standards. These standards define how components should be built and how the components should communicate with each other. Object Request Broker (ORB) services, based on COM/DCOM and CORBA, focus on how components communicate. Component framework services, also based on CORBA and COM/DCOM, focus on how components should be built. The currently two dominant component frameworks include ActiveX/OLE and Java Beans.

ActiveX and Object Linking and Embedding (OLE) are implementations of COM/DCOM that may be used in the present invention. ActiveX is a collection of facilities forming a framework for components to work together and interact. ActiveX divides the world into two kinds of components: controls and containers. Controls are relatively independent components that present well-defined interfaces or methods that containers and other components can call. Containers implement the part of the ActiveX protocol that allows for them to host and interact with components, forming a kind of back plane for controls to be plugged into. ActiveX is a scaled-down version of OLE for the Internet. OLE provides a framework to build applications from component modules and defines the way in which applications interact using data transfer, drag-and-drop and scripting. OLE is a set of common services that allow components to collaborate intelligently.

In creating ActiveX from OLE 2.0, Microsoft enhanced the framework to address some of the special needs of Web-style computing. Microsoft's web browser, Internet Explorer, is an ActiveX container. Therefore, any ActiveX control can be downloaded to, and plugged into the browser. This allows for executable components to be interleaved with HTML content and downloaded as needed by the Web browser.

JavaBeans is Sun Microsystem's proposed framework for building Java components and containers. The intent is to develop an API standard that will allow components developed in Java (or beans), to be embedded in competing container frameworks including ActiveX or OpenDoc.

Other component frameworks include OpenDoc and ONE. OpenDoc provides an open command document infrastructure based on CORBA. It uses CORBA as its object model for inter-component communications. OpenDoc architecture provides services analogous to those provided by OLE, and OpenDoc components can also inter-operate with OLE components. The OpenDoc equivalent of an object is termed a part. Each type of part has its own editor and the OpenDoc architecture has responsibility for handling the communications between the distinct parts.

Open Network Environment (ONE) is an object-oriented software framework from Netscape Communications for use with Internet clients and servers, which enables the integrating of Web clients and servers with other enterprise resources and data. By supporting CORBA, ONE-enabled systems will be able to link with object software from a wide array of vendors, including IBM, Sun Microsystems, Digital Equipment, and Hewlett-Packard. Netscape is positioning ONE as an alternative to Microsoft's Distributed Common Object Model (DCOM).

The operating system services 258 are the underlying services such as multitasking, paging, memory allocation, which are typically provided by today's modern operating systems, such as Windows® based operating systems from Microsoft. Where necessary, an additional layer or APIs may be provided to gain either operating system independence or a higher level of abstraction for application programmers. Those skilled in the art would recognize that several operating system services 258 may be used in the present invention and that the netcentric computing system 10 is not limited to the use of a particular operating system.

For a more detailed discussion of the preferred environment services 72, refer to U.S. patent application Ser. No. 09/676,580, entitled ENVIRONMENT SERVICE ARCHITECTURES FOR NETCENTRIC COMPUTING SYSTEMS, which is incorporated by reference herein, in its entirety.

Referring once again to FIG. 5, as previously set forth the preferred netcentric execution architecture 32 for the netcentric computing system 10 includes transaction services 70. The transaction services 70 are applications that provide the transaction integrity mechanism for the netcentric computing system 10. This allows all data activities within a business event to be grouped as a single, logical unit of work.

In the preferred embodiment, a transaction is a unit of work that includes the following (ACID) characteristics. A transaction is atomic; if interrupted by failure, all effects are undone (rolled back). A transaction produces consistent results; the effects of a transaction preserver invariant properties. A transaction is isolated; its intermediate states are not visible to other transactions. Transactions appear to execute serially, even if they are performed concurrently. A transaction is durable; the effects of a completed transaction are persistent; they are never lost (except in a catastrophic failure).

A transaction can be terminated in one of two ways in the present embodiment. The transaction is either committed or rolled back. When a transaction is committed, all changes made by the associated requests are made permanent. When a transaction is rolled back, all changes made by the associated requests are undone. In small to moderate scale environments of less than 150 simultaneous users on a single server 92, 96, 98, this service may be provided by database management service software with its re-start/recovery and integrity capabilities. For larger environments, distributed on-line transaction managers might be more applicable. These transaction managers provide sharing of server 92, 96, 98 processes across a large community of users and can be more efficient than the DBMSs.

Figures 11, 12:
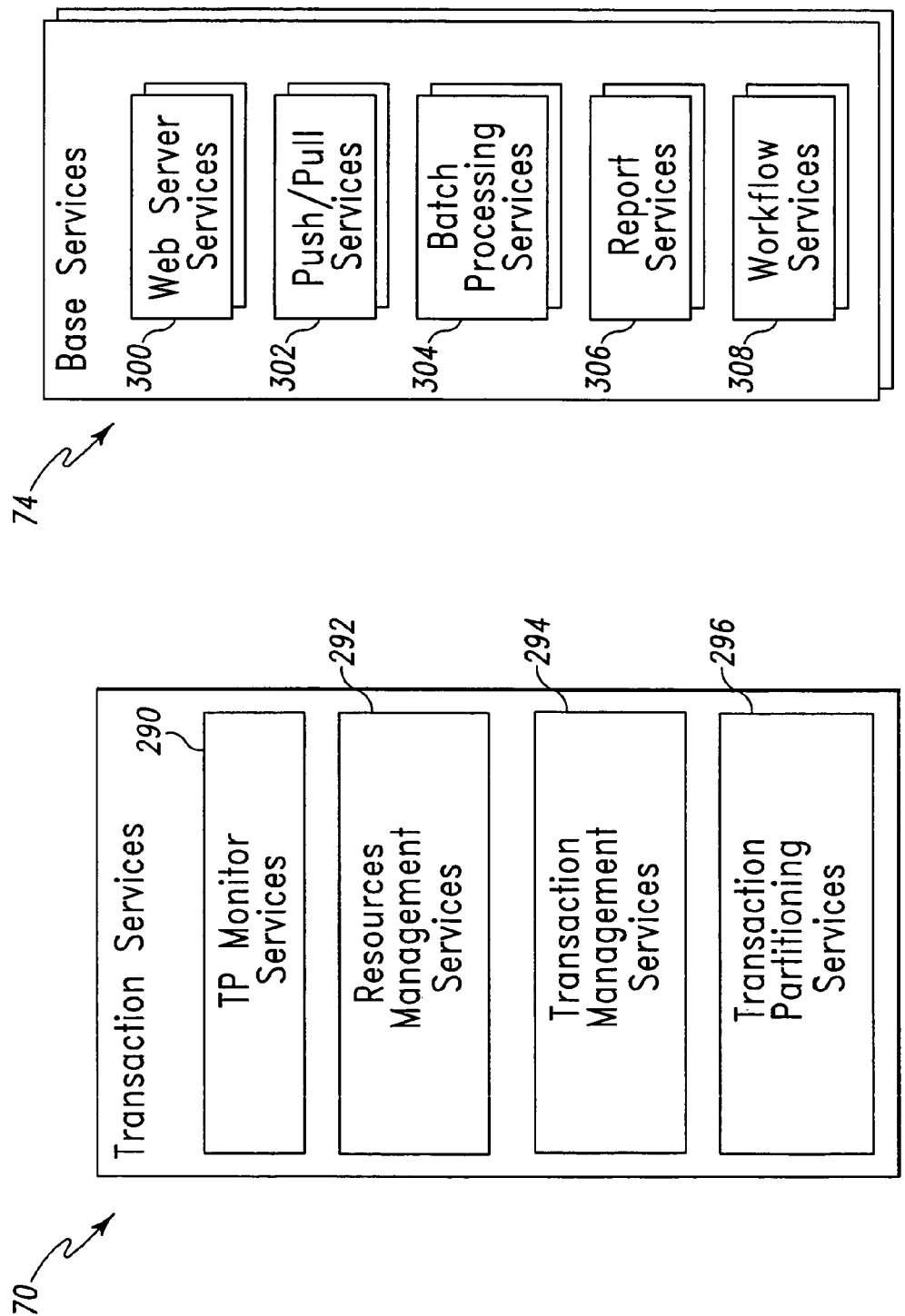
FIG. 11 illustrates the preferred transaction services of the netcentric computing system.
FIG. 12 illustrates the preferred base services of the netcentric computing system.

As illustrated in FIG. 11, the preferred transaction services 70 may be selected from the group consisting of transaction monitor services 290, resource management services 292, transaction management services 294 and transaction partitioning services 296. The transaction monitor services 290 are the applications that provide the primary interface through which applications invoke the transaction services 70 and receive status and error information. The transaction monitor services 290, in conjunction with the information services 64 and the communication services 66, provide for load balancing across processors or machines and location transparency for distributed transaction processing. Those skilled in the art would recognize that the type of transaction monitor services 290 used in the netcentric computing system 10 will vary depending on the needs of each particular business enterprise.

Some transaction monitor applications provide a method of accessing nonrelational data, such as VSAM files or flat files, independently of where the file physically resides. If write access is required for these data sources, the monitor would provide more dependable messaging and two-phase commit capabilities than the data source messaging capabilities alone. Because transaction monitor applications provide load balancing functionality and because they effectively reduce the number of connections that must be made to the database(s), they help conserve the resources of the data servers and, as a result, increase the throughput of the system. Systems with high throughput requirements should consider using a transaction monitor.

The preferred transaction monitor applications maintain interoperability(communication, data translation, etc.) between heterogeneous resource managers (databases) and clients (UNIX, MS Windows NT, etc.). The preferred transaction monitor applications provide robust functionality: two-phase commit, recovery/rollback, naming services, security services, can guarantee message delivery, can be maintained for high-availability operation and provides audit trail logging. Therefore, the more mission-critical the netcentric computing system 10, the more likely it is that a transaction monitor application is used.

Transaction monitor applications make a valuable addition to netcentric computing systems 10 that require high availability because of their fault tolerance. The automatic restart/recovery feature helps a netcentric computing system 10 recognize when components have failed and attempts to restart them. Also, because of the location transparency feature of service caing, if an entire node (i.e. server 92, 96, 98) in a system goes down, clients 78, 79, 120 may be able to reach the service they need on another node providing the same service.

Transaction monitor applications offer multiple scalability options. Preferred monitor transaction applications can run on machines ranging from PCs to mainframes. Monitors also scale by allowing new machines to be added dynamically to the system. Adding additional nodes in the production cycle is one strength of the transaction monitor services 290, although some monitors are better at doing this than others.

The preferred transaction monitor applications also provide security authorization/authentication services. The transaction monitor application can also access databases and services running on mainframe systems. Preferred transaction monitor applications include mainframe networking capability and maintain transaction rollback during mainframe accesses. If access to the legacy system is read only, the messaging capabilities of the data source will likely be sufficient. If access is write, the messaging and two-phase commit capabilities of the transaction monitor applications would be more dependable.

If the transaction services 70 are distributed across multiple nodes, the transaction monitor services 290 provide common administrative facilities to manage groups of servers 92, 96, 98. These facilities allow a system to be managed from one location with a common set of commands for each machine. One strength of transaction monitor services 290 is the ability to ensure a global two-phase commit over multiple heterogeneous databases. Although transaction monitor services 290 provide global two-phase commit "transaction processing" functionality, netcentric computing systems 10 that do not need this feature can also benefit by using transaction monitor services 290. For example, the load-balancing feature in itself can help increase system performance. Also, the administrative facilities can help simplify system management.

Data dependent routing is the ability to route requests to a particular server based upon the data passed within the request. Transaction monitor services 290 can provide this functionality. For example, where netcentric computing system 10 has several servers 92, 96, 98 accepting requests from clients 78, 79, 120 dispersed across North America. There are two groups of servers 92, 96, 98. Once group of servers 92, 96, 98 handles requests from all clients located in the USA while the other group of servers 926, 96, 98 serve requests from Canada. When a client 78, 79, 120 sends a request to the system, a field in the request message, defining the location of the client 78, 79, 120, is passed to the system. The transaction monitor services 290 are then able to route the request to the correct group of servers 92, 96, 98 (USA or Canada) based upon information in the request message.

The preferred transaction monitor services 290 provide the ability to enqueue and dequeue requests to and from a reliable (stable storage) queue. Both the application and the administrator can control the order of the messages (service requests) in the queue. Messages can be ordered LIFO, FIFO, time based, priority, or by some combination of these keys. An application updates a customer database. Suppose that the database has been partitioned such that the information on customers most likely to use a branch office is stored locally at a branch office. There is a requirement to maintain an up-to-date of the entire customer database at the home office. The application that updates the local customer mast can place a copy of the update into a reliable queue. The queue can be forwarded to the home office via a WAN, and the updates can be replicated in the home office database. The queuing system can be used to assure that every update completed at the local office is completed at the home office. Transaction services 90 are typically used in three-tier and multi-tier architectures. Particularly in netcentric computing systems 10, applications might need to support getting and providing access to multiple back-end services, across enterprises, as part of a single transaction or user activity.

The resource management services 292 are applications that provide concurrency control and integrity for a singular data resource (e.g., a database or a file system). Integrity is guaranteed by ensuring that an update is completed correctly and entirely or not at all. The resource management services 292 use locking, commit, and roll-back services and are integrated with the transaction management services 294, which are set forth below.

The transaction management services 294 are applications that coordinate transactions across one or more resource managers either on a single machine or multiple machines within the netcentric computing system 10. The transaction management services 294 ensure that all resources for a transaction are updated or, in the case of an update failure on any one resource, all updates are rolled back. This service also allows multiple applications to share data with integrity. These services allow multiple applications to share data with integrity. The transaction management services 292 help implement the notion of a transaction, a set of computations producing changes to recoverable data which demonstrate the ACID properties. Atomicity, where all changes are made completely (committed) or not (roll back). Consistency, where the effects of a transaction preserve invariant properties. Isolation, where intermediate data values are not visible to other transactions. And durability, where the effects of a completed transaction are persistent.

Two-phase commit is a feature found in distributed database management systems and online transaction processing monitors within the transaction management services 294 to ensure information integrity across distributed databases. With this feature, a transaction is only committed if two databases have the necessary information. If a problem arises on a network connection or a computer, the software will roll the transaction back so it will not be entered in either place. A restart mechanism may then retry to complete the transaction.

The transaction partitioning services 296 are applications that provide support for mapping a single logical transaction in an application into the required multiple physical transactions. For example, in a package or legacy-rich environment, the single logical transaction of changing a customer address may require the partitioning and coordination of several physical transactions to multiple application systems or databases to update the change of address. The transaction partitioning services 296 provide the netcentric computing system 10 with a single transaction view, while still allowing multiple applications or databases to be updated seamlessly.

In a given application, a single business process of updating a customer record requires an update to a table in a UNIX-based relational database and then an update to a table in an MVS DB2 database. Although there are two physical transactions occurring, this entire business process is represented as a single logical transaction. Transaction partitioning services allow the application to ensure that the individual transactions occur across the different UNIX and MVS systems and that the single logical transaction is completed and successful when the individual physical transactions are completed and successful.

Referring once again to FIG. 5, as previously set forth the netcentric execution architecture 32 of the netcentric computing system 10 further includes base services 74. As illustrated in FIG. 12, the preferred base services 74 may be selected from the group consisting of web server services 300, push/pull services 302, batch services 304, base report services 306 and workflow services 308. The base services 74 use applications to provide support for delivering applications to a wide variety of users over the Internet connection 107, intranet connection 106 and extranet connection 110, or any other type of network connection.

The web server services 300 are applications that preferentially enable organizations to manage and publish information and deploy netcentric software applications over the Internet connection 107, intranet connection 106 and extranet connection 110. These services preferentially support: managing documents in common formats such as HTML, Microsoft Word, etc.; handling client 78, 79, 120 requests for HTML pages; processing scripts such as common gateway interface (CG1) or Active Server Pages (ASP); and caching web pages. Those skilled in the art would recognize that the web server services 300 will vary from application to application, depending on the demands placed on the netcentric computing system 10.

As set forth above, the web browser services 300 handle client 78, 79, 120 request for HTML pages. A Web browser initiates an HTTP request to the Web server 98, either specifying the HTML document to send back to the browser or the server program (e.g., CGI, ASP) to execute. If the server program is specified, the Web server 98 executes the program which generally returns a formatted HTML page to the Web server 98. The web server 98 then passes this HTML page just as it would any standard HTML document back to the Web browser.

Server side scripting enables programs or commands to be executed on the server machine providing access to resources stored both inside and outside of the web server 98. For example, server side scripts can be used to process requests for additional information, such as data from an RDBMS.

The first time a user requests a Web page, preferentially the web server 98 retrieves that page from the network and stores it temporarily in a cache (memory on the web server 98). When another page or the same page is requested, the web server 98 first checks to see if the page is available in the cache. If the page is available, then the web server 98 retrieves it from the cache, otherwise it retrieves it from the network. Clearly, the web server 98 can retrieve the page from the cache more quickly than retrieving the page again from its location out on the network. The web server 98 typically provides an option to verify whether the page has been updated since the time it was placed in the cache, and if it has to get the latest update.

The push/pull services 302 are applications that allow for interest in a particular piece of information to be registered and then changes or new information to be communicated to the subscriber list. Traditional Internet users "surf" the web by actively moving from one web page to another, manually searching for content they want and "pulling" it back to the desktop via a graphical browser. But using the push model, on which subscription servers are based, content providers can broadcast their information directly to individual users' desktops. The technology uses the Internet's strengths as a two-way conduit by allowing the user to specify the type of content they want to receive. Content providers then seek to package the requested information for automatic distribution to the user's personal computer.

Depending upon requirements, synchronous or asynchronous push/pull services may be required in the netcentric computing system 10. Synchronous push/pull services provide a mechanism for applications to be notified in real time if a subscribed item changes (e.g., stock ticker). Asynchronous push/pull services do not require that a session-like connection be present between the subscriber and the service or application providing information. Asynchronous push/ pull services can be useful for pro-actively updating customers on changes in order status or delivering information on new products or services they have expressed an interest in.

The batch services 304 are applications used to perform large-scale repetitive processing where no user involvement is required as well as reporting. Preferentially, areas for design attention include scheduling, recovery/restart, use of job streams, and high availability (e.g., 24-hour running). In addition, close attention must be paid to performance as the batch services 304 usually must be processed within strict batch windows.

The design of batch architectures is often complicated considerably by the fact that batch jobs must be able to run concurrently with on-line systems. The general globalization of companies requires that the on-line systems must be available on a close to 24×7 hours basis, eliminating the traditional batch windows. Concurrent batch and on-line processing poses serious challenges to data integrity, throughput and performance.

Batch application programs can include business processing such as payroll, billing, etc., and can also include report generation. This is an often overlooked area in client/server architectures. Traditional client/server solutions and Netcentric solutions often require batch processing, but unlike the mainframe, the typical platforms and development environments used often do not have built-in batch or reporting architecture facilities.

Batch processing should be used in preference to on-line modules when: 1) the same process or set of processes, must be applied to many data entities in a repetitive and predictable fashion; 2) there is either no manual element to the process or the manual element can be completely separated from a batch element; and 3) the volume of information to be presented to a user is too great to be processed on-line or it can be better printed in batch.

Although not illustrated in FIG. 12, the batch services 304 preferentially are selected from the group consisting of driver services, restart/recovery services, batch balancing services and batch report services. These services provide the control structure and framework for the batch services 304. The restart/recovery services are used to automatically recover and restart batch programs if any of the programs should fail during execution. The batch balancing services support the tracking of run-to-run balances and totals for the batch services 304. The batch report services are used to summarize and communicate information, using either printed paper or on-line reporting.

The report services 306 are applications for simplifying the construction and delivery of reports or generated correspondence. The report services 306 help to define reports and to electronically route reports to allow for on-line review, printing, and/or archiving. Further, the report services 306 also support the merging of application data with predefined templates to create letters or other printed correspondence.

The preferred report services 306 include driver services, report definition services, report building services and report distribution services. The driver services provide the control structure and framework for the reporting system. The report definition services receive and identify the report request, perform required validation routines, and format the outputted report(s). After the request is validated, the report build function is initiated. The report build services are responsible for collecting, processing, formatting, and writing report information (for example, data, graphics, text). The report distribution services are responsible for printing, or otherwise distributing, the reports to users.

The following types of reports are preferentially supported by the report services 306: scheduled, on-demand, and event-driven. Scheduled reports are generated based upon a time and/or date requirement. These reports typically contain statistical information and are generated periodically (invoices and bills, for example). Some reports will be requested by users with specific parameters on-demand. The scheduling of these reports, the formatting, and/or the data requirements are not known before the request is made, so these factors must be handled at request time. This report type includes reports whose generation is triggered based on a business or system event. An example here would be a printed trade slip.

The workflow services 308 are applications that control and coordinate the tasks that must be completed to process a business event. For example, at XYZ Savings and Loan, in order to receive a promotion, you must complete an essay explaining why you should be promoted. This essay and your personnel file must be routed to numerous individuals who must review the material and approve your promotion. Workflow services coordinate the collection and routing of your essay and your personnel file.

In operation, the workflow services 308 enable tasks within a business process to be passed among the appropriate participants, in the correct sequence, and facilitates the completion of the tasks within set time frames and budgets. Task definition includes the actions required as well as work folders containing forms, documents, images, and transactions. The workflow services 308 use business process rules, routing information, role definitions and queues. Workflow functionality is crucial for the customer services and engineering applications to automate the business value chains, and monitor and control the sequence of work electronically.

The business processes can be of a repetitive nature, e.g., automatically routing and controlling the review of a work plan through the approval stages. These are called production workflows. Conversely, it can be an ad hoc process, e.g., generating and delivering a work order for a special meter reading to a meter reader who is available to perform the task. In production workflows the processes are predefined, whereas ad hoc workflows are created only for a specific non-recurrent situation. Often it is difficult to determine how much ad hoc In the preferred embodiment, the workflow services 308 are applications that provide a mechanism that defines, monitors, and controls the sequence of work electronically. The applications of the workflow services 308 are typically provided by the servers 92, 96, 98, as they often coordinate activities among multiple users or multiple computers. Although not illustrated in FIG. 12, the workflow services 308 may be selected from the group consisting of role management services, route management services, rule management services and queue management services. Those skilled in the art would recognize that other workflow services 308 may be used in the netcentric computing system 10 to process various requests among users.

Role management services are applications that provide for the assignment of tasks to roles that can be mapped to individuals within the business. A role defines responsibilities which are required in completing a business process. A business worker must be able to route documents and folders to a role, independent of the specific person, or process filling that role. For example, a request is routed to a supervisor role or to Purchasing, rather than to "Mary" or "Tom." If objects are routed to Mary and Mary leaves the company or is reassigned, a new recipient under a new condition would have to be added to an old event. Roles are also important when a number of different people have the authority to do the same work, such as claims adjusters; just assign the request to the next available person. In addition, a process or agent can assume a role; it doesn't need to be a person. Role management services provide this additional level of directory indirection.

Route management services are applications that enable the routing of tasks to the next role. Route management services enable the routing of tasks to the next role, which can be done in the following ways: serial, where the tasks are sequentially performed; parallel, where the work is divided among different players; conditional, where the routing is based upon certain conditions; and ad hoc, for work which is not part of the predefined process. Workflow routing services route "work" to the appropriate workflow queues. When an application completes processing a task, it uses these services to route the work-in-progress to the next required task or tasks and, in some cases, notify interested parties of the resulting work queue changes.

The automatic movement of information and control from one workflow step to another requires work profiles that describe the task relationships for completing various business processes. The concept of integrated performance support can be exhibited by providing user access to these work profiles. Such access can be solely information, to allow the user to understand the relationship between tasks, or identify which tasks need to be completed for a particular workflow, or navigational, to allow the user to move between tasks. Route management services also support the routing and delivery of necessary information (e.g., documents, data, forms, applications, etc.) to the next step in the workflow as needed.

The rule management services support the routing of workflow activities by providing the intelligence necessary to determine which routes are appropriate given the state of a given process and knowledge of the organization's workflow processing rules. Rule management services are typically implemented through easily maintainable tables or rule bases which define the possible flows for a business event.

The queue management services provide access to the workflow queues that are used to schedule work. In order to perform workload analysis or to create "to do lists" for users, an application may query these queues based on various criteria (a business event, status, assigned user, etc.). In addition, manipulation services are provided to allow queue entries to be modified. Workflow services 308 allow users and management to monitor and access workflow queue information and to invoke applications directly.

For a more detailed discussion of the preferred base services 74, refer to U.S. patent application Ser. No. 09/677,074, entitled BASE SERVICE ARCHITECTURES FOR NETCENTRIC COMPUTING SYSTEMS, which is incorporated herein by reference, in its entirety.

Referring once again to FIG. 5, as previously set forth, the netcentric execution architecture 32 of the netcentric computing system 10 includes business logic services 76. The netcentric execution architecture 32 services are all generalized services designed to support the applications' business logic. How business logic is to be organized must be determined based upon the characteristics of the application system to be developed. The business logic services 76 are the core of any application, providing the expression of business rules and procedures (e.g., the steps and rules that govern how a sales order is fulfilled). AS such, the business logic includes the control structure that specifies the flow for processing business events and user requests.

Figure 13:
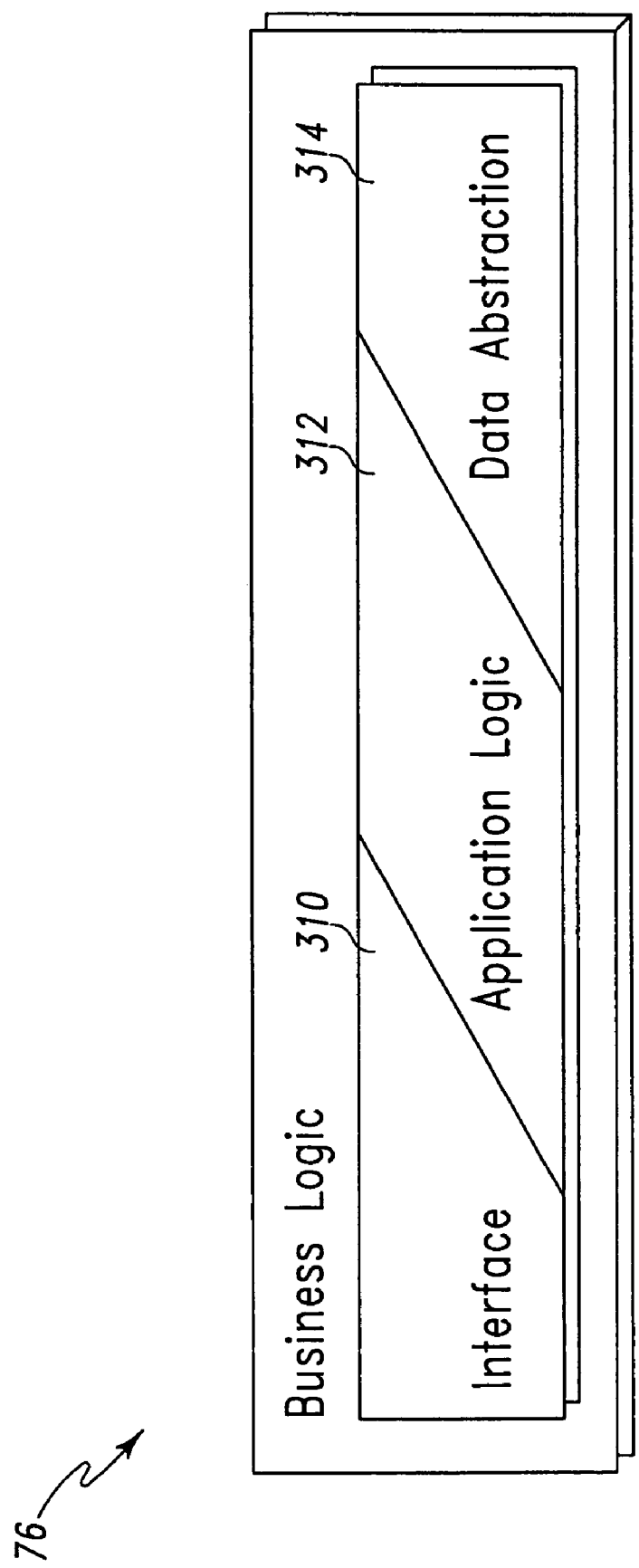
FIG. 13 illustrates the preferred business logic services of the netcentric computing system.

As illustrated in FIG. 13, the preferred business logic services 76 include interface logic 310, application logic 312 and database abstraction 314. The interface logic 310 includes applications that interpret and map the actions of users into business logic processing activities. With the assistance of the presentation services 62, the interface logic 310 provides the linkage that allows users to control the flow of processing within the application.

In the preferred embodiment, the application logic 312 is the expression of business rules and procedures (e.g., the steps and rules that govern how a sales order is fulfilled). As such, the application logic 312 includes applications that have the control structure that specifies the flow for processing of business events and user requests. The isolation of control logic facilitates change and adaptability of applications to changing business processing flows.

Data abstraction 314 includes applications that provide the applications with a more logical view of information, further insulating applications from physical information storage considerations. The information services 64 isolate the business logic services 76 from the technical specifics of how information is stored (e.g., location transparency, ROBMS, syntax, etc.). The developers of the business logic services 76 should preferentially be shielded from the details and complexity of other architecture services (e.g., information services 64), and other business logic for that matter.

For netcentric computing systems 10, it is important to decide whether the business logic services 76 will be separate from the presentation logic services 62 and the information services 64. Separation of the business logic services 76 into its own tier is often done using an application server 96, as illustrated in FIG. 4. In this type of an environment, although some business rules such as field validation might still be tightly coupled with the presentation logic services 62, the majority of the business logic services 76 is separate, usually residing on the application server 96. It is also important to decide whether the business logic services 76 should be packaged as components to maximize software reuse and to streamline software distribution.

Another factor to consider is how the business logic services 76 are distributed between the client 78, 120 and the server(s) 92, 96, 98 where the business logic services 76 are stored and where the business logic services 76 are located when the software application is being executed. There are several ways to distribute the business logic services 76: business logic applications can be stored on the server(s) 92, 96, 98 and executed on the server(s) 92, 96, 98; business logic applications can be stored on the server(s) 92, 96, 98 and executed on the client 78, 120; business logic applications can be stored and executed on the client 78, 120; and some business logic applications can be stored and executed on the server (s), and some business logic can be stored and executed on the client.

Having the business logic applications stored on the servers 92, 96, 98 enables developers to centrally maintain application code, thereby eliminating the need to distribute software to client machines when changes to the business logic applications occur. If all the business logic applications execute on the server, the application on the client will make requests to the server whenever it needs to execute a business function. This could increase network traffic, which may degrade application performance. On the other hand, having the business logic applications execute on the client may require longer load times when the application is initially launched. However, once the application is loaded, most processing is done on the client until synchronization with the server is needed. This type of an architecture might introduce complexities into the application that deal with the sharing of, and reliance on central data, across many users.

If the business logic services 76 are stored and executed on the client 78, 79, 120, software distribution options must be considered. In the preferred embodiment, one option is to have a system administrator or the user physically install new applications and update existing applications on each client machine. Another option is to use an application that performs automatic software distribution functions. A third option is to package the applications into ActiveX controls, utilizing the automatic install/update capabilities available with ActiveX controls if the application is launched from a web browser.

Preferentially, Internet applications used in the netcentric computing system 10 house a majority of the business processing logic on the server(s) 92, 96, 98, thereby supporting a thin-client model. However, as technology evolves, this balance may shift, allowing business logic application code bundled into components to be either downloaded at runtime or permanently stored on remote client workstations. (client-side business logic applications are supported through the use of Java applets, JavaBeans, Plug-ins and JavaScript from Sun/Netscape, and ActiveX controls and VBScript from Microsoft.)

Referring to FIG. 2, the preferred netcentric computing system 10 also includes the operations architecture 36. In the preferred embodiment, the operations architecture 36 operates and manages the overall operation of the netcentric computing system 10. The operations architecture 36 provides a combination of tools, support services, procedures and controls that are required to keep a production system up and running well.

Figure 14:
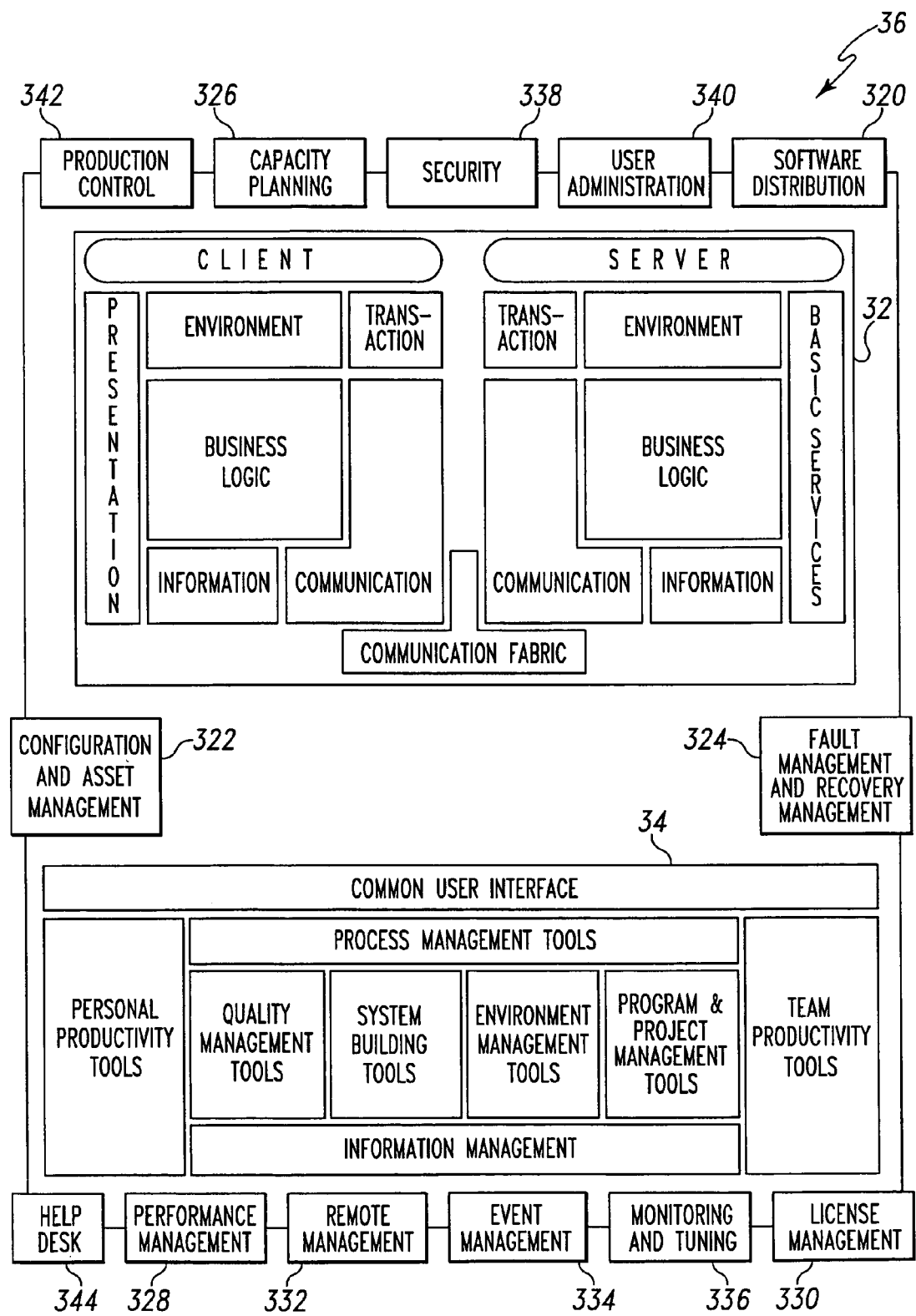
FIG. 14 illustrates the preferred operations architecture of the netcentric computing system.

As illustrated in FIG. 14, the operations architecture 36 supports the netcentric execution architecture 32 and the development architecture 34. The preferential tools of the operations architecture 36 may be selected from the group consisting of software distribution tools 320, configuration and asset management tools 322, fault management and recovery management tools 324, capacity planning tools 326, performance management tools 328, license management tools 330, remote management tools 332, event management tools 334, monitoring and tuning tools 336, security tools 338, user administration tools 340, production control tools 342 and help desk tools 344. The operations architecture 36 differs from the netcentric execution architecture 32 in that its primary users are systems administrators and production support personnel. Each of the tools of the operations architecture 36 is set forth in greater detail below.

The software distribution tool 320 include applications that perform automated delivery to, and installation of, applications on servers and end user devices (e.g., workstations, kiosks, etc.). In the preferred embodiment, the software distribution tool 320 is capable of delivering software updates and software inside the business enterprise 90 as well as for its extended ones, i.e., suppliers 108 and remote clients 79 that include customers.

To manage the netcentric computer system 10 effectively, the business enterprise 90 must have a solid understanding of what is where, and they must maintain rigor in keeping track of modifications. The configuration and asset management tools 322 provide applications that keep track of where information is located as well as the content of the information. Some examples of information that these applications may keep track of include product licensing information, warranty information, vendor names, logical and physical device information (such as total capacity and current utilization), product configuration tracking, software and data version levels, network configuration parameters, physical location and accounting information. Those skilled in the art would recognize that several configuration and asset management applications may be used in the present invention, depending on the needs of the enterprise.

The fault management and recovery management tools 324 provide applications that assist in the diagnosis and correction of system faults in the netcentric computing system 10. Common faults may include networks, server, workstation, or even application-level faults. Fault diagnosis may further include applications for isolation; viewing of host, server, and workstation error logs; and determining the software and data versions and configurations of affected machines.

The capacity planning tools 326 are applications that focus on components of a particular environment in the netcentric computing system 10, such as the network, physical space, and processing power, to understand the need to change the capacity of those components based on the needs of the business enterprise 90. In the preferred embodiment, the capacity planning tools 326 monitor components that are considered to be heavily sensitive to changes in computing resource usage. The capacity planning tools 326 may use historical management data combined with estimates for growth or changes to configuration to simulate the ability of different system configurations to meet capacity needs. Those skilled in the art would recognize that various capacity planning tools 326 may be used in the present invention.

The performance management tools 328 of the operations architecture 36 are applications that monitor the performance of computing resources in the netcentric computing system 10. Performance issues are no longer confined to the network or to the central processing unit for netcentric computing systems 10. Performance is preferentially viewed in an end-to-end manner, accounting for all factors that affect the performance of the netcentric computing system 10, relative to user requests. The license management tools 330 of the operations architecture 36 includes applications that focus on guaranteeing compliance with software licensing agreements. As known in the art, several different methods exist to verify compliance with software agreements and may be used in the present invention.

The remote management tools 332 of the operations architecture 36 provide applications that allow support personnel to "control" a user's desktop over a network so that they do not need to be physically present at a workstation to diagnose problems. As known in the art, once control of the desktop is established, screen updates for the controlled desktop are displayed at both locations. The support person is then effectively sitting at the workstation he/she controls and can do necessary diagnostics. The event management tools 334 of the operations architecture 36 include applications that manage events that other applications and systems software generate during operation. Common event-handling mechanisms are required to provide information to management in a simple, consistent format and to forward information on important events for management purposes.

The monitoring and tuning tools 336 of the operations architecture 36 are applications that focus on the number of devices and the geographic disparity of devices that may be used in the netcentric computing system 10. The number of events generated in the system rises due to the increased complexity. Devices such as client machines, network components, and servers generate events on startup or failure to periodically report device status. The monitoring and tuning tools 336 allow the netcentric computing system 10 to quickly and easily adapt to the various devices connected to, and using, the netcentric computing system 10.

The security tools 338 of the operations architecture 36 comprise applications that provide various security measures for the netcentric computing system 10. The security concerns of Internet based environments have been widely publicized. Although the security requirements for a netcentric computing system 10 will constantly be evolving as new security breaches are discovered, there are several tools that can help provide reasonable levels of security.

The user administration tools 340 of the operations architecture 36 include applications that provide the tools to the netcentric computing system 10 that allow the system to keep track of users. Adding a user to the netcentric computing system 10 may require adding a user to the network, one or more server operating systems, one or more database systems, an e-mail system, and an existing host-based system. Those skilled in the art would recognize that there are several different types of tools that fall under the penumbra of user administration tools 340 and that the tools set forth above are for illustrative purposes only.

The production control tools 340 of the operations architecture 36 include applications that perform scheduling processes across a distributed environment. As such, they allow users to view and monitor the day-to-day operations of the business enterprise 90. Those skilled in the art would recognize that the particular type of production control tools 340 used in the present invention will vary depending on the needs of the business enterprise 90.

The help desk tools 344 of the operations architecture 36 includes applications that route users of the netcentric computing system 10 to the appropriate areas or personnel for help. Unless the help desk tool 344 is included there is a risk that the user may be given information that is incorrect, forwarded to the wrong department or otherwise mishandled in the netcentric computing system 10. Those skilled in the art would recognize that the exact makeup of the help desk tools 344 will vary depending on the needs of the particular business enterprise 90.

For a detailed discussion of the preferred operations architecture 36, refer to U.S. patent application Ser. No. 09/676,584, entitled OPERATIONS ARCHITECTURES FOR NETCENTRIC COMPUTING SYSTEMS, which is incorporated herein by reference, in its entirety.

Figure 36:
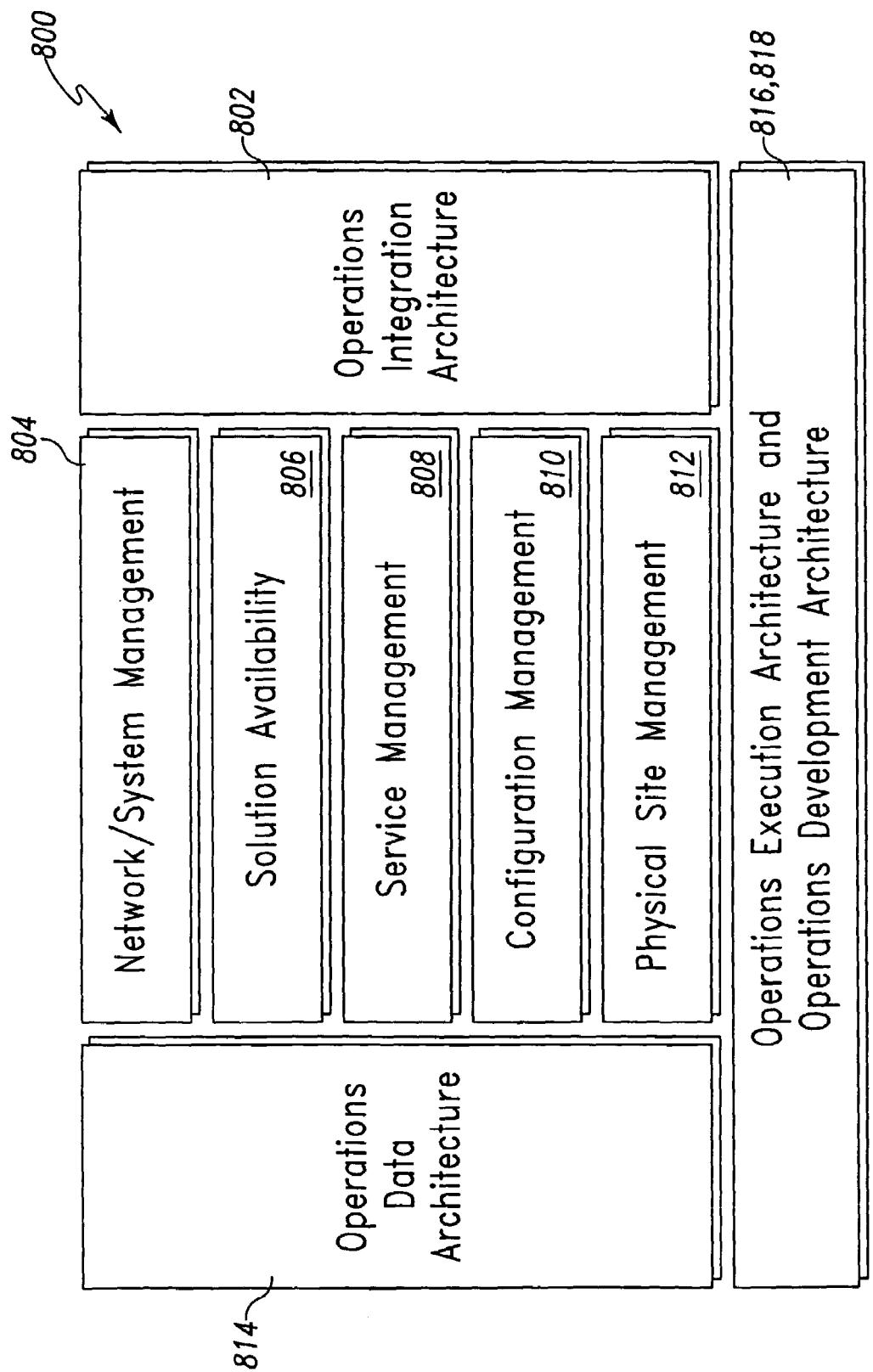
FIG. 36 illustrates another preferred embodiment of an operations architecture.

Referring to FIG. 36, another preferred embodiment of an operations architecture 800 is illustrated. The operations architecture 800 is a combination of tools, technology and support services required to keep a production system up and running efficiently. Unlike the execution and development architectures, its primary users are system administrators, production support, and service management personnel. The operations architecture 800 is the technology component of the operations infrastructure, which is the bundled set of people, process and technology involved in operations. As a result, the operations architecture 800 provides the tool or technology blueprint for an operations environment, while other frameworks provide the basis for defining and implementing process and organization solutions.

The preferred operations architecture 800 contains three main elements: component categories and components 802–812, operations data architecture 814 and operations execution and operations development architectures 816, 818. The component categories and components are depicted in the middle and upper right element of FIG. 36. The categories shown represent a logical grouping of technology components based on industry drivers or interdependencies of the components. The six component categories comprise: operations integration architecture components 802, network/systems management components 804, solution availability components 806, service management components 808, configuration management components 810 and physical site management components 812. Each of these categories has associated "components" within. Each component provides the operations architecture 800 with specific functionality (e.g., a service desk component). Each component has been classified in only one component category even though it may have a tight interrelationship with components in other categories.

The operations data architecture 814 is depicted on the left side of the operations architecture 800 diagram. This represents where and how operations data is stored, how it is accessed and by whom, where it is used and how it is distributed. The preferred operations architecture 800 also includes an operations execution architecture 816 and an operations development architecture 818. These are depicted along the bottom of the diagram. They represent the environments in which operations architecture 800 components are developed, deployed and operated.

Figure 37:
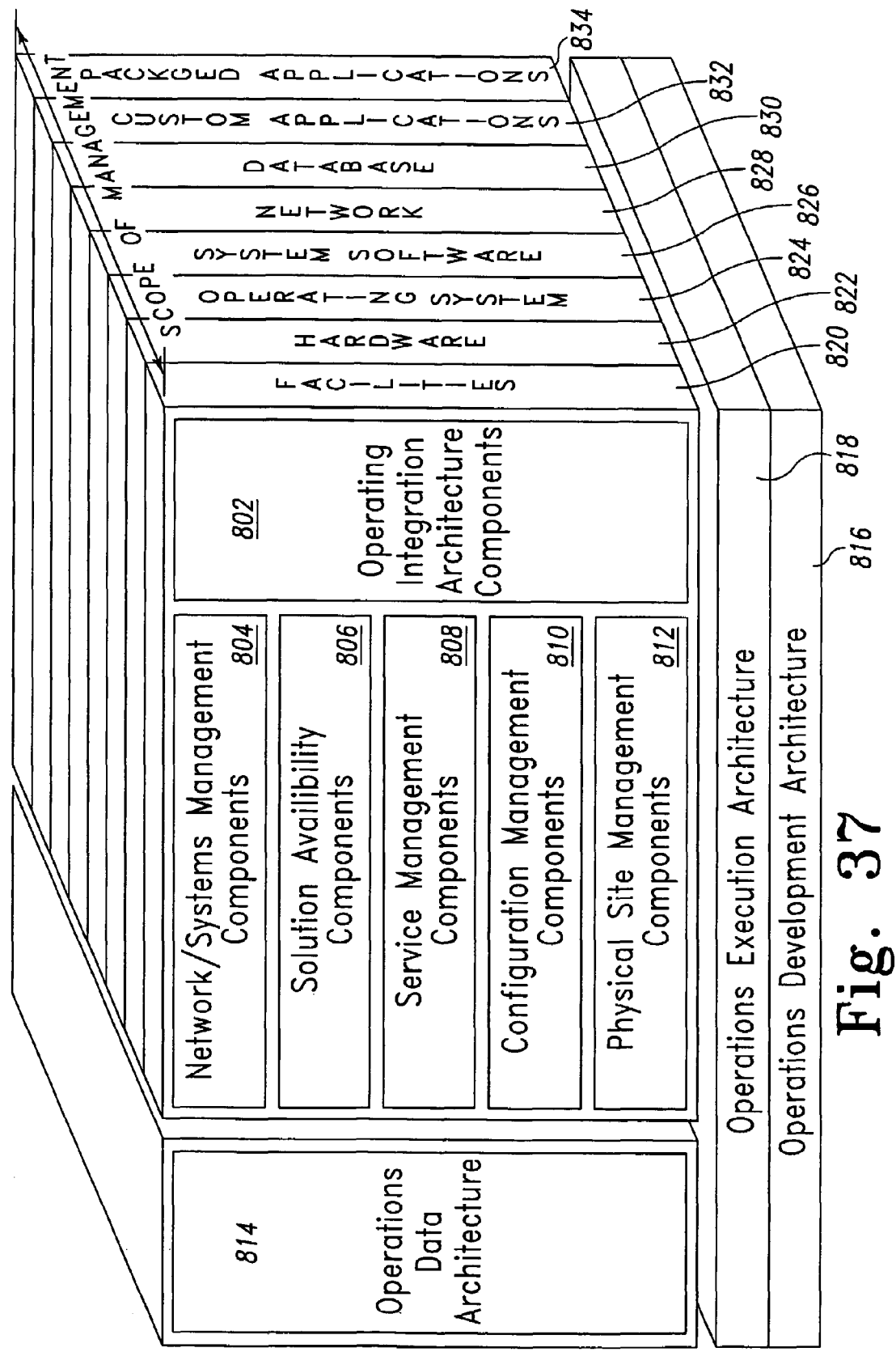
FIG. 37 illustrates the preferred managed domains of the operations architecture.

The introduction of a third dimension to the framework diagram, as illustrated in FIG. 37, allows various "managed domains" to be depicted. The preferred managed domains include facilities 820, hardware 822, operating system 824, systems software 826, network 828, database 830, custom applications 832 and packaged applications 834. This third dimension is important for two reasons. First, it is critical that operations management meets user service levels across all domains. Operations management tools, processes and organization structure must manage across these domains as opposed to within individual domains or "silos." Second, using this extension, one could further specify a project's scope. For example, by highlighting the network/systems management component 804 and the operating system 824 and network 828 "domains," the scope of a project is clearly depicted.

As previously set forth, the preferred operations architecture 800 includes operations integration architecture components 802. The operations integration architecture components 802 are the components that address the integration of the other operations architecture components. The operations integration architecture 802 addresses considerations for deciding on common standards, interfaces, message formats, monitoring responsibilities and file logging formats to be used by all of the components of the preferred operations architecture 800.

A framework-based approach should be considered for a large implementation where many operations components are addressed, and a centralized management approach is needed. For example, most large companies today have some sort of network monitoring or application management in place. A framework may be used to manage these environments from a centralized or single point. This can reduce duplication and streamline the management effectiveness by allowing a single administrator to manage the environment from one terminal.

The benefits of a framework-based approach include a uniform look and feel across all platforms; ease of integration between operations components (e.g., a central point of administration for components like help desk tool integration, software distribution, remote access, service level reporting, data base management, operating system, desktop monitoring, capacity planning and network monitoring); scaleable; allows multiple components to be implemented in a similar manner; and usually allows for the integration of third-party operations components.

An ideal integration framework, whether implemented as a framework or point solution, should be scaleable to work equally well in a large or small environment. The integration framework overhead (i.e., processing time, hard disk space, network bandwidth utilization) should be offset by improving the efficiency, throughput, response times and capabilities of the environment. In reality, the overhead introduced by an integration framework is highly dependent on the size of implementation, the architecture of the systems being managed and the design of the integration framework. The performance impacts of factors may impede the scalability of the integration framework.

Most frameworks are designed with the assumption that organizations, over time, choose the hardware and operating systems that are best suited to the task at hand or the applications. This creates a heterogeneous computing environment. The integration framework (discussed below) should support the systems and networks used by a client 78, 79, 120 in order to provide core integration services. The integration framework typically communicates via TCP/IP at the SNMP layer. In addition, support for SNA, RPC or IPX/SPX may also be provided. The client's 78, 79, 120 environment should determine the protocols that are supported.

Figure 38:
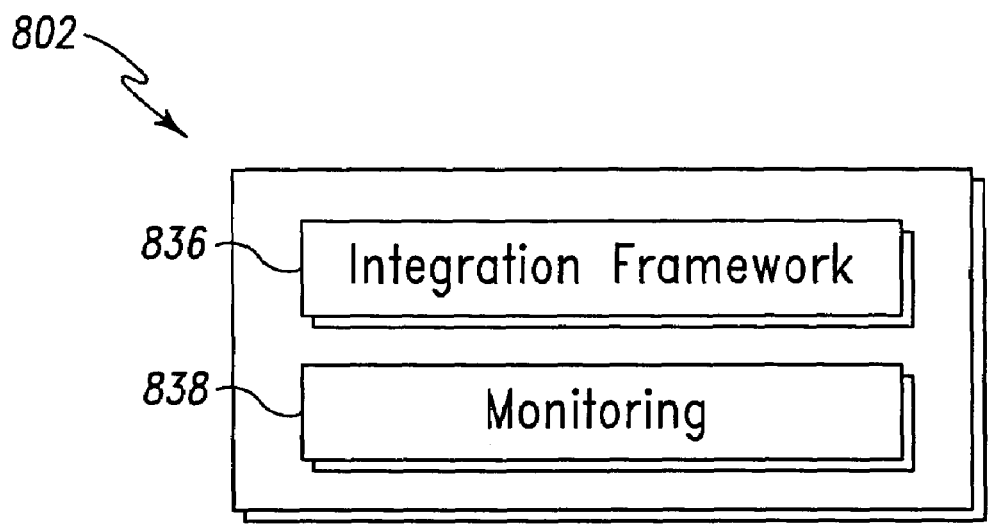
FIG. 38 illustrates the preferred operations integration architecture.

Referring to FIG. 38, the preferred operations integration architecture components 802 include an integration framework 836 and a monitoring component 838. The integration framework provides the foundation, which standardizes the way system events are communicated, addressed and managed throughout the environment. The integration framework ties together applications from a packaged framework provider, independent third parties and/or custom solutions to increase the operational availability, maintenance and development efficiencies of the environment. The majority of ROI (Return On Investment) from the integration framework is derived by implementing a robust integration framework with a high degree of event monitoring and event correlation, interoperability and communications between operations architecture components.

The preferred integration framework 836 falls into two main types of categories: framework-based and point solution-based. A framework-based integration framework uses a packaged technology offering to link operations architecture components. This approach is best utilized in a large enterprise where many operations components are being addressed. The point solution-based integration framework ties a variety of point-solution operations components together through custom integration. This approach is more appropriate when a very limited number of operations architecture components are being addressed.

Figure 39:
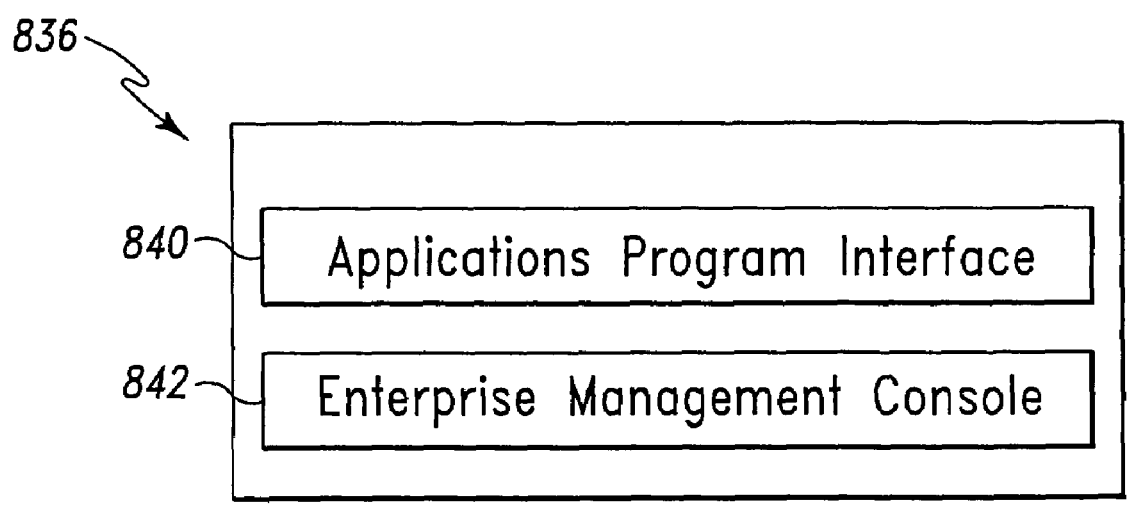
FIG. 39 illustrates the preferred integration framework.

Referring to FIG. 39, the preferred integration framework 836 includes an applications program interface 840 and an enterprise management console 842. The application program interface (API) 840 subcomponent of the integration framework 826 acts as the communication bridge or translator for messages from a client 78, 79, 120 into messages that the integration framework 836 may understand, allowing operations management components to communicate with each other despite potentially different message formats. The API 840 provides a limited set of standardized handles, which allow an application to access a service of the integration framework 836 without knowledge of the detailed inner-workings of the service. The API 840 thus serves as the foundation for integration between operations architecture components and the integration framework 836.

The typical challenge of designing and/or implementing APIs is determining the exact protocol method that each component uses to communicate. The use of operations architecture components from independent third parties and the client 78, 79, 120 may require customization of or development of new APIs 840 to support the needed communications within the integration framework 836. The use of various layers, stacks and versions of IP, SNMP and/or other technologies may increase the complexity of the solution.

For a framework-based approach to the integration framework 836, standard and commonly used APIs are typically incorporated into a packaged framework provided by the vendor. The inclusion of the APIs in a packaged framework tends to ease the integration between operations components that must communicate with each other; however, third-party or custom-designed operations components may require the development of a new or custom API to integrate with the integration framework. Industry-leading frameworks typically allow for the development and integration of these new APIs.

Integration for point solution-based or hybrid integration frameworks may be more difficult. The best-of-breed solutions selected to meet the client's operation component needs may not include the necessary APIs 840 to allow communication between the operations components. In many cases, custom APIs 840 must be developed to allow the necessary communications.

All operations integration architecture components 802 will interface with APIs 840 to provide communications services; however, the key component interface for the API 840 is for the monitoring components 838. Monitoring components 838 reside on a monitored resource and use APIs 840 to facilitate the communications to the integration framework and other services via direct API-to-API, command line or custom interfaces. The monitoring component 838 is further discussed below.

The enterprise management console (EMC) 842 subcomponent provides a centralized user interface to view and manage a client/server or distributed environment. The EMC 842 may tie all the operations management tools to a common user interface to allow administrators to proactively and remotely manage a whole environment from a single point. The EMC 842 may also be customized to the preferences of the administrator.

The EMC 841 may locate objects throughout the operations environment by using autodiscovery or by a single IP address discovery. Autodiscovery automatically finds networked objects and resources within the enterprise and virtually displays them for subsequent inspection via an appropriate topology. Autodiscovery typically locates the networked objects and resources that have an SNMP address. System administrators may subsequently filter the objects and resources to enhance the management view. By using single IP address discovery, administrators can eliminate unwanted objects or resources from the management view. All discovery information is typically stored in the common object repository along with management policies, defined characteristics, status information and management methods.

The EMC 842 typically interfaces with all operations integration architecture components 802 using a direct API to API, command line or custom-developed interface. This integration provides a single user interface to manage and administer the operations architecture components, thus simplifying and centralizing operations of the system. The key interfaces of the EMC 842 subcomponent are an application program interface subcomponent, a service desk component and the monitoring component. The application program interface subcomponent APIs enable communications between the EMC 842 and other operations architecture 800 components. The service desk component integrates with the EMC 842 to log track, and route incident reports.

The monitoring component 838 integrates with the EMC 842 to monitor, control and report the status of a network. The component may also provide the autodiscovery functionality of the EMC 842, as well as provide a means to graphically depict the status of network elements. It also integrates with the EMC 842 for event correlation, and serves as the administrators interface for receiving event/fault messages.

Referring to FIG. 38, the monitoring components 838 observe and report status information for system resources. A monitoring component 838 collects event, fault and health information from resources throughout the system for use by other operations components to ensure availability and that the system is continually functioning in accordance with defined service levels. The monitoring components 838 include two services or functions that assist in the propagation of event messages, which are event/fault management services and performance management services.

Event/fault management services receive, log, classify and present event messages in a console based on preestablished filters or thresholds. An event is an electronic message generated by any component (i.e. application software, system software, hardware, etc.) in the system. Event/fault management services may also contain the logic needed to handle events and escalate them to people not connected to the central console. In response to some of these informational events (i.e., non-negative events), the event/fault management services may send requests for action to the appropriate operations component. The service distinguishes whether events are neutral (e.g., "status is ok") or negative (e.g., "device has failed"). If it is determined that an event is negative, the event is passed to fault management for fault diagnosis and correction. A thorough understanding of the network baselines and thresholds will assist in correlating the network events and faults. This correlation can be used to understand root cause analysis when problems occur.

Performance management services perform the monitoring and management of end-to-end performance based on utilization, capacity and overall performance statistics. If necessary, the performance management services can make adjustments to the production environment, either to enhance performance or to rectify degraded performance. As monitoring functionality may be provided by many components in an operations architecture, a common problem is overlap of monitoring responsibilities. Some overlap may be unavoidable, but, ideally, the monitoring capabilities of all components should work together and complement each other, distributing information to specified consoles, and reducing the need for multiple enterprise managers.

Users may interface with the monitoring component 838 in many ways. Interaction is typically either one-way notification or two-way interaction. Each user typically has access to the enterprise management console (EMC) 842, which win show events from components that the user manages, based upon the users access level. Through this interface, users will be able to view, acknowledge and close events within the environment. In addition, users may also access the component console. While the component console is not intended to be the main point of contact for viewing events within the environment, it may serve as a diagnostic tool that will allow administrators to view events within the environment, do certain correlation actions, and view other pertinent information. The use of specific monitoring and console capabilities of each component may provide more detailed information than an integrated console could and, thus, may reduce the amount of time required to diagnose a fault.

Information gathered from system resources, regarding events, faults and attribute status is collected by a device often called a monitor, probe or agent. These devices reside on monitored resources and gather specific information to report to the appropriate component of the operations architecture. The devices may also monitor resource values and alert the administrator when a certain condition or criteria are met. Monitoring devices are usually scaleable and configurable, so any number may be applied to a given resource. In addition, these devices typically employ a manager/client concept. In other words, the components that use management information, control management actions and delegate authority are architecturally separate from the components that produce the management data and take action on behalf of managers.

As different components of the operations architecture 800 may provide their own monitoring agents, it is important to understand the role and types of data each agent is traditionally responsible for monitoring. This helps ensure that monitoring redundancy is avoided as much as possible. The most typical component monitors and their responsibilities include network/system management component monitors, database management component monitors, application and operating systems monitors/utilities, integration framework agents and hardware monitors.

Network/system management component monitors survey the status of the network devices (e.g., hubs, switches, servers) for events faults and health information. A standard protocol to consider as part of the network management component monitor is RMON. RMON, a standard management information base (MIB) that defines current and historical MAC layer statistics and control objects, facilitates the capture of real-time information across the network. The RMON MIB provides a standard method to monitor the basic operations, providing interoperability between SNMP management stations and monitoring agents. RMON can be used to analyze and monitor network traffic data within remote LAN segments from a central location. From its console, an RMON tool can automatically activate a remote monitor and collect traffic and performance data on that monitor's segment.

Database management component monitors survey the status of databases. They monitor database response times, manage and track storage utilization, performance and availability of the database. The data obtained from monitoring is used to determine commonly requested information from the database, to identify performance bottlenecks, and to assist in the ongoing tuning of databases to handle current and future volumes. Application & OS monitors/utilities survey the status of the operating system, applications and CPU/memory utilization and may use the operating systems proprietary monitoring and administration utilities to collect information into log files. The log files are passed to the management console of the operations architecture where the events and faults are filtered to alert operators of existing or potential problems.

Integration framework agents survey the status of the managed system resources. In addition, they promote the integration of monitoring capabilities through event correlation across components. Hardware monitors, such as protocol analyzers and "sniffers," assist technical support personnel to quickly diagnose/resolve complex network problems by directly examining electrical signals on a network link. This is increasingly important in today's global, distributed, diverse and super-segmented network environments that contain a wide variety of managed HUBs, switches, and routers, all scattered over remote sites making it almost impossible to "see" where problems are originating.

Communication between monitor components 838 and operations architecture 800 components provides the necessary information and feedback to maintain a stable environment. Typically, the monitoring system will use a layer of TCP/IP, such as SNMP, to control and communicate with resource monitors; however, in some instances, the level of detail provided by SNMP, or another layer of TCP/IP, is not adequate, so a proprietary protocol may need to be implemented to fully monitor a resource. For example, when monitoring a Cisco router, HP OpenView will gather device information using SNMP; however, since the level of detail provided by SNMP is not adequate, CiscoWorks 2000 (Cisco's proprietary management solution) integrates with HP OpenView and also utilizes CDP (Cisco Discovery Protocol) to obtain even greater information.

The monitoring component 838 may provide three main ways of notification that an event has occurred: paging, e-mail or a console alert. In case of a critical event, a text page with a detailed message of the event may be sent to the support person's pager. For notification of non-critical events, users are typically notified by email or via the enterprise management console 842. In addition, all events detected by the monitoring system may have a corresponding service desk ticket automatically created. By updating and closing tickets, the corresponding event throughout the system may be acknowledged and closed.

Some monitoring components 838 provide event correlation functionality, which ties together duplicate events, or events that are symptoms of a larger problem. Care must be taken if implementing event correlation to ensure that connections between events and root causes defined or event correlation may impede, rather than improve, problem diagnosis and resolution.

Event automation may exist on to handle different event levels. Four basic event levels are defined below along with sample notifications that may be implemented based on the criticality. Notifications may vary depending on client 78, 79, 120 requirements: trivial events of little or no importance may be automatically dropped; events of minor importance may open a service desk ticket for the team responsible for the event; major events may open a service desk ticket and run automated scripts to handle or maintain the problem; and for critical events, a text page may be set to the individual responsible for the event. By adding an escalation feature, the system may continue to page the "On Call" operators until someone acknowledges the event. After the initial page, the system may wait some set period of time. If the operator does not respond, a second page will be send to the same individual. After an additional period of time, the page will be duplicated and sent again to the same "On Call" person as well as the person's backup. This escalation continues through multiple levels of people until someone responds and acknowledges the event.

The preferred monitoring component 838 integrates with all of the components of the operations architecture 800 to provide event/fault management and performance management services. These services allow the components of the operations architecture 800 to send notification and alert messages and monitor performance levels. The key interfaces of the monitoring component 838 are the integration framework component 836, the service level management component 886, the service desk component 880 and the failover management component 872. The integration framework component integrates 836 with the monitoring component 838 to ensure that notification, warning and alert messages are standardized between the operations architecture components. In addition, the enterprise management console subcomponent serves as the visual message center for operations administrators. The service level management component 886 integrates with the monitoring component to ensure that service levels are maintained. The components use the performance data to check service levels, and uses the event/fault management service for system notifications. The service desk component integrates with the monitoring component to create trouble tickets for events and faults of a minor to critical nature. The service desk component allows the tickets to be tracked and traced. The failover management component integrates with the monitoring component to ensure that the system availability is high. Each of the components is discussed in more detail in the sections that follow.

Referring to FIG. 36, the operations architecture 800 also includes the network/systems management components 804. The network/systems management components 804 include all the components that monitor network and systems performance, process job activity and diagnose and report failures. The technical architecture hardware and software components addressed by the network/systems management components 804 includes hardware and software in all information technology environments; development, testing and execution. In addition, the actual information technology architecture components include: facilities, hardware, operating system, system software, network, database, custom applications and packaged applications.

Figure 40:
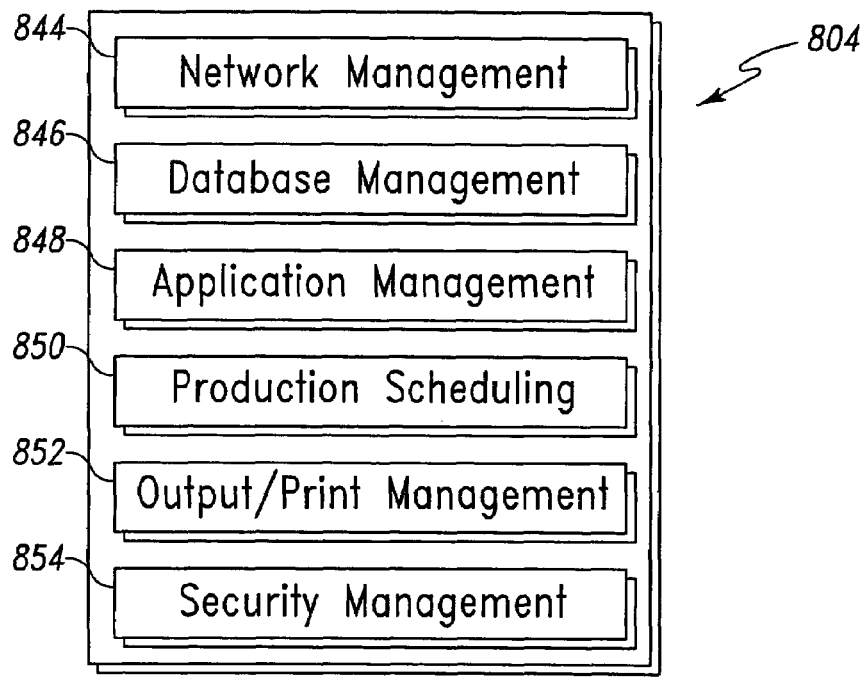
FIG. 40 illustrates the preferred network/systems management components.

Referring to FIG. 40, the preferred network/systems management components 804 includes network management tools 844, database management tools 846, application management tools 848, production scheduling tools 850, output/print management tools 852 and security management tools 854. Network management tools 844 monitor, control and report on the status of a network, and should integrate into an overall management platform. Network management tools 844 perform various functions including: monitoring, configuration management, element management, inventory management and change control, as well as providing a means to graphically depict the status of elements in the network.

Network management tools 844 are robust and equipped with large sets of functionality, specifically focused on the network domain. Because of this, the network management tools 844 may overlap with other tools that have been implemented to manage other elements in the environment (such as configuration management, monitoring, etc.). It is important to understand this overlap as it could influence the scope and functionality implemented for specific components. Network management should be considered as part of an operations architecture design. For a holistic solution, integration with existing management systems, service desk tools, application management tools and external service provider tools will need to be considered. If integrating with a backup/restore component (discussed later), ensure the backup/restore of the network management system is included in backup recovery technical requirements.

Due to the recording of large amounts of network and device notifications, network management systems require high capacity media, especially if historical data is kept for trending analysis. While the network management components 844 may integrate with many components in an architecture, there are a few key components that should be considered for especially tight integration: network management tools should interact with automated generation of service desk ticketing tools, inventory/asset tools and platform management tools.

SNMP (Simple Network Management Protocol), the Internet community's de facto standard management protocol, as well as RMON/RMON2 and MIBs are necessary for network management. These elements provide the ability to monitor, analyze and troubleshoot the network and devices on the network by facilitating the exchange of management information between network devices. A management protocol is used to convey management information between agents and Network Management Stations (NMSs). SNMP agents reside in the network devices where they collect and store management information that is passed between the other agents and the NMSs. Using SNMP data (such as network error rates) makes it easier to manage network performance, find and solve network problems and plan for growth.

Figure 41:
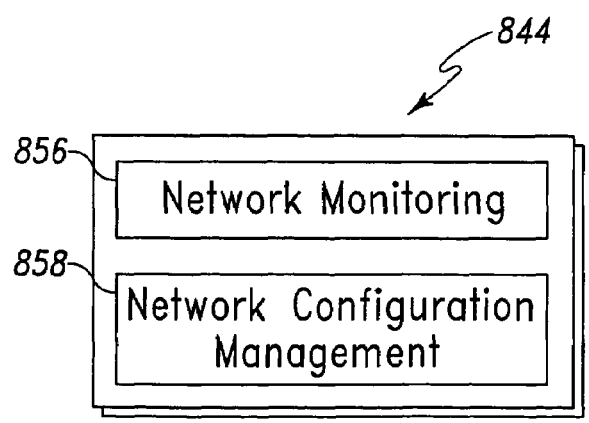
FIG. 41 illustrates the preferred network management tools.

Referring to FIG. 41, the preferred network management tools 844 include network monitoring components 856 and network configuration management components 858. Many components in the operations architecture provide monitoring functionality, which can cause significant monitoring redundancy in an environment. To encourage effective integration, monitoring considerations for all these components are addressed by the network monitoring component 856. Those skilled in the art would recognize that various network monitoring components 856 may be used in the present invention.

The network configuration management component 858 allows the network management tools 844 to remotely install and/or configure firmware or software on the network component (i.e., IOS upgrades, security IP addresses, etc.) It is used to remotely administer changes to network components on an as-needed basis and is implemented as part of a new network or existing network with the management of configurable devices. It involves identifying, controlling and monitoring the managed objects in a network, including hardware devices and software objects.

Referring to FIG. 40, the preferred network/system management component 804 includes database management tools 846. Database management from an operations perspective, is a critical component of any operations architecture 800 because it allows for the management of multiple databases within an enterprise. With most projects having a database component within their architecture and with databases existing across an enterprise, it is even more critical to provide the database administrators with some advanced tools to assist in database management. Implementing a component to manage the stored data across any single or multiple databases provides the utilities to: report on free space in tablespaces, databases and segments; coalesce tablespaces to reduce fragmentation; create and manage table and index partitions, data caches and buffer pools and node groups; validate tables and indexes to prevent corruption; analyze table and index statistics to maintain optimized performance; move transaction logs; shrink databases; and export and import databases in any mode.

Database management can also be applied to proprietary databases and the management component that typically comes with it. Because most architectures encompass databases existing across the enterprise, the content will focus on the management of multiple databases. Database management usually supports the following tools/capabilities: application tracing/debugging (e.g., debugging SQL Statements and database applications); replication management—tracking and comparing changes in the environment; and Interfacing to other applications and databases (e.g., MS SQL Server, Sybase, Oracle, Informix, DB2, etc.).

Several operations-related features are available in the preferred database management tools 846 that enhance productivity of database management; these include: managing multiple databases concurrently from a single graphical console; automating and streamlining day-to-day database administration tasks such as creating user accounts, altering objects, migrating schemas between development, test and production, etc.; scheduling capabilities to specify when to run specific tasks; monitoring database performance statistics (e.g., hit ratios, rollback contention, I/O distribution, etc.); ensuring the database is prepared for backup; and optimizing the indexes in database environment. The database management tools 846 also preferably comply with the following standards: ODBC; TCP/IP; X/Open's DTP/XA—for distributed transaction processing across heterogeneous database systems; ANSI SQL; JSQL—for JAVA interface; SNMP—for interacting with event management tools; Support UNIX and NT platforms for the server; and Support UNIX, Windows 95, 98 and NT for the client.

Figure 42:
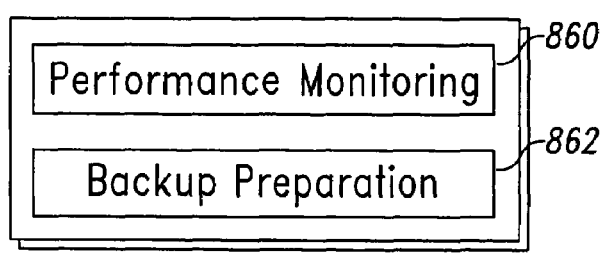
FIG. 42 illustrates the preferred database management tools.

Referring to FIG. 42, the preferred database management tools 846 include database performance monitoring services 860 and backup preparation services 862. Database performance monitoring services 862 survey the status of the database, promotes the improvement of database response times, manages and tracks storage, utilization, performance and availability of the database. The database backup preparation services 862 manage the specific backup and recovery needs necessary to a database. This subcomponent is vital to the management of a database in that it ensures the database can recover from small to large interruptions in service, whether caused by man-made or natural disaster. Although this subcomponent is closely related to the overall backup/storage/recovery component (discussed later), it is specific to databases. The overall backup/storage/recovery component will be responsible for the physical components in the backup and recovery (e.g., backup media, the backup itself) process.

Referring to FIG. 40, the preferred network/systems management component 804 also includes application management tools 848. The application management tools 848 deal with the performance and events that occur within an application. First, the application itself can contain instrumentation to measure internal application response time and performance. Second, the client 78, 79, 120 portion of the application can contain monitors to view application performance in a client server application from the perspective of the end user.

Referring to FIG. 40, the preferred network/systems management tools 804 include production scheduling tools 850. The production scheduling tools 850 are made up of a suite of applications that schedule and automate tasks specific to enterprise network, systems and applications management. The production scheduling component provides the capabilities of an automated job scheduler that dynamically schedules and dispatches batch jobs to automate production workloads.

Scheduling solutions centralize and automate the scheduling and management of jobs in distributed UNIX and Windows NT, bringing the functionality of mainframe batch scheduling to these environments with features such as self-correcting job control, centralized system-wide monitoring, and programmable error recovery. In addition, most enterprise-wide production scheduling tools 850 provide wide-ranging functionality, including system command scheduling, automatic PARM calculation and substitution, step-level condition-code validation, workload balancing, schedule forecasting and simulation, SAF security, optional SMP/E support, simultaneous support for multiple JCL libraries, electronic vaulting capabilities, pre-built calendars and other utilities. Comprehensive enterprise-wide scheduling preferentially support all major on-line systems including MVS, UNIX, VMS, Windows NT, AS/400 and Tandem platforms. This ensures that the production scheduling tools 850 can support interfaces across various platforms for the management and monitoring of all networks and systems management jobs across enterprise-wide.

In larger, geographically distributed organizations, the production scheduling tools 850 design should include an approach for triggering event-dependent processing on geographically distributed systems. Systems become more efficient when geographical location-specific events are managed on local resources such as local UNIX or NT servers. In addition, organizations may require local control of jobs due to service level requirements. Therefore, the production scheduling tools 850 should include global and/or local control, as well as synchronization of processes throughout the enterprise.

The production scheduling tools 850 aid the overall systems environment's efficiency in several ways. First, the component supports running more jobs and more applications in parallel, shortening the batch window and increasing the throughput of the available window. It reduces I/O processing and I/O delays, improves overall CPU utilization and saves DASD and tape usage. In addition, the production scheduling tools 850 provide even more powerful processing capabilities with the emergence of Parallel Sysplex and CMOS processors. It executes units of work in parallel, and dynamically distributes and balances these units across several processors with available resources.

Adapters are custom interfaces that enable the production scheduling tools 850 to initiate, monitor and control jobs for third-party tools and applications, such as SAP R/3, Oracle, Baan, Legato and PLATINUM AutoXfer. The adapters not only enable scheduling of tasks, but also monitor the success or failure of those tasks by providing status information in the form of exit codes. The adapters enable the scheduler to drive dependencies across applications and tools, while using the sophisticated date, calendar, and scheduling features of the production scheduling component. The adapter facilitates central management of all job processing in an environment by using one scheduler instead of multiple schedulers to execute tasks within systems management tools and packaged applications.

Referring to FIG. 40, the preferred network/systems management tools 804 include output/print management tools 852. The output/print management tools 852 ensure that output is distributed and tracked in a timely manner. It manages the output resources throughout the information technology environment, documents through the system and outputs delivery through a range of distribution channels. The output management tools 852 are often integrated into a suite of enterprise management tools. The output/print management tools 852 include two main elements: the server and an agent. The output management server can either reside centrally or be geographically distributed in the clients network. The server may interact with the production scheduling tools 850 to provide a central point for output scheduling. The main task of the server is to schedule, submit and track output jobs. The output management agent resides on each system requiring an interface to the output management tool. The agent interacts with the output management server to send and receive information for distributions.

The output/print management tools 852 preferentially should be implemented to centrally manage the operation's effort required for output distribution. Benefits of a distributed output management system include reliable print job delivery, multiple destination printing, a facility to allow for the restarting of faulted or interrupted jobs, an output management replacement for applications with limited output capabilities (i.e., SAP) and end-to-end job tracking by user, destination, or output queue. The output/print management tools 852 should provide destination and operating system independence to ensure that distribution can occur to any platform in the client's environment. Specific platforms may include: UNIX, TCP/IP based, GUI front end, command line interface, network (LAN/WAN) attached printers, printers attached to remote systems (i.e., MF, NT, UNIX).

The business requirements of the client will determine the necessary output channels supported by the output/print management tools 852; however, in most instances, support for printing, e-mail, file transfer, fax, messaging and on-line (web) are required. The output format of a file may vary depending upon the output channel. For network printing, the output/print management tools 852 typically support Postscript, PCL, text (EBCDIC and ASCII), FrameMaker (MIF and binary) and graphics files as inputs. Since the component may distribute output to various types of network printers, it typically manages the translation of Postscript, FrameMaker, and test data streams to support the printer type. It is very important for the Output Management design team to understand TCP/IP, UDP and relevant information regarding ports both on the server and printer. Most of the third-party output management components utilize the TCP/IP ports on network printers to distribute and track jobs.

For faxes, the output/print management tools 852 preferentially support Postscript, PCL, text (EBCDIC and ASCII), and FrameMaker (MIF and binary) input files. Output to fax machines may also be scaled. For example, selected pages of documents may be faxed, custom cover sheets may be specified and a limited number of header and footer areas may be specified. For e-mail, the output/print management tools 852 preferably support Postscript, PCL, text (EBCDIC and ASCII), and FrameMaker (MIF and binary) input files. MIME file attachments are also supported. For file transfers, the output/print management tools 852 preferentially allow for the transfer of files between any host capable of supporting standard ftp operations. Output may be sent to any UNIX, mainframe, or PC destination while maintaining the original file format. For on-line viewing (web), the output/print management tools 852 preferably provide an interface tool or product to support the web functionality. The web-viewing component should provide the ability to automatically publish various types of information on the intranet. For the on-line viewing of jobs, security considerations must include creating the appropriate rights. In this way, authorized users may subscribe to the information via the intranet.

The output/print management tools 852 distribute information from a central site using both 'push' and 'pull' distribution mechanisms. The 'push' mechanism allows distribution to users in different forms. These include: pointcast (to one user), multicast (to multiple users); and broadcast (to all users). The 'pull' mechanism allows users to access reports via an on-line viewing means such as the web. Hence, users can "pull" the reports to their desktops for viewing and printing.

The output/print management tools 852 preferentially integrate with applications so that the services can be initiated automatically during output processing. The component should also have the ability to integrate with standard email packages. In addition, the component should integrate with other system management and network management components, such as, monitoring, production scheduling, change control, and security management components. The interfaces used to establish this integration will be dependent upon the tool selection for each component while meeting the business requirements to the client.

Figure 43:
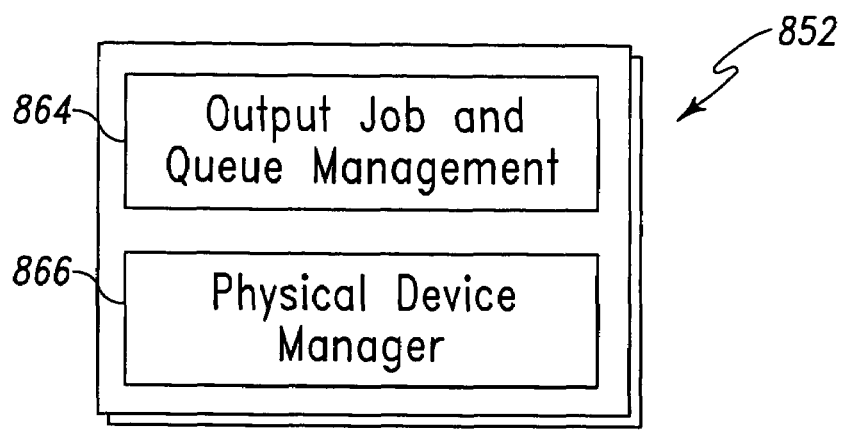
FIG. 43 illustrates the preferred output/print management tools.

Referring to FIG. 43, the preferred output/print management tools 852 include output job and queue manager components 864 and physical device manager components 866. The output job and queue manager (OJQM)864 sub-component maintains a single view of all the jobs and queues residing on the system. The capabilities of the output job and queue manager 864 preferentially include: tracking of jobs in queue, retaining queue jobs with a user-definable job retention period, setting queue scheduling policy, verifying job completion/delivery and management authorizations, controlling queues of various types, configuring queues to serve multiple physical devices, identifying jobs by user destination or queue management, and end-to-end notification.

The physical device manager components 866 are responsible for managing all of the physical output resources throughout the system from a central console. These output resources include all destinations; printers, fax machines, e-mail locations, web pages and pagers. In particular, it supports the administration of physical output resources and the status of physical output resources. The physical device manager components 866 provide the "master console" to operations personnel to oversee the device information and allows them to identify problems and implement corrective action as necessary.

The physical device manager components 866 are responsible for creating applications and managing configurations of these applications. A successful output management solution must allow for rapid, unexpected, dynamic output management configuration changes throughout the output management system with minimal or zero user interruption. The configuration information of all the output devices should be stored in a central repository to reduce administration and allow a single-system view of all resources being managed throughout the system. By utilizing a server-centric design, a resource or destination is immediately available to any client without a client-side configuration. In addition, determining the actual physical destination of an output job may be difficult. The benefit of an output management system is that it allows output to any device within the system. However, without a system-wide naming convention, output jobs may be sent to incorrect locations or devices.

Referring to FIG. 40, the preferred network/systems management tools 804 includes security management tools 854. The security management tools 854 preserve the confidentiality, integrity and availability of information system assets (includes hardware, software, firmware, customer data, information/data and telecommunications) by managing and coordinating security functions (people and processes), and by utilizing security tools and technologies in order to enforce the security policies and standards defined for the system.

Security itself cannot be divided clearly into execution, development or operations architectures, but rather is applicable in all three of them. For example, access control tools may be required in an operations architecture to manage access to system administration utilities, while they may also be needed in a development architecture to manage access to code repositories. To avoid redundancy of security content in these architecture frameworks, all security areas and components are now represented within the security framework. The security framework gives a comprehensive overview of the security areas and components needed to ensure the confidentiality, integrity and availability of information assets.

Figure 44:
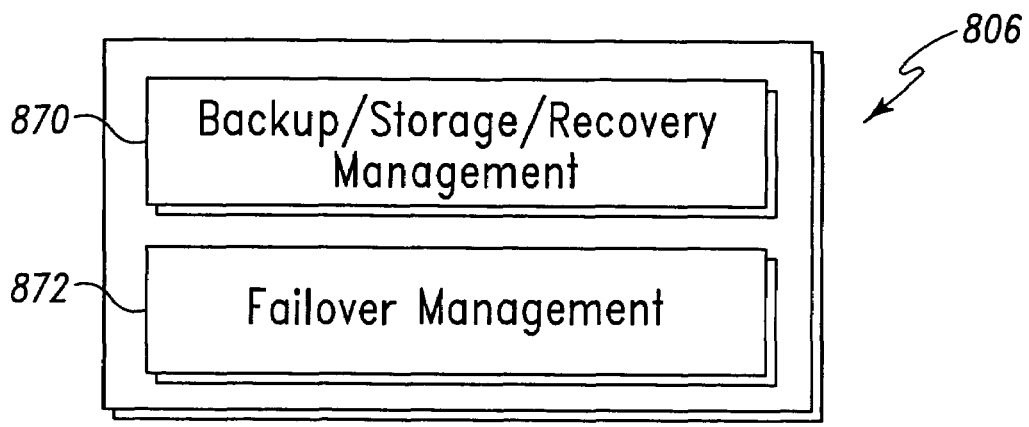
FIG. 44 illustrates the preferred solutions availability components.

Referring to FIG. 36, the preferred operations architecture 800 also includes solutions availability components 806. The solution availability components 806 include applications that ensure availability of information technology systems through back-up or redundancy strategies. As illustrated in FIG. 44, the preferred solutions availability components 806 include backup/storage/recovery management components 870 and failover management components 872.

The backup/storage/recovery management components 870 of the operations architecture 800 handles all of the backups and restorations that need to take place across a distributed system. This component is vital to the operations architecture 800 in that it ensures the system can recover from small to large interruptions in service, whether caused by man-made or natural disaster. Depending upon the system architecture, back management can occur centrally or remotely.

Business requirements dictate how the backup/storage/recovery management components 870 supports database backups. Database support may become more complex in a distributed environment as business critical data may be distributed across the system. New architectures may require logical databases to be spread across multiple devices, creating inter-device data dependencies. Backup strategies must coordinate the data across these devices, and must determine where the backup copy or copies of the data will reside. Database backups may be supported by the backup/storage/recovery management components 870 or database management system (DBMS) components of the operations architecture 800. Depending upon the configuration of the database and the amount of critical data, the database management system may best serve the backup needs of the client.

Figure 45:
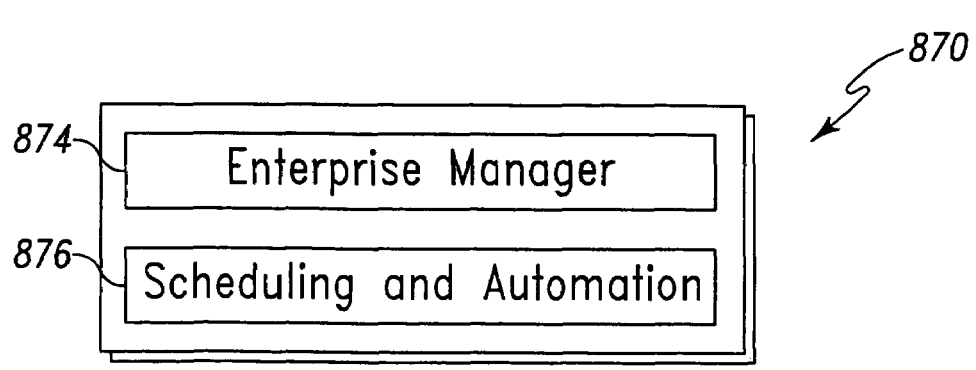
FIG. 45 illustrates the preferred backup/storage/recovery management components.

Referring to FIG. 45, the preferred backup/storage/recovery management components 870 include enterprise manager components 874 and schedule and automation components 876. Enterprise manager (EM) components 874 provide a user interface to view and manage various types of centralized and distributed storage media (i.e., tapes, disks, etc.). The enterprise manager components 874 allow an operator to monitor and control storage resources from a centralized console. The enterprise manager components 874 interface and capabilities should be determined by the client; however, the base characteristic of the interface utilizes a graphical user interface (GUI) with the option of defaulting to a command line interface. For flexibility in execution, the graphical user interface may be configurable. Specific capabilities may include: ability to customize interfaces for different classes of users, and provisions for comprehensive and effective error messages to aid in deciphering problems and taking corrective action.

The scheduling and automation components 876 handle the execution of scheduled backups across the environment, and the ability for the scheduled backups to initiate automatically without requiring human interaction. Business requirements will determine the timetable and schedule of system backups. It is important produce a backup schedule that will provide the most flexibility and reliability in effectively backing up all data of applications including critical databases to help ensure the ability to recover from potential disasters. Automation of the process is important so as to limit the amount of user intervention during the process. Jobs should be automated where possible, and should rerun or restart automatically from a point of failure. Automated control of media inventory, including labeling and loading may be of significance depending on the environment.

Referring to FIG. 44, the preferred solutions availability components 806 include failover management components 872. The failover management components 872 provide the mechanisms for managing and controlling the switch over of users and applications from a primary system to a secondary system after a fault or failure. In the event of a fault or failure, the failover management component re-routes system resources to a secondary, stable configuration until the primary resources are restored and/or replaced. Although the failover management components 872 may be the solution for most faults or failures that may occur in a system, it will not account for a complete disaster. In the event of a disaster, a disaster recovery plan should be in place to allow the client to restore system operability or replace a system within a specified timeframe.

The failover management components 872 should be considered whenever disruption in the availability of mission-critical data and/or applications would impact the ability to conduct business or perform daily tasks. This may be especially important in environments such as eCommerce or banking/accounting applications where availability is crucial, and downtime is extremely costly to the organization. The failover management components 872 use redundant systems and data to ensure that the flow of mission-critical data is maintained.

The failover management components 872 may be implemented to provide protection against four types of failure. A different tool may be required for each type of failure. Network interface protection services use redundant LAN/WAN cards (e.g., Ethernet, token ring, or FDDI) in case of network card failure. In the case of card failure, the failover management component automatically routes traffic to the second card. The failover tool transparently moves the IP address from one LAN card on a server to a standby LAN card on the same server.

Network path protection services use redundant network paths to maintain a LAN/WAN connection. The redundant paths may be accomplished using two or more connected hubs to create a single network with alternate paths. In case of network failure, the failover management component tool transparently moves the server address from the controller card on the first hub, to controller card of the second hub. Afterwards, the component issues a retransmit so the client becomes aware of the new mapping and continues the connection. System protection services use a redundant system to protect against system failure. The secondary system is transparent to the other system or clients on the network. In case of a system failure, the secondary server's LAN card becomes the redundant controller. In this type of failure, client connections are broken, but they may simply reconnect using the same IP address. Data protection services use redundant disks to protect against data loss or unavailability. Distributed environments may take advantage of redundant arrays of inexpensive disk (RAID) technology or disk mirroring to ensure uninterrupted data flow.

Figure 46:
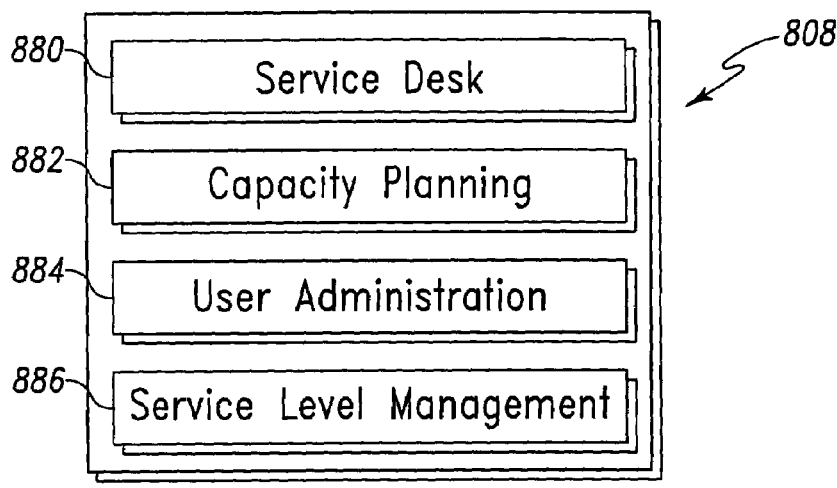
FIG. 46 illustrates the preferred service management components.

Referring to FIG. 36, the preferred operations architecture 800 also includes service management components 808. The service management components 808 include those components that assist the information technology organization in providing quality information technology service and support. Since service management is a process-oriented function, it must be kept in mind that these components address service management from only a technical perspective. As illustrated in FIG. 46, the preferred service management components 808 may be selected from a service desk component 880, a capacity planning component 882, a user administration component 884 and a service level management component 886.

The service desk components 808 provide the functionality of maintaining a central point of contact to route all reported incidents from users to proper support teams. Service desk components 880 for organizations, functions or departments require tools to automate the logging, tracking and routing of incidents. The service desk components 880 provide the following additional functionality: logging and tracking of incidents, querying of logged incidents, reporting of incidents, notification and escalation to support teams for incidents meeting predetermined criteria. The effectiveness and efficiency of the service desk components 880 can be further established with integration of other operations architecture 800 components, specifically in the areas of monitoring and reporting.

There are many situations in which support and solutions must quickly be provided for an incident or problem. Within organizations, there may be high-priority functions/departments, such as loan generation and approval for a finance company or drug-interaction reporting to the FDA for a pharmaceutical company. If these departments are dependent on information technology applications, the service desk design must be suitable to quickly handle support for incidents and problems.

Figure 47:
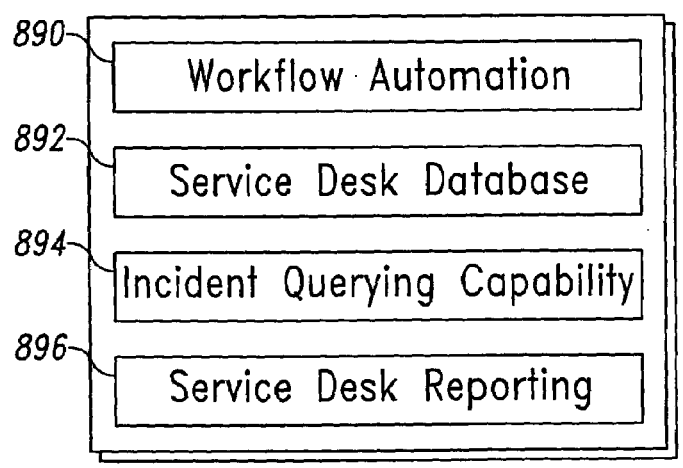
FIG. 47 illustrates the preferred service desk components.

Referring to FIG. 47, the preferred service desk component 880 includes workflow automation services 890, service desk database 892, incident querying capability services 894 and service desk reporting services 896. Workflow automation services 890 impact all aspects of the overall service desk design. It includes the design and creation of windows, process triggers, and events in the service desk components 808. It is defined by the process flow design for logging, tracking, assigning and closing incidents. The window or screen views include the location and pattern of fields for incident data entry. The process triggers and events include pre-determined and programmed actions such as auto-assignment and auto-escalation of incidents.

Workflow automation services 890 address the number of applications being supported as well as any complexities with the systems being supported. Support complexity includes the knowledge distribution through the overall support organization as well as the transfer of incidents from one information technology support group to another. For example, as the number of applications or application complexity increases, the more knowledge capital required by the information technology support organization. Typically, this knowledge capital is distributed throughout the information technology organization (i.e., UNIX Admins, and Oracle DBA's).

Workflow automation services 890 address support complexity by ensuring that fields values and "pull-down" menus address all support groups as well application specific detail. The design and integrity of hard-coded field values is not only important for pre-production, but it is also important to ensure that the design is flexible enough so that fields and hard-coded values can easily be modified as support personnel transition with time. In addition to ensuring field value considerations, the auto-notification and auto-ticket assignment design should be thorough enough to ensure that correct application information is being sent to e-mail and pagers.

Another direction of the service desk component 880 and the workflow automation services 890 is the logging and tracking of incidents via the Web. With this direction, end-users log and check status of their own incidents. Many of the service desk components 880 offer solutions, which allow for Web integration with some customization. The most important workflow aspect for Web integration is to ensure that workflow is simple, but also solid enough to obtain all the correct incident information in the first logging.

The service desk database 892 is the repository where actual incidents, employee profile information, and hardware profile information exist. The structure of tables and the allocation of space are main considerations for developing a service desk database. The main factors that drive the service desk database design are estimated numbers of logged incidents and estimated numbers of queries. With an efficiently structured service desk database, overall workflow and system performance will not be impeded.

Most service desk components 880 allow for the option to create a flat file database to store incidents. However, this is not an optimal choice for most organizations. This is because as the flat file increases in size, overall service desk application performance quickly deteriorates. It is optimal and recommended, even by service desk component vendors, to select third-party databases such as Oracle or Sybase. The selection of the third-party database for the service desk should be the same type of database already supported by the organization (i.e., an organization using Oracle should use Oracle as the service desk database).

The service desk components 880 incident estimates and query estimates are the main factors for designing the structure and layout of the service desk database 892. The amount of incidents logged by organizations can range from a several dozen to several thousand in a week. Size estimates for the service desk database 892 and database hardware should include the size of current incidents, which require migration and the estimates of future incidents. In addition, a database administrator (DBA) should preferentially be an integral part of the total database design effort. In addition, any documentation, release notes and manuals of the service desk components 880 must be made available to the DBA. Appropriately sizing and structuring a service desk database 892 is also a challenge. Since most database sizing is based on estimates of production incident rates, consideration should be given for performance testing the service desk database 892 and/or allocating time in production for "fine tuning" the database.

The service desk database is impacted by the organizational structure by the actual number of users on the service desk system. With more users, queries must be well defined for efficiency. In addition, queries should be optimized to minimize over-complexity. Also, unnecessary ad-hoc user queries should be eliminated. (See Incident Querying Capability.) The service desk database 892 design preferentially includes an archiving tool for current incidents as well as future number of incidents. Also, the solution should include a means to search, access, read and report on archived incidents.

Incident querying capability services 894 include the retrieval or reporting of incidents via pre-defined and ad-hoc query statements. The incident querying capability services 894 allows for the retrieval of incidents, employee profiles and hardware profiles with specific characteristics (e.g., all incidents submitted today with high priority, and with the Microsoft Excel Macro Virus). A robust incident querying capability is an important sub-component to the preferred service desk component 880 since the complexity of record retrieval grows as the amount of incidents increases.

Organizational structure affects the incident querying capability services 894 in several ways. With more groups in an organization comes a larger amount of queries. If the organization and service desk components 880 are dispersed geographically, workflow design considerations must be made to accommodate querying capability from various organizational locations. For complex and numerous queries throughout a geographically dispersed service desk, hardware and database sizing estimates must accommodate query demand. Another consideration driven by the organizational structure is including the functionality to generate solutions in the querying capability with a "hook" into a solutions database.

As the number of applications and/or support complexity increases, the number and complexity of queries also increases. In the area of pre-defined queries, the amount of queries increases as the number of application support groups increases. This is because most pre-defined queries derive specific application or problem information. For large, complex applications such as SAP, service desk incident queries must also be complex to derive specific problem information. System hardware and database sizing estimates must accommodate the projected query estimates.

The incident querying capability services 894 are driven by business type and priority in various ways. Business type and urgency is defined by the requirement to have minimal or no downtime (e.g., a pharmaceutical company utilizing information technology systems to run adverse drug reaction reports for the FDA due to a recent adverse drug reaction cannot afford degradation in systems and information technology support). As business urgency increases, the more incident querying capability services 894 required by the service desk components 880. This, in turn, will cause a larger number of users running queries on the service desk components 880. With more users running queries, adequate capacity should be determined. In addition, users should be trained on how to run queries to limit unnecessary queries and system performance degradation.

Logging and querying for incidents over the Web is a direction for many organizations. With this direction, end-users check status of their own incidents by running queries from various geographical regions. Many of the service desk components 880 offer solutions that allow for Web integration, including the capability to run queries. Queries will typically take longer since users are running queries from different locations, subnets and Internet firewalls.

Service desk reporting services 896 include the capability to run pre-defined or ad-hoc queries on the service desk database 892 to review management and other incident summary reports. Many of these reports are tied to OLA and SLA reporting. The higher the number of OLAs and SLAs, the higher the number of reports required for an information technology organization. Service desk reporting services 896 track trends in incidents, applications, application components, and time periods. The service desk reporting services 896 can be packaged as part of the service desk component 880 or it may be a third-party vendor solution.

It is the organizational structure, which most drives the reporting requirements. With more groups and support teams in an organization comes a larger breadth and depth of reports. It is the reporting requirements, which drive many of the pre-defined incident queries. The greater the volume and complexity of reports, the larger the queries become in complexity and number. In addition, organizational structure drives the reporting format. Some support groups may require only "raw" columned data. In other situations, the same report may have to be displayed as an executive summary in graphical format. There are various reporting tools, which can produce single reports in different formats for different audiences. In addition, on the pragmatic end, tools such as Remedy can run queries and save data in text format to be formatted in Excel.

Another function of the service desk reporting services 896 is providing access to reports via the Web. With this direction, end-users, support personnel and managers view and print pre-defined reports. Reporting becomes a less-extensive task if workflow automation services 890 and querying have been addressed to reflect Web integration.

Referring to FIG. 46, the preferred service management components 808 include capacity planning components 882. The capacity planning components 882 represent the tools that gather utilization data from various elements of an environment and translate this information along with planned workloads into projected hardware and software capacity needs. Data is typically generated through the use of agents placed on elements in the environment. Elements of an environment that are often measured/analyzed by the capacity planning components 882 include disk space, memory utilization, processor utilization, databases and networks.

A different set of tools is required to perform capacity planning in a mainframe environment versus a client/server environment. In a mainframe environment, many of the utilization statistics and data-gathering features required for capacity planning are part of the mainframe operating system and will be accessed by a third-party capacity planning application that is chosen. In a client/server environment, it will likely be necessary to implement capacity planning agents on the elements of the environment that will contribute data to a capacity planning component.

Different elements of the environment may require unique agents to gather accurate and relevant utilization statistics. For example, databases typically require unique capacity planning agents vs. agents to measure utilization for disk space, microprocessor, or network utilization. Care must be taken in product selection processes that the vendor supports all elements, which must be modeled, or that the vendor can support the integration of a third-party agent if required. When selecting a capacity planning component 882, a team should ensure that all operations system, database, systems or software standards that contribute to the environment being modeled are supported by the capacity planning component, or that those systems or software are somehow addressed through the component design.

The physical location of the elements to be monitored by capacity planning components 882 impacts the complexity of the architecture. When the environment is centralized, less effort is required to install agents and gather utilization data than when the environment is physically distributed. As the capacity planning component 882 often requires measurement agents to be installed directly onto production systems, it is imperative that the various stakeholders of those systems be involved in the design and implementation process. Stakeholders may include application owners, network administrators, system programmers or application administrators. These stakeholders should be fully aware of the potential performance impacts of the capacity planning measurement agents and should contribute and buy in to testing, rollout and contingency planning for the capacity planning components 882.

Figure 48:
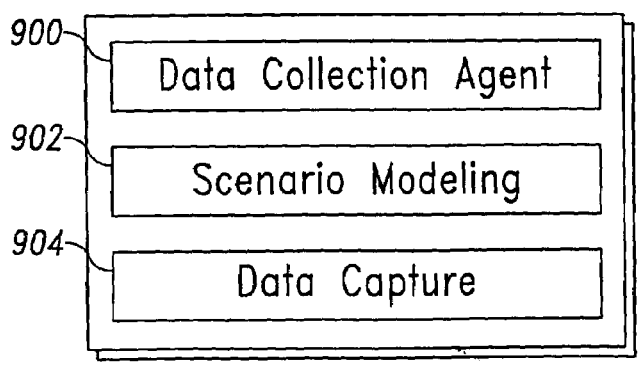
FIG. 48 illustrates the preferred capacity planning components.

Referring to FIG. 48, the preferred capacity planning components 882 include a data collection agent 900, a scenario modeling agent 902 and a data capture agent 904. The data collection agent 900 subcomponent of the capacity planning component 882 provides the monitoring and measurement services to generate data for building a capacity model. Data collection is done through programs called "agents," which typically reside on an element whose utilization and performance is being measured. Examples of these elements include an application server, a network component, or a database.

A key design criterion of the data collection subcomponent is the accuracy of the data generated by the agent. The accuracy of various tools' data collection agents vary widely and this directly impacts the accuracy of the capacity model and the quality of the capacity plan. The "footprint" of capacity planning data collection agents 900 is typically not large enough to cause significant performance degradation of a server or network. However, a data collection agent 900 combined with other services on a server or network (such as monitoring agents, etc.) may in total produce enough processing "overhead" to impede performance of the production environment. Design of the data collection agent 900 should consider the effect of the agent in combination with other processes to ensure that performance remains adequate. Typical data types generated by data collection agents 900 include processor utilization, memory utilization, DASD utilization, network utilization and transaction response time. There are some manual data collection activities as well, typically service level measures and targets as well as workload definitions and growth projections.

The scenario modeling agent 902 is the set of capabilities in a capacity planning component 882 that allows future system performance to be simulated based on workload (e.g., number of users, number of transactions per minute) and systems configuration (e.g., number of processors, amount of DASD, amount of memory) inputs. The scenario modeling agent 902 supports various reporting capabilities as well.

Accurate scenario modeling depends on estimates of the performance limitations of specific products in an environment. For example, the performance limitations of a Pentium II processor or a database must be input for the scenario modeling agent 902 to be able to accurately estimate its performance under different workloads. Some capacity planning components 882 provide a repository of predefined product performance specifications for common system components (e.g. processors, databases). If this repository is not available as part of a client's scenario modeling subcomponent, manual estimation and entry of product limitations will be required.

Several types of reporting capabilities exist for the preferred scenario modeling agent 902. Based on workloads and product specifications, the scenario modeling agent 902 should be able to discern the resulting service levels and performance expectations across system components. As such, different system configurations can be simulated, such as the addition of additional memory or DASD and the resulting impact on service levels, which is scenario-based reporting. Based on specified workloads and resources, it is possible to predict the level of utilization the resources are experiencing. These resources utilization reports may also include data on contention for system resources. Graphical reporting (as opposed to spreadsheets and/or tables) is supported in some tools to ease the usability of the model.

The data capture agent 904 takes a point-in-time utilization view of elements in the environment, typically during a peak usage period, and creates a "base model" which is a snapshot representation of system performance. Using the base model along with workload estimates (e.g., expected number of users and growth rates, number of servers) and service level expectations (e.g., a two-second response time is required), a capacity plan for future system capacity requirements can be created. The data capture agent 904 preferably allows the user to easily modify the base model once it has been created. For example, the user may wish to change workloads or correct inaccurate data within the base model.

Referring to FIG. 46, the preferred systems management components 808 include user administration components 884. The user administration components 884 preserve the confidentiality, integrity and availability of information system assets (includes hardware, software, firmware, customer data, information/data, and telecommunications) to users by managing and coordinating user security functions (including processes), and by utilizing security tools and technologies in order to enforce the security policies and standards defined for the system.

User administration components 884 cannot be divided clearly into execution, development or operations architectures but, rather, is applicable in all three of them. For example, access control tools may be required in an operations architecture to manage user access to system administration utilities, while they may also be needed in a development architecture to manage access to code repositories. To avoid redundancy of user administration/security content in these architecture frameworks, all security areas and components are now represented within a security framework. The security framework gives a comprehensive overview of the security areas and components needed to ensure the confidentiality, integrity and availability of information assets.

As illustrated in FIG. 46, the preferred systems management components 808 include service level management components 886. The service level management components 886 are the set of tools that allow information technology organizations to view and report on end-to-end system performance against information technology service levels. Service level management components 886 automate traditional manual processes that combined data from other operations architecture 800 components, such as service desk tickets, change control records and monitoring logs to create an end-to-end service level report. Using end-to-end service level data, information technology organizations can more effectively plan, measure, predict and improve performance against service levels.

The service level management components 886 may utilize existing operations data from various sources such as: service desk tickets contain data on ticket resolution times and problems with specific system components; change control records contain data such as number of problem changes, number of changes executed by particular service group, or number of backed-out changes; and monitoring log data is performance and utilization statistics from various system components such as network, database, operating system and applications. The service level management components 886 store this data in its own data repository that connects to the data sources. The service level management components 886 also maintain information about data relationships to support event and performance correlation. Direct connections must be configured from these data sources to a service level management repository.

The service level management components 886 have a knowledge engine, which contains organizational specific rules that define service levels; and manages the interface to operations data sources. The real-time operations data is compared to the rules in the knowledge engine on a periodic basis. The time intervals and frequency of the real-time "service checks" are determined by the priority of the service levels. If any of the operations data fail to meet service levels as defined by the rules, operations and management personnel can be notified automatically.

Depending on the feature set of the specific tool being implemented, the service level management components 886 can react to service level deficiencies in various ways. The service level management components 886 can trigger notifications of service level deficiencies; apply intelligence to generate specific advice and predict service levels. The applied intelligence can also be used to actually help diagnose application problems and generate detailed recommendations for resolving performance and reliability issues. Predict potential non-compliance issues with service level agreements. This helps management plan for resources in advance. Custom rules can also be added to the service level management components 886. allowing for custom implementations or changes in service levels. Automate the tuning of applications to meet service level requirements. This may be done through a service level management "controller" that helps focus on the areas that cause most performance and reliability problems and can take corrective actions.

Once operations data is captured in the data repository, various reports can be run and submitted to operations personnel and service providers. These summary reports include overall application performance and downtime reports, service desk ticket summary reports, database performance reports, network performance reports, and overall service provider effectiveness. Areas to consider include utilizing existing report data from various databases (example: producing reports directly from the service desk and change control database) versus replicating the data to a common service level management data repository. If all service level management data is replicated to a common repository, there may be more flexibility in producing a larger depth and breadth of reports without impacting any individuals using/accessing current databases (e.g., service desk users and change control users accessing their respective databases).

Another consideration for service level management reporting is allowing reports to be distributed and viewed on the Web. This eliminates the processing and overhead of printing hard copies, especially with the larger management reports. An area of consideration is understanding the interface with an output/print management solution such as Dazel, or configuring custom interface between the service level management components 886 and the Internet. Since many of the management reports contain key information technology production information, it is important to allow the appropriate management access to the reports. Web security is an important factor both for internal user access and for developing appropriate firewalls to prevent inappropriate external use.

Referring to FIG. 36, the preferred operations architecture 800 includes configuration management components 810. The configuration management components 810 include the components, which help the information technology operations environment understand and modify "what is where.", These components may either track information about an element configuration and "push or pull" data and software to an element. Information, which needs to be tracked, includes product licensing information, warranty information, vendor names, logical and physical device information, product configuration tracking, software and version levels, network configuration parameters, physical location, and accounting information.

Figure 49:
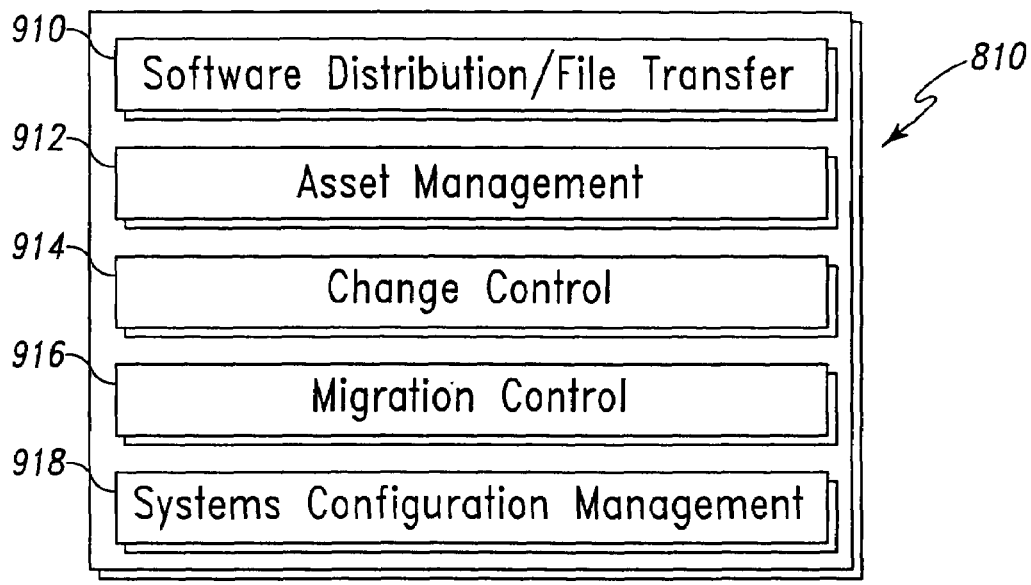
FIG. 49 illustrates the preferred configuration management components.

Referring to FIG. 49, the preferred configuration management components 810 include software distribution/file transfer components 910, asset management components 912, change control components 914, migration control components 916 and systems configuration management components 918. Software distribution/file transfer components 910 provide an automated mechanism for distributing new or changed software and/or data files to an end user or target system. This component addresses the technology used to centrally manage software installation (applications, service packs, and operating system updates), repairs, updates, and removal. The distribution of software should include verifying the target configuration, distributing the software, and verifying the distribution was successful.

Software distribution/file transfer components 910 vary from simple to elaborate in terms of the features they provide. Specific tools typically fall into one of three tiers: Tier 1: Provides basic facilities for transferring files/software to and from remote computer systems. This tier is at the level of FTP, and allows the transfer of text files to printing devices as well as between computer systems. Tier 2: A slightly more advanced file exchange solution, tools at this level are able to create an inventory of all the hardware and software in the environment, store the information in a database, and use it to perform software distributions and installations. Entire software packages can be rolled out to the enterprise by scheduling distribution of source and configuration files to appropriate servers and distribution points. It can also be used to target and coordinate installations on servers and workstations. Tier 3: A "Self-Healing" solution where the tool diagnoses and repairs software conflicts and components. To perform this functionality, the tool captures and monitors the working configuration of each application and stores it. When an application fails, the tool compares the captured information to the configuration of a user's desktop and executes required changes to restore the working configuration. The tool may also offer remedies to enable the user to fix the problem or send it to the service desk.

The asset management components 912 represent the tools, from a hardware and software aspect, that ensure all assets in an environment are registered within the inventory system and that detailed information for registered assets is updated and validated. These tools support events throughout an asset's lifetime: procurement, installation, maintenance and transfer of information technology assets. The data created by the asset management components 912 is typically used for such activities as managing service levels, managing change, assisting in incident and problem resolution, and providing necessary financial information to the organization.

The asset management components 912 interface with the service desk component 880, the systems configuration management component 918 and the change control component 914. The asset management component 912 assists the service desk components 880 support personnel in trouble shooting user problems by: identifying user location and properties of an asset; and tracking files to identify changes made to settings of hardware and software. They assist the systems configuration management component 918 by providing the ability to restore settings to a previous configuration. They assist the change control components 914 plan asset changes. Information is also used to assist in managing the method, schedule, and resources needed to perform a rollout by: identifying nodes that will receive distribution; providing data to calculate cost of change; providing data to proactively predict any technological conflicts that may occur if the change is implemented; and monitoring installation failures.

Figure 50:
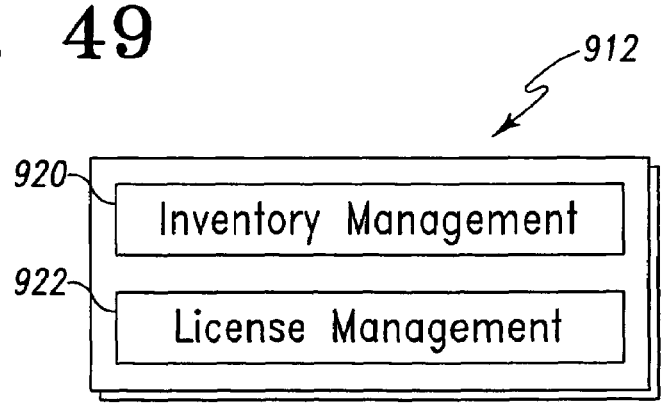
FIG. 50 illustrates the preferred asset management components.

Referring to FIG. 50, the preferred asset management components 912 include inventory management tools 920 and license management tools 922. Inventory management tools 920 determine the composition of the assets in the environment. In addition, this subcomponent provides and stores the information about the assets and enables reporting and tracking. An inventory scan is executed to determine what the assets in the environment are. The inventory scan agent "touches" each asset and determines what type of equipment it is, what hardware resides on it, and what software is on it. This scan provides the data for a database of the assets which can be queried and produce reports on the assets in the environment. Because of security and privacy issues, remote clients (notebook users, home PC's, etc.) who are using personal systems should be excluded from the inventory process. Remote users with corporate based laptops should receive an inventory scan when they are able to connect to the network for a period of time. Several asset management tools 912 will allow the exclusion of one, or a group of, PCs that need to be excluded.

License management tools 922 ensure software licenses are being maintained throughout the enterprise. The license management tools 922 manage the number and type of licenses and ensures strict adherence to license agreements by metering the environment for software and license usage. License metering is usually a feature of the license management component whose purpose is: to monitor software product for license information (e.g., license use and availability); to ensure maintenance of software licenses and optimize the number of licenses in the environment; to track license use and availability to achieve asset optimization; and to generate reports on the license management metrics.

License management tools 922 preferentially integrate with event management for notification of expired licenses and software, and in an application-sharing environment, when the license thresholds are being exceeded or reached. These notifications can be e-mailed or logged for retrieval by the administrator.

Referring to FIG. 49, the preferred configuration management component 810 also includes change control components 914. The change control components 914 enable a controlled and repeatable management of components as they evolve in both development and production environments. The change control components 914 help automate a process by which the various information technology units, project teams, and business units communicate, implement, and document changes in the systems environment. In addition, the change control components 914 help provide efficient and prompt handling of all change requests. Another function of the change control components 914 are to provide traceability for all changes incorporated into the production, development and testing environments.

The change control components 914 can integrate with various technical aspects of the operations architecture 800. Help desk incidents can be linked to proposed and executed information technology change requests. In this area, design considerations should include designing a data interface to the service desk component 880. For example, help desk incident record numbers (the primary individual key per record) can be tied to change control record numbers. The design of the workflow should allow for the auto-query of "related" change control or help desk records upon a press of a button.

Data gathered by the network/systems management tools 804 can provide a baseline to measure against unauthorized changes. In this case, the query design of the change control components 914 should include the ability to perform ad-hoc or pre-determined queries, which can report on specific network management changes. Data gathered by network/systems management tools 804 (UNIX, VMS, MVS, etc.) can be utilized to monitor systems once a change has taken place. In this case, errors or system degradation in a change can be detected. A design consideration for the change control components 914 in this area would be to develop an interface with the systems management tools in which system performance degradation can be tracked and reported.

Monitoring tools can notify the change control components 914 when configurations have changed or been modified. Although this is not a direct design consideration in the change control components 914, the design must include an interface that distinguishes which change control personnel to notify for these types of changes. Prior to a release, data within the change control components 914 database can provide substantial information on which issues occurred when changes were conducted in the test environment. Design considerations must address workflow and query capability in two areas: 1) to allow a "free-text" field in the change control component window and 2) to address full-text search capability on free text fields. Asset management data (hardware and software) can be tied with the change control components 914 in two ways. One way is to allow the change control component to link to hardware and profile tables. In this way, change administrators can select hardware information from a "pull-down" menu in the workflow. Secondly, the querying capability should address the ability to track changes to specific hardware, servers, and applications.

Figure 51:
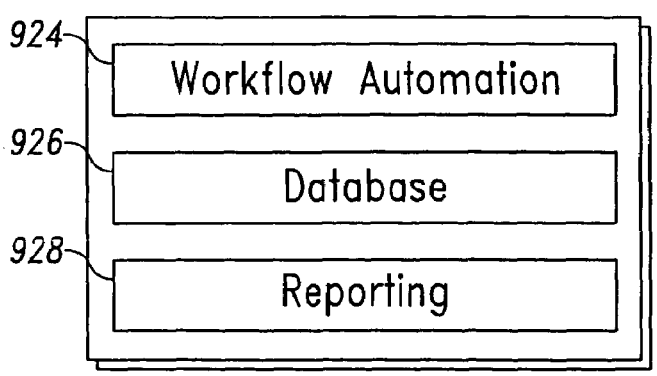
FIG. 51 illustrates the preferred change of control components.

Referring to FIG. 51, the preferred change control component 914 includes a change control workflow automation 924, a change control database 926, and change control reporting services 928. Workflow automation 924 impacts all aspects of the overall change control design. It includes the design and creation of windows, process triggers, and events. It is defined by the process flow design for logging, approving, tracking, assigning, and closing change requests. In addition to logging, approving, and tracking change requests, the change control workflow automation components 914 include interfaces to other components of the operations architecture 800 such as the configuration management components 810 and the service desk component 880. The window or screen views include the location and pattern of fields for change request data entry. The process triggers and events include pre-determined and programmed actions such as auto-assignment and auto-escalation of incidents.

The change control workflow automation component 914 must appropriately be designed to ensure that the execution of change is conducted in a proper order. This can be accomplished by designing triggers to perform automatic approval checkpoints to insure that the approver is aware of change details and that all pertinent information is entered in the change request. Change details include execution order by support group (i.e. 1. App Admin stops application daemons, 2. DBA brings down database, 3. System Admin reboots server), scheduling conflicts, and back-out plans. The change control workflow automation components 914 design must address support complexity by ensuring that fields values and "pull-down" menus address all support groups as well application specific detail. The design and integrity of hard-coded field values is not only important for pre-production, but also important to ensure the design is flexible. In this way, fields and hard-coded values can easily be modified as IT support personnel transition with time. In addition to ensuring field value considerations, the auto-notification and auto-ticket assignment design should be thorough enough to ensure that correct application information is being sent to e-mail and pagers.

The change control database 926 is the repository where actual change records, and application, server and hardware profile information exist. From this database, change schedules and other reports are queried for and printed by a user front-end. The structure of tables and the allocation of space are main considerations for developing change control database 926. The main factors that drive the change control database 926 design are estimated number of logged changes and estimated number of queries.

Most change control components 914 allow for the option to create a flat file database to store change requests. However, this is not an optimal choice for most organizations. This is because as the flat file increases in size, the overall change control components 914 performance quickly deteriorates. It is optimal and recommended to select third-party databases such as Oracle or Sybase. The selection of the third-party database for the change control database 926 should be the same type of database already supported by the organization. (i.e., An organization using Oracle should use Oracle as the change control database 926.)

The change control components 914 request estimates, query and approving estimates are the main factors for designing the structure and layout of the change control database 926. The amount of changes logged by organizations can range from a several dozen to several hundred in a week. It is very common for the change control components 914 to share databases with the service desk component 880 since the amount of change requests is significantly smaller than the amount of service desk incidents. In the case of sharing databases, the change control component 914 would simply require its own tables. Size estimates for the change control database 926 and database hardware should include the size of current change requests that require migration, and the estimates of future change requests. In addition, a database administrator (DBA) must be an integral part of the total database design effort. In addition, any documentation, release notes and manuals of the change control components 914 must be made available to the DBA.

The change control reporting components include the capability to run pre-defined or ad-hoc queries on the change request database and create reports to review management and other change correlations. Many of these reports are tied to OLA and SLA reporting. change control reporting components 928 can help track trends in changes to systems and application components within given time periods. The change control reporting components 928 can be packaged as part of the change control components 914 or it may be a third party vendor solution.

Referring to FIG. 49, the preferred configuration management components 810 also include migration control components 916. Migration control components 916 control multiple versions of source code, data, and other items as they are changed, tested, and moved from one development environment into another, for example, from development to test and from test to production. Data migration control tools manage multiple versions of the database and its data to ensure that accurate data and structure are maintained in the environment, and to ensure that versions of application code and database are deployed consistently. Types of data that would be migrated include base codes data and converted data. Other migration control components 916 manage other types of objects to ensure that complete versions of all components reside in the production environment (for example, test definitions and scripts).

The systems configuration management component 918 is typically addressed in the development architecture 500 of an organization; however, the component has several key interfaces to the operations architecture 800. The interfaces ensure that applications are transferred to the production environment without disruption to service levels or application availability. The key interfaces for the system configuration management components 918 to the operations architecture 800 are for the software distribution/file transfer component 910, the change control component 914 and the change control migration control component 916.

Once code is properly tested is must be properly labeled and versioned. The systems configuration management component 918 interfaces with the software distribution/file transfer components 910 to ensure that software is not distributed unless it was tested and versioned properly. The systems configuration management component 918 has many dependencies and interfaces to the change control component 914. Every new module of code and all modifications require a change control record. The change control records are used to help track of which changes occurred where. Also, the systems configuration management component 918 data within the change control database 926 is extracted to create change summary reports for operations groups and management. The systems configuration management component 918 interfaces to the migration control component 916 by assuring that correct version information exists across the organization before any migrations occur. Since the systems configuration management repository contains all the version information, the migration control component 916 utilizes this information to ensure repeat or wrong migrations do not occur.

Figure 52:
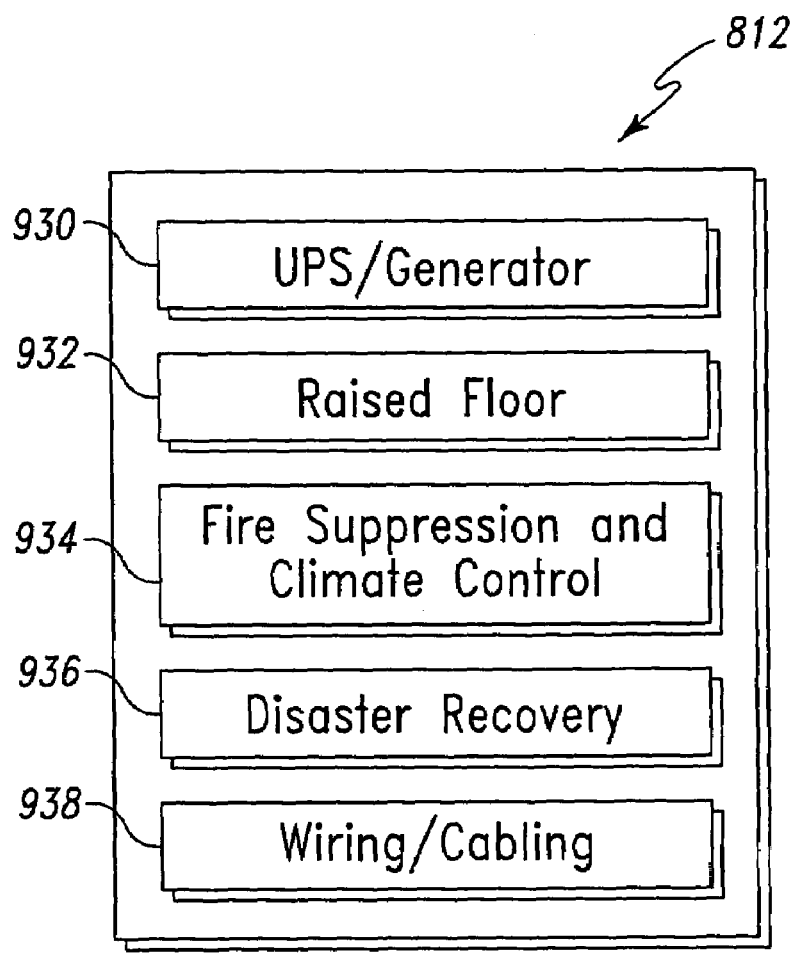
FIG. 52 illustrates the preferred site management components.

Referring to FIG. 36, the preferred operations architecture 800 also includes physical site management components 812. The physical site management component 812 ensures that the physical environment is managed and protected against unplanned outages. The physical site management component 812 applies to all environment architectures: development, testing, and execution. Referring to FIG. 52, components that may be implemented as part of this category include: UPS/generator components; a raised floor; fire suppression and climate control systems 934; wiring/cabling 938; and disaster recovery components 936.

As set forth above, the physical site management components 812 include a UPS generator component 930. To protect against loss of computing resources due to power outages, it is common for separate power units to be used as contingency supplies for critical computing resources. These may be implemented to support the power needs of an entire data center such as with an independent generator, or may be implemented to support a single machine through a battery-based UPS. Typically, UPS systems are designed to provide enough power for users and administrators to do the backups or systematic shut-down necessary to prevent catastrophic loss of information.

To ease organization and provide spaces for systems components such as wiring and heating/cooling/power systems, it is common in data centers to implement a raised floor 932. Most raised floor is 12 to 18 inches high. This amount of clearance allows for cable trays to occupy their necessary space without impeding airflow. Many server-class systems are designed to cool interior components with chilled air intake from a raised floor. The cooled air then flows up through the server, across the heated components and is discharged at the top (and back) of the server. This 'hotter' air is then re-chilled before being recirculated under the raised floor. For optimal cooling effects, all tiles in a raised floor should be in place. Special 'cut outs' or ventilation panels allow for appropriately directed airflow. This can only be accomplished with a reasonable amount of air pressure caused by all of the raised floor tiles being in place. The raised floor should be grounded to prevent static or undesired electrical charges from being distributed across the floor.

As set forth above, the preferred physical site management components 812 also include fire suppression and climate control systems 934. It is common in data centers or computer rooms to implement systems that protect computing resources from damage due to fire or other catastrophic events. Halon or other chemical systems may be implemented.

Halon systems or more recently FM200 systems are implemented to suppress fires in data centers. These systems use a 'heavy gas', which displaces oxygen and thus suffocates a fire. The use of these systems is also 'friendly' to computer hardware unlike water and others. Because of the chemical nature of these systems, there are usually additional precautions or government regulations, which must be followed in the event of a discharge. Halon (or like) systems often require a 'sealed' room to be completely effective. Doorways, conduit feeds, air handling feeds, etc. should be properly sealed in order for the systems to optimally work. These fire suppression systems should be configured with a warning prior to discharge. Such an indicator should allow personnel in the data center adequate time to leave the room. The systems often release with a force that will displace items that are not firmly attached (papers, unsecured ceiling tiles, etc.). Most systems should be equipped with a discharge override button and an annunciator panel, which gives a clear indication of the specific fire (or excessive heat) location in the facility.

Temperature and humidity monitoring and regulation is a key component of a data center. Appropriate air regulation is needed in order to keep hardware within its performance tolerances. Most data centers build redundancy into these climate systems by having multiple chillers and multiple air handlers. A common practice is to have an extra air handler and/or chiller, which allow one unit to be serviced/maintained without impacting the room's climate. The cooling capacity should match or exceed the BTU output potential of the components and room.

Many facilities have standard building codes, which require water sprinklers to be installed in the event of a fire. These charged pipes should be disabled over the computer room floor in favor of a non-damaging fire suppression system such as Halon (see above). Moisture/water sensors should be placed at the lowest points under the raised floor.

Detection should give an audible alarm and an annunciator panel should give an indication as to the specific location of detection in the facility.

The preferred physical site management components 812 also include disaster recovery services 936. If applicable, organizations may employ many levels of disaster recovery precautions. This will range from off-site storage of backups to entirely redundant physical facilities to support disaster contingencies. In these cases, all of the above physical environment management services would be duplicated at the backup site.

Minimally, off-site storage of backups should be planned and used. Arrangements for speedy retrieval of specific tapes should be negotiated in the arrangement with the storage provider. In the event of a disaster, shut-down procedures should be well documented, practiced and followed. Data centers with many systems should clearly identify the order in which systems should be shut-down and restored in the event of a disaster. Multiple scenarios exist for recovery at an alternate location. Failover: some implementations may plan to use hardware at an existing alternate location to provide 'failover' capabilities for their critical systems. The most common cases of this are development servers in a separate facility acting as a failover for production servers. Cold site: generally, these are agreements/arrangements, which allow an impacted site to use a portion of space in another data center. The servers themselves are not duplicated; often arrangements for a vendor to quickly supply the hardware are agreed to. Hot site: in this scenario, all components are duplicated between two physically separate facilities. This provides the highest degree of redundancy, but also is the most expensive alternative. All disaster recovery scenarios should be planned and tested regularly. Recovery testing should range from simple backup restores to full 'practice' failovers at the alternate facility.

The preferred physical site management components 936 also include wiring/cabling 938. The wiring and cabling of operation architecture 800 may be of many types. Generally, it may be divided into two categories: power and data. Power cabling exists between the UPS (or 'house' power source) and the servers. In most data centers, power distribution units (PDUs) are used to facilitate the orderly delivery of power to various parts of the facility. A PDU functions and looks much like a standard electrical breaker box. Each individual breaker is then generally used for a power run (often called a 'whip') out to individual servers or racks. Data cables may support network connections and/or connectivity to external systems (e.g., a standalone disk array). 10-BaseT (Unshielded Twisted Pair), and Fiber Optic cable are typically used for LAN and backbone links. Wiring systems are typically housed in wiring closets and/or under the raised floor to encourage an organized environment. Distribution/punch-down panels for wiring to users' desktops may be used. Rather than having the cable from each desktop plug directly into a networking hub (which can cause difficulties in managing moves, adds, and changes) the distribution panel provides an intermediate connection between desktops and network hubs.

Labeling is of paramount importance. Both ends of every cable should appropriately give the cable a unique identifier. This helps in problem resolution. In the case of power cables, the connector type (e.g., L-620) should also be indicated on the label. PDU labeling is also key. Each breaker should be clearly identified mapping both its use and the connecting cable's unique identifier. PDUs provide a portion of the power from the UPS. In some critical systems cases (production hardware, disk units servicing many servers), redundant power feeds to separate PDUs are desired. Distributing the power feeds between two PDUs eliminates an additional single point of failure. Often, individual servers require multiple network connections (one for general network; one for a separate backup network; one for internet vs. secured). With multiple connections to the same server, labeling is even more critical. These same principles apply to data cables used for external disk arrays, etc. As with other critical components, change control for all wiring should be followed. Documentation and approval of changes will help with problem identification and resolution.

The operations data architecture 814 represents where and how operations data is stored, how it is accessed, where it is used, and how it is distributed. In many cases, parts of the operations data architecture will be predefined by packaged operations architecture components, which impose specific logical and/or physical data models. In addition, the operations data architecture is significantly impacted by the operations processes and organization as these dictate who needs access to data and how data will be used. As such, design and implementation of the operations data architecture should always involve teaming with process and organization implementation teams.

The specific types of data that will make up the operations data architecture 814 are determined by operations architecture components being used. As there is typically a large amount of overlap in the types of data that are needed by various components, there is significant opportunity for data sharing across components. These opportunities for sharing must be balanced against a packaged component's need for data to conform to its own set of standards and file structures. In addition to data types created by operations architecture components, there may be a need to view data from outside the operations architecture.

Many packaged operations components have predefined logical or physical data models that may drive the design of a client's operations data architecture. For instance, to achieve the full data sharing and integration benefits of the Tivoli TME integration framework, it is likely suggested that the predefined data repositories and file structures be used. While certain amounts of customization may be required (e.g., whether Oracle, Sybase, etc. storage standards will be used, physical distribution of core operations data, how often this data is replicated/synchronized) significant customization effort can be expected if a component's packaged data structure is modified and original integration benefits are still expected.

If operations data will be shared across operations architecture components, a key project task will be to define how operations components will interface to the data generated by a different component. Sharing could require anything from a unique data replication/synchronization strategy to a simple messaging interface. For example, interfaces may be built between a service desk component 880 and the monitoring component to ensure that the service desk component 880 is automatically notified of critical events. These interfaces may be scripts that send an alert message directly from the data source to the dependent component, or they may be based on a data replication strategy that periodically copies event data to a central location where it is analyzed for specific events.

An operations architecture 800 project should review all interfaces between components be sure to address the interface mechanism for each place where data will be shared. As many operations architecture components use flat file storage for data, interface definitions teams will need to determine: what is the DBMS or file structure for data that will be shared; and how will the operations data be synchronized across components? The operations data architecture must support overall service level agreements. Common performance targets that can influence the operations data architecture design include update requirements, the number of service desk component 880 events expected per month, transaction response time for service desk personnel, application availability requirements, growth expectations and 24/7 support.

Figure 53:
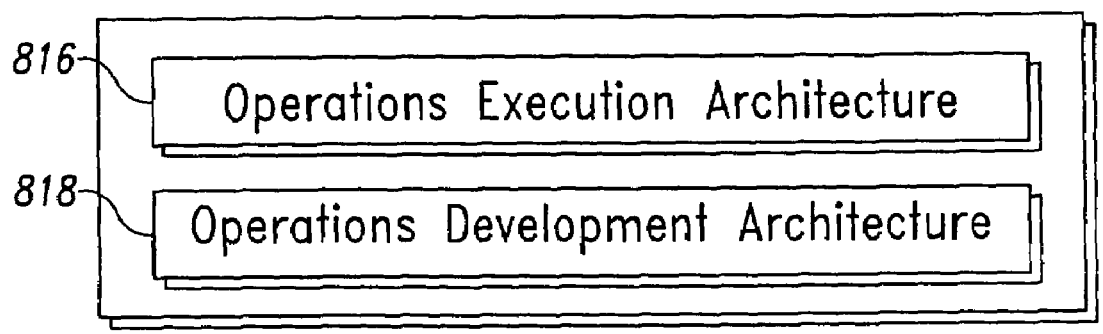
FIG. 53 illustrates the preferred operations execution architecture and the operations development architecture.

Referring to FIG. 36, the preferred operations architecture 800 includes the operations execution architecture 816 and the operations development architecture 818. Although not illustrated in FIG. 36, the architectures 816, 818 are separate components, which are illustrated in FIG. 53. The operations execution architecture 816 provides the run-time services required for components of the operations architecture 800 to execute. It answers the question "What is the technology environment on which my operations architecture components will run?" Put another way, it is the "infrastructure" for components of the operations architecture 800. As an example, a client with an NT standard for application servers and a TCP/IP network may wish to implement a set of operations architecture components to manage its desktops. If the client chose to adhere to its standards, the operations execution architecture 816 would include NT for the operating system and presentation services, and TCP/IP for communications services. Operations architecture 800 components would be required to communicate via TCP/IP and run on the NT platform.

It is important that the operations execution architecture 816 be considered when designing and implementing an operations architecture. Its impact may include: technology standards may be imposed for operations architecture components (e.g., the component must run on HP-UX, or it must adhere to certain messaging standards such as DCOM or CORBA); and, additional components that must be purchased to implement the operations architecture (e.g., the server hardware and network on which operations architecture components run may need to be purchased).

The operations development architecture 818 provides a unified collection of technology services, tools, techniques and standards for constructing and maintaining components of the operations architecture. It answers the question "What is the technology environment in which my operations architecture components are designed, built and maintained?" As an example, a client that plans to deploy a packaged integration framework into production may choose to establish a separate product test environment, which contains development versions of all operations architecture components that will be deployed. In this environment, the design and configuration of operations architecture components can be modified without affecting the production environment. This "testbed" represents an operations development architecture 818.

It is important that the operations development architecture 818 be considered when designing and implementing an operations architecture 800 as its impact may include: the establishment of a safe "development & testing" environment for operations architecture components; the need for development architecture components to be purchased, designed, and deployed by the project to create this "development & testing" environment; and new processes and procedures, and criteria that govern when an operations component is adequately tested and "ready" for rollout.

While the invention has been described in its currently best known modes of operation and embodiments, other modes and embodiments of the invention will be apparent to those skilled in the art and are contemplated. For other features, advantages and combinations of the present invention refer to U.S. Provisional Application Ser. No. 60/156, 962, filed on Oct. 1, 1999 NETCENTRIC AND CLIENT/SERVER COMPUTING, which is herein incorporated by reference, in its entirety.

What is claimed is:

1. A netcentric computing system having an operations architecture stored on a computer readable medium, comprising:
   a operations integration architecture component executable to provide for the integration of other operations architecture components;
   a network/systems management component executable to survey a status of network devices for event faults and health information, to integrate into an overall management platform and to provide monitoring redundancy;
   a solution availability component executable to ensure availability of information technology systems through back-up or redundancy strategies by coordination of data across a plurality of network devices and by enablement of the netcentric computer system to recover from man-made and natural disasters that result in interruptions to service;
   a service management component executable to assist an information technology organization in providing quality information technology service and to support and to provide a central point of contact to route all reported incidents from users to support teams;
   a configuration management component executable to remotely administer changes to network components and to allow network management tools to remotely install or configure firmware or software on the network;
   a physical site management component executable to ensure that the physical environment is managed and protected against unplanned outages;
   an operations data architecture executable to support an overall service level agreement by defining how operations data is stored, accessed, used and distributed, and how an operations component interfaces to data generated by a different component;
   an operations execution architecture executable to provide the run-time services for execution of the operations architecture; and
   an operations development architecture, wherein the components provide specific functionality for the operations architecture, while the architectures represent the environments in which the components are developed, deployed, and operated.

2. The operations architecture of claim 1, wherein said operations integration architecture comprises an integration framework and a monitoring component.

3. The operations architecture of claim 2, wherein said integration framework further comprises an applications program interface and an enterprise management console.

4. The operations architecture of claim 1, wherein said network/systems management component is selected from the group consisting of a network management tool, a database management tool, an application management tool, a production scheduling tool, an output/input management tool and a security management tool.

5. The operations architecture of claim 4, wherein said network management tool is selected from the group consisting of a network monitoring component and a network configuration management component.

6. The operations architecture of claim 4, wherein database management component is selected from the group consisting of a database performance monitoring service and a backup preparation service.

7. The operations architecture of claim 4, wherein said output/input management tool is selected from the group consisting of an output job and queue manager, and a physical device manager.

8. The operations architecture of claim 1, wherein said solutions availability component is selected from the group consisting of a backup/storage/recovery management component and a failover management component.

9. The operations architecture of claim 8, further comprising a monitor for viewing application performance in a client server application.

10. The operations architecture of claim 1, wherein said service management component is selected from the group consisting of a service desk component, a capacity planning component, a user administration component and a service level management component.

11. The operations architecture of claim 10, wherein said service desk component includes a workflow automation service, a service desk database, an incident querying capability service and a service desk reporting service.

12. The operations architecture of claim 10, wherein said capacity planning, component includes a data collection agent, a scenario modeling agent and a data capture agent.

13. The operations architecture of claim 1, wherein said configuration management components is selected from the group consisting of a software distribution/file transfer component, an asset management component, a change control component, a migration control component and a systems configuration management component.

14. The operations architecture of claim 13, wherein said asset management component includes inventory management tools and license management tools.

15. The operations architecture of claim 13, wherein said change control component includes a change control workflow automation application, a change control database and a change control reporting service.

16. The operations architecture of claim 1, wherein said physical site management component includes a UPS/generator component, a raised floor, a fire suppression and climate control system, a plurality of wiring/cabling and a disaster recovery component.

17. The operations architecture of claim 1, wherein the network configuration management component identifies, controls or monitors a plurality of managed objects in the network.

18. The operations architecture of claim 17, wherein the managed objects are hardware objects or software objects.

19. The operations architecture of claim 1, wherein said operations integration architecture addresses integration of operations architecture components and decides on common standards, interfaces, message formats, monitoring responsibilities, and file logging formats used by other components of the operation architecture.

20. The operations architecture of claim 2, wherein said integration framework provides a foundation for standardizing the way system events are communicated, addressed, and managed throughout an environment of the netcentric computing system.

* * * * *

UNITED STATES PATENT AND TRADEMARK OFFICE
CERTIFICATE OF CORRECTION

PATENT NO. : 7,020,697 B1
APPLICATION NO. : 09/706012
DATED : March 28, 2006
INVENTOR(S) : Marina Goodman et al.

It is certified that error appears in the above-identified patent and that said Letters Patent is hereby corrected as shown below:

Column 1

Line 25, delete "transaction" and insert -- transactions --.

Column 23

Line 21, add a period after "upgrade".
Line 21, "Referring" should begin a new paragraph.

Column 26

Line 10, delete the "=" between "management" and "team".
Line 58, delete "is" and insert -- are --.

Column 44

Line 24, delete "Be" and insert -- By --.

Column 46

Line 6, add a period after "folders".

Column 67

Line 45, add -- to -- after "order" and before "maximize".

Column 73

Line 59, delete "GIF" and insert -- .GIF --.
Line 59, delete "JPEG" and insert -- .JPEG --.

Column 75

Line 18, delete "a" between "be" and "simple" and insert -- as --.

Column 79

Line 20, delete "form" and insert -- from --.

UNITED STATES PATENT AND TRADEMARK OFFICE
CERTIFICATE OF CORRECTION

| | |
|---|---|
| PATENT NO. | : 7,020,697 B1 |
| APPLICATION NO. | : 09/706012 |
| DATED | : March 28, 2006 |
| INVENTOR(S) | : Marina Goodman et al. |

It is certified that error appears in the above-identified patent and that said Letters Patent is hereby corrected as shown below:

Column 84

Line 10, delete "though" and insert -- thought --.

Column 85

Line 59, delete "ion" and insert -- in --.

Column 96

Line 11, delete "fro" and insert -- for --.
Line 23, insert -- are -- before "responsible".
Line 46, delete "exchange" and insert -- eXchange --.

Column 97

Line 33, delete "delivery" and insert -- deliver --.

Column 98

Line 34, "The network" should begin a new paragraph.

Column 99

Line 30, delete "IN" and insert -- In --.

Column 100

Line 57, delete "IN" and insert -- In --.

Column 102

Line 23, delete "these" and insert -- this --.

Column 104

Line 29, delete "win" and insert -- will --.

UNITED STATES PATENT AND TRADEMARK OFFICE
CERTIFICATE OF CORRECTION

PATENT NO. : 7,020,697 B1
APPLICATION NO. : 09/706012
DATED : March 28, 2006
INVENTOR(S) : Marina Goodman et al.

It is certified that error appears in the above-identified patent and that said Letters Patent is hereby corrected as shown below:

Column 107

Line 59, delete "caing" and insert -- calling --.

Column 108

Line 36, delete "Once" and insert -- One --.

Column 112

Line 45, insert a period after "hoc".

Column 113

Line 67, delete "AS" and insert -- As --.

Column 121

Line 61, delete "win" and insert -- will --.

Column 136

Line 4, delete "in to" and insert -- into --.

Column 138

Line 27, delete "886."and insert -- 886, --.

Column 142

Line 60, delete "change" and insert -- Change --.

Column 143

Line 36, insert -- keep -- between "help" and "track".

Column 147

Line 2, "The operations" should begin a new paragraph.

UNITED STATES PATENT AND TRADEMARK OFFICE
CERTIFICATE OF CORRECTION

PATENT NO. : 7,020,697 B1
APPLICATION NO. : 09/706012
DATED : March 28, 2006
INVENTOR(S) : Marina Goodman et al.

It is certified that error appears in the above-identified patent and that said Letters Patent is hereby corrected as shown below:

Column 149

Line 26, delete the comma between "planning" and "component".

Signed and Sealed this

Eighth Day of August, 2006

JON W. DUDAS
*Director of the United States Patent and Trademark Office*